United States Patent
Ham et al.

(10) Patent No.: US 10,218,834 B2
(45) Date of Patent: Feb. 26, 2019

(54) MOBILE TERMINAL CAPABLE OF PERFORMING REMOTE CONTROL OF PLURALITY OF DEVICES

(71) Applicant: LG ELECTRONICS INC., Seoul (KR)

(72) Inventors: Junseok Ham, Seoul (KR); Jaeyoung Kim, Seoul (KR); Yoonho Shin, Seoul (KR); Yoonseong Kim, Seoul (KR); Heejeong Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/739,985

(22) PCT Filed: Jun. 23, 2016

(86) PCT No.: PCT/KR2016/006674
§ 371 (c)(1),
(2) Date: Dec. 26, 2017

(87) PCT Pub. No.: WO2016/208984
PCT Pub. Date: Dec. 29, 2016

(65) Prior Publication Data
US 2018/0191890 A1 Jul. 5, 2018

(30) Foreign Application Priority Data
Jun. 26, 2015 (KR) .......... 10-2015-0091419

(51) Int. Cl.
*H04M 1/725* (2006.01)
*G08C 23/04* (2006.01)
*G06K 9/00* (2006.01)

(52) U.S. Cl.
CPC ........ *H04M 1/72533* (2013.01); *G08C 23/04* (2013.01); *H04M 1/725* (2013.01);
(Continued)

(58) Field of Classification Search
CPC .. G06F 3/0304; G06F 3/0346; G06F 3/03542; G06F 3/0383; G06F 3/0425;
(Continued)

(56) References Cited

U.S. PATENT DOCUMENTS

| | | | | |
|---|---|---|---|---|
| 6,020,881 A | * | 2/2000 | Naughton | H04L 12/282 348/E5.102 |
| 7,492,876 B2 | * | 2/2009 | Fujimoto | G08B 13/1961 340/426.13 |

(Continued)

FOREIGN PATENT DOCUMENTS

| | | |
|---|---|---|
| KR | 1020120079208 | 7/2012 |
| KR | 1020140061060 | 5/2014 |

OTHER PUBLICATIONS

PCT International Application No. PCT/KR2016/006674, International Search Report dated Sep. 21, 2016, 3 pages.

*Primary Examiner* — Babar Sarwar
(74) *Attorney, Agent, or Firm* — Lee, Hong, Degerman, Kang & Waimey

(57) ABSTRACT

The present invention relates to a mobile terminal which can perform remote control of a plurality of devices. A mobile terminal according to an embodiment of the present invention comprises: a display; a reception unit which receives at least one device identification signal from at least one device or at least one transmitter corresponding to the device; a control unit which performs control so as to detect, from the received at least one device identification signal, the identification signal of a device that can be remotely controlled, extract control command information for the remote control of the device on the basis of the detected identification signal, and display a remotely controlled object for the remote control of the device, on the basis of the extracted control command information; and a transmission unit which, when a predetermined item in the remotely con- (Continued)

trolled object is selected, transmits a remote control signal corresponding to the selected item.

20 Claims, 124 Drawing Sheets

(52) U.S. Cl.
CPC ..... *G06K 9/00087* (2013.01); *G06K 9/00288* (2013.01); *G06K 9/00355* (2013.01); *G08C 2201/42* (2013.01); *G08C 2201/50* (2013.01); *G08C 2201/93* (2013.01)

(58) Field of Classification Search
CPC .... G06F 3/002; G06F 3/04842; G06F 3/0487; G08C 17/00; G08C 17/02; G08C 2201/30; G08C 2201/70; G08C 2201/92; G08C 2201/42; G08C 2201/50; G08C 2201/93; G08C 23/04; H04N 2005/4408; G06K 9/00087; G06K 9/00288; G06K 9/00355; H04M 1/725; H04M 1/72533
See application file for complete search history.

(56) References Cited

U.S. PATENT DOCUMENTS

| | | | | |
|---|---|---|---|---|
| 8,897,897 | B2* | 11/2014 | Demskie | H04N 5/4403 |
| | | | | 700/20 |
| 9,204,291 | B2* | 12/2015 | Jackson | H04W 8/245 |
| 9,449,500 | B2* | 9/2016 | Arling | G08C 17/02 |
| 9,691,272 | B2* | 6/2017 | Hou | H04L 67/125 |
| 2002/0024518 | A1* | 2/2002 | Murata | G06F 3/1454 |
| | | | | 345/440 |
| 2004/0208588 | A1 | 10/2004 | Colmenarez et al. | |
| 2005/0049862 | A1* | 3/2005 | Choi | G10L 15/26 |
| | | | | 704/231 |
| 2006/0047513 | A1* | 3/2006 | Chen | H04M 1/7253 |
| | | | | 704/246 |
| 2006/0103545 | A1* | 5/2006 | Tsou | G08C 17/02 |
| | | | | 340/12.29 |
| 2006/0168644 | A1* | 7/2006 | Richter | G06F 17/30876 |
| | | | | 726/2 |
| 2007/0159349 | A1* | 7/2007 | Chang | G08C 17/02 |
| | | | | 340/4.3 |
| 2007/0265717 | A1* | 11/2007 | Chang | G06F 1/1626 |
| | | | | 700/83 |
| 2010/0081375 | A1* | 4/2010 | Rosenblatt | G08C 17/02 |
| | | | | 455/41.1 |
| 2011/0043372 | A1* | 2/2011 | Ohki | H04N 5/4403 |
| | | | | 340/4.3 |
| 2011/0170787 | A1 | 7/2011 | Gum | |
| 2011/0191516 | A1* | 8/2011 | Xiong | G06F 13/14 |
| | | | | 710/305 |
| 2012/0280948 | A1* | 11/2012 | Barrus | G06F 3/04883 |
| | | | | 345/179 |
| 2014/0106735 | A1* | 4/2014 | Jackson | H04W 8/245 |
| | | | | 455/419 |
| 2014/0266639 | A1 | 9/2014 | Zises | |
| 2014/0267623 | A1* | 9/2014 | Bridges | G01S 17/003 |
| | | | | 348/46 |
| 2015/0010167 | A1* | 1/2015 | Arling | H04N 21/42226 |
| | | | | 381/105 |
| 2016/0227150 | A1* | 8/2016 | Sun | G06F 3/011 |
| 2017/0126420 | A1* | 5/2017 | Zhang | G06F 1/1698 |
| 2017/0278384 | A1* | 9/2017 | Ham | H04Q 9/00 |
| 2017/0323559 | A1* | 11/2017 | Mi | G08C 23/04 |

* cited by examiner

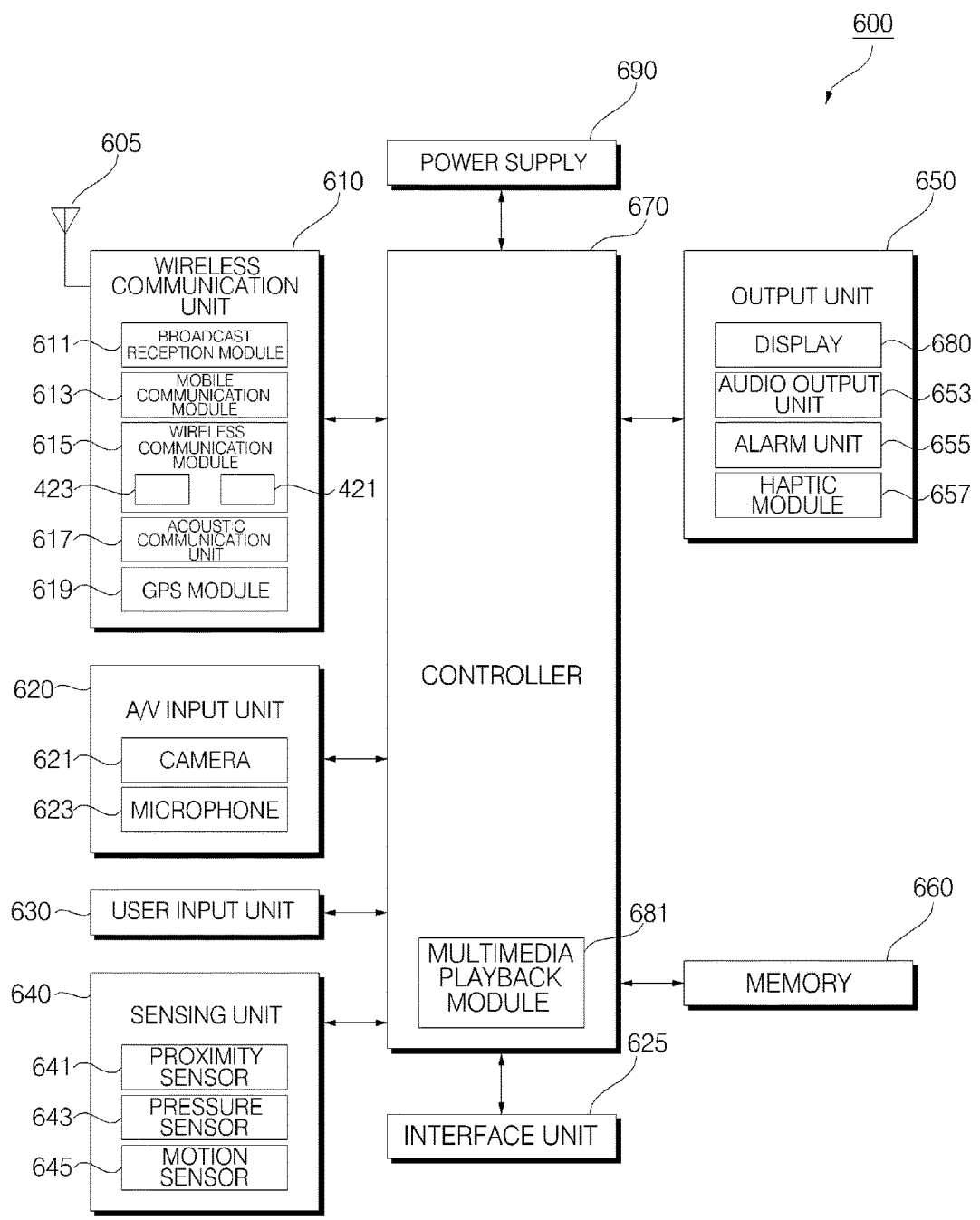

FIG. 9B
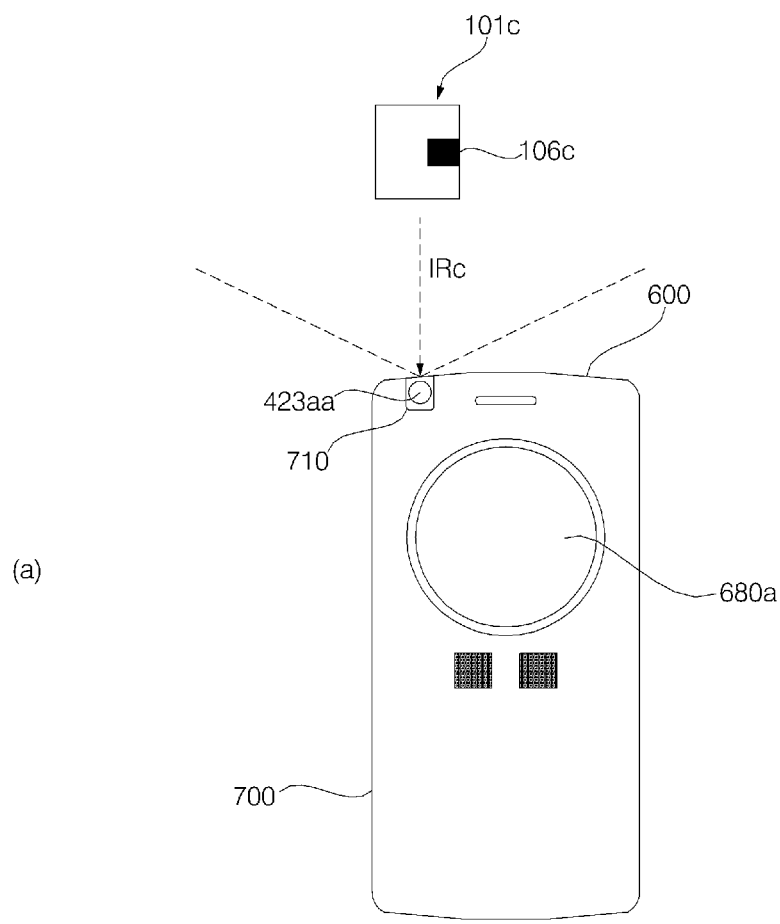
(a)
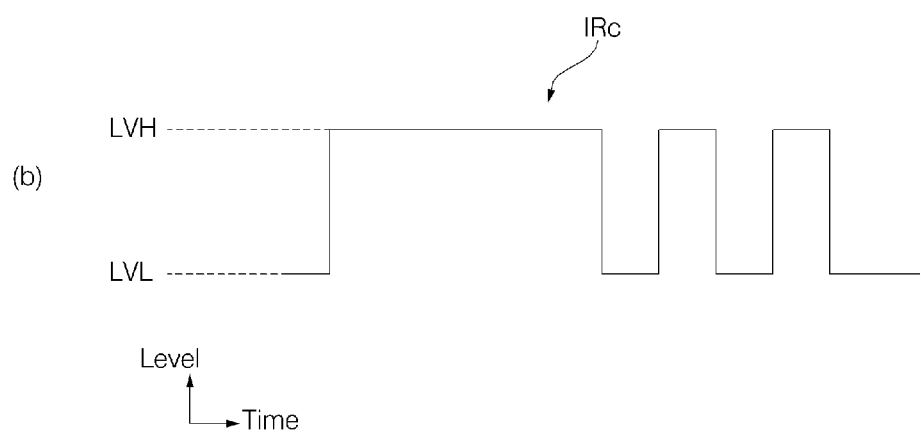
(b)

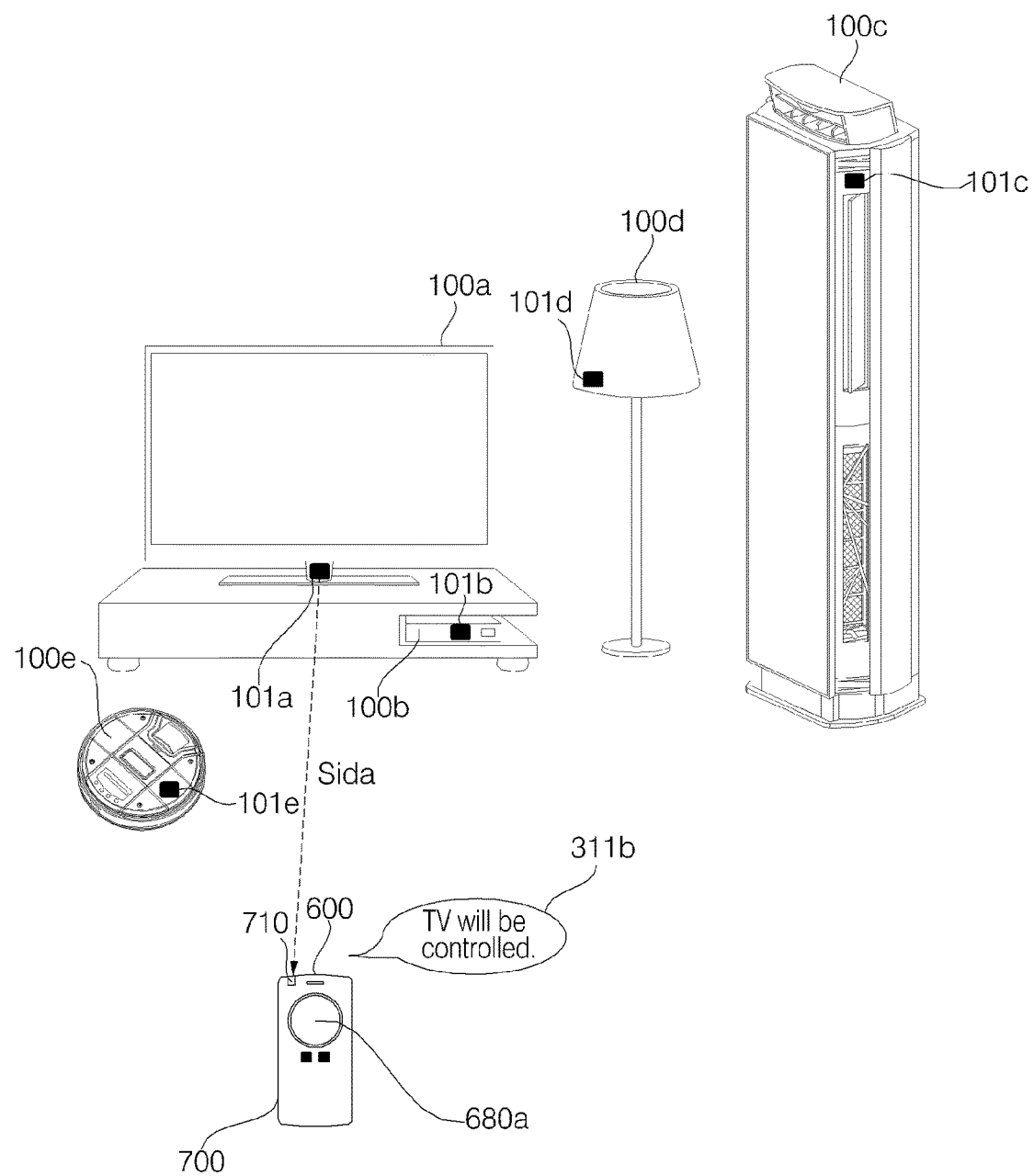

FIG. 9E
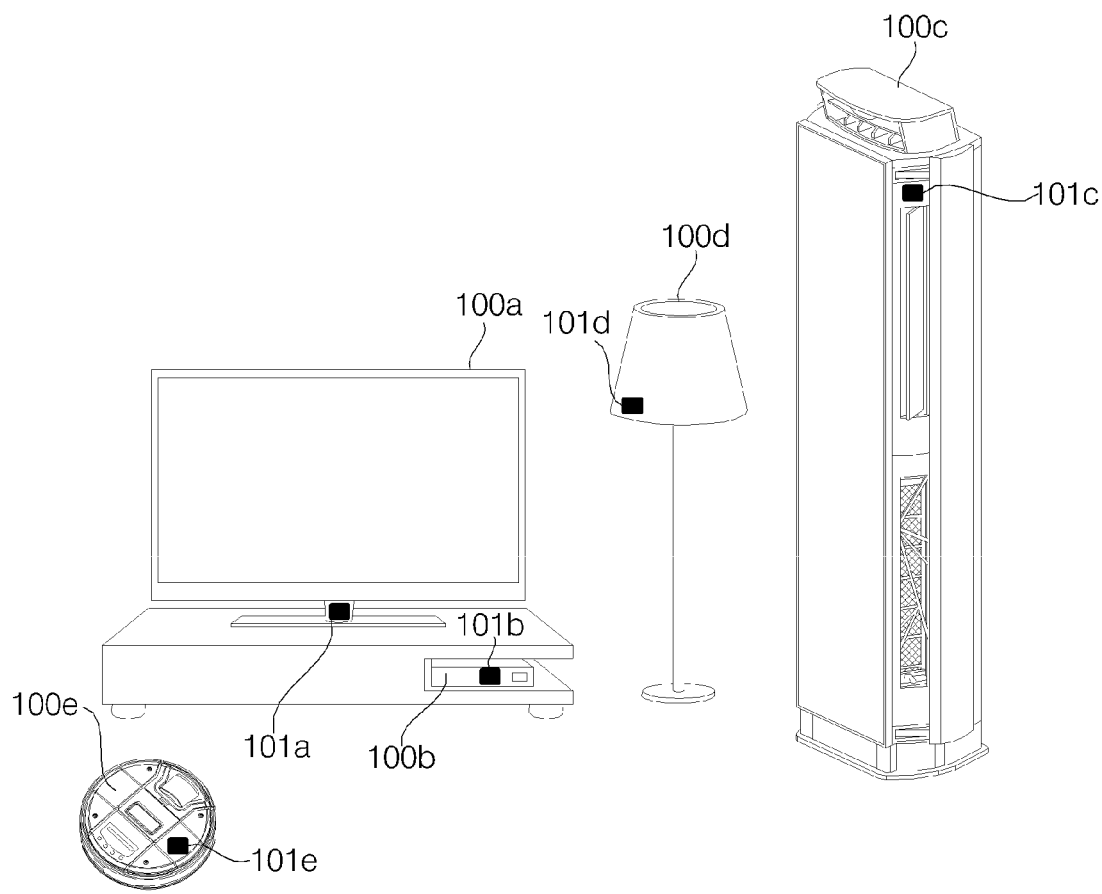
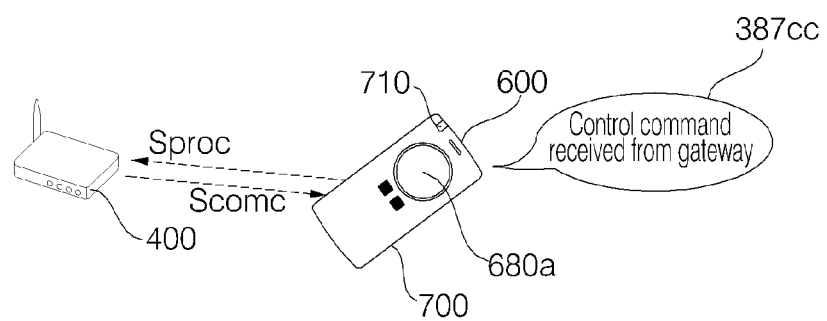

FIG. 9H
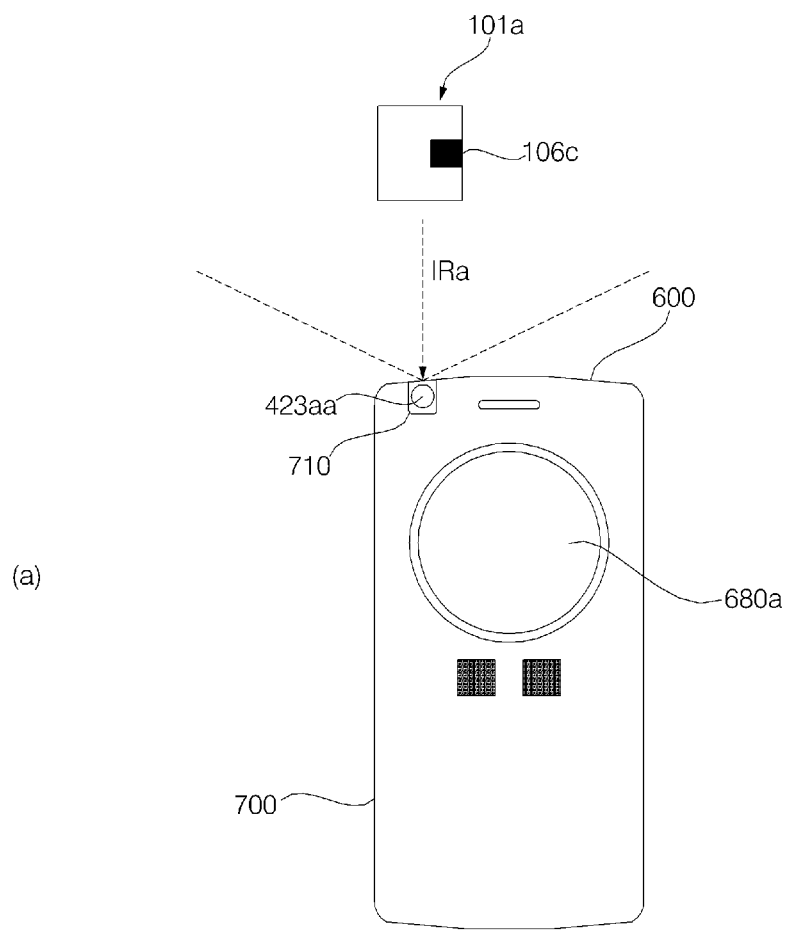
(a)
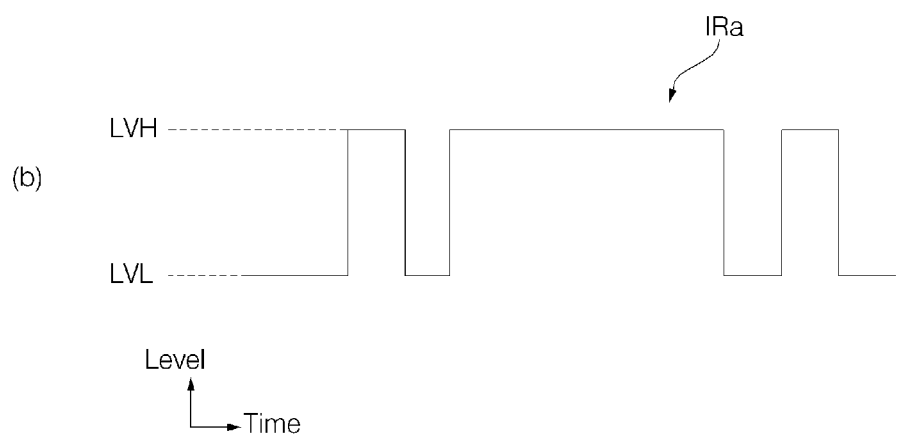
(b)

FIG. 11B
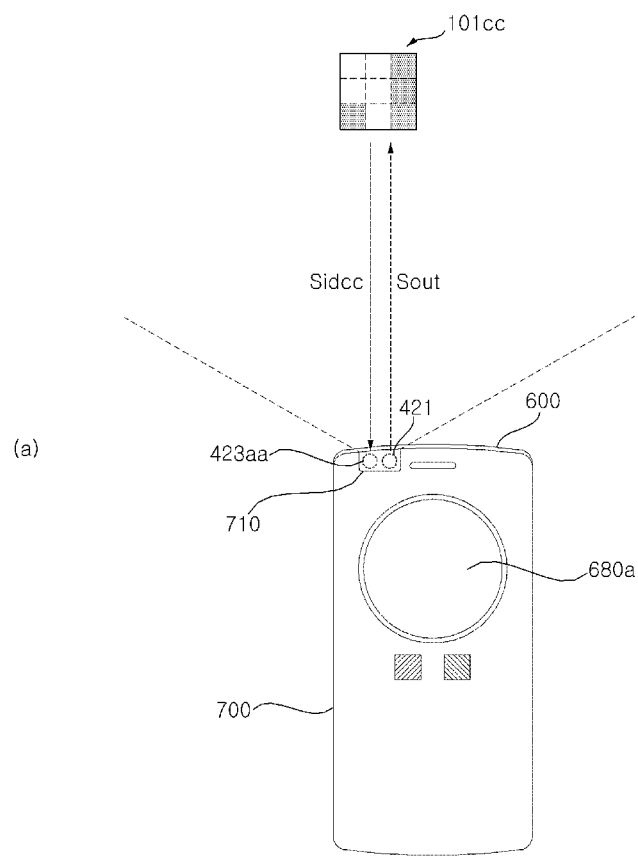
(a)
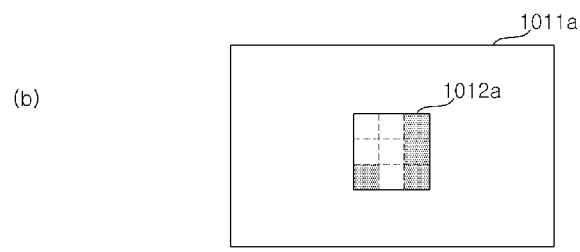
(b)

FIG. 11D
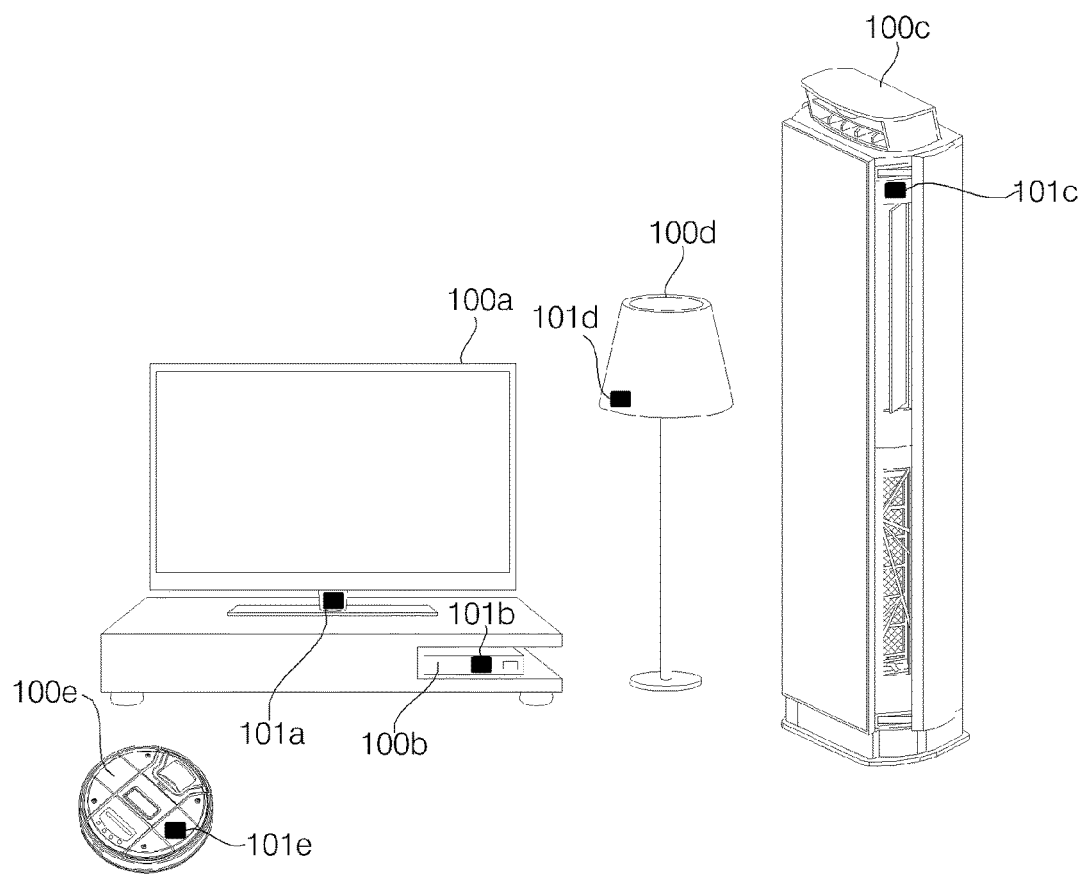
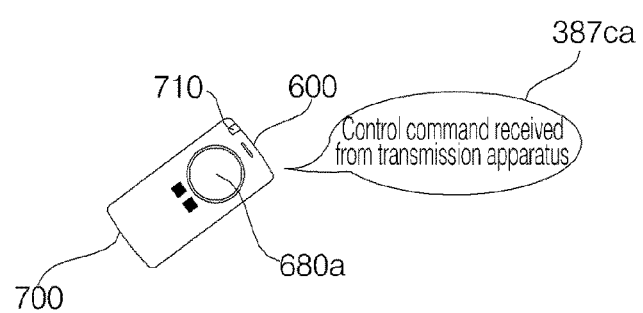

FIG. 11E
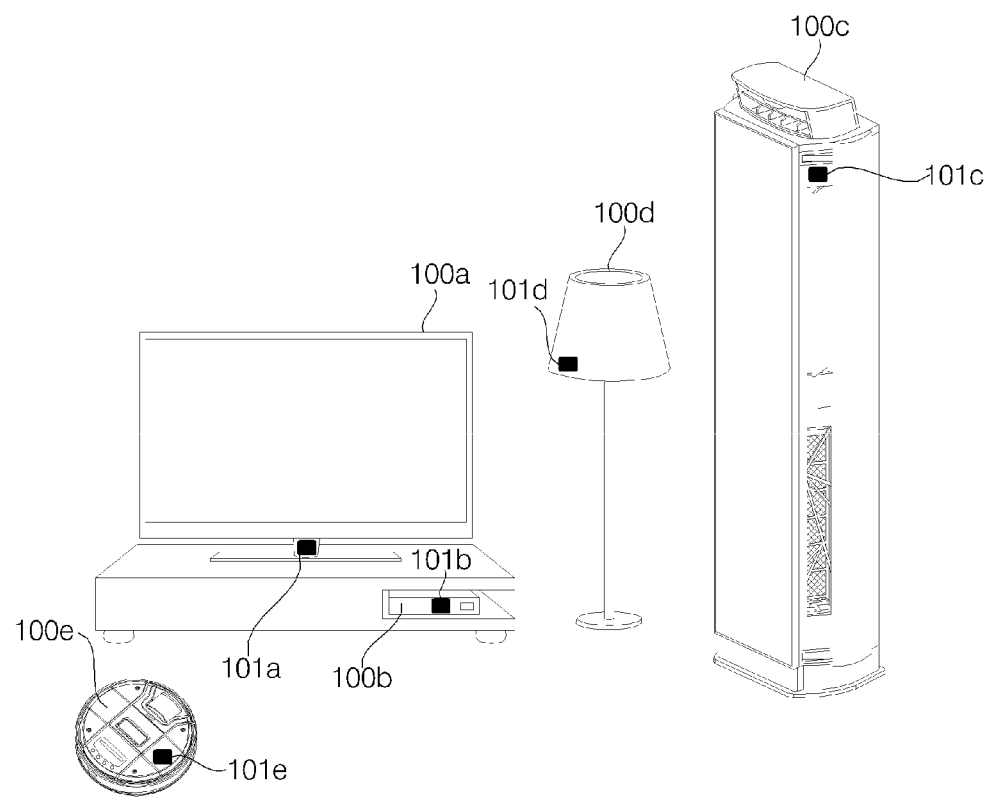
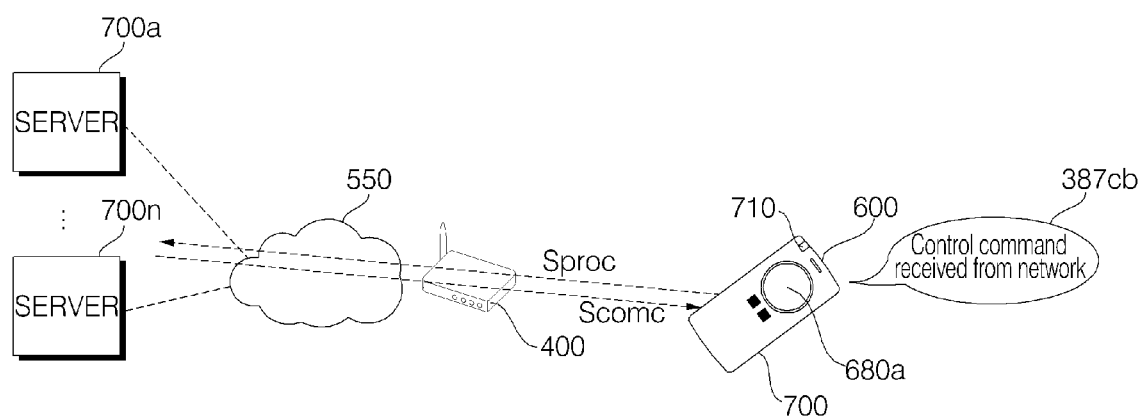

FIG. 11F
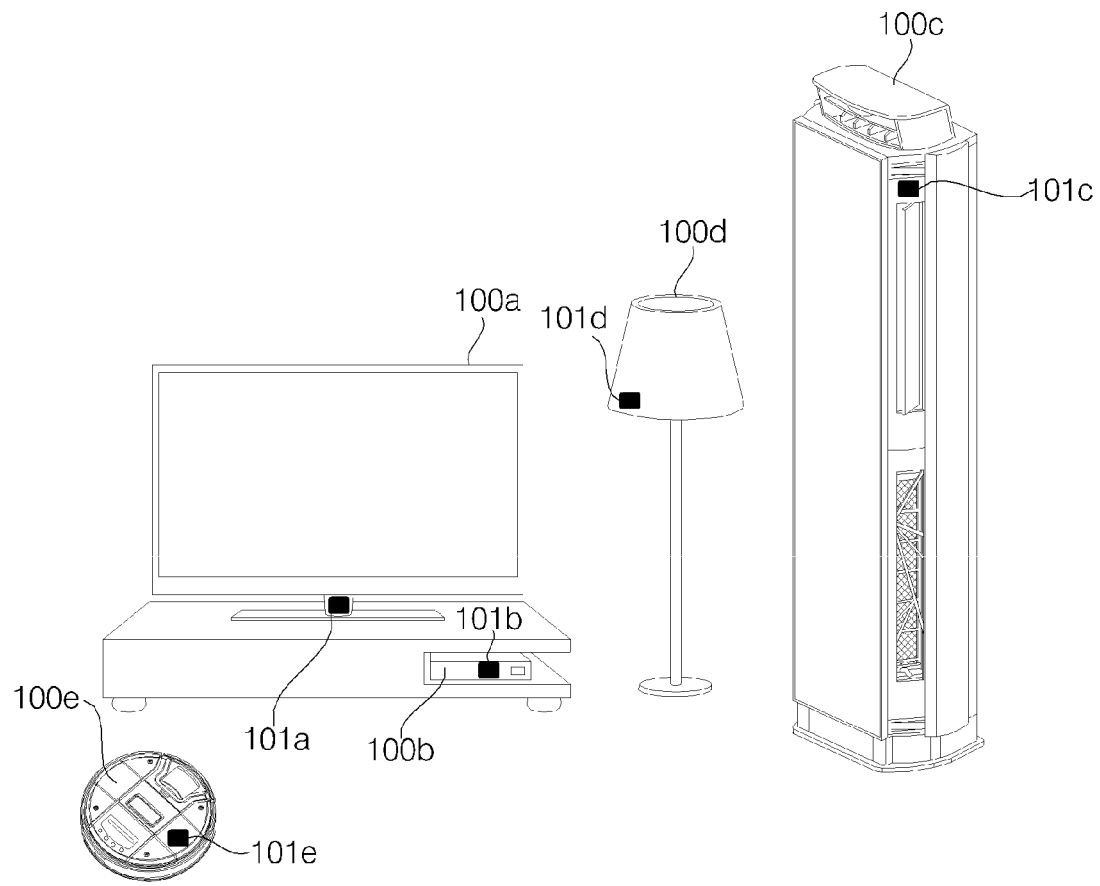
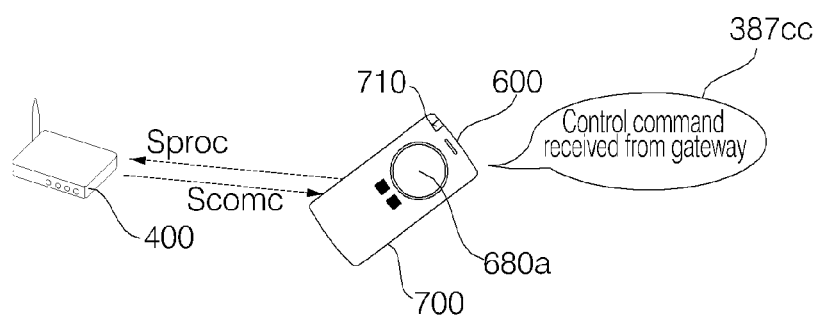

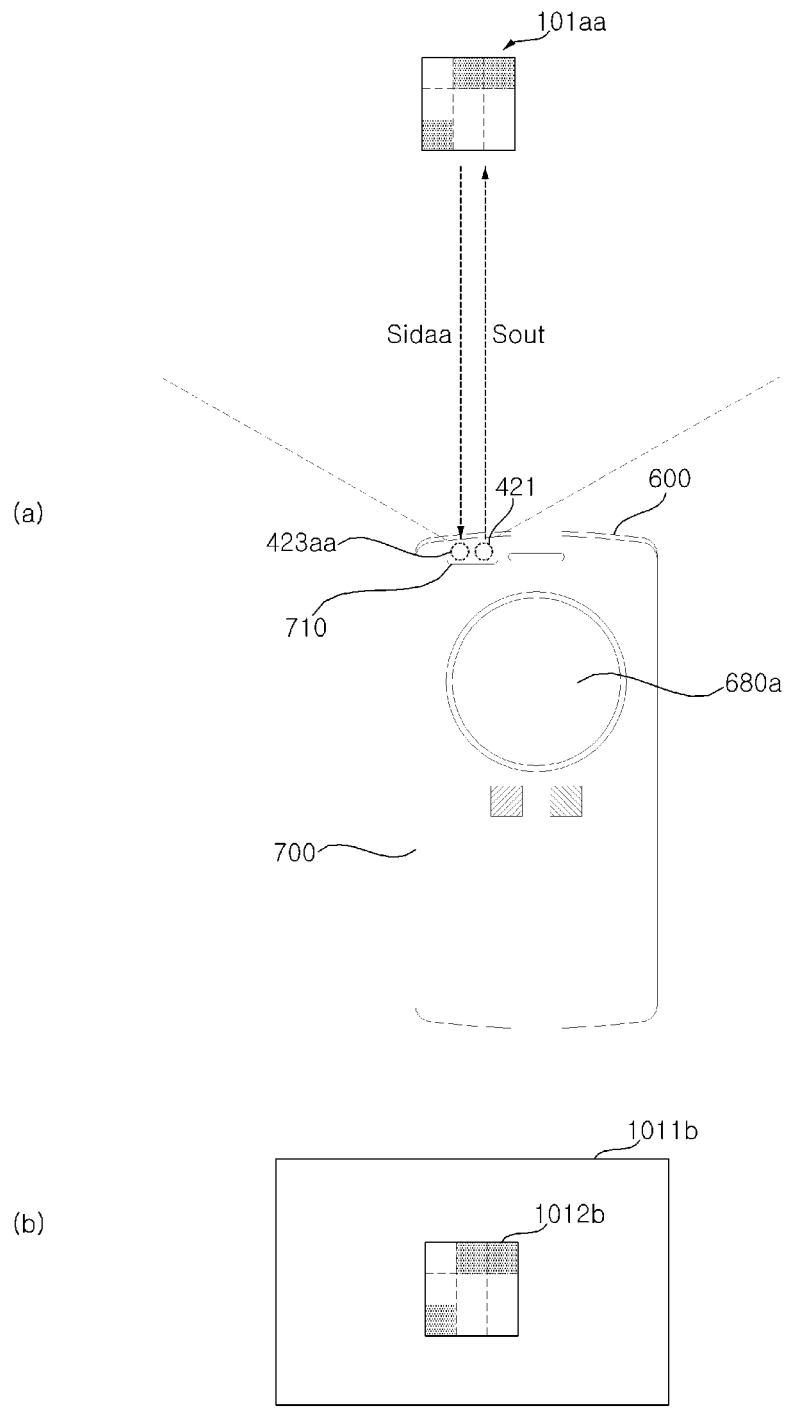

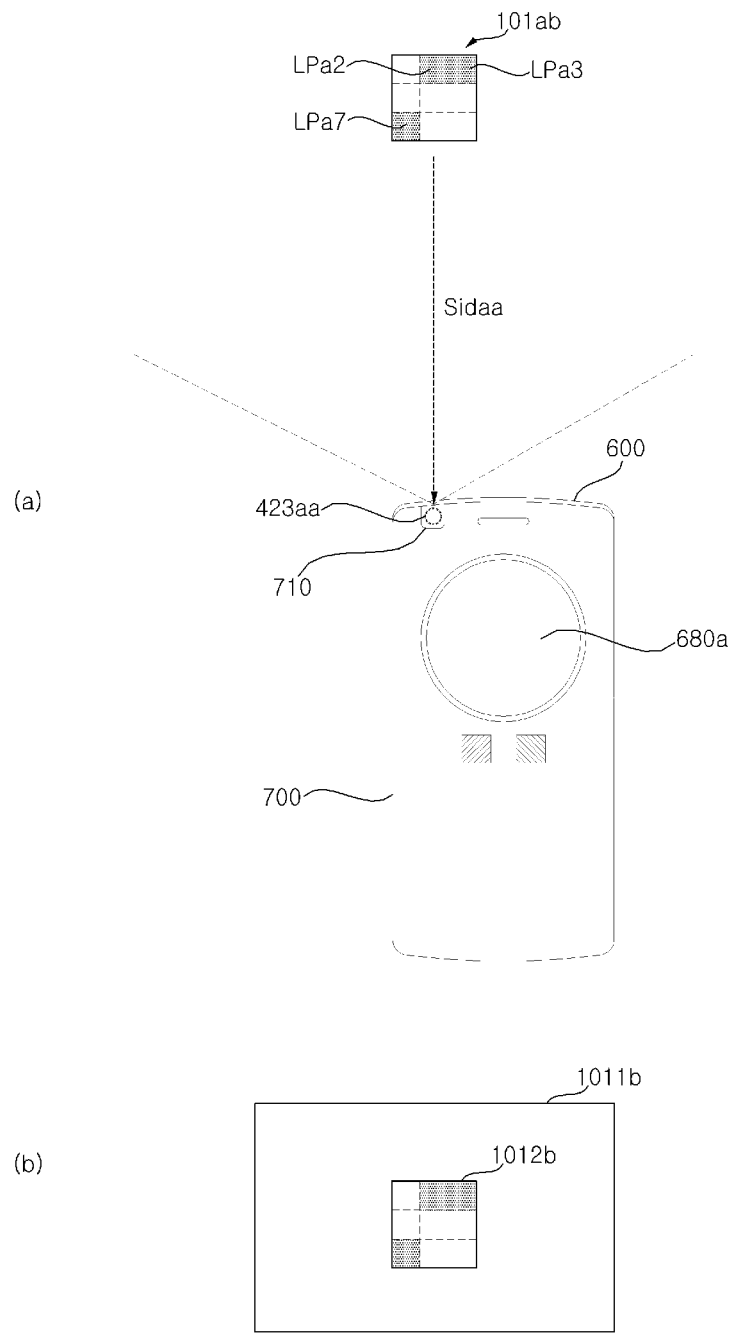

FIG. 13E
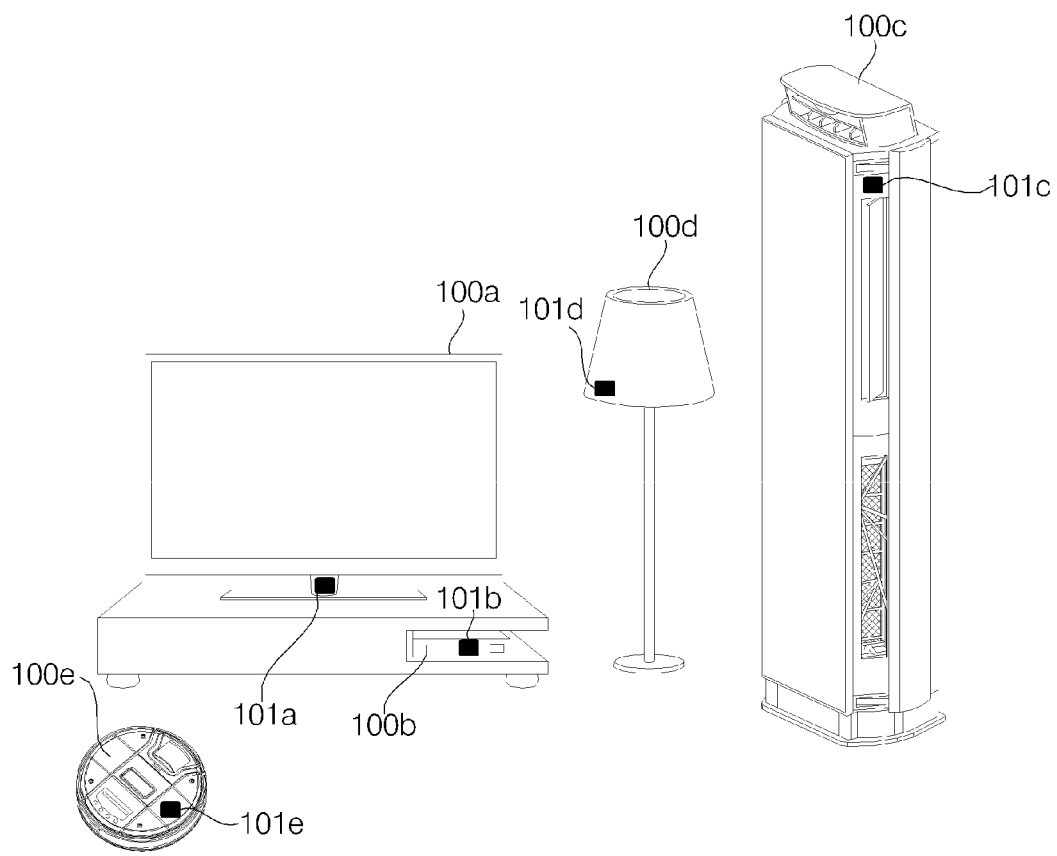
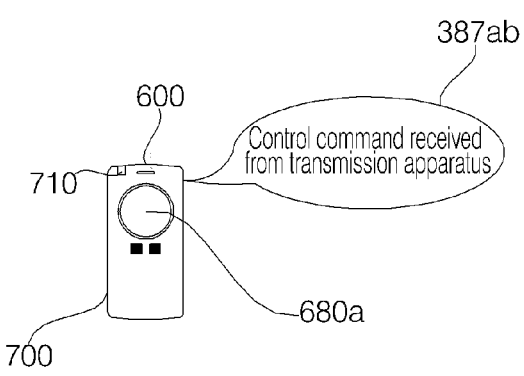

FIG. 17C
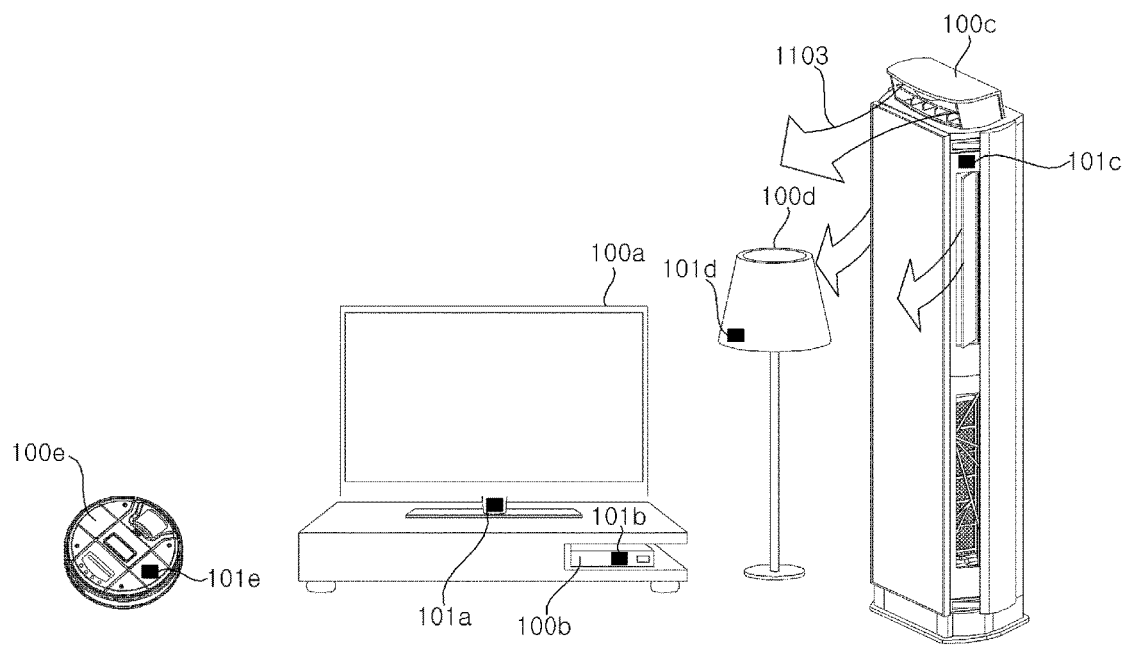
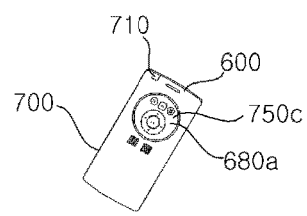

FIG. 18C
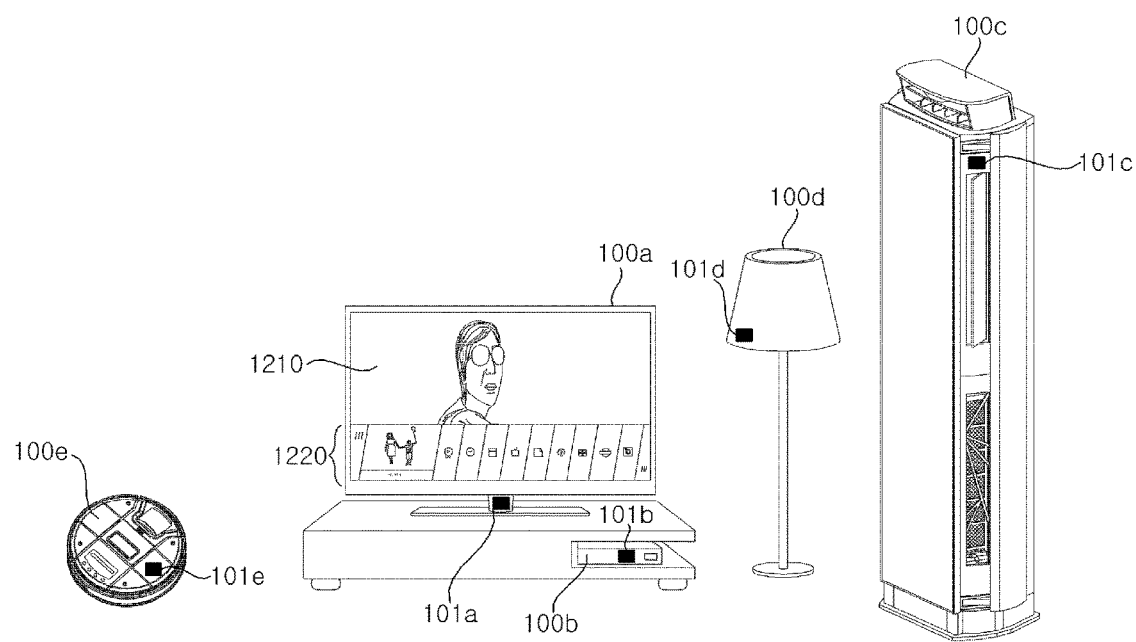
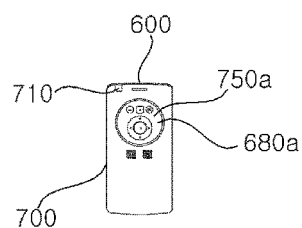

FIG. 19E
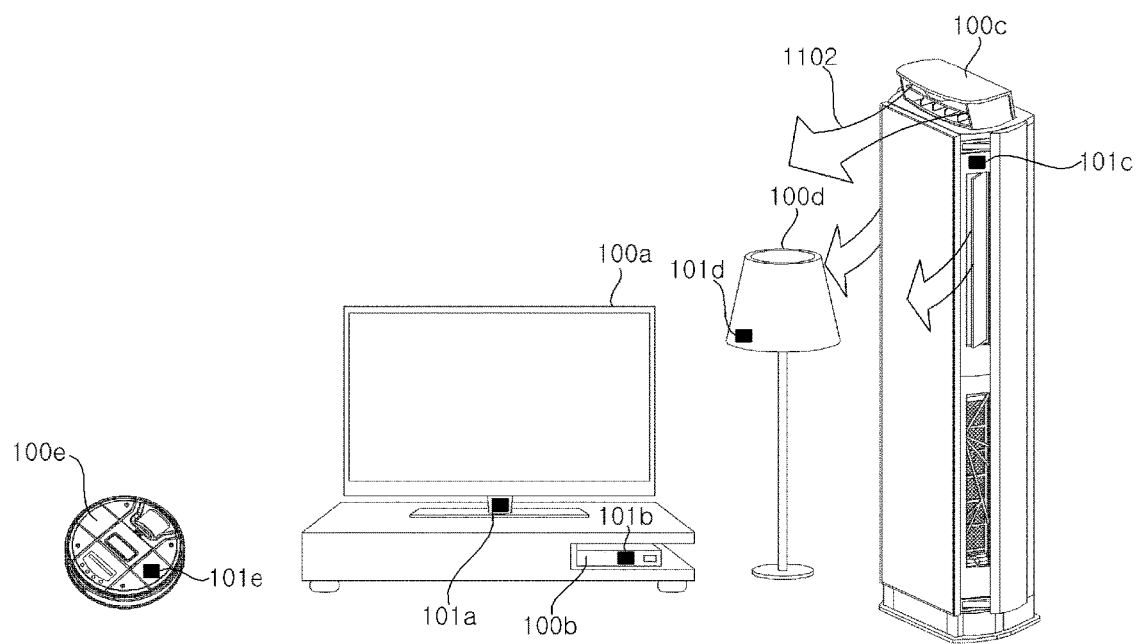
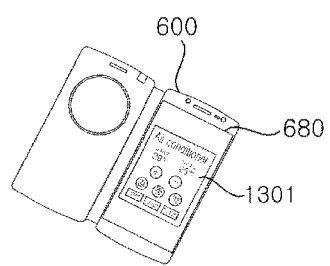

FIG. 20C
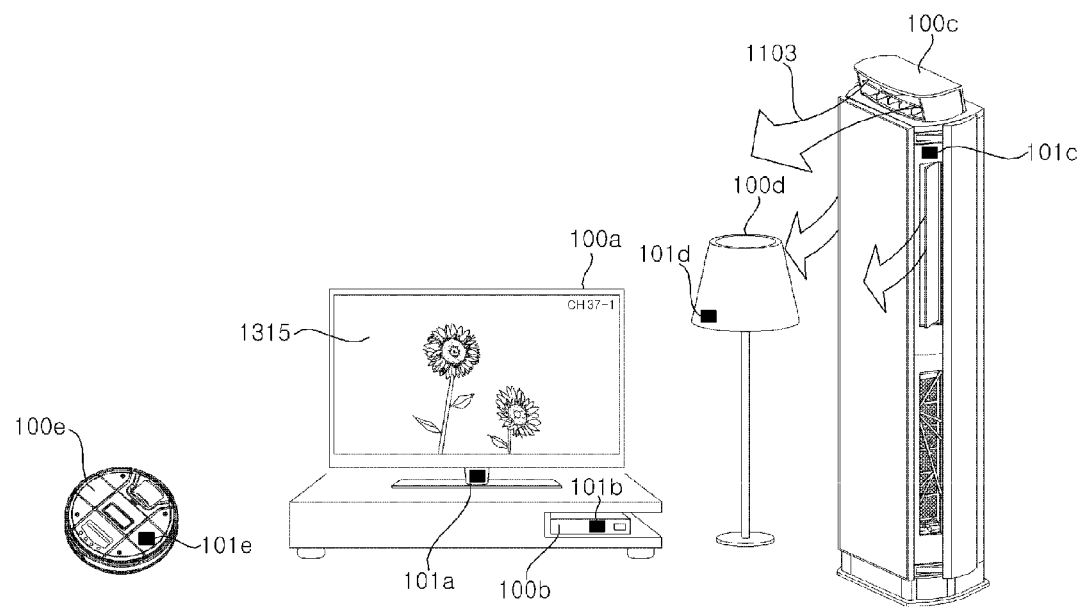
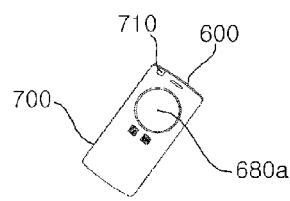

FIG. 20C
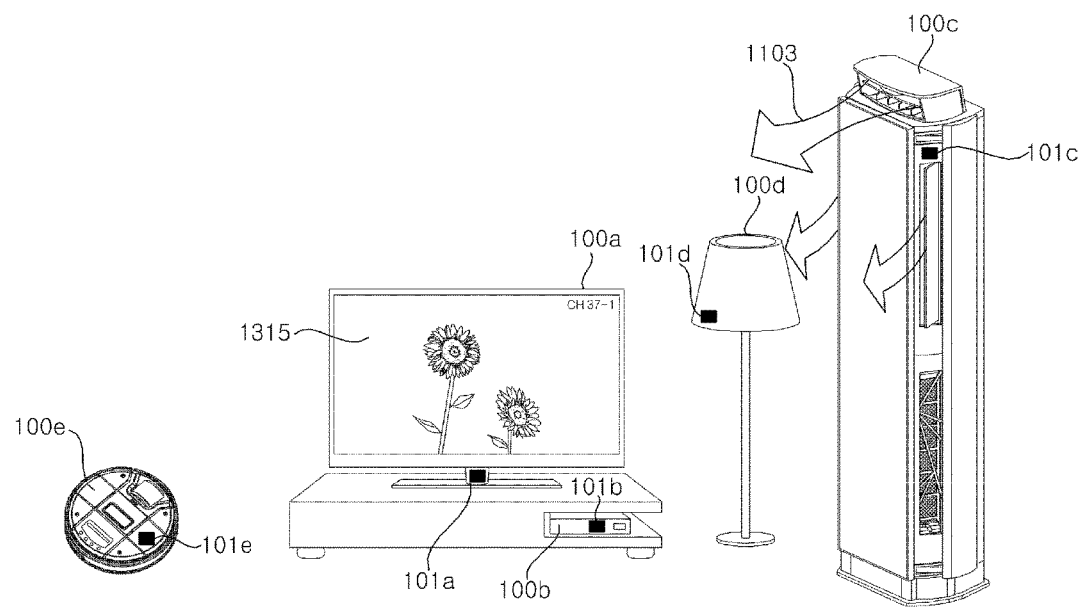
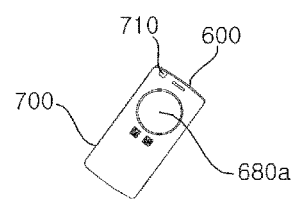

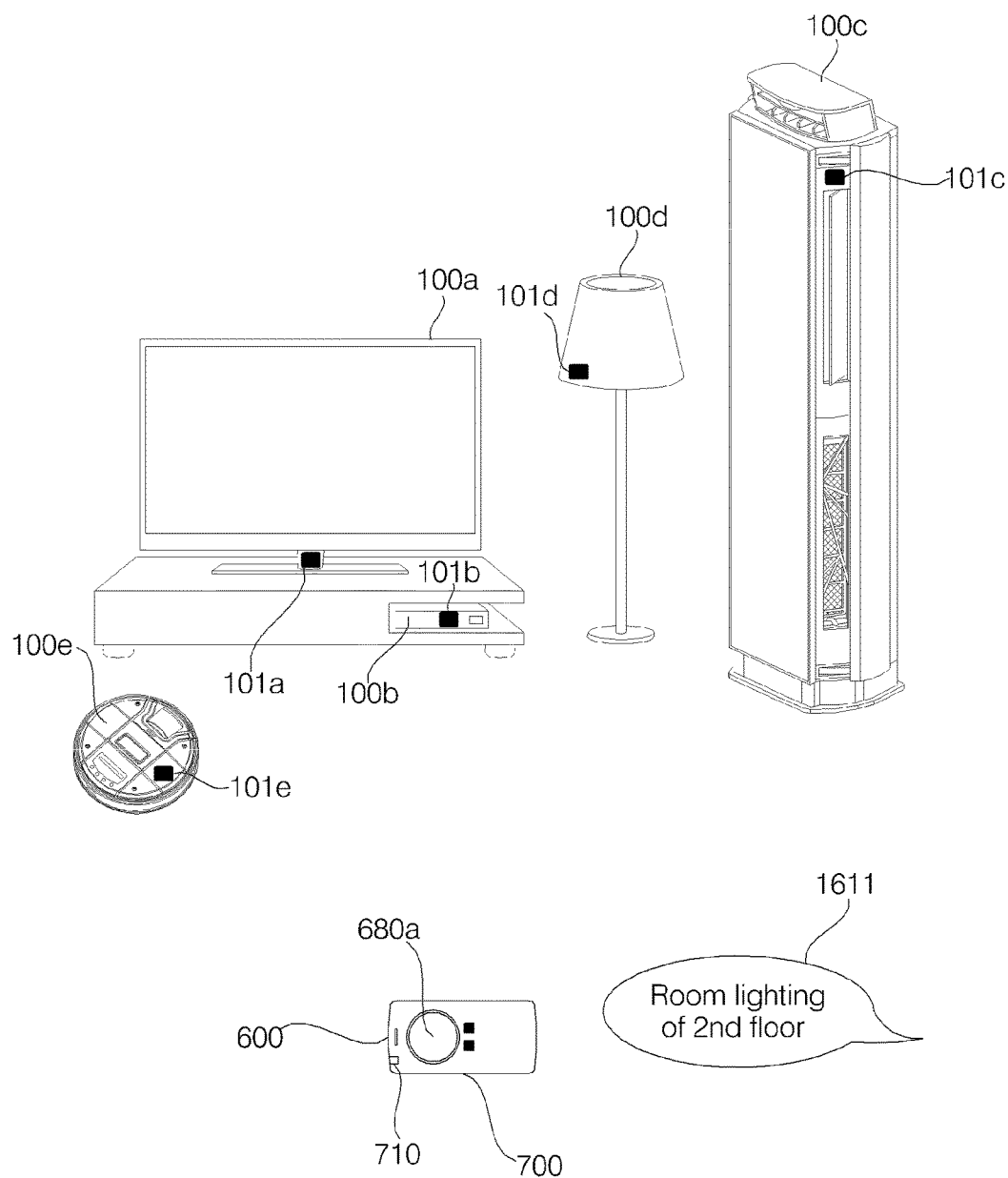

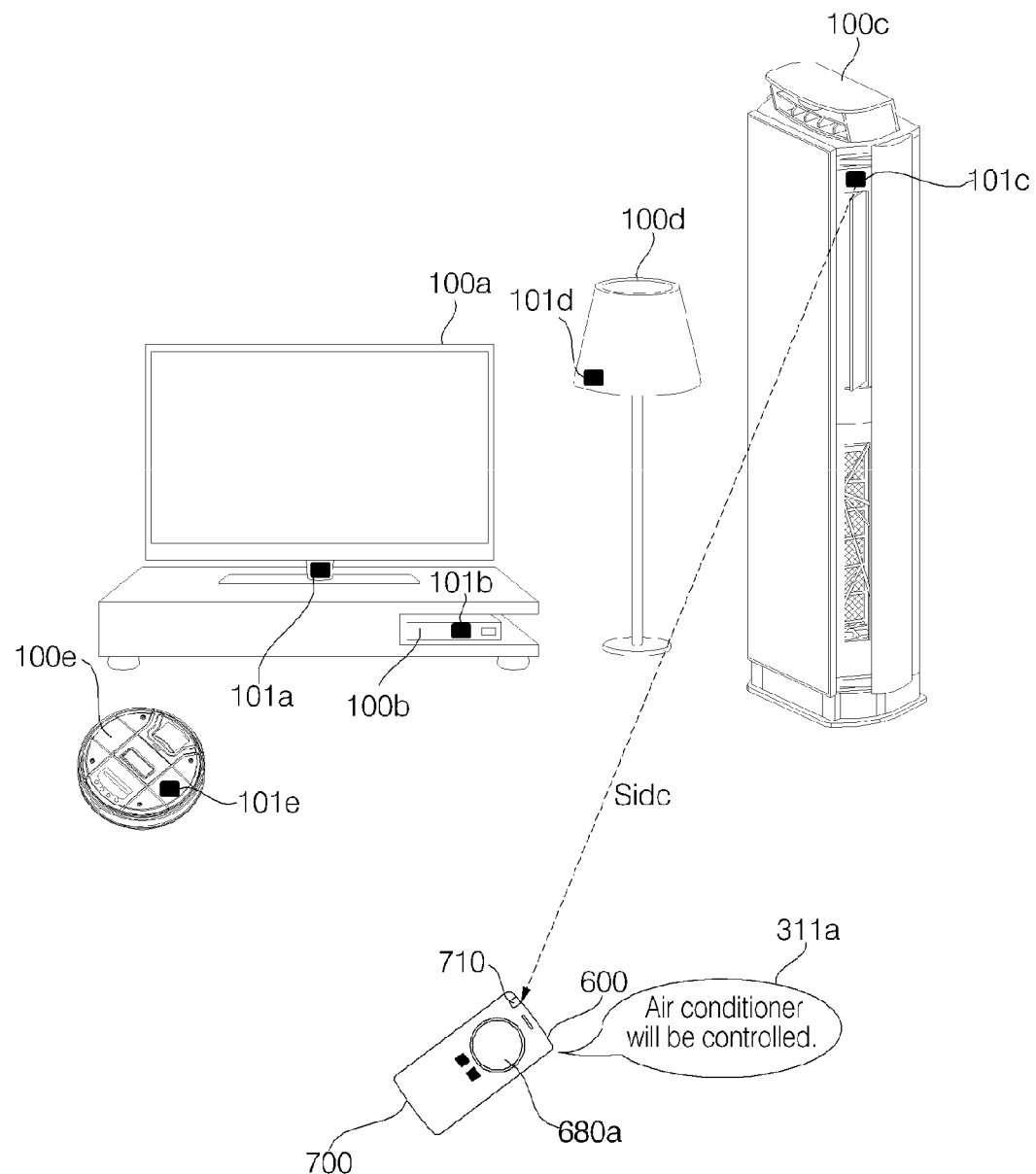

FIG. 23C
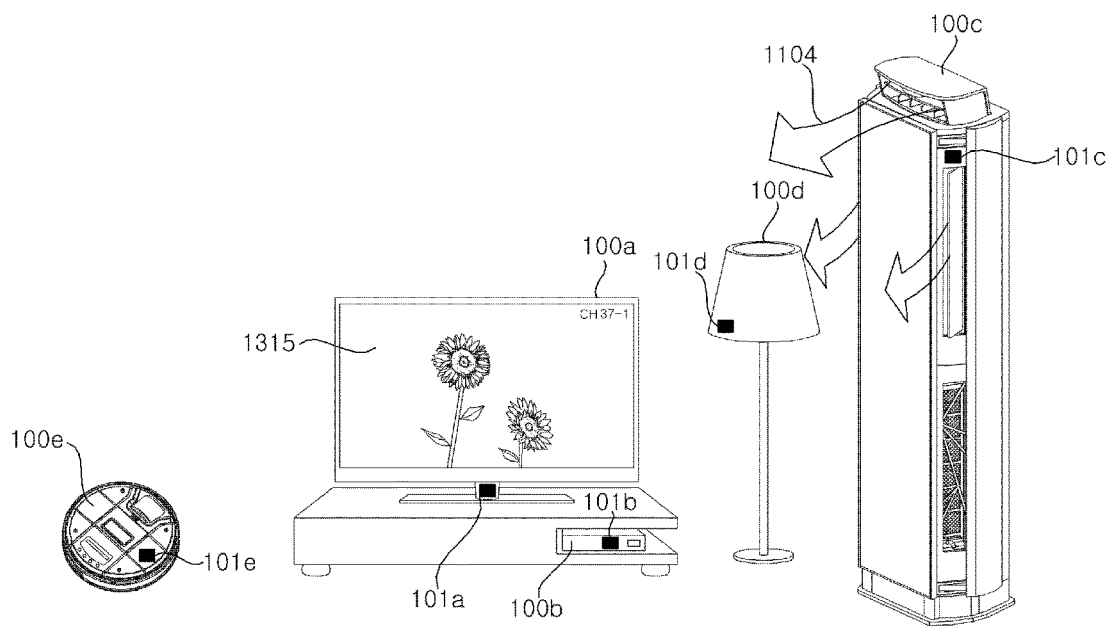
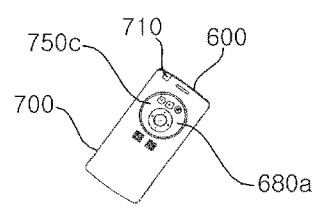

FIG. 26D
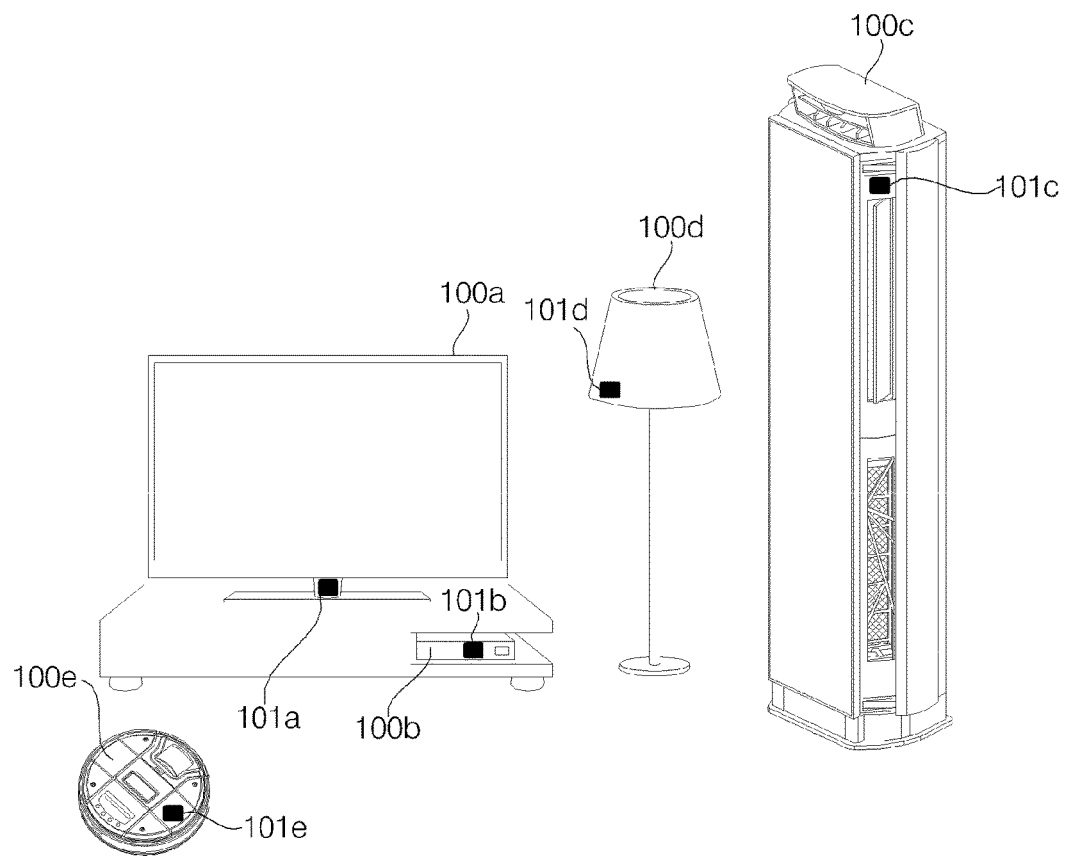
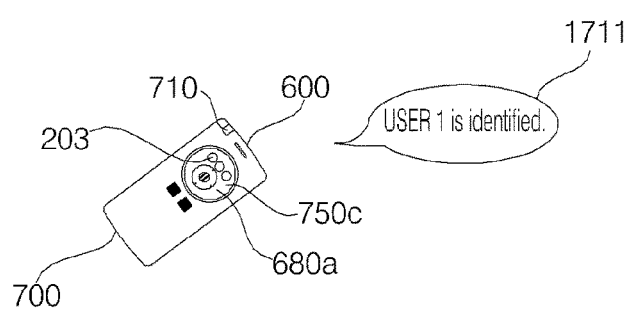

FIG. 26F
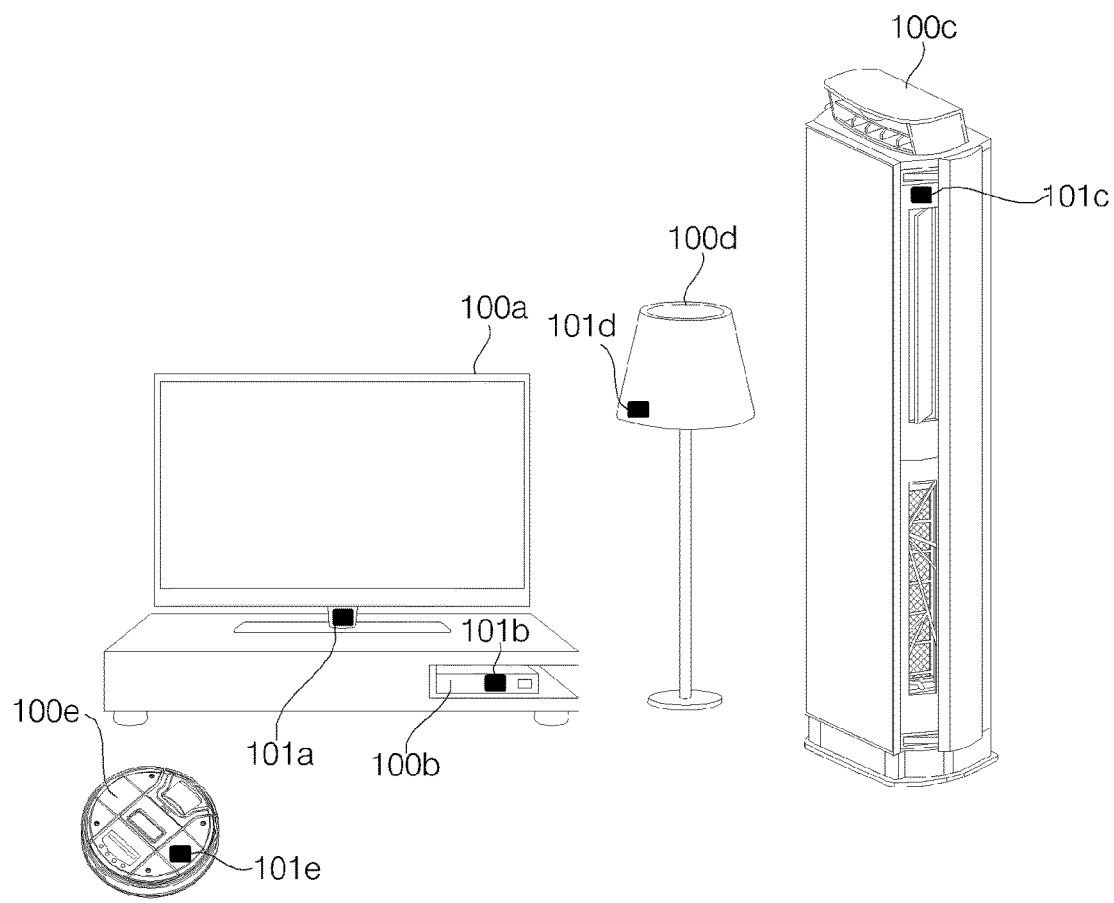
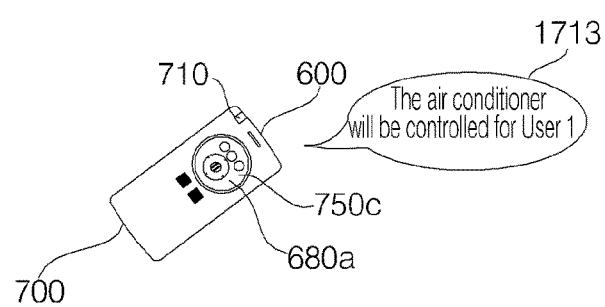

FIG. 27A
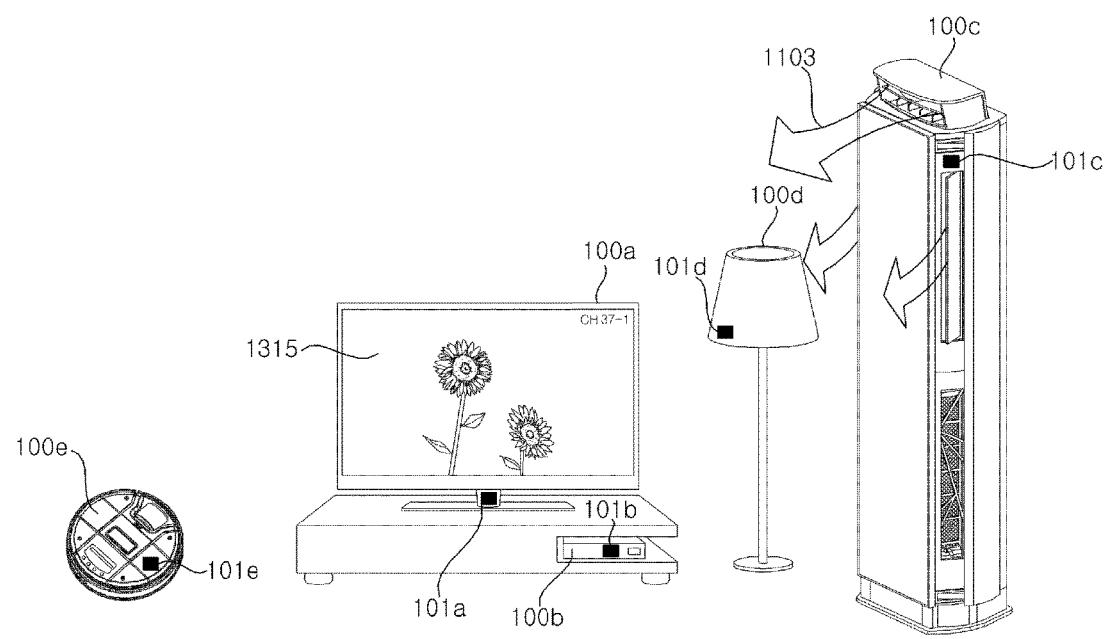
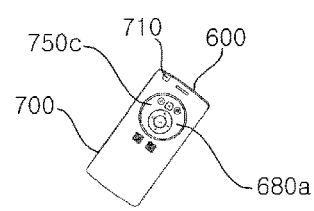

FIG. 27B
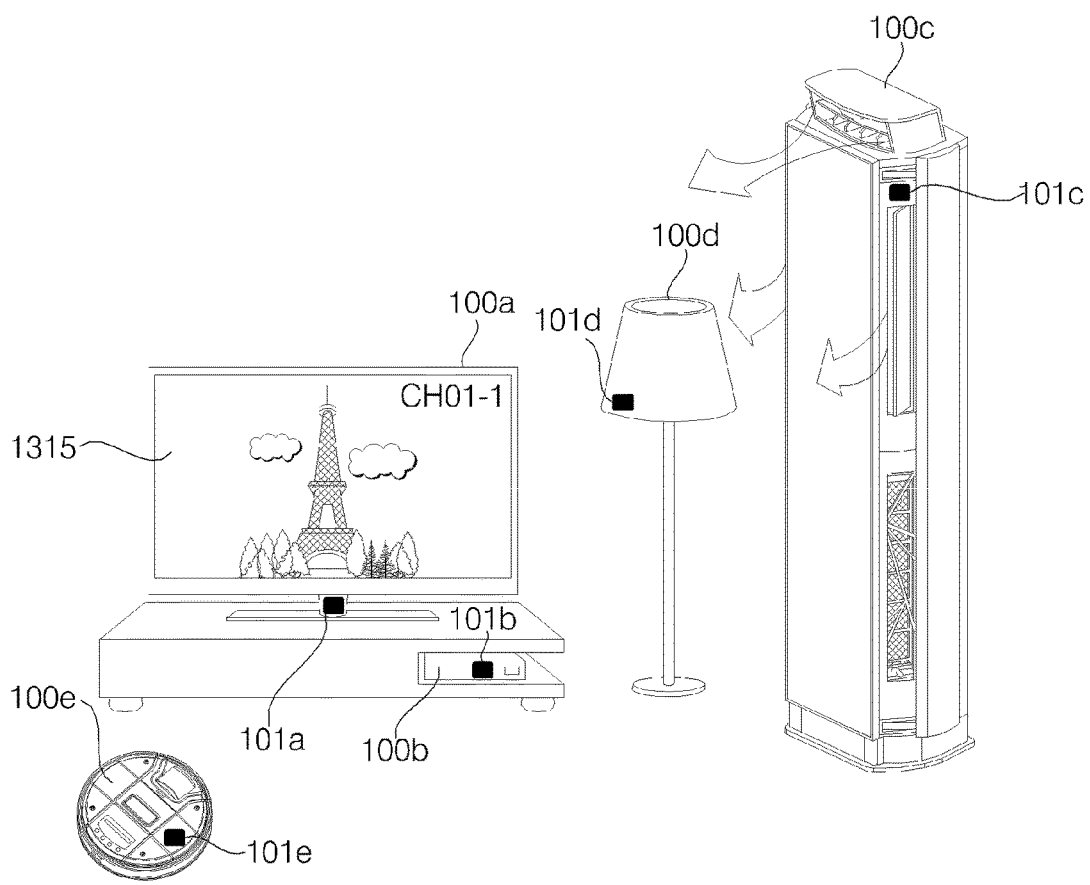
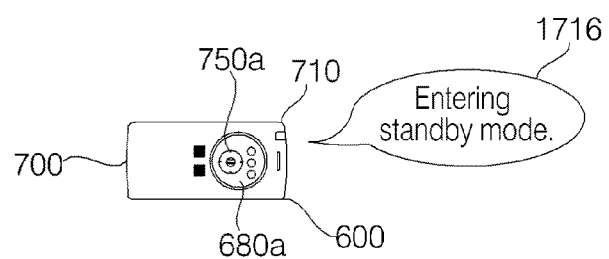

FIG. 29G
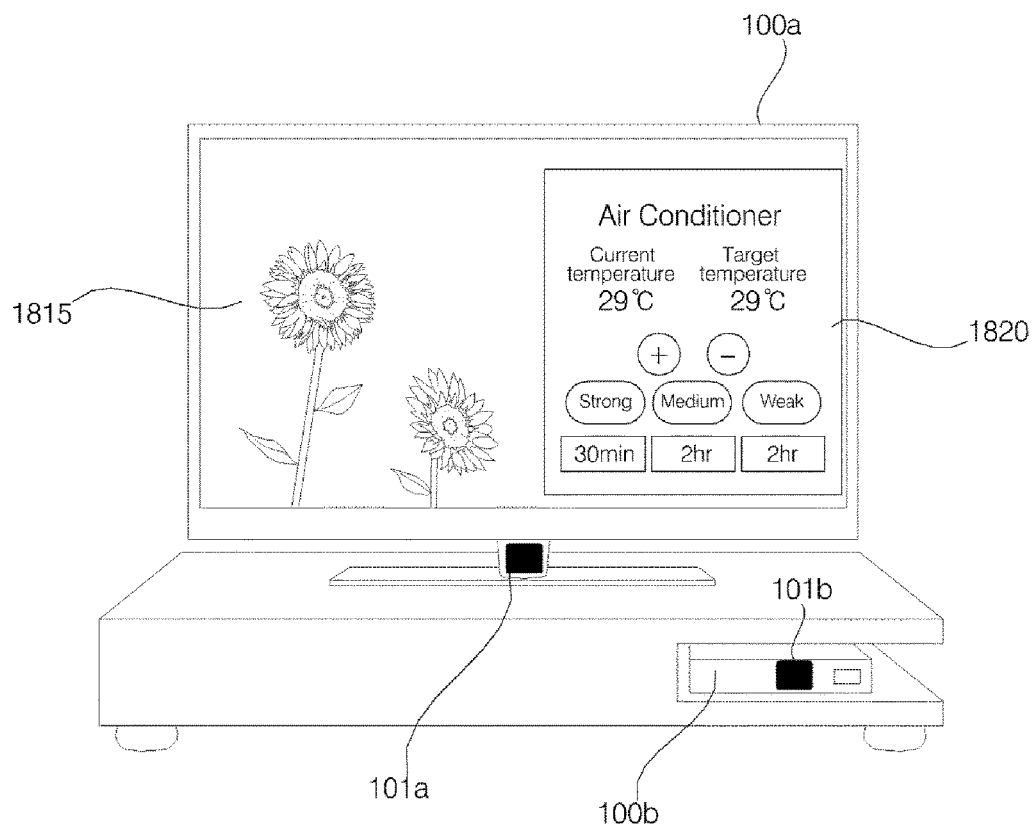
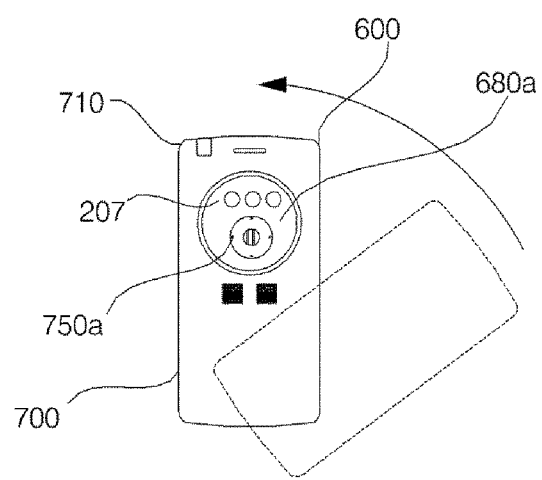

FIG. 29H
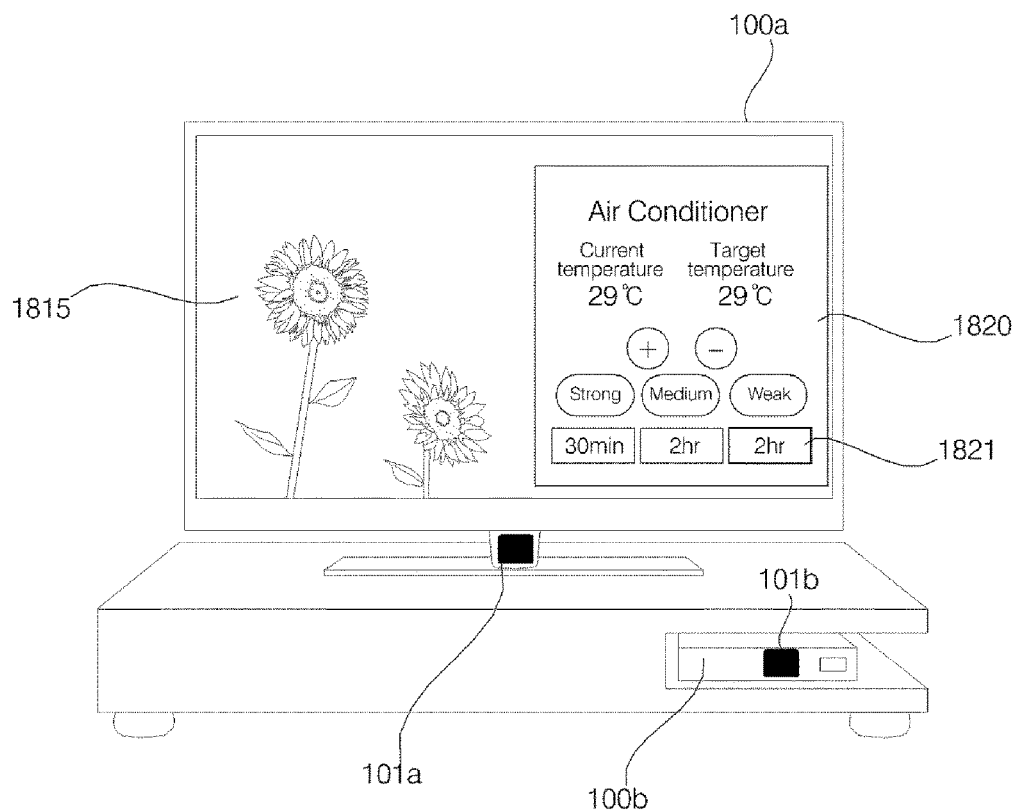
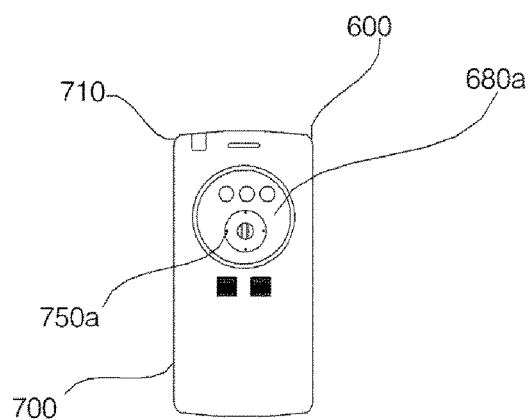

FIG. 29I
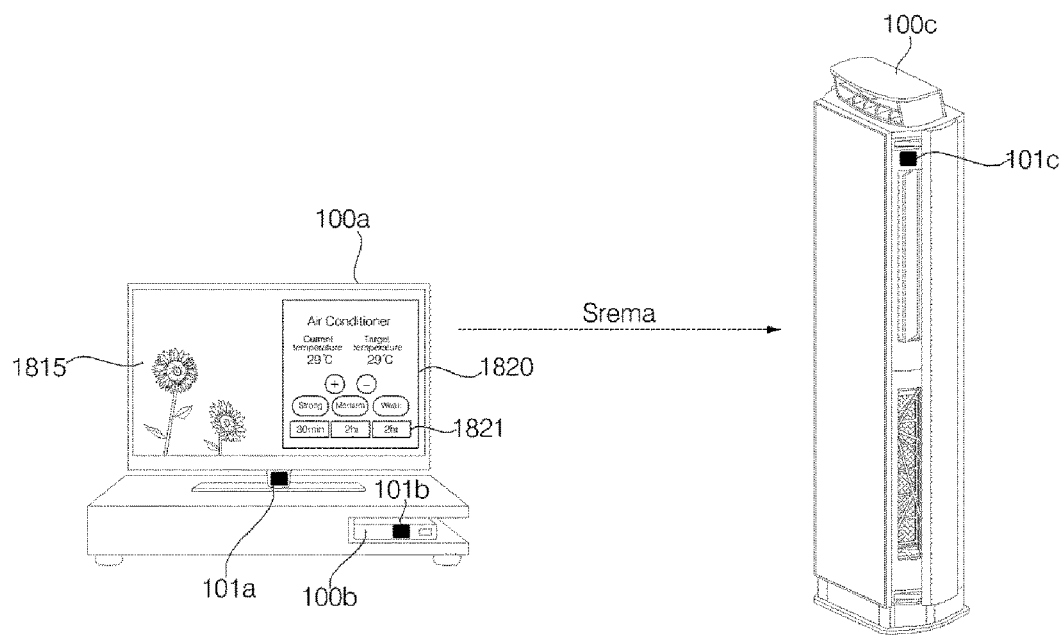
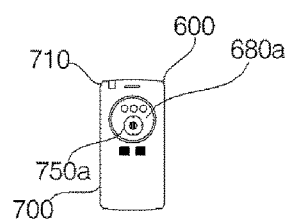

FIG. 30C
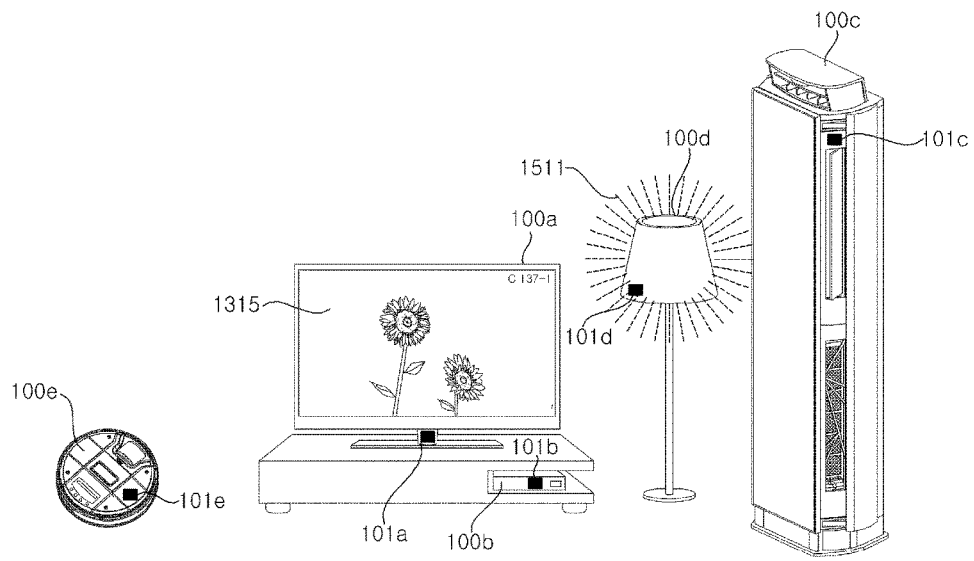
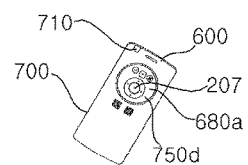

FIG. 30C
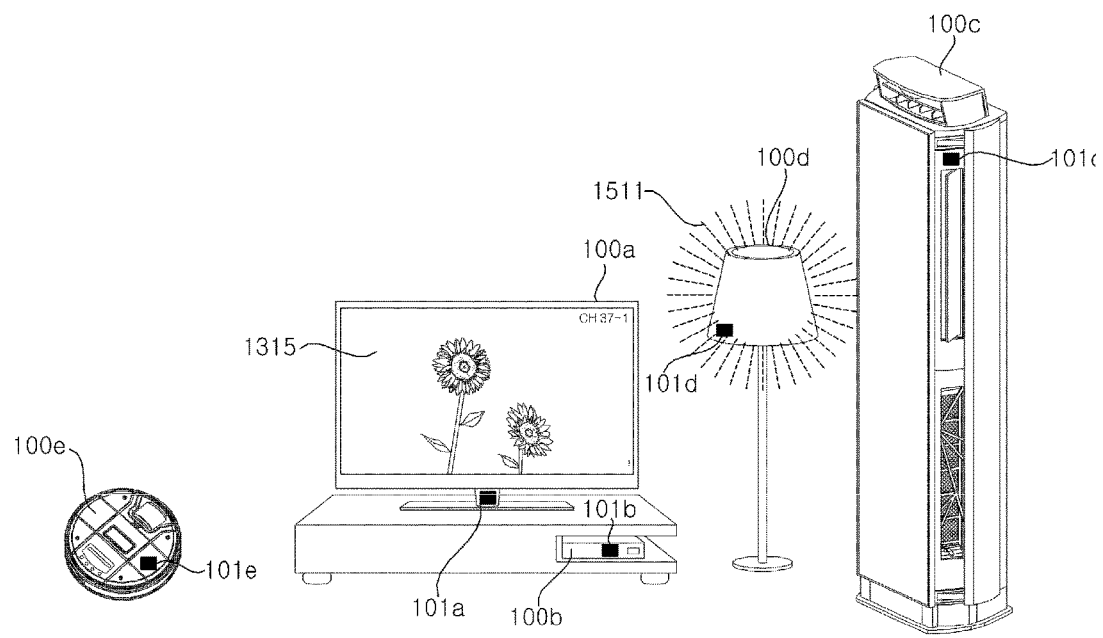
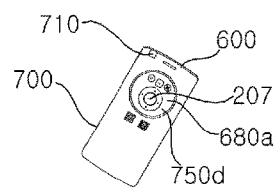

MOBILE TERMINAL CAPABLE OF PERFORMING REMOTE CONTROL OF PLURALITY OF DEVICES

CROSS-REFERENCE TO RELATED APPLICATIONS

This application is the National Stage filing under 35 U.S.C. 371 of International Application No. PCT/KR2016/006674, filed on Jun. 23, 2016, which claims the benefit of earlier filing date and right of priority to Korean Application No. 10-2015-0091419, filed on Jun. 26, 2015, the contents of which are all hereby incorporated by reference herein in their entirety.

TECHNICAL FIELD

The present invention relates to a mobile terminal capable of identifying a plurality of devices and performing remote control of the identified devices.

BACKGROUND ART

A mobile terminal is a portable device which is portable and has one or more functions of carrying out voice and video communication, inputting and outputting information, and storing data. As these functions are diversified, the mobile terminals come with complicated functions such as photographing and capturing of a moving picture, playback of a music file or a moving picture file, gaming, reception of broadcasting, wireless Internet, and transmission and reception of a message, and are implemented in the form of multimedia players. Various new attempts are being made in hardware and software for such mobile terminals implemented in the form of multimedia players in order to implement complicated functions.

DISCLOSURE

Technical Problem

It is an object of the present invention to provide a mobile terminal capable of identifying a plurality of devices and performing remote control of the identified devices.

Technical Solution

In accordance with an aspect of the present invention, a a mobile terminal includes a display, a reception unit to receive at least one device identification (ID) signal from at least one device or a transmission apparatus corresponding to the device, a controller to detect an ID signal of a remotely controllable device from the at least one received device ID signal, extract control command information for remote control of the device based on the detected ID signal, and perform a control operation based on the extracted control command information to display a remote control object for remote control of the device, and a transmission unit to transmit, when a predetermined item is selected in the remote control object, a remote control signal corresponding to the selected item.

Advantageous Effects

According to an embodiment of the present invention, a mobile terminal includes a display, a reception unit to receive at least one device identification signal from at least one device or a transmission apparatus corresponding to the device, a controller to detect an identification signal of a remotely controllable device from the at least one received device identification signal, extract control command information for remote control of the device based on the detected identification signal, and perform a control operation based on the extracted control command information to display a remote control object for remote control of the device, and a transmission unit to transmit, when a predetermined item is selected in the remote control object, a remote control signal corresponding to the selected item. Thereby, the mobile terminal may perform remote control of a plurality of devices.

Particularly, when the mobile terminal is directed at the device, the mobile terminal may recognize or identify the device based on the identification signal transmitted from the device or a transmission apparatus in the vicinity of the device. Then, the mobile terminal may set a control command in a predetermined item in the remote control object corresponding to the device. Thereby, the mobile terminal may easily perform remote control of a plurality of devices.

DESCRIPTION OF DRAWINGS

FIG. 6 is an internal block diagram of the mobile terminal of FIG. 1.

FIGS. 9A to 9L are views illustrating the method of operating the mobile terminal of FIG. 8.

FIGS. 13A to 13G are views illustrating the operation methods of FIGS. 12A to 12C.

FIG. 28 is a flowchart illustrating an exemplary method of operating a mobile terminal according to another embodiment of the present invention.

FIGS. 32A to 32C are views illustrating the method of operating the mobile terminal of FIG. 31.

FIG. 33 is a flowchart showing an exemplary method of operating a mobile terminal according to another embodiment of the present invention.

BEST MODE

Hereinafter, the present invention will be described in detail with reference to the drawings.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
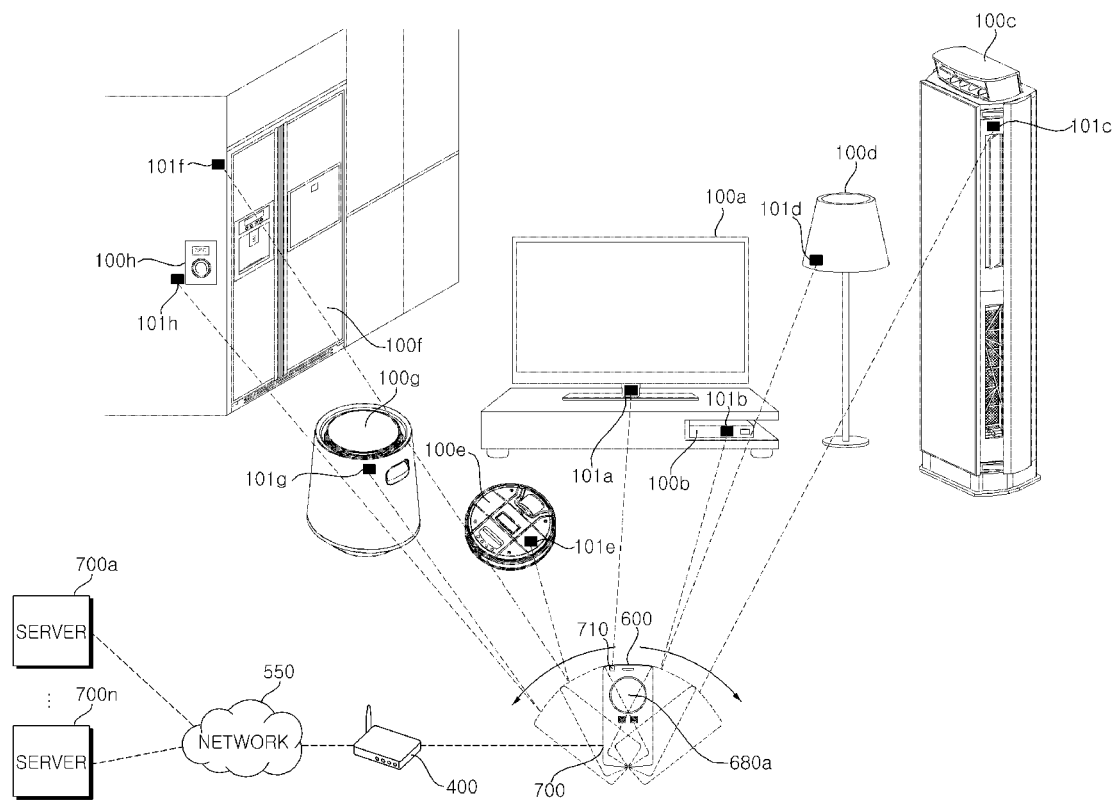
FIG. 1 is a view illustrating a device remote control system according to an embodiment of the present invention.

FIG. 1 is a view illustrating a device remote control system according to an embodiment of the present invention.

Referring to FIG. 1, a device remote control system 10 according to an embodiment of the present invention may include a mobile terminal 600, a plurality of devices 100a, 100b, 100c, 100d, 100e, 100f, 100g, and 100h, and transmission apparatuses 101a, 101b, 101c, 101d, 101e, 101f, 101g and 101h that are mounted in or disposed around the respective devices.

The device remote control system 10 may further include a gateway 400 and servers 700a, . . . , 700n.

While the figure shows an image display apparatus 100a such as a TV, a set-top box 100b, an air conditioner 100c, a lighting device 100d, a robot cleaner 100e, a refrigerator 100f, an air cleaner 100g, and a temperature control 100h as an example of devices, various other examples are also possible. The devices shown in the figure may be called home devices.

Other examples of the devices may include a washing machine, an optical disk reproducing device, a gaming device, a gas valve, a security device such as a security camera, a door that is electronically opened and closed, a window that is electronically opened and closed, an audio output unit, a gaming device, an electronic picture frame, an energy storage system (ESS), a digital camera, a perfume emitting device, a vehicle, and a drone.

Hereinafter, the devices shown in the figure are mainly described.

Each of the transmission apparatuses 101a, 101b, 101c, 101d, 101e, 101f, 101g, and 101h may transmit a device identification (ID) signal for identifying a corresponding device among the other devices.

The device ID signal may include at least one of device type information, manufacturer information, device model name information, device state information, or device control command related information about the corresponding device.

The device state information may include an ON/OFF state of the device and an operation value state at the time when the device operates.

Alternatively, the device ID signal may be a specific signal set so to identify each device. For example, the device ID signal may be a time-based pattern signal or a space-based pattern signal. More specifically, the device ID signal may be a time-based infrared pattern signal or a space-based infrared pattern signal.

Each of the transmission apparatuses 101a, 101b, 101c, 101d, 101e, 101f, 101g and 101h may reflect an output signal output from the mobile terminal 600 directed thereat, and transmit a device ID signal toward the mobile terminal 600.

The device ID signal, which is a signal having good directionality, may be one of an infrared signal, a radio frequency (RF) signal, a Wi-Fi signal, a ZigBee signal, a Bluetooth signal, a laser signal, and a Ultra Wideband (UWB) signal.

The mobile terminal 600 may receive a plurality of ID signals from the respective transmission apparatuses 101a, 101b, 101c, 101d, 101e, 101f, 101g, and 101h.

If the mobile terminal 600 is directed at one of the plurality of devices 100a, 100b, 100c, 100d, 100e, 100f, 100g, and 100h or one of the plurality of devices 100a, 100b, 100c, 100d, 100e, 100f, 100g, and 100h, the mobile terminal 600 may detect one of the at least one received ID signal as a representative ID signal.

The mobile terminal 600 may perform signal processing on the detected ID signal or the representative ID signal, and recognize or identify a device corresponding to the ID signal based on at least one of the device type information, the manufacturer information, the device model name information or the device state information, and the information related to a device control command, which are included in the detected ID signal.

Alternatively, the mobile terminal 600 may compare the detected ID signal or the representative ID signal with data associated with the ID signal previously stored in the mobile terminal 600, thereby recognizing or identifying the device.

Then, the mobile terminal 600 may perform a control operation to display a remote control object for remote control of the recognized device.

When a remote control object for device control is displayed and an item is selected in the remote control object by the user, the mobile terminal 600 may output and transmit a signal corresponding to the selected item, that is, a remote control signal.

For example, when the mobile terminal 600 is directed at the air conditioner 100c, the mobile terminal 600 may control a first item in the remote control object to display a remote control object for adjustment of the strength of wind from the air conditioner and may output and transmit a remote control signal related to the wind strength adjustment for the air conditioner when the first item is operated.

Thus, when the mobile terminal 600 is directed at a first device, it may detect a first ID signal received from the first device, and perform a control operation based on the detected first ID signal to display a first remote control object for remote control of the first device. When the mobile terminal 600 is directed at a second device, it may detect a second ID signal received from the second device, and perform a control operation based on the detected second ID signal to display a second remote control object for remote control of the second device.

Accordingly, remote control of various devices may be performed using a single mobile terminal 600.

The display apparatus 100a such as a TV, the set-top box 100b, the air conditioner 100c, the lighting device 100d, the robot cleaner 100e, the refrigerator 100f, the air cleaner 100g, the temperature control 100h, and the like may be remotely controlled depending on the direction of orientation of the mobile terminal 600.

The remote control signal output from the mobile terminal 600 may be one of an infrared (IR) signal, an RF signal, a Wi-Fi signal, a ZigBee signal, a Bluetooth signal, a laser signal, and an Ultra Wideband (UWB) signal.

The mobile terminal 600 may receive control command information about at least a part of the remote control object from the gateway 400, in consideration of remote control of each device.

Alternatively, the mobile terminal 600 may transmit control command information about at least a part of the remote control object to the gateway 400 to perform remote control of each device.

In particular, the gateway 400 may receive control command information about at least a part of the remote control object for remote control of each device from the external servers 700a, . . . , 700n and the like.

Here, the external servers 700a, . . . , 700n may be servers operated by the respective device manufacturers or servers storing information about the respective devices.

Figure 2:
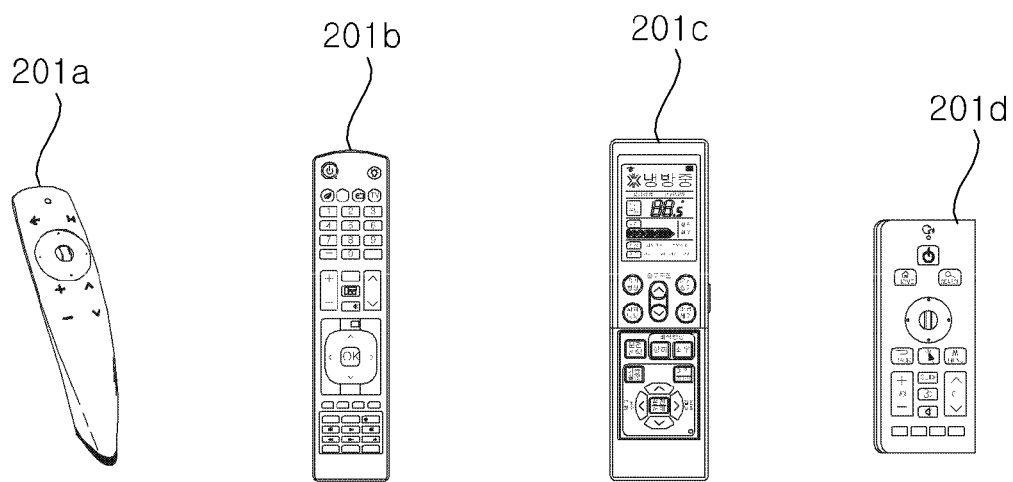
FIG. 2 is a view illustrating mobile terminals or remote control screens for respective devices.

FIG. 2 is a view illustrating mobile terminals or remote control screens for respective devices.

FIG. 2 exemplarily shows a mobile terminal 201a for an image display apparatus, a mobile terminal 201b for an optical disk player, a mobile terminal 201c for an air conditioner, and a mobile terminal 201d for a robot cleaner.

As shown in FIG. 2, when mobile terminals assigned different codes are used to remotely control the respective electronic devices, the user may suffer inconvenience as the number of mobile terminals increases.

According to the present invention, a mobile terminal capable of more easily performing remote control of a plurality of devices is presented.

FIGS. 3A to 3F are views illustrating variation of the types of devices controlled according to the orientation of the mobile terminal of FIG. 1.

Figure 3A:
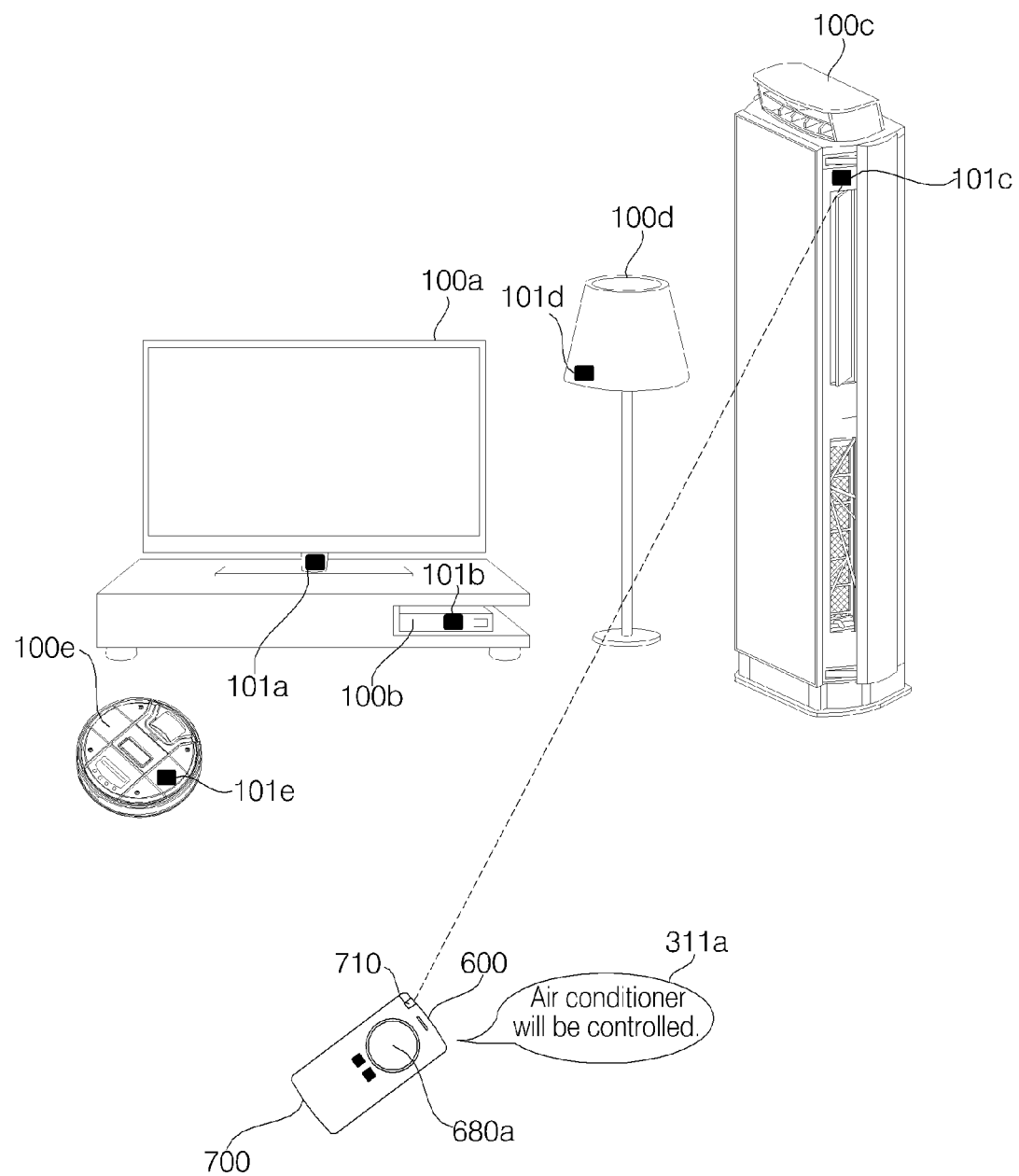
FIGS. 3A to 3F are views illustrating variation of the types of devices controlled according to the orientation of the mobile terminal of FIG. 1.

FIG. 3A illustrates a case where the mobile terminal 600 is directed at the air conditioner 100c among the various devices 100a, 100b, 100c, 100d, and 100e in a house.

The mobile terminal 600 receives at least one ID signal including an ID signal from the transmission apparatus 101c corresponding to the air conditioner 100c. Then, the mobile terminal 600 may detect the ID signal in the at least one received ID signal, and recognize or identify that the remote control enabled device is the air conditioner 100c, based on the detected ID signal.

For example, when at least one of device type information, manufacturer information, or device model name information is included in the detected ID signal, the mobile terminal 600 may perform signal processing on the ID signal, extract at least one of the device type information, the manufacturer information, or the device model name information, and recognize or identify the device corresponding to the ID signal based on at least one of the extracted device type information, the extracted manufacturer information, or the extracted device model name information.

As another example, if the received and detected ID signal is a specific signal configured to identify each device, the mobile terminal 600 may compare the received and detected ID signal with data related to the ID signal and stored in the memory 660 to recognize or identify the device.

More specifically, when the received and detected ID signal is a time-based pattern signal, the mobile terminal 600 may compare the time-based pattern signal-related data stored in the memory 660 with the received pattern signal to recognize or identify the device.

Alternatively, when the received and detected ID signal is a space-based pattern signal, the mobile terminal 600 may compare the space-based pattern signal-related data stored in the memory 660 with the received pattern signal to recognize or identify the device.

Then, the mobile terminal 600 may control a remote control object for the air conditioner 100c to be displayed after identifying the directed device as the air conditioner 100c.

When the device identification is completed or display of the remote control object is completed, the mobile terminal 600 may provide a device control enable message 311a by outputting sound, or emitting light through an LED included in the mobile terminal 600 for a predetermined time, or outputting vibration. Thereby, the user may recognize that the air conditioner is controllable. FIG. 3A illustrates outputting an air conditioner control enable message 311a such as "The air conditioner is controlled" in the form of sound.

Alternatively, to provide user convenience, a device whose identification is completed or which is controllable by the mobile terminal 600 may be configured to emit light through an LED included in the device or the transmission apparatus for a predetermined time, to make a specific sound through a sound device included in the device or the transmission apparatus, or to display a remote control enable message for the mobile terminal 600 on the display included in the device or the transmission apparatus.

In particular, when a predetermined item is selected in the remote control object after display of the remote control object is completed, the mobile terminal 600 may transmit a remote control signal corresponding to a control command of the predetermined item to the air conditioner 100c.

The air conditioner 100c may emit light through an LED built in the air conditioner 100c for a predetermined time after receiving the remote control signal. Thereby, the user may recognize that the air conditioner is being controlled.

Figure 3B:
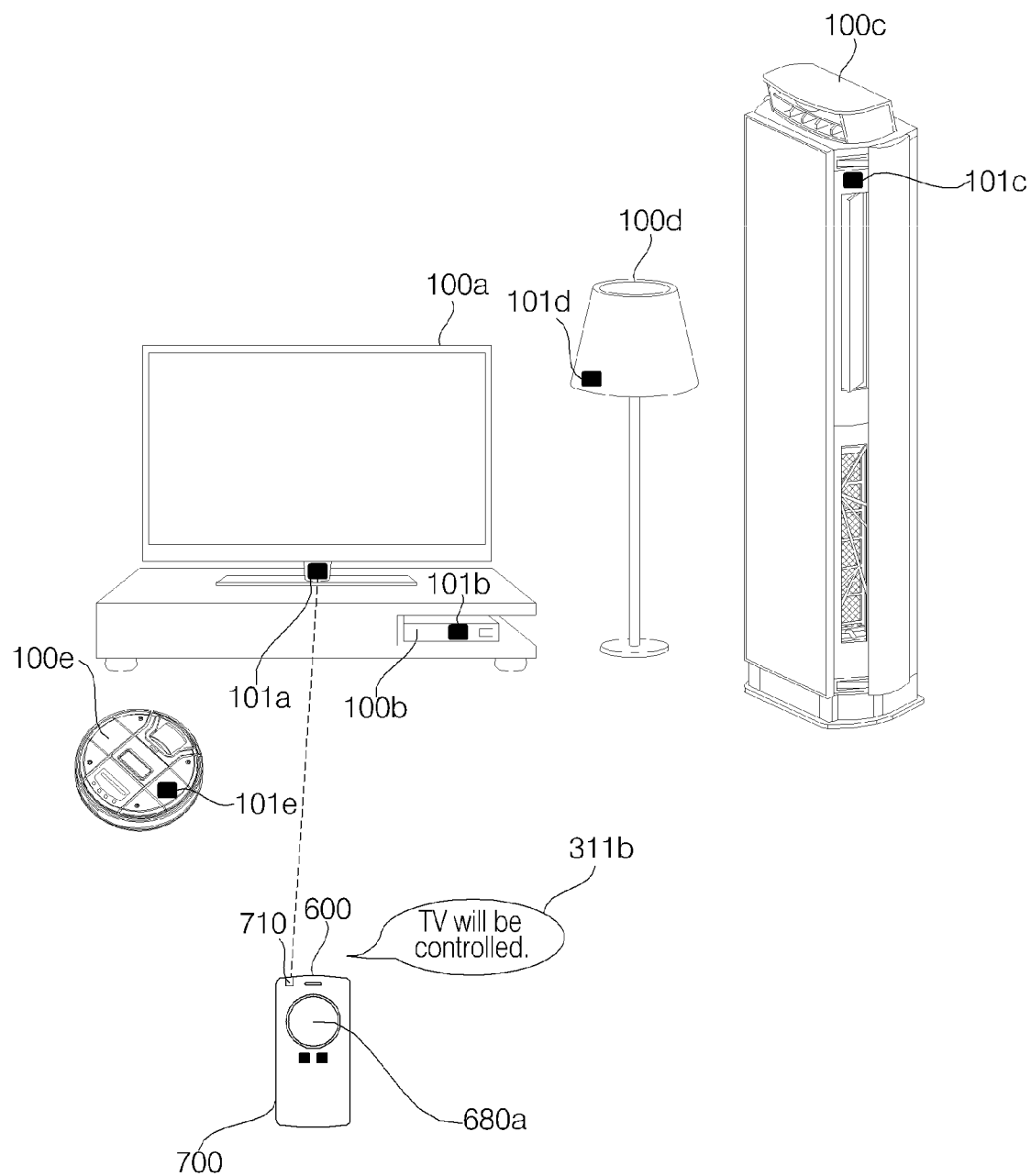

Next, FIG. 3B illustrates a case where the mobile terminal 600 is directed at the image display apparatus 100a among the various devices 100a, 100b, 100c, 100d, and 100e in the house.

The mobile terminal 600 receives an ID signal from the transmission apparatus 101a corresponding to the image display apparatus 100a.

Then, the mobile terminal 600 may detect the ID signal in at least one ID signal including the ID signal received from the image display apparatus 100a, and recognize or identify that the remote control enabled device is the image display apparatus 100a, based on the detected ID signal. For the method of recognizing the image display apparatus 100a, refer to the description of FIG. 3A.

After recognizing that the device at which is the mobile terminal 600 is directed is the image display apparatus 100a, the mobile terminal 600 may control a remote control object for the image display apparatus 100a to be displayed.

Figure 3C:
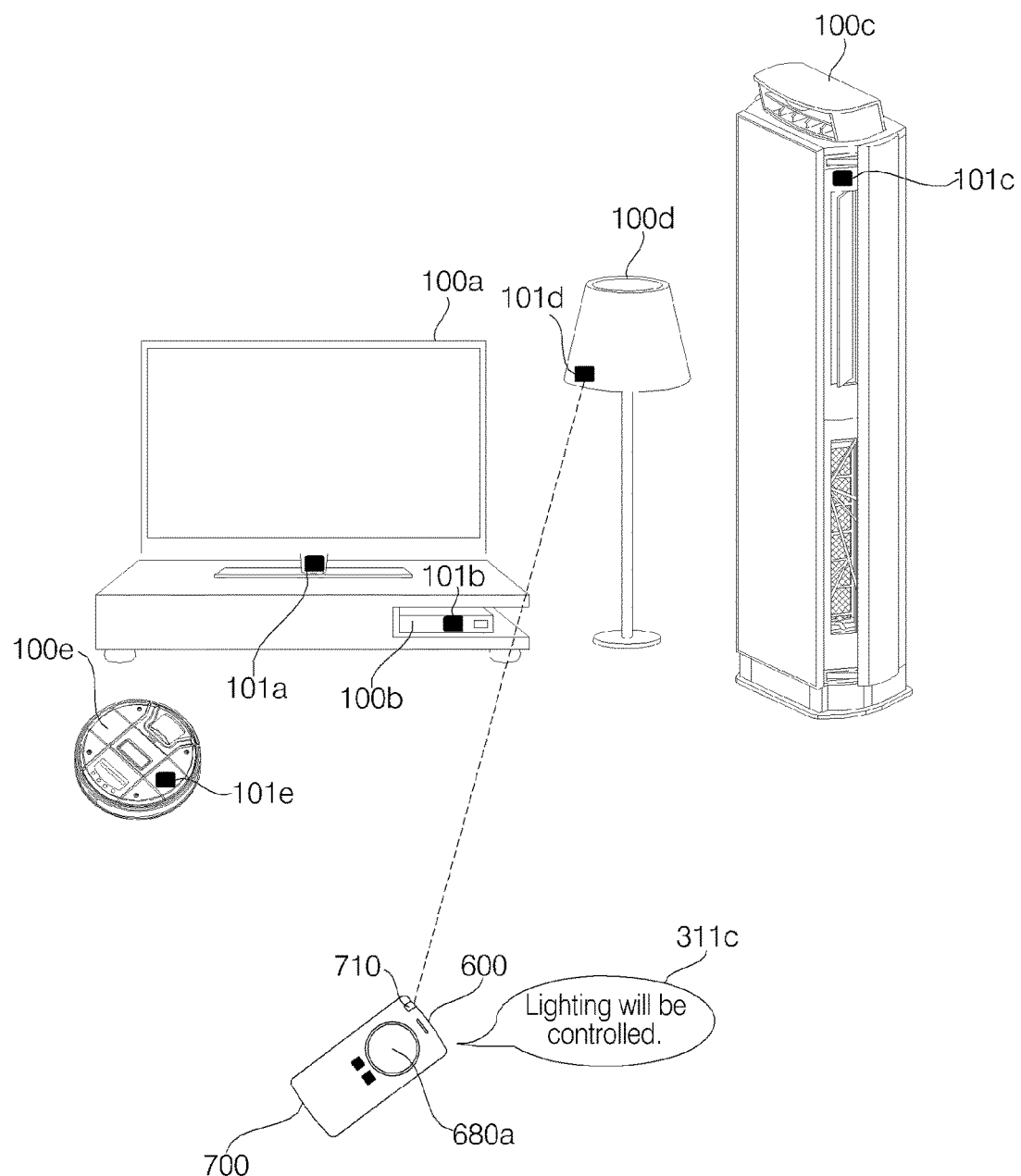

Next, FIG. 3C illustrates a case where the mobile terminal 600 is directed at the lighting device 100d among the various devices 100a, 100b, 100c, 100d, and 100e in the house.

The mobile terminal 600 receives an ID signal, for example, an infrared (IR) signal from the transmission apparatus 101d corresponding to the lighting device 100d.

Then, the mobile terminal 600 may recognize that the device at which the mobile terminal is directed is the lighting device 100d, based on the infrared (IR) signal. For the method of recognizing the lighting device 100d, refer to the description of FIG. 3A.

After recognizing that the device at which the mobile terminal is directed is the lighting device 100d, the mobile terminal 600 may control a remote control object for the lighting device 100d to be displayed.

Figure 3D:
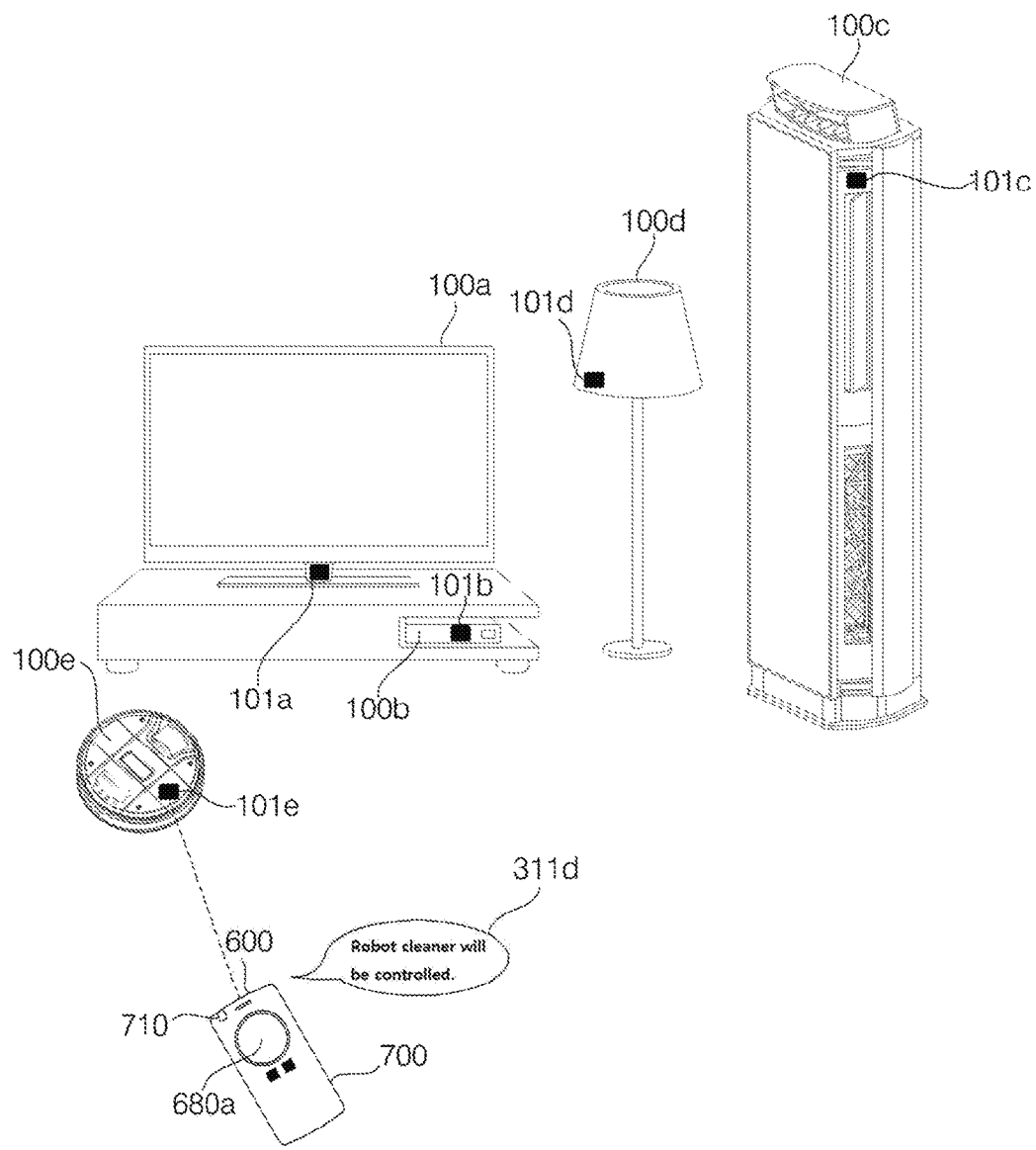

Next, FIG. 3D illustrates a case where the mobile terminal 600 is directed at the robot cleaner 100e among the various devices 100a, 100b, 100c, 100d, and 100e in the house.

The mobile terminal 600 receives an ID signal from the transmission apparatus 101e corresponding to the robot cleaner 100e.

Then, the mobile terminal 600 may detect the ID signal in at least one ID signal including the ID signal received from the robot cleaner 100e, and recognize or identify that the remote control enabled device is the robot cleaner 100e, based on the detected ID signal. For the method of recognizing the robot cleaner 100e, refer to the description of FIG. 3A.

After recognizing that the device at which the mobile terminal is directed is the robot cleaner 100e, the mobile terminal 600 may control a remote control object for the robot cleaner 100e to be displayed.

Figure 3E:
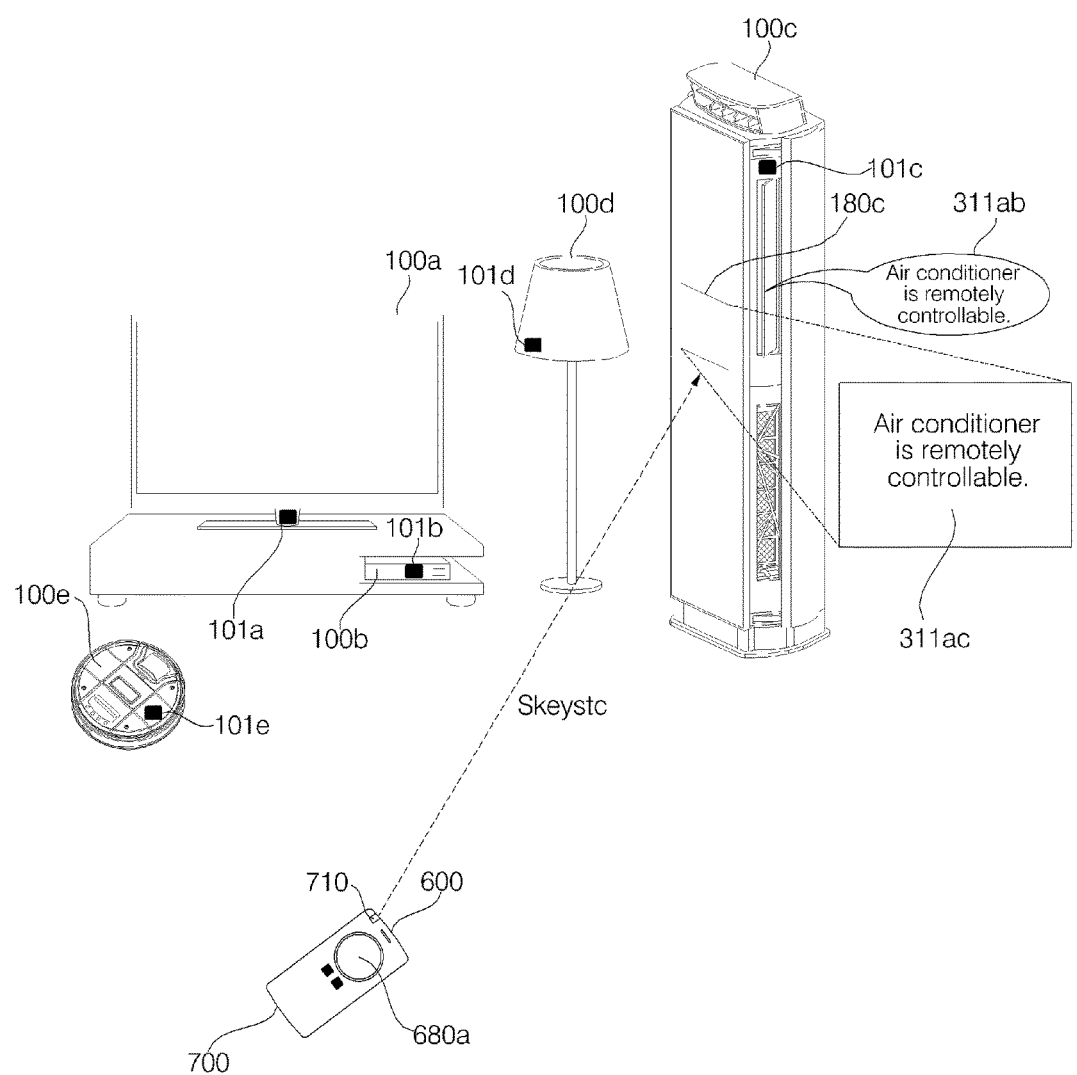

FIG. 3E illustrates a case where a remote control enable signal Skeystc is transmitted from the mobile terminal 600 to the air conditioner 100c when setting for remote control of the air conditioner 100c is completed.

After receiving the remote control enable signal Skeystc, the air conditioner 100c may display an air conditioner remote control enable message 311ac on the display 180c or output the air conditioner remote control enable message 311ab in the form of sound.

Unlike the example of FIG. 3A, in which the air conditioner control enable message 311a such as "The air conditioner is controlled." is output from the mobile terminal 600, the remote control enable signal Skeystc may be transmitted to the air conditioner 100c, and air conditioner remote control enable messages 311ab and 311ac may be output from the air conditioner 100c.

Figure 3F:
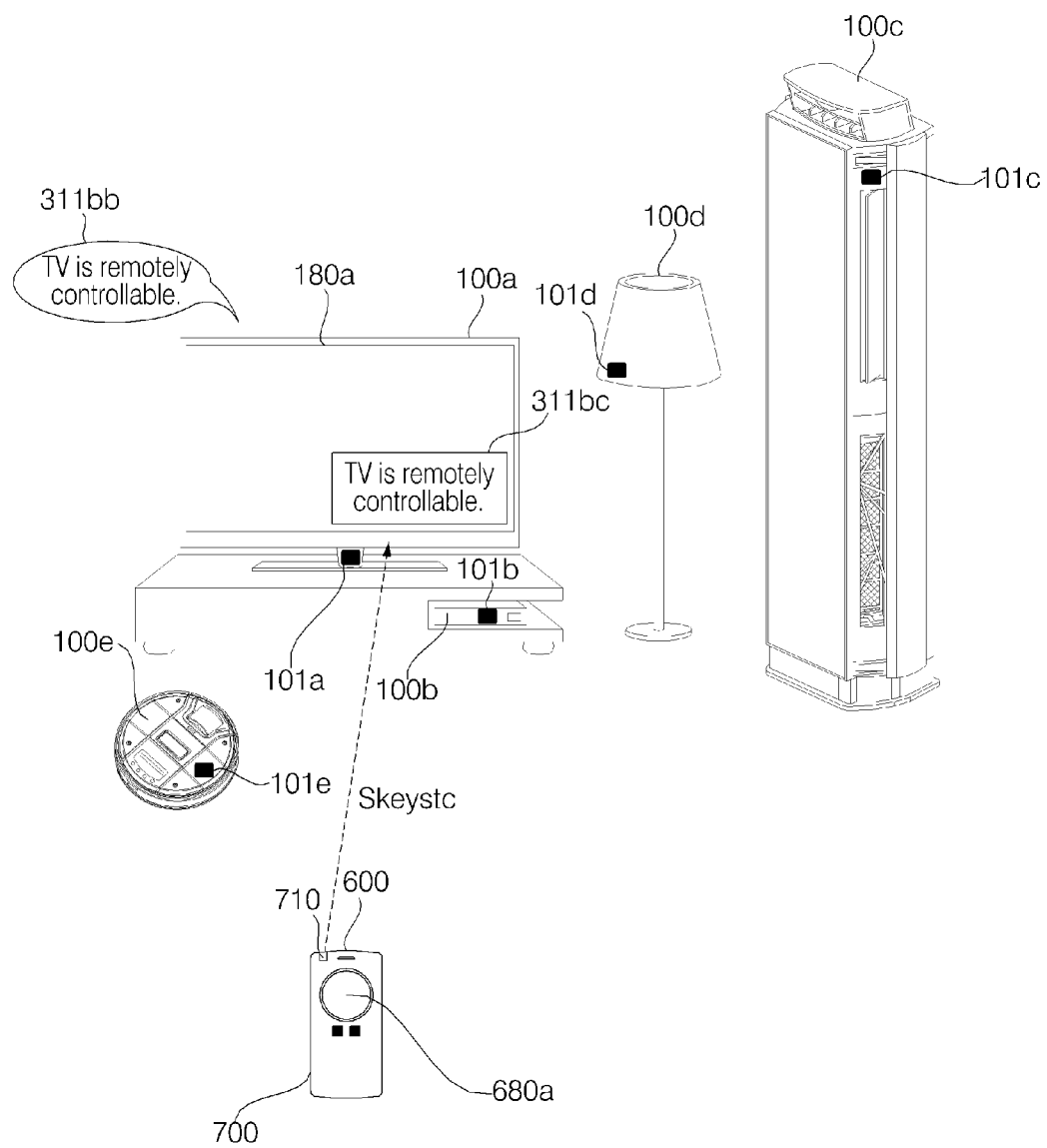

FIG. 3F illustrates a case where a remote control enable signal Skeysta is transmitted from the mobile terminal 600 to the image display apparatus 100a when the setting for remote control of the image display apparatus 100a is completed.

After receiving the remote control enable signal Skeysta, the image display apparatus 100a may display an image display apparatus remote control enable message 311bc on the display 180a or output an image display apparatus remote control enable message 311bb in the form of sound.

Figure 4A:
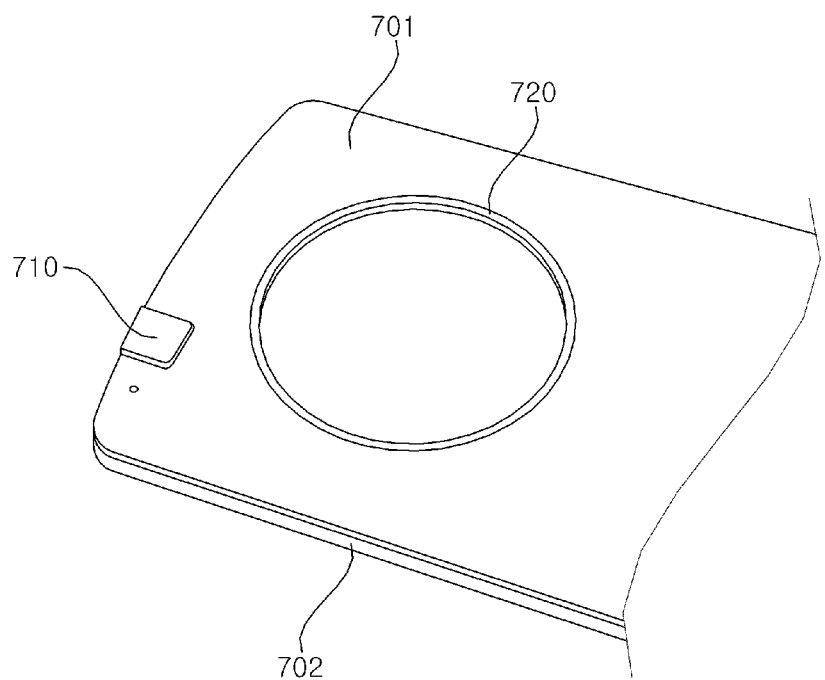
FIGS. 4A to 4C are views illustrating a mobile terminal case mounted on the mobile terminal of FIG. 1.
Figure 4B:
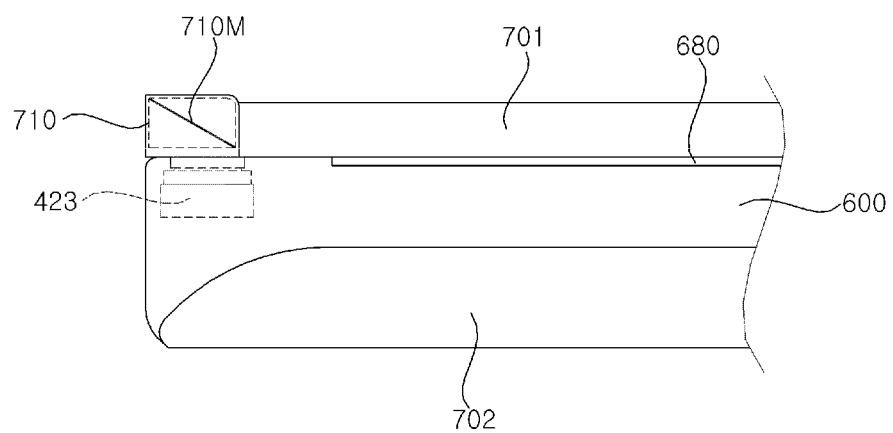
Figure 4C:
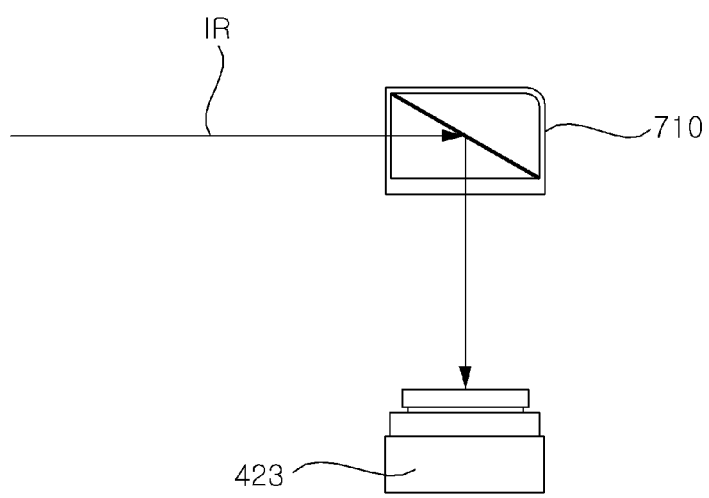

FIGS. 4A to 4C are views illustrating a mobile terminal case mounted on the mobile terminal of FIG. 1.

FIG. 4A is a partial perspective view of a mobile terminal case 700 according to an embodiment of the present invention, FIG. 4B is a side view of the mobile terminal case of FIG. 4A, and FIG. 4C is a side view showing a reception unit of the mobile terminal and a mirror portion of the mobile terminal case.

Referring to the figures, the mobile terminal case 700 may include a front case 701 covering at least a part of the display area of the mobile terminal 600 and a rear case 702 coupled to or attached to the rear surface of the mobile terminal 600.

The upper area of the front case 701 may be provided with an opening 720 for checking an image displayed on a display 680.

The front case 701 is disposed on the upper side of the reception unit 423, which is disposed on one side of the periphery of the display 680 of the mobile terminal 600, and may include a mirror portion 710 configured to divert the path of an incoming ID signal, for example, an infrared (IR) signal, onto the reception unit 423.

Specifically, as shown in FIG. 4C, the mirror portion 710 may change the path of an ID signal incident on the mobile terminal from the upper side of the mobile terminal 600 such that the ID signal having the changed path is incident onto the reception unit 423, which is disposed on the front surface of the mobile terminal 600.

Accordingly, even when the front case 701 is placed to cover the mobile terminal 600, an ID signal output in the direction in which the mobile terminal 600 is oriented may be stably incident on the reception unit 423.

Therefore, even in the standby mode, the mobile terminal 600 may display a remote control object for remote control of the device in a display area corresponding to the area where the opening 720 is formed in the mobile terminal front case 701.

When the remote control object is displayed, the controller 680 of the mobile terminal 600 may temporarily release the standby mode. If there is touch input for a predetermined item in the remote control object, the controller 680 of the mobile terminal 600 may perform a control operation to output a remote control signal corresponding to the item.

Accordingly, remote control of various devices may be easily performed by changing the direction of orientation of the mobile terminal 600, even when the case 700 is placed to cover the mobile terminal.

Figure 5A:
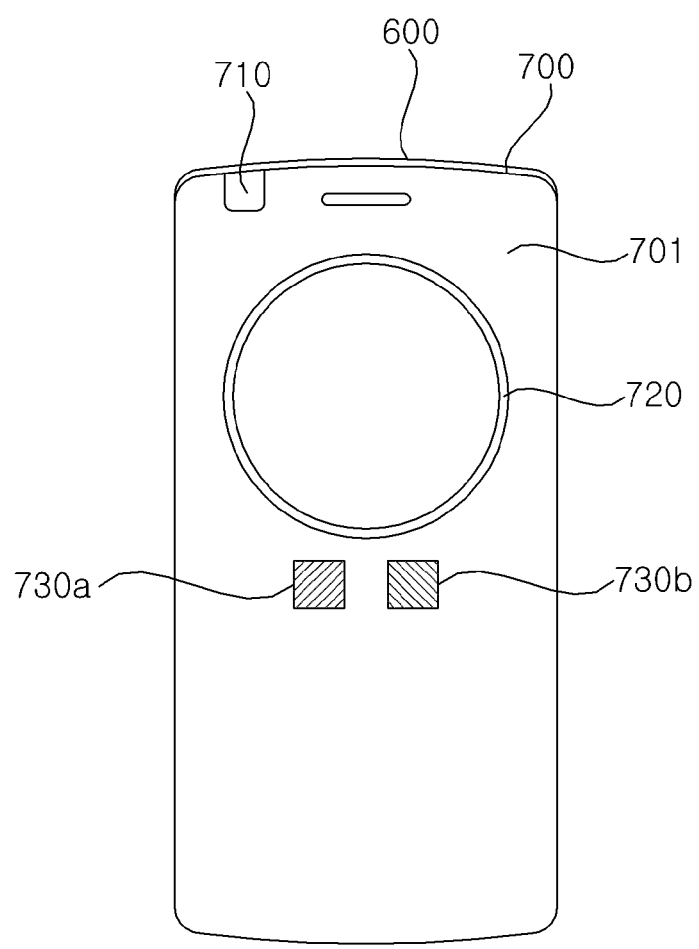
FIGS. 5A and 5B are views illustrating the closed position and open position of the front case of a mobile terminal.
Figure 5B:
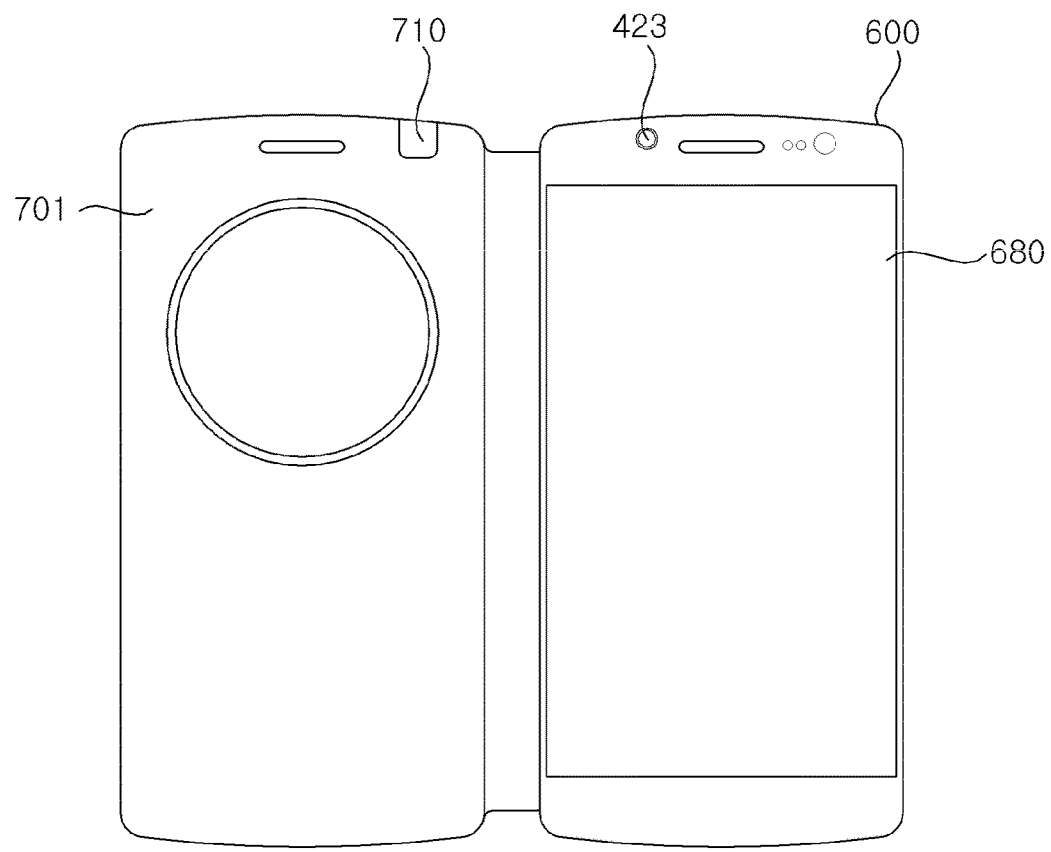

FIGS. 5A and 5B are views illustrating the closed position and open position of the front case of a mobile terminal.

FIG. 5A is a front view illustrating the front case 701 of a mobile terminal in a closed position, and FIG. 5B is a front view illustrating the front case 701 of the mobile terminal in an open position.

Referring to FIG. 5A, a conductive material may be applied to a part of the front case 701, and be different from the material for the other area.

In the figure, it is illustrated that a conductive material is applied to a first area 730a and a second area 730b, which are below the opening of the front case 701, and is different from the material for the other area.

For example, a conductive material having a higher conductivity than that of the peripheral area is preferably applied.

Thus, even when the front case 701 is placed to cover the mobile terminal, the touch sensor of the mobile terminal 600 may sense the touch input for the first area 730a or the second area 730b.

Therefore, in the case where the front case 701 is placed to cover the mobile terminal, the controller 680 of the mobile terminal 600 may set a first item to be selected when the first area 730a is touched, and set a second item to be selected when the second area 730b is touched.

Here, the first item may be a menu item and the second item may be a multi-device operation item, but it should be noted that embodiments are not limited thereto and various modifications are possible.

That is, the controller 680 of the mobile terminal 600 may assign the menu item to the first area 730a and the multi-device operation item to the second area 730b.

As shown in FIG. 5A, when the mobile terminal 600 is directed at a specific device with the front case 701 closed, the controller 680 of the mobile terminal 600 may control a remote control object for remote control of the specific device to be displayed.

For example, when the mobile terminal 600 is directed at a first device, the controller 680 of the mobile terminal may control a first remote control object for remote control of the first device to be displayed, based on a first ID signal received. When the mobile terminal 600 is directed at a second device, the controller 680 of the mobile terminal 600 may control a second remote control object for remote control of the second device to be displayed, based on a second ID signal received.

As shown in FIG. 5B, when the front case 701 is open, the controller 680 of the mobile terminal 600 may control other remote control items to be displayed in an area around the displayed remote control object together with the displayed remote control object, or switch the screens and control the displayed remote control object and another remote control screen to be displayed.

Accordingly, more various items can be identified and selected, thereby enhancing user convenience.

FIG. 6 is an internal block diagram of the mobile terminal of FIG. 1.

Referring to the figure, the mobile terminal 600 may include a mobile terminal that is movable.

The mobile terminal 600 may include a wireless communication unit 610, an audio/video (A/V) input unit 620, a user input unit 630, a sensing unit 640, an output unit 650, a memory 660, an interface unit 625, a controller 670, and a power supply 690.

The wireless communication unit 610 may include a broadcast reception module 611, a mobile communication module 613, a wireless communication module 615, an audio communication unit 617, and a GPS module 619.

The broadcast reception module 611 may receive at least one of a broadcast signal or broadcast-related information from an external broadcast management server over a broadcast channel. Here, the broadcast channel may include a satellite channel and a terrestrial channel.

The broadcast signal and/or the broadcast-related information received through the broadcast reception module 611 may be stored in the memory 660.

The mobile communication module 613 transmits and receives a wireless signal to at least one of a base station, an external terminal, or a server on a mobile communication network. Here, the wireless signal may include various types of data according to transmission/reception of a voice call signal, a video call signal, or a character/multimedia message.

The wireless communication module 615 refers to a module for wireless Internet access, and the wireless communication module 615 may be embedded in or installed outside the mobile terminal 600. For example, the wireless communication module 615 may perform WiFi-based wireless communication or WiFi Direct-based wireless communication.

The wireless communication module 615 may include a reception unit 423 for receiving an ID signal and a transmitting section 423 for transmitting a remote control signal.

The reception unit 423 may receive a device ID signal of any one of an infrared (IR) signal, a radio frequency (RF) signal, a ZigBee signal, a Bluetooth signal and a laser signal from the transmission apparatus 101.

Accordingly, the reception unit 423 may include an IR reception unit (not shown) and an RF reception unit (not shown).

The transmission unit 421 may output a remote control signal of any one of an infrared (IR) signal, a radio frequency (RF) signal, a ZigBee signal, a Bluetooth signal and a laser signal.

Accordingly, the transmission unit 421 may include an IR transmission unit (not shown) and an RF transmission unit (not shown).

The transmission unit 421 may output different remote control signals for each of a plurality of devices. For example, when outputting a remote control signal that is an IR signal, IR signals having different patterns or different frequency bands may be output.

The transmission unit 421 may output an output signal Sout in correspondence with the case of FIG. 4B. The output signal Sout may be any one of an IR signal, a radio frequency (RF) signal, a ZigBee signal, a Bluetooth signal, and a laser signal.

When the device is the image display apparatus 100*a*, the mobile terminal 600 may transmit a signal including information on pointing information about the mobile terminal 600, for example, information about motion, to the RF transmission unit (not shown).

The audio communication unit 617 may perform audio communication. The audio communication unit 617 may output sound by adding predetermined information data to audio data to be output in an audio communication mode. Further, in the audio communication mode, the audio communication unit 617 may extract predetermined information data from the sound received from an external source.

Bluetooth, Radio Frequency Identification (RFID), Infrared Data Association (IrDA), Ultra Wideband (UWB), ZigBee, or the like may be used as the short-range communication technology.

The global positioning system (GPS) module 619 may receive position information from a plurality of GPS satellites.

The audio/video (A/V) input unit 620 is provided for inputting an audio signal or a video signal, and may include a camera 621 and a microphone 623.

The user input unit 630 generates key input data that the user inputs to control the operation of the terminal. To this end, the user input unit 630 may include a key pad, a dome switch, and a touchpad (resistive pad/capacitive pad). Particularly, when the touchpad and the display 651 form a layered structure, the structure may be called a touchscreen.

The sensing unit 640 may generate a sensing signal for controlling operation of the mobile terminal 600 by sensing the current state of the mobile terminal 600 such as the open/closed state of the mobile terminal 600, the position of the mobile terminal 600, and contact of the user.

The sensing unit 640 may include a haptic sensor 641, a pressure sensor 643 and a motion sensor 645. The motion sensor 645 may employ an acceleration sensor, a gyro sensor, a gravity sensor and the like to sense movement or location of the mobile terminal. In particular, the gyro sensor, which is configured to measure angular speed, may sense orientation (angle) of the mobile terminal with respect to a reference direction.

The output unit 650 may include a display 651, an audio output unit 653, an alarm unit 655, and a haptic module 657.

The display 680 displays and outputs information processed by the mobile terminal 600.

When the display 681 forms a layered structure with the touchpad to implement a touchscreen as described above, the display 681 may be used not only as an output device but also as an input device for inputting information according to user touch.

The audio output unit 653 outputs audio data received from the wireless communication unit 610 or stored in the memory 660. The audio output unit 653 may include a speaker and a buzzer.

The alarm unit 655 outputs a signal for reporting occurrence of an event in the mobile terminal 600. For example, the alarm unit 655 may output a signal in the form of vibration.

The haptic module 657 generates various haptic effects which may be felt by the user. A typical example of the haptic effects generated by the haptic module 657 is vibration.

The memory 660 may store a program for processing and controlling the controller 670, application data, and the like, and may function to temporarily store input data or output data (e.g., a phonebook, a message, a still image, a moving image, etc.).

In particular, the memory 660 may store patterns of a plurality of IR signals received from a plurality of devices. It may also store data for each device and operation item setting. It may also store an IR signal pattern for each device and operation item.

The interface unit 625 serves as an interface with all the external devices connected to the mobile terminal 600. The interface unit 625 may receive data from an external device or receive power from the external device and transmit the data or power to each component in the mobile terminal 600 and may allow data in the mobile terminal 600 to be transmitted to the external device.

The controller 670 typically controls the operations of the respective units to control the overall operation of the mobile terminal 600. For example, it may perform related controls and processing for voice calls, data communications, video calls, and the like. In addition, the controller 670 may include a multimedia playback module 681 for multimedia playback. The multimedia playback module 681 may be configured in hardware in the controller 670 or configured in software separately from the controller 670.

When receiving a device ID signal from at least one device or a transmission apparatus corresponding to the device via the reception unit 423, the controller 670 may control a remote control object for remote control to be displayed based on the received device ID signal. When a predetermined item is selected in the remote control object, the controller 670 may control the transmission unit 421 to transmit a remote control signal corresponding to the selected item.

When the mobile terminal is directed at the device, the controller 670 may identify the device based on the ID signal received from the device or the transmission apparatus corresponding to the device.

When the mobile terminal 600 is directed at a first device, the controller 670 of the mobile terminal may control a first remote control object for remote control of the first device to be displayed, based on a first ID signal received. When the mobile terminal 600 is directed at a second device, the controller 670 of the mobile terminal may control a second remote control object for remote control of the second device to be displayed, based on a second ID signal received.

When one of the first remote control object and the second remote control object is selected, the controller 670 may control a remote control signal corresponding to the selected item to be transmitted.

When the mobile terminal 600 is directed at the image display apparatus 100*a*, the controller 670 may control a signal corresponding to movement of the mobile terminal 600 sensed by the sensing unit 640, or a pointing signal to be transmitted to the image display apparatus 100*a* through the wireless communication module 615, particularly, through the transmission unit 421.

The user input interface unit (not shown) of the image display apparatus 100*a* may include a wireless communication unit (not shown) capable of wirelessly transmitting and receiving signals to and from the mobile terminal 600, and a coordinate value calculation unit (not shown) capable of calculating a coordinate value of a pointer corresponding to an operation of the mobile terminal 600.

The user input interface unit (not shown) may wirelessly transmit and receive signals to and from the mobile terminal 600 through an RF module (not shown). The mobile terminal 600 may receive a signal transmitted according to the IR communication standard through an IR module (not shown).

The coordinate value calculation unit (not shown) may calculate the coordinate value (x, y) of the pointer to be displayed on the display (not shown) by correcting the shake or error of the camera based on the received signal corresponding to the operation of the mobile terminal 600.

The transmission signal of the mobile terminal 600 input to the image display apparatus 100*a* through the user input interface unit (not shown) is transmitted to the controller (not shown) of the image display apparatus 100*a*. The controller (not shown) may determine the information about the operation of the mobile terminal 600 and the item operation from the signal transmitted from the mobile terminal 600, and control the image display apparatus 100*a* according to the determination.

The power supply 690 receives external power and internal power under control of the controller 670 to supply power required for operation of the respective components.

The camera 621 may capture an image. Particularly, when the camera 621 is directed at the user's face, an image including the user's face may be captured.

The controller 670 may recognize the user based on the captured image of the user's face and pre-stored user images.

The camera 621 may capture an image including the user's fingerprint. In this case, the controller 670 may recognize the user based on the captured image of the user's fingerprint and pre-stored user fingerprint images.

The controller 670 may perform authentication of the user based on the image captured by the camera 621, and may perform a control operation to enable remote control of devices when the authentication of the user is successful.

The controller 670 may control user information to be transmitted to a directed device, and perform a control operation to enable remote control of the device upon receiving the user authentication confirm information from the device.

The block diagram of the mobile terminal 600 shown in FIG. 6 is for an embodiment of the present invention. Each component in the block diagram may be integrated, added, or omitted according to the specifications of the mobile terminal 600 that is actually implemented. That is, two or more components may be combined into one component as needed, or one component may be divided into two or more components. The functions performed in the respective block are for the purpose of illustrating embodiments of the present invention, and specific operations and apparatuses do not limit the scope of the present invention.

Figure 7:
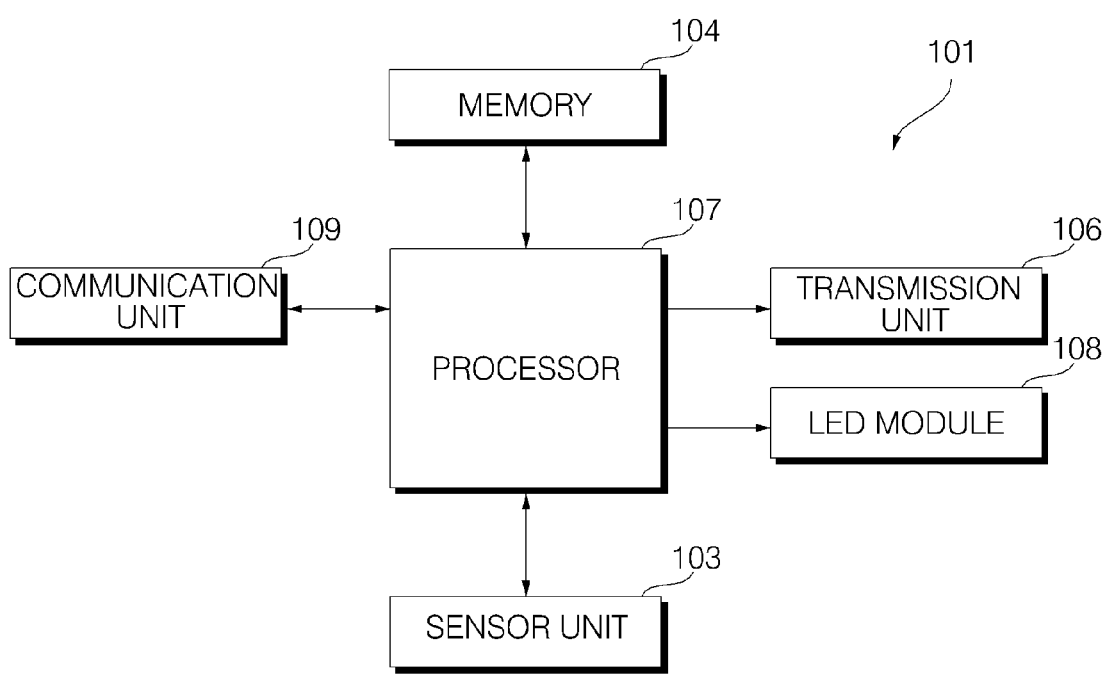
FIG. 7 is an exemplary internal block diagram of the transmission apparatus of FIG. 1.

FIG. 7 is an exemplary internal block diagram of the transmission apparatus of FIG. 1.

Referring to the figure, a transmission apparatus 101 may include a sensor unit 103, a memory 104, a processor 107, a transmission unit 106, an LED module 108, and a communication unit 109.

The sensor unit 103 may sense power on/off of a corresponding nearby device. To this end, the sensor unit 103 may include an electromagnetic field (EMF) sensor.

The processor 107 may recognize the type of the device or the device model name information based on the information related to the corresponding device stored in the memory 104 or the data associated with a ID signal of a specific pattern corresponding to the device. Then, the processor 107 may control the transmission unit 106 to transmit the ID signal corresponding to the identified device type or device model.

The processor 107 may check the power on/off state information about the device according to the power on/off sensing information about the device sensed by the sensor unit 103. Then, the processor 107 may control the transmission unit 106 to transmit the ID signal or the device state information corresponding to the recognized device power on/off state information.

Alternatively, the processor 107 may check the power on/off state information about the device according to the power on/off sensing information about the device sensed by the sensor unit 103. Then, the processor 107 may check the device type information or device model name information based on the checked device power on/off state information. Then, the processor 107 may control the transmission unit 106 to transmit an ID signal or device state information corresponding to the checked device type information or device model name information.

The memory 104 may store information related to the corresponding device or data associated with an ID signal of a specific pattern corresponding to the device.

The transmission unit 106 transmits an ID signal. The ID signal may include power on/off state information about the device. In particular, the ID signal of a specific pattern corresponding to the device may be transmitted. Further, the transmission unit 106 may transmit the power on/off state information about the device.

The LED module 108 may emit light according to the operation state of the transmission apparatus 101. For example, when a remote control signal is transmitted from the mobile terminal 600, the LED module 108 may flicker.

The communication unit 109 may exchange data with the device. For example, an ID signal may be received from the device. That is, the communication unit 109 may receive, from each device, at least one of device type information, manufacturer information, device model name information, device state information, and device control command related information about each device.

The device state information may include an ON/OFF state of the device, an operation value state at the time of operation of the device.

Alternatively, the communication unit 109 may transmit and receive data to and from the gateway 400.

For example, the communication unit 109 may receive control command information from the gateway 400 for at least a part of the remote control objects for remote control of each device.

The communication unit 109 may transmit control command information about at least a part of the remote control objects to the gateway 400, for remote control of each device.

Although not shown in the figure, a power supply may be further provided. The power supply may convert prevailing AC current into DC power and supply the converted power to each unit or supply DC power to each unit through a separate battery.

Although not shown in the figure, a display unit and a sound output unit may be further provided. The display unit may display information indicating whether the mobile terminal is remotely controllable and whether the sound output unit is paired with the mobile terminal. The sound output unit may output sound corresponding to the information indicating whether the mobile terminal is remotely controllable and whether the sound output unit is paired with the mobile terminal.

Figure 8:
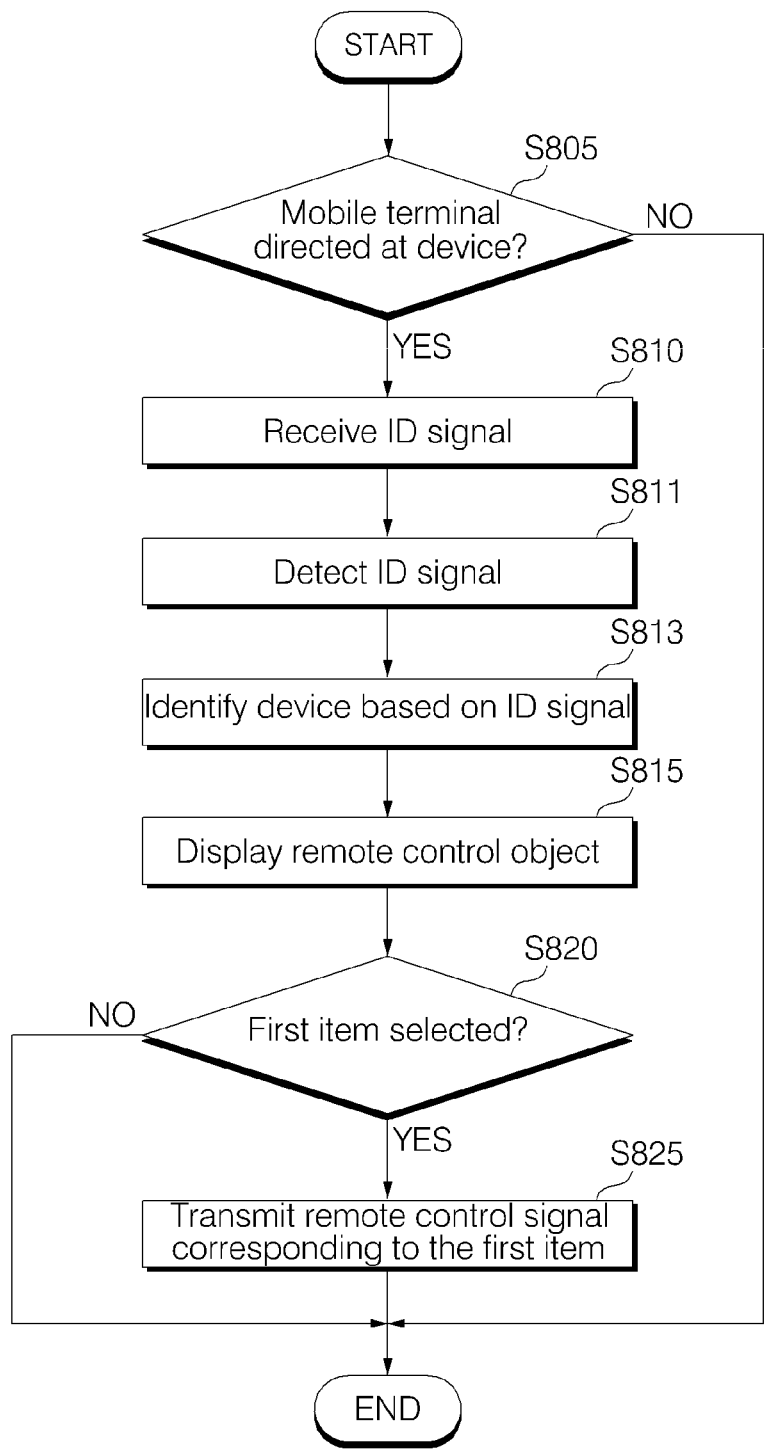
FIG. 8 is a flowchart illustrating an exemplary method of operating a mobile terminal according to an embodiment of the present invention.

FIG. 8 is a flowchart illustrating an exemplary method of operating a mobile terminal according to an embodiment of the present invention, and FIGS. 9A to 9L are views illustrating the method of operating the mobile terminal of FIG. 8.

Referring to FIG. 8, when the mobile terminal 600 is directed at a device (S805), the reception unit 423 of the mobile terminal 600 receives an ID signal (S810).

For example, when the mobile terminal 600 is directed at the air conditioner 100c, the reception unit 423 of the mobile terminal 600 may receive an ID signal of a pattern corresponding to the air conditioner from the air conditioner 101c or the transmission apparatus 101c corresponding to the air conditioner 100c.

Next, the controller 670 of the mobile terminal 600 may detect the ID signal among the at least one received ID signal (S811).

Next, the controller 670 of the mobile terminal 600 identifies the device based on the detected ID signal (S813).

As described above, as a device identification method, a device may be identified by extracting information from the received ID signal or by comparing the received ID signal with a plurality of pieces of device information stored in the memory 660 or data associated with a plurality of device ID signals.

Next, the controller 670 of the mobile terminal 600 controls an object for remote control of the device to be displayed (S815).

Next, the controller 670 of the mobile terminal 600 determines whether a first item in the remote control object is selected (S820), and if so, transmits a remote control signal corresponding to the first item (S825). Thus, remote control of the device may be easily performed.

Figure 9A:
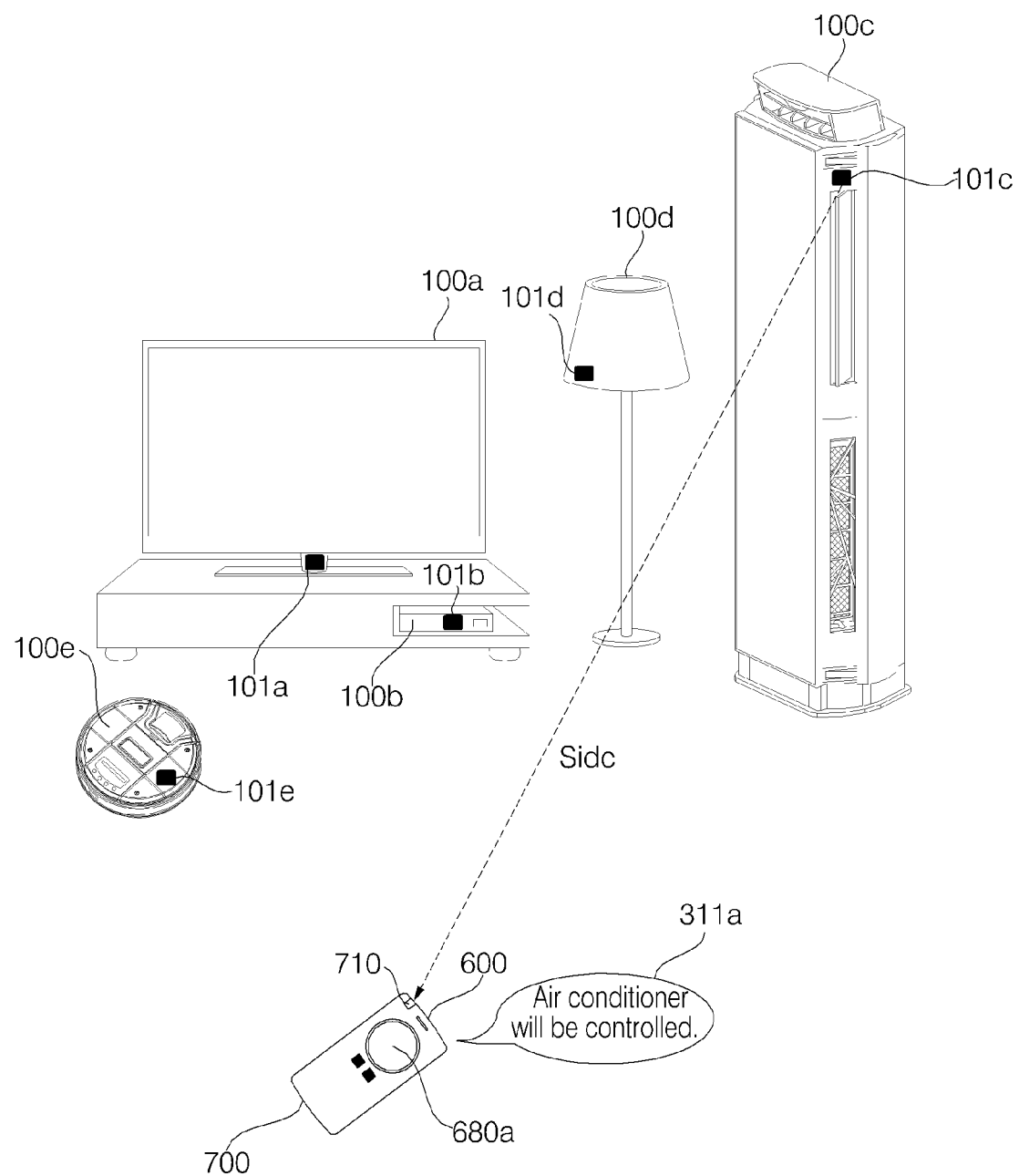

Referring to FIG. 9A, a plurality of transmission apparatuses 101a, 101b, 101c, 101d, 101e, 101f, 101g, and 101h, which are active transmission apparatuses, may each have a separate power source and output device ID signal.

The figure illustrates that the transmission apparatus 101c corresponding to the air conditioner 100c outputs an ID signal Sidc when the mobile terminal 600 is directed at the air conditioner 100c.

The mobile terminal 600 may receive at least one ID signal including the ID signal Sidc through the reception unit 423, detect the ID signal Sidc in the received ID signal, and perform signal processing on the detected ID signal Sidc, and then may recognize or identify that the air conditioner 100c is currently remotely controllable.

Then, at least a part of the remote control object may be set to operate as an air conditioner operation key.

FIG. 9B illustrates that the transmission unit 106c of the transmission apparatus 101c corresponding to the air conditioner 100c outputs a first infrared ID signal IRc.

The IR camera 423aa of the mobile terminal 600 may capture an infrared image including the transmission apparatus 101c corresponding to the air conditioner 100c as shown in FIG. 9B(a)

FIG. 9B(b) illustrates that the first infrared ID signal IRc has a constant low level LVL and a constant high level LVH, and the duty is variable. That is, the first infrared ID signal IRc having the duty of a first pattern based on time is exemplarily shown.

The controller 670 may detect the first infrared ID signal IRc having the duty of the first pattern, as shown in the figure, based on a plurality of infrared images captured during a predetermined frame period.

The controller 670 may compare the pattern data pre-stored in the memory 660 with the first pattern of the detected first infrared ID signal IRc and identify the intended device as the air conditioner 100c.

FIG. 9C illustrates that the transmission apparatus 101a corresponding to the image display apparatus 100a outputs AN ID signal Sida when the mobile terminal 600 is directed at the image display apparatus 100a.

Accordingly, the mobile terminal 600 may receive at least one ID signal including the ID signal Sida through the reception unit 423, detect the ID signal Sida in the received ID signal, and perform signal processing on the detected ID signal Sida, thereby recognizing or identifying that the image display apparatus 100a is currently remotely controllable.

Then, at least a part of the remote control object may be set to operate as an image display apparatus operation key.

Figure 9D:
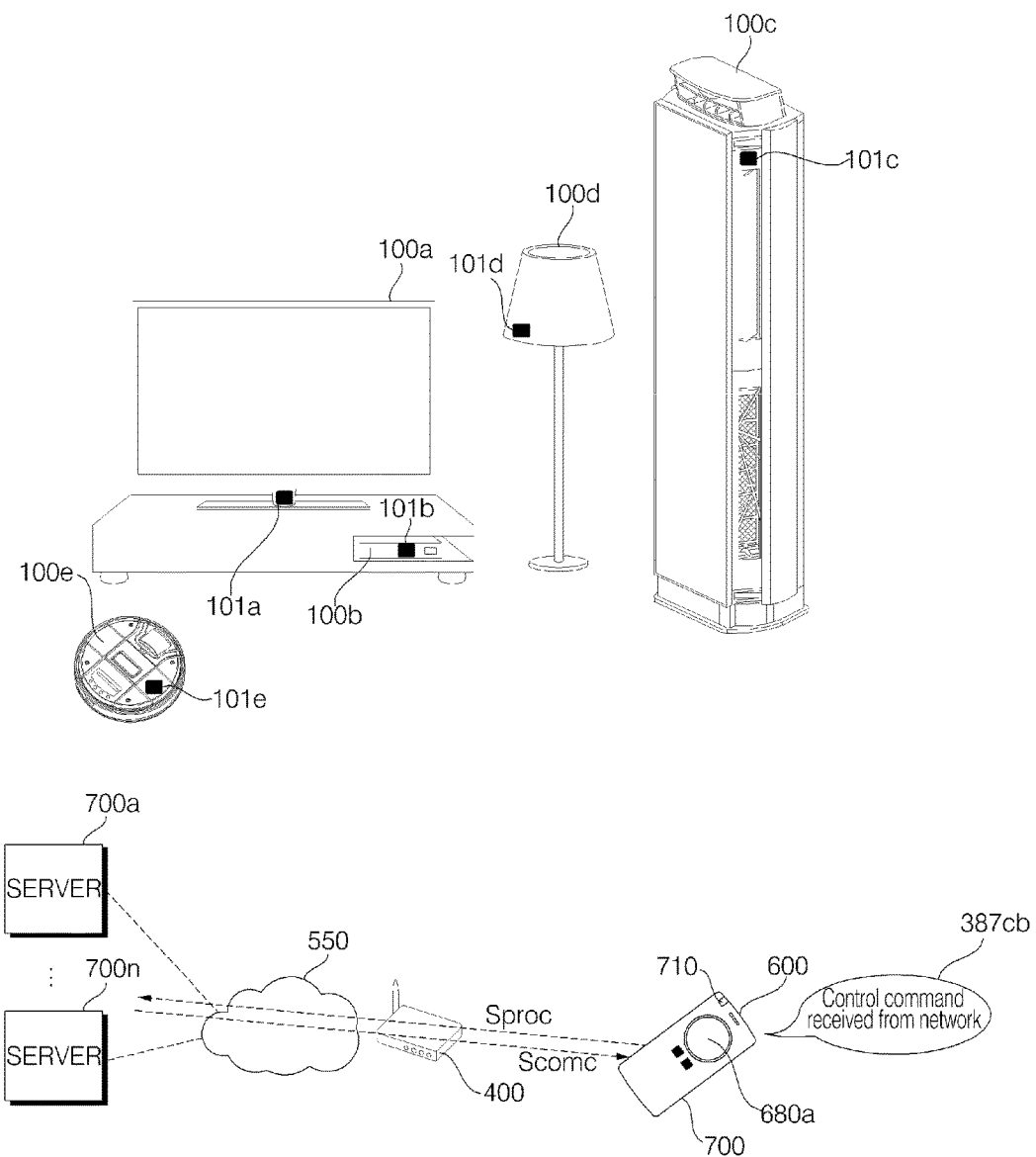
Figure 9F:
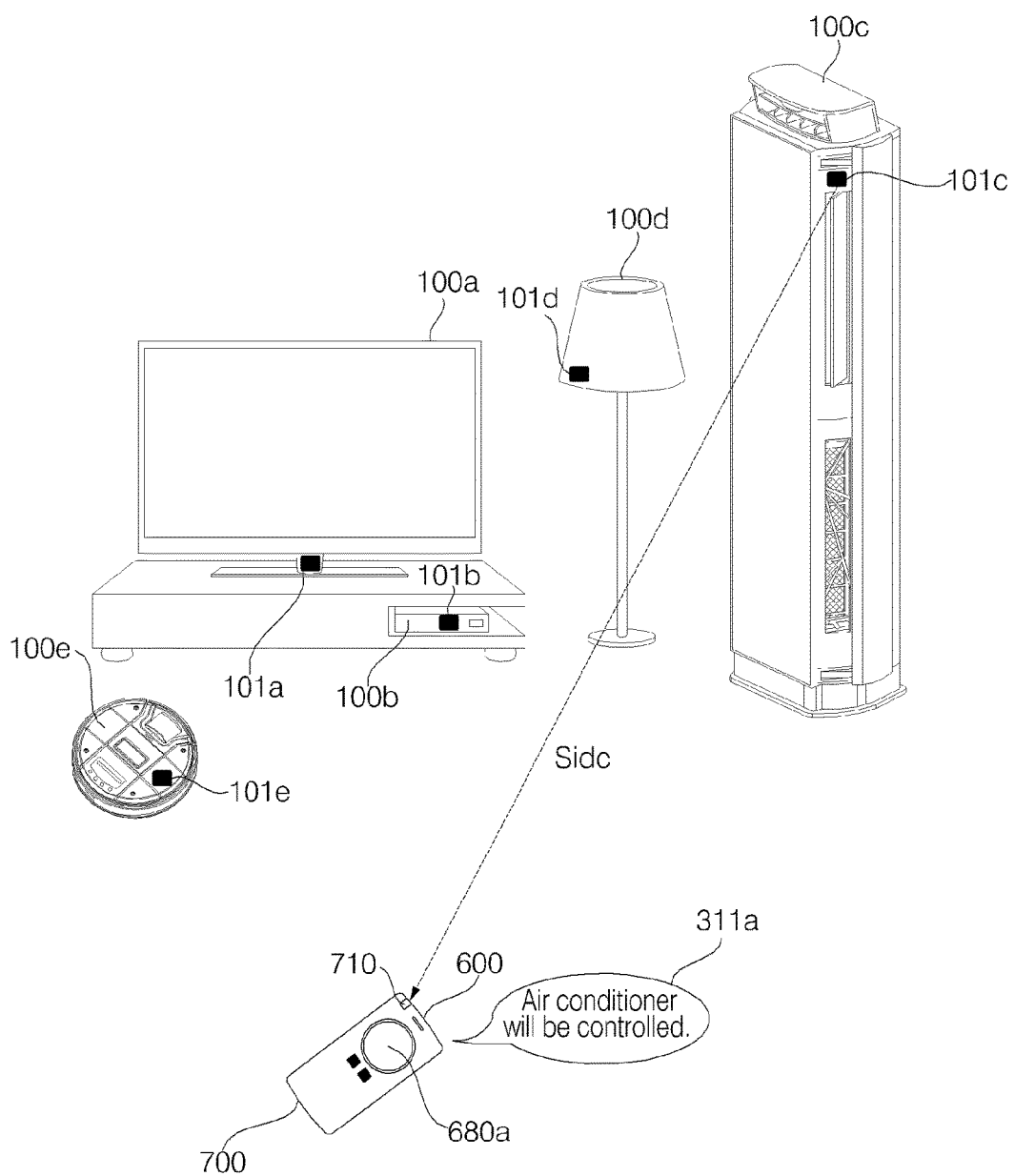
Figure 9G:
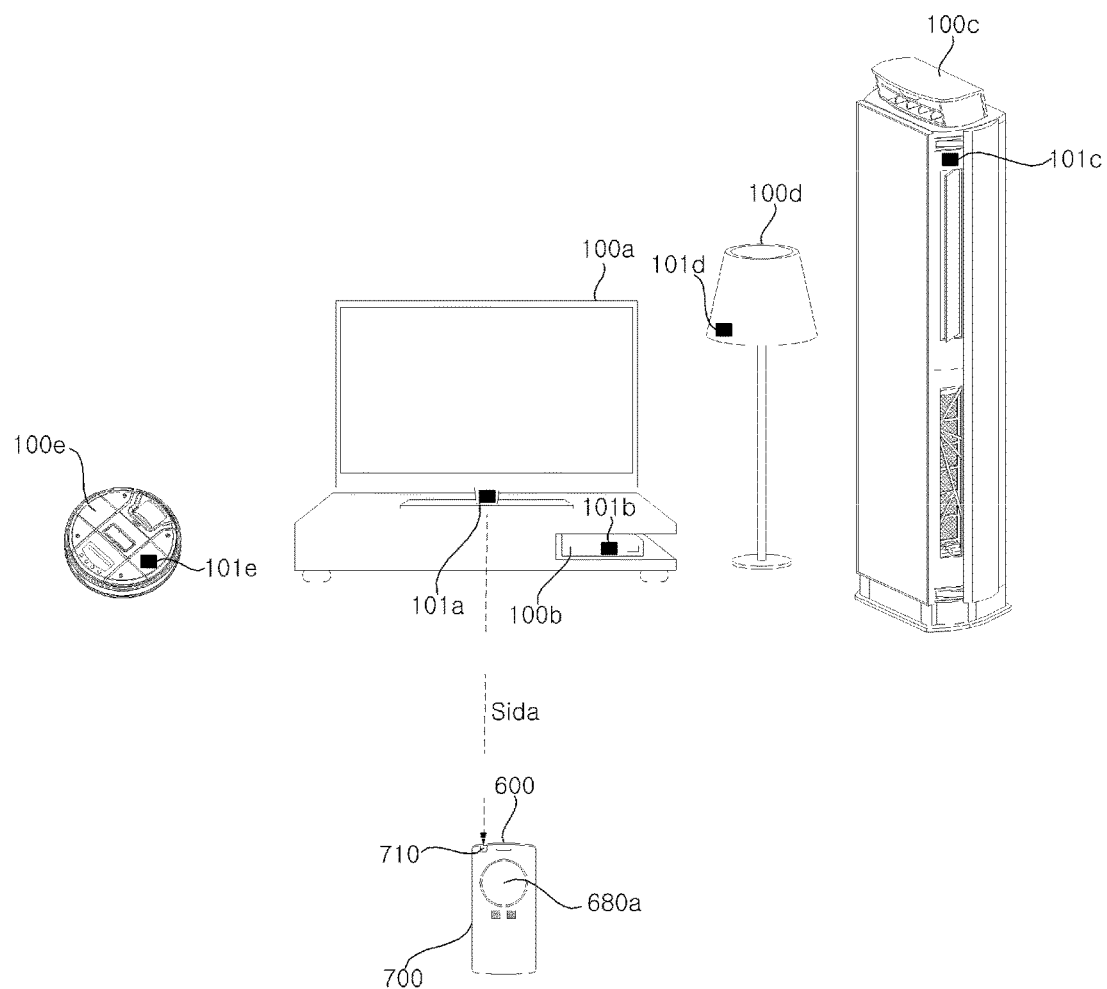
Figure 9I:
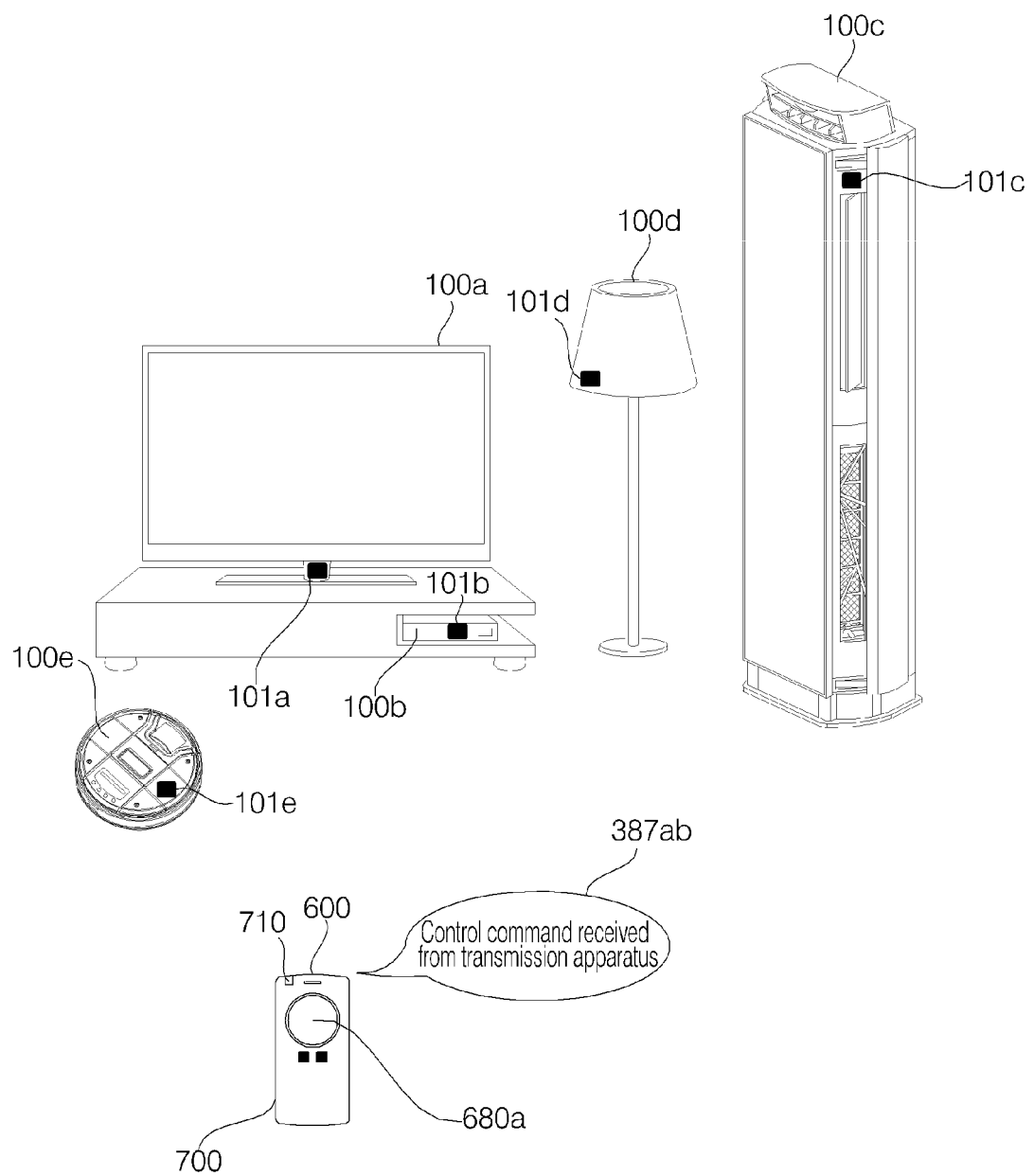
Figure 9J:
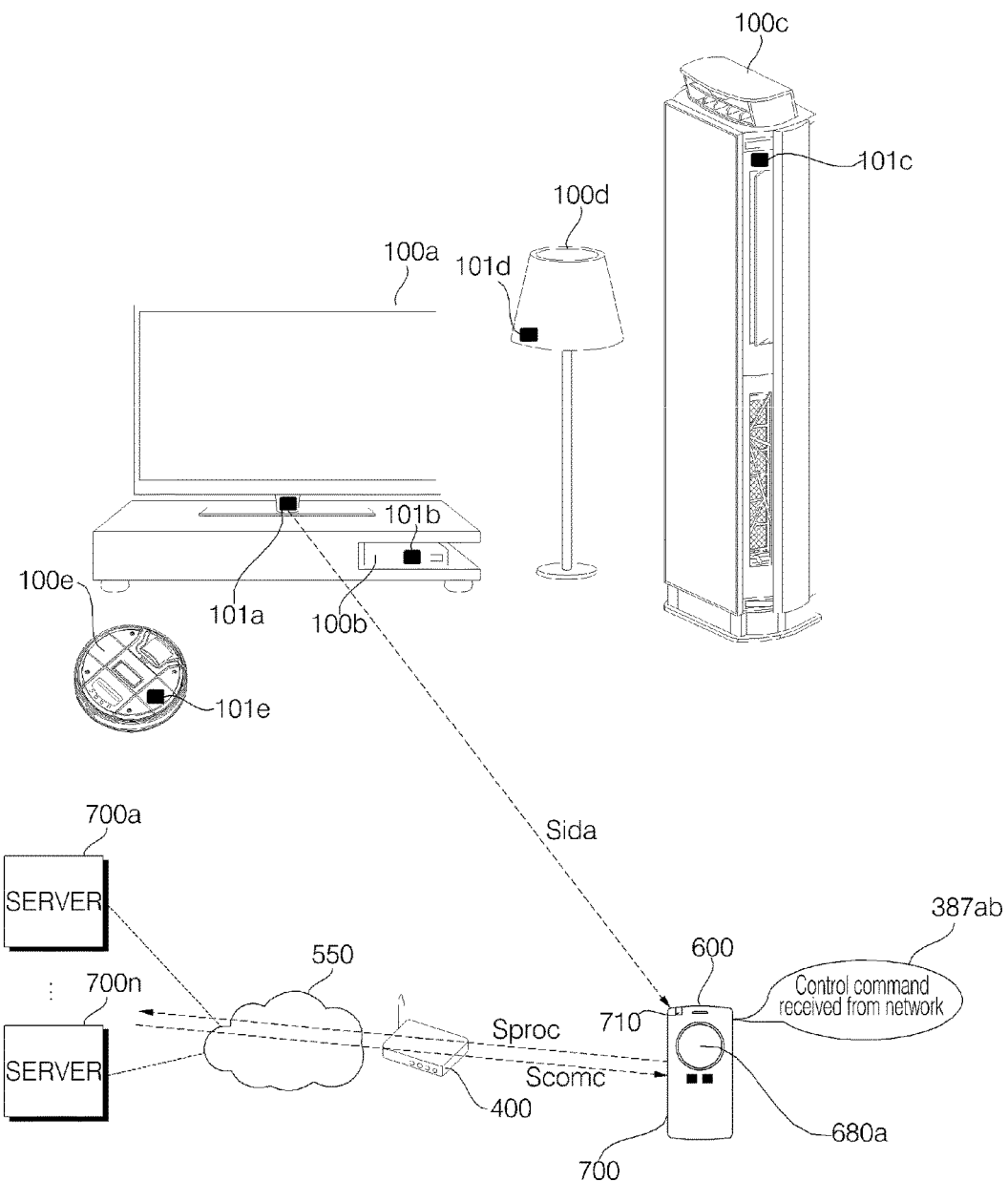
Figure 9K:
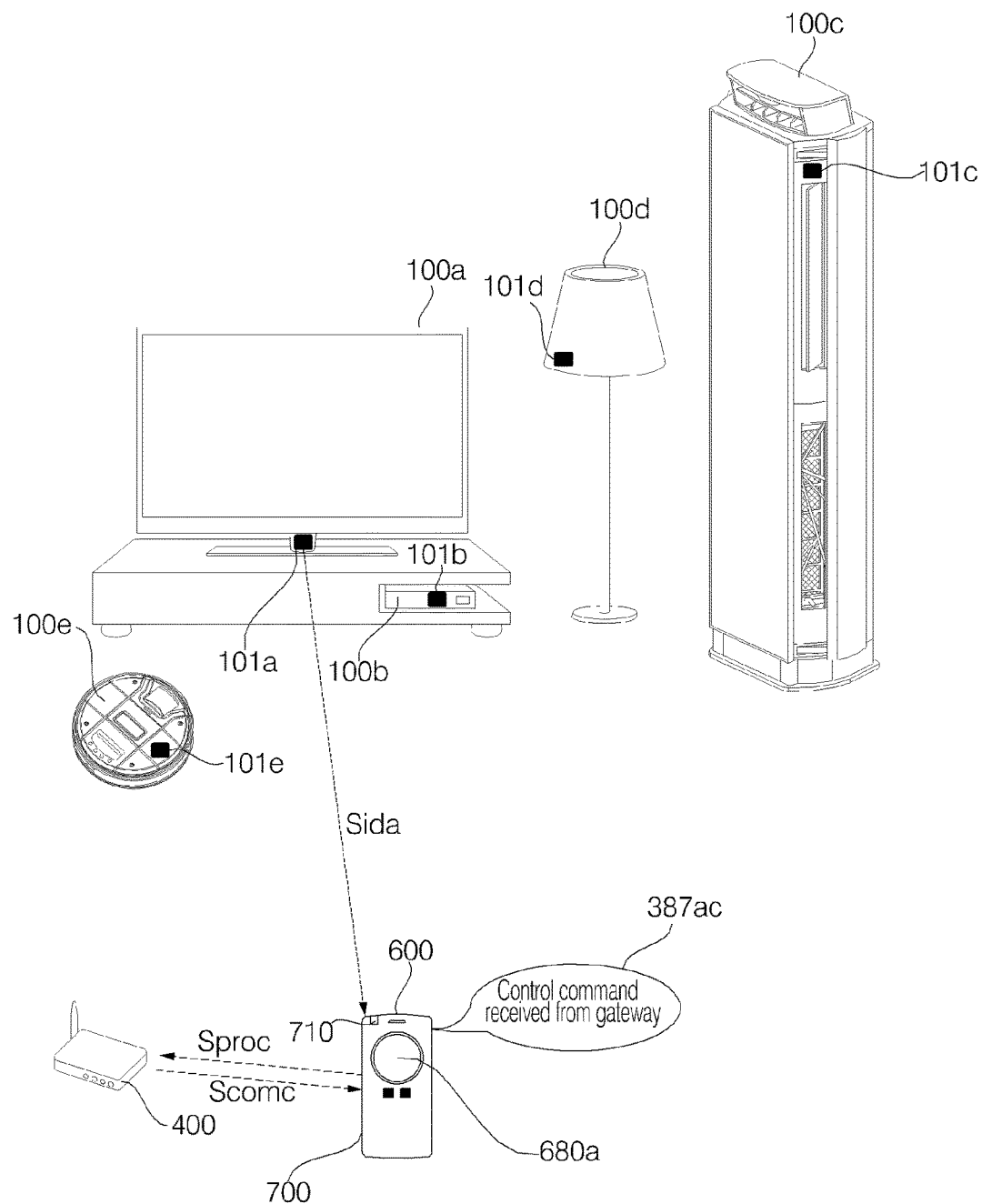
Figure 9L:
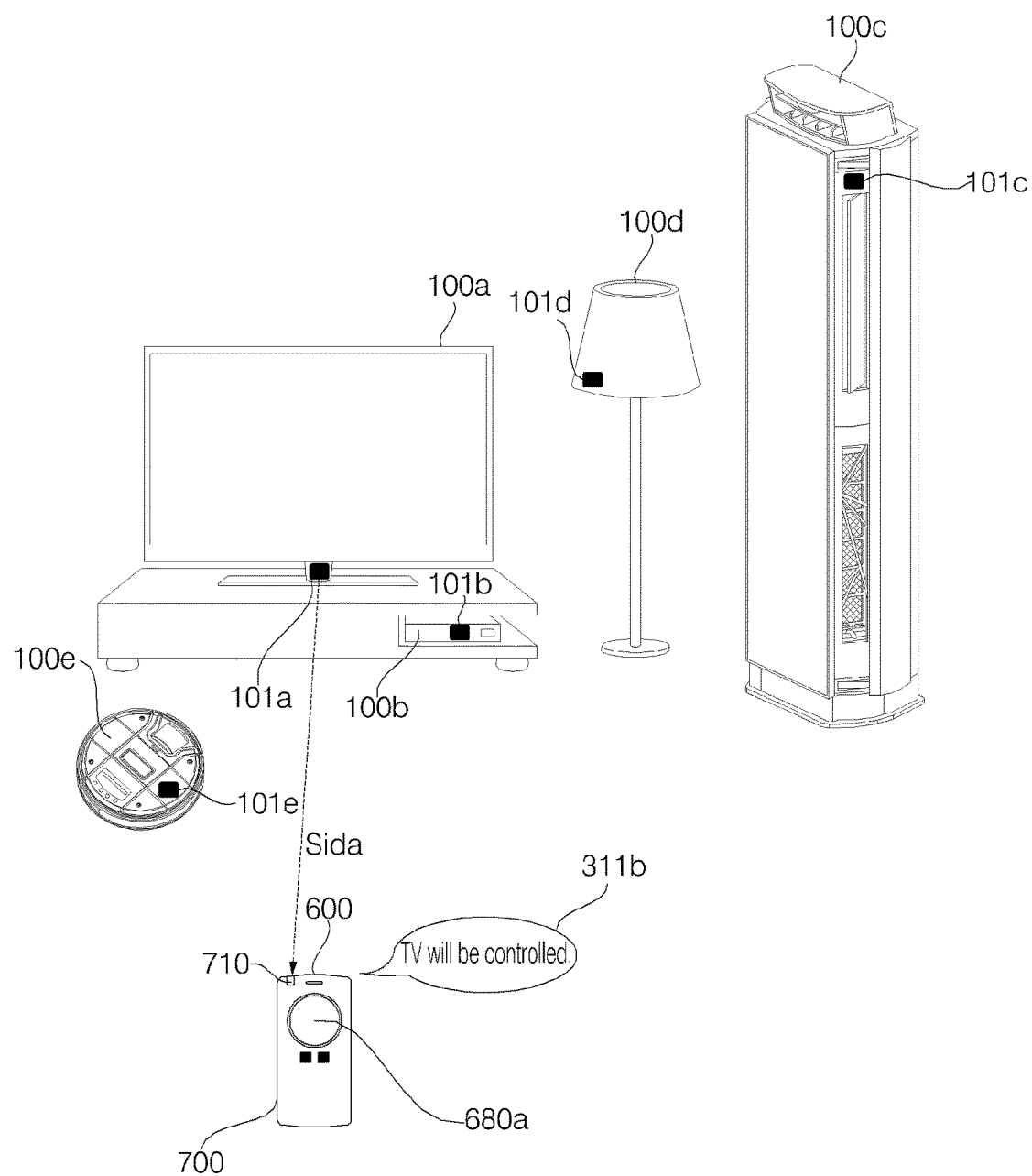

Next, FIG. 9D illustrates that the transmission unit 106a of the transmission apparatus 101a corresponding to the image display apparatus 100a outputs a second infrared ID signal IRa.

The IR camera 423aa of the mobile terminal 600 may capture an infrared image including the transmission apparatus 101a corresponding to the image display apparatus 100a as shown in FIG. 9D(a).

FIG. 9D(b) illustrates that the infrared ID signal IRa has a constant low level (LVL) and a constant high level (LVH), and the duty thereof is variable. That is, the figure illustrates the second infrared ID signal IRa having the duty of a second pattern which is based on time.

The controller 670 may detect the second infrared ID signal IRa having the duty of the second pattern as shown in the figure based on a plurality of infrared images captured during predetermined frame period.

The controller 670 may compare the pattern data pre-stored in the memory 660 with the second pattern of the detected second infrared ID signal IRa and identify the intended device as the image display apparatus 100a.

Figure 10:
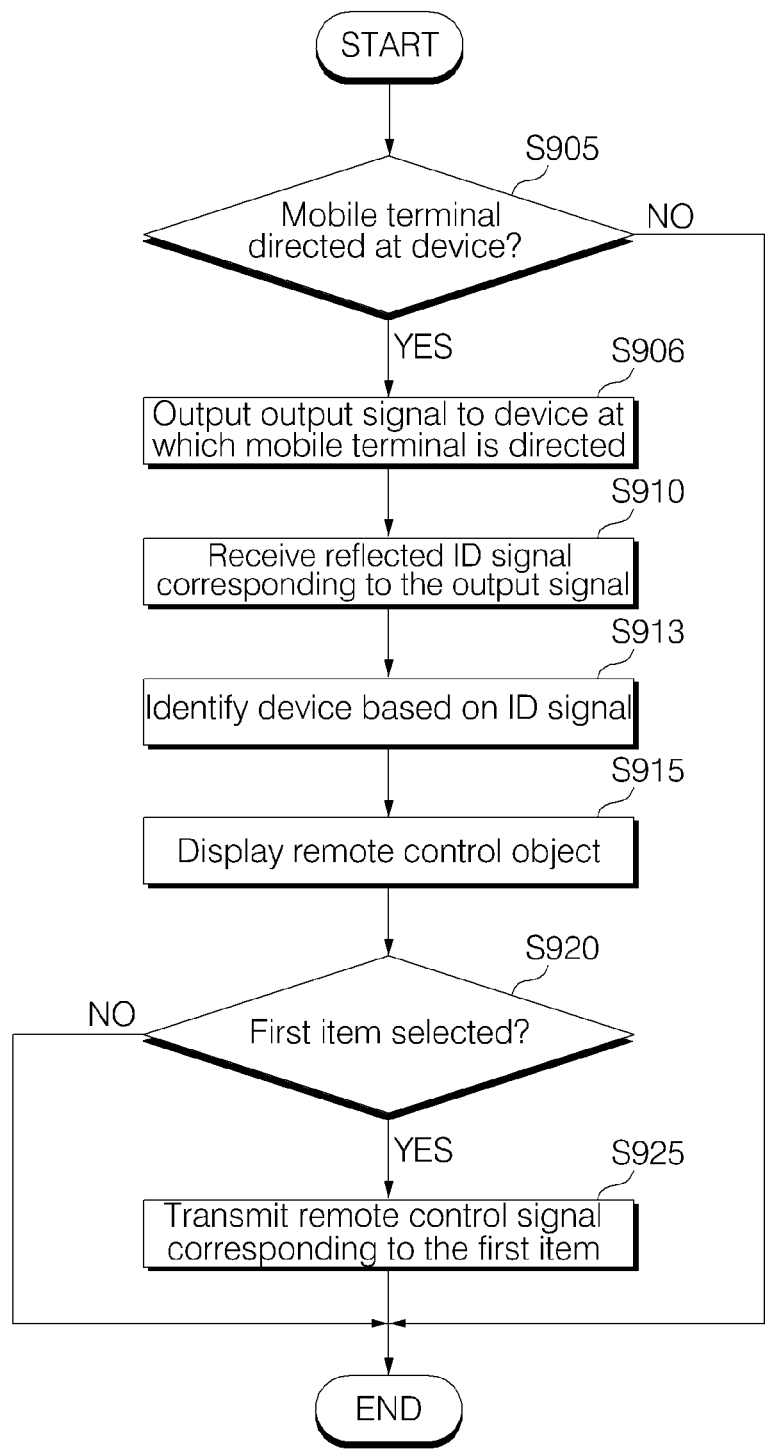
FIG. 10 is a flowchart illustrating an exemplary method of operating a mobile terminal according to another embodiment of the present invention.
Figure 11A:
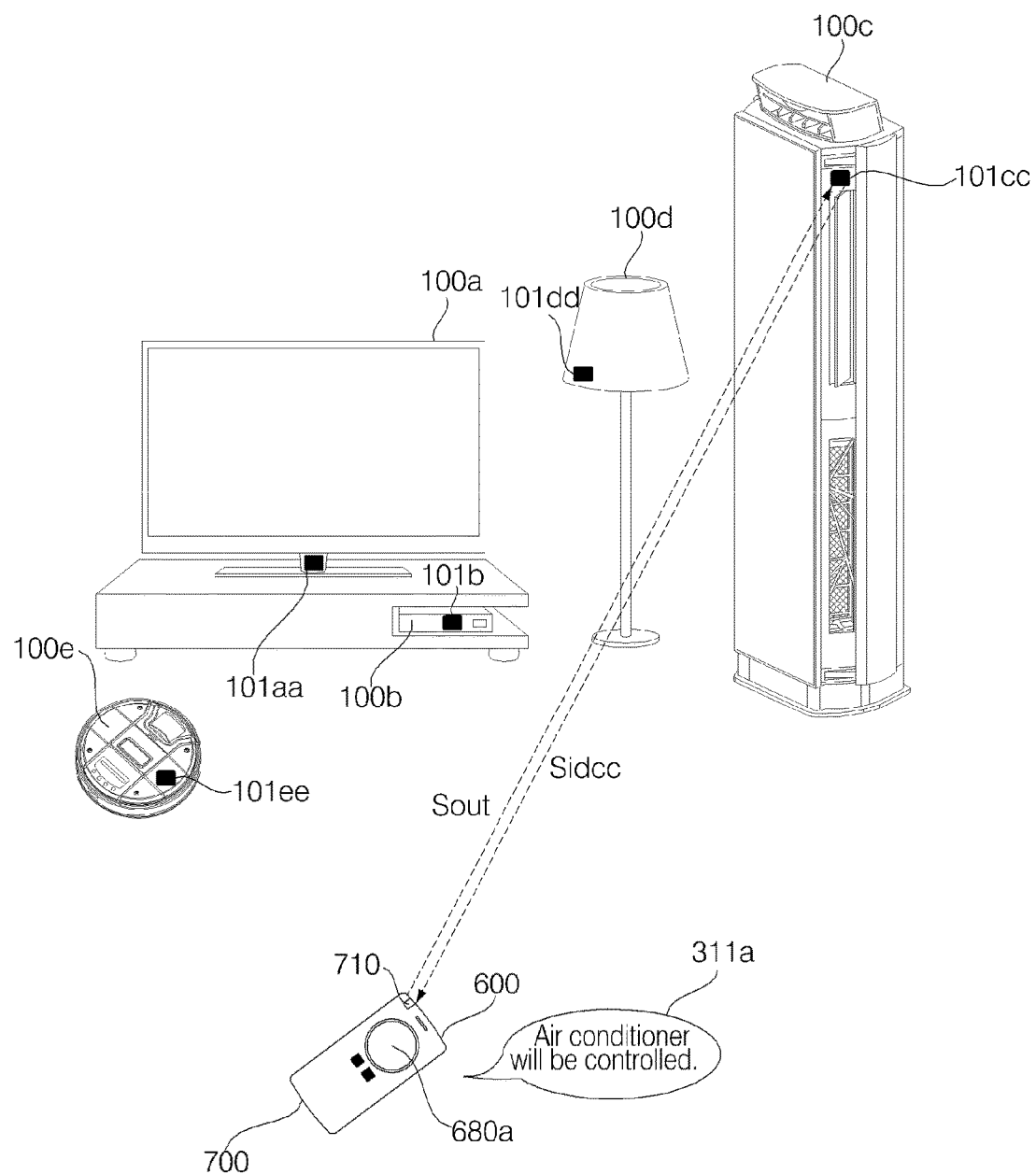
FIGS. 11A to 11P are views illustrating the method of operating the mobile terminal of FIG. 10.

FIG. 10 is a flowchart illustrating an exemplary method of operating a mobile terminal according to another embodiment of the present invention, and FIGS. 11A to 11P are views illustrating the method of operating the mobile terminal of FIG. 10.

The operation method of FIG. 10 is similar to that of FIG. 8 except step S906 of outputting an output signal and step S910 of receiving a reflected ID signal corresponding to the output signal. Steps S905 and S913 to S925 are the same as steps S805, S811, and S813 to S825.

Referring to FIG. 11A, the transmission apparatuses 101aa, 101bb, 101cc, 101dd, 101ee, 101ff, 101gg, and 101hh, which are passive transmission apparatus, may include a reflective member for reflecting an output signal from the outside without a separate power source.

Each device may include a different reflection pattern member for device identification at the time of reflection.

The mobile terminal 600 may output, through the transmission unit 421, the output signal Sout toward the device at which the mobile terminal is directed.

As shown in FIG. 11A, when the mobile terminal 600 is directed at the air conditioner 100c, the output signal Sout output from the mobile terminal 600 may be input to the transmission apparatus 101cc corresponding to the air conditioner 100c and the transmission apparatus 101cc may output a reflected signal, that is, an ID signal Sidcc toward the mobile terminal 600, by reflection, total reflection, or the like using a specific pattern formed thereon.

Thus, the mobile terminal 600 may receive at least one ID signal including the ID signal Sidcc through the reception unit 423 and perform signal processing on the detected ID signal Sidcc, and then may recognize or identify that the air conditioner 100c is currently remotely controllable.

FIG. 11B illustrates a transmission apparatus 101cc of the air conditioner 100c, which has a space-based first infrared-reflecting pattern.

In particular, FIG. 11B(a) illustrates a case where the transmission unit 421 of the mobile terminal 600 outputs an infrared output signal Sout to the transmission apparatus 101cc of the air conditioner 100c at which the mobile terminal is directed, and a reflected infrared signal Sidcc is received by the infrared camera 423aa by a first infrared reflection pattern formed on the transmission apparatus 101cc.

Thus, the infrared camera 423aa may capture at least one infrared image 1011a including the first infrared reflection pattern 1012a as shown in FIG. 11B(b).

The controller 670 may compare the first infrared reflection pattern 1012a in the captured infrared image 1011a with infrared pattern data pre-stored in the memory 660 or the like, and may identify the device at which the mobile terminal is directed as the air conditioner 100c.

While the infrared pattern is illustrated in the figure as a 3×3 pattern, various modifications are possible.

Figure 11C:
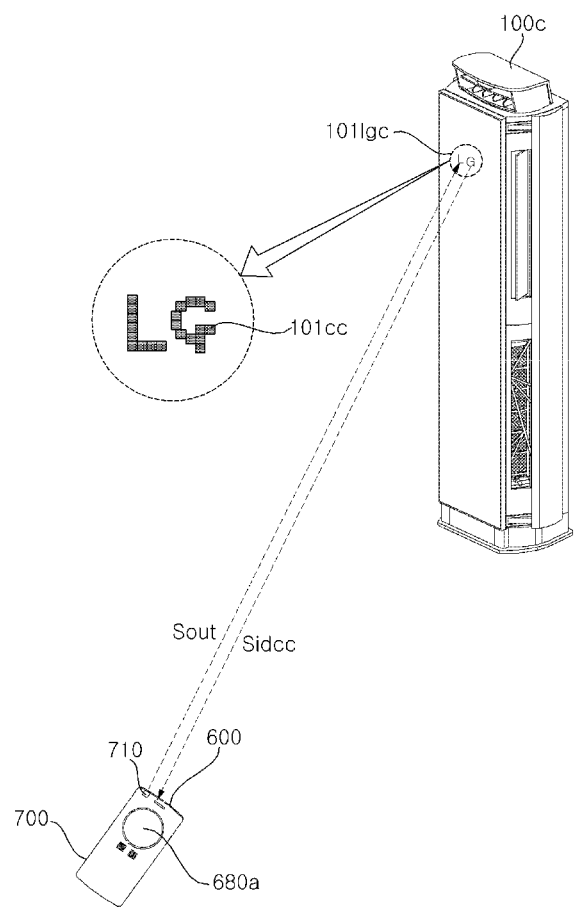

FIG. 11C illustrates a case where a transmission apparatus 101cc having a space-based first infrared reflection pattern is provided on a logo 101gc formed on the front surface of the air conditioner 100c.

When the transmission apparatus 101cc having the space-based first infrared reflection pattern is provided on the logo 101lgc formed on the front surface of the air conditioner 100c as shown in the figure, it is not necessary to provide an infrared reflection pattern in a separate space, and therefore the degree of freedom of design may be improved.

FIG. 11D illustrates a case where control command information is received from the transmission apparatus 101c corresponding to the air conditioner 100c.

Next, FIG. 11E illustrates a case where control command information is received from a server 700. Particularly, in the figure, a control command information reception complete message 387cb is output in the form of sound.

In the figure, a control command information request Sproc directed to the server 700 is output from the mobile terminal 600 and the control command information Scomc from the server 700 is received by the mobile terminal 600.

Next, FIG. 11F illustrates a case where control command information is received from the gateway 400. Particularly, in the figure, a control command information reception complete message 387cc is output in the form of sound.

In the figure, a control command information request Sproc directed to the gateway 400 is output from the mobile terminal 600, and the mobile terminal 600 receives control command information Scomc from the gateway 400.

Figure 11G:
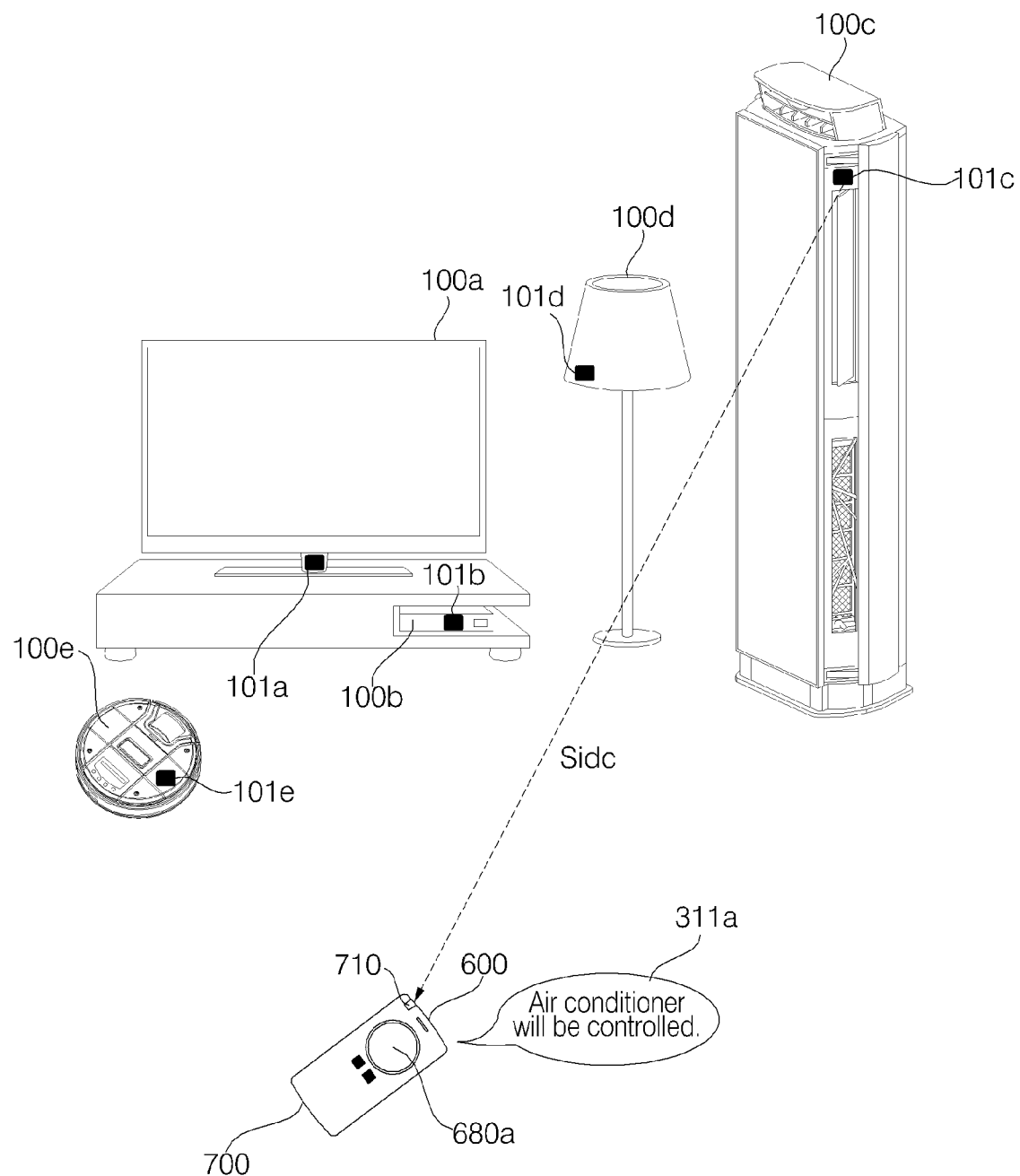

A remote control object is displayed through the transmission apparatus 101c, the server 700 or the gateway 400 based on the received control command information. Alternatively, when setting of the received control command is completed in a predetermined item in the remote control object, the mobile terminal 600 may output a device control enable message 311a, as shown in FIG. 11G.

Figure 11H:
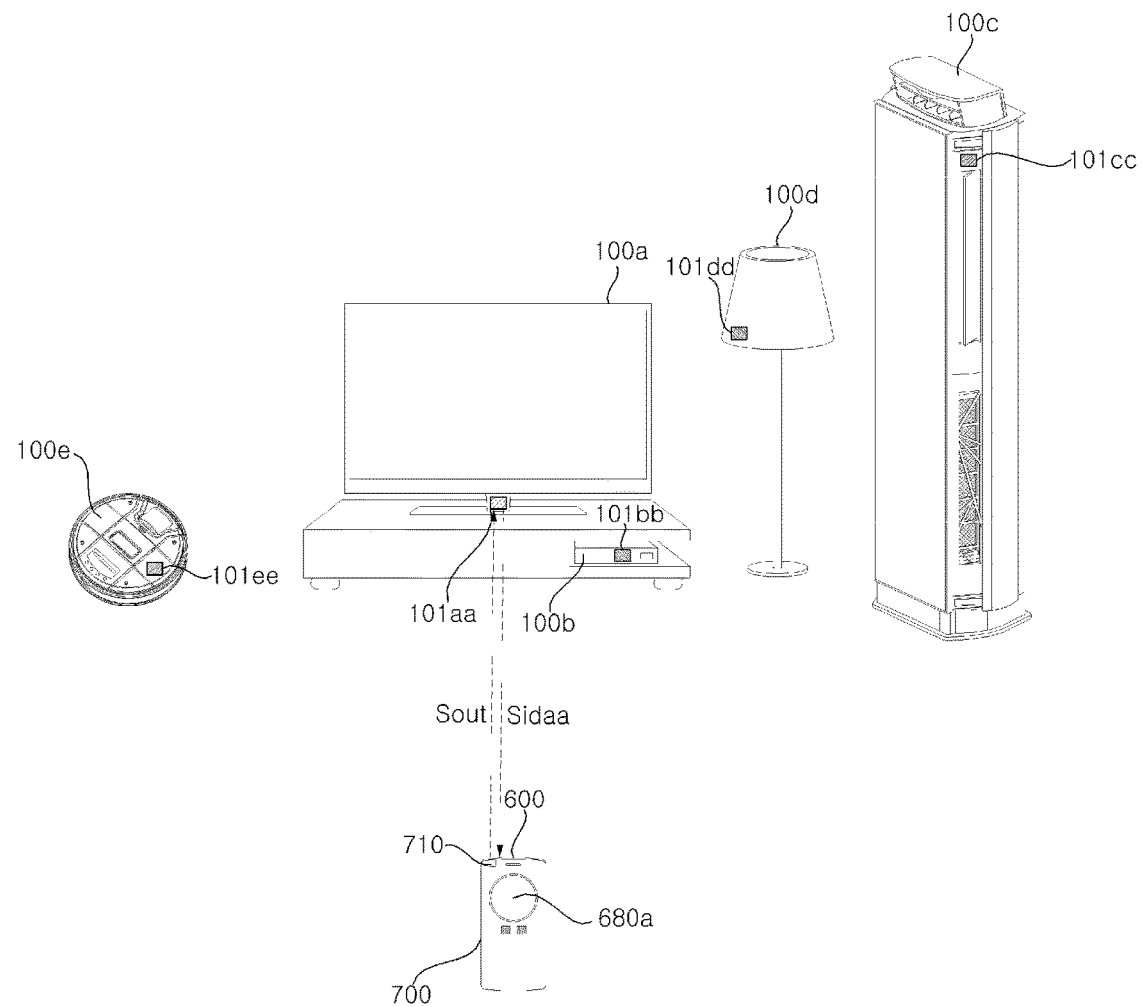

FIG. 11H illustrates a case where the mobile terminal 600 is directed at the image display apparatus 100a, an output signal Sout output from the mobile terminal 600 is transmitted to the transmission apparatus 101*aa* corresponding to the image display apparatus 100*a*, and the transmission apparatus 101*aa* outputs a reflected signal, that is, an ID signal Sidaa toward the mobile terminal 600, by reflection, total reflection, or the like using a specific pattern formed thereon.

Thus, the mobile terminal 600 may receive at least one ID signal including the ID signal Sidaa through the reception unit 423, detect the ID signal Sidaa among the ID signals, and perform signal processing on the detected ID signal Sidaa, and then may recognize or identify that the image display apparatus 100*a* is currently remotely controllable.

FIG. 11I illustrates a transmission apparatus 101*aa* of the image display apparatus 100*a*, which has a space-based second infrared reflection pattern.

Particularly, FIG. 11E(a) illustrates a case where the transmission unit 421 of the mobile terminal 600 outputs an infrared output signal Sout to the transmission apparatus 101*aa* of the image display apparatus 100*a* at which the mobile terminal is directed, and a reflected infrared signal Sidaa is received by the infrared camera 423*aa* by a second infrared reflection pattern formed on the transmission apparatus 101*aa* of the infrared camera 100*a*.

Thus, the infrared camera 423*aa* may capture at least one infrared image 1011*b* including the second infrared reflection pattern 1012*b* as shown in FIG. 11E(b).

The controller 670 may compare the second infrared reflection pattern 1012*b* in the captured infrared image 1011*b* with infrared pattern data pre-stored in the memory 660 or the like, and may identify the device at which the mobile terminal is directed as the image display apparatus 100*a*.

Figure 11J:
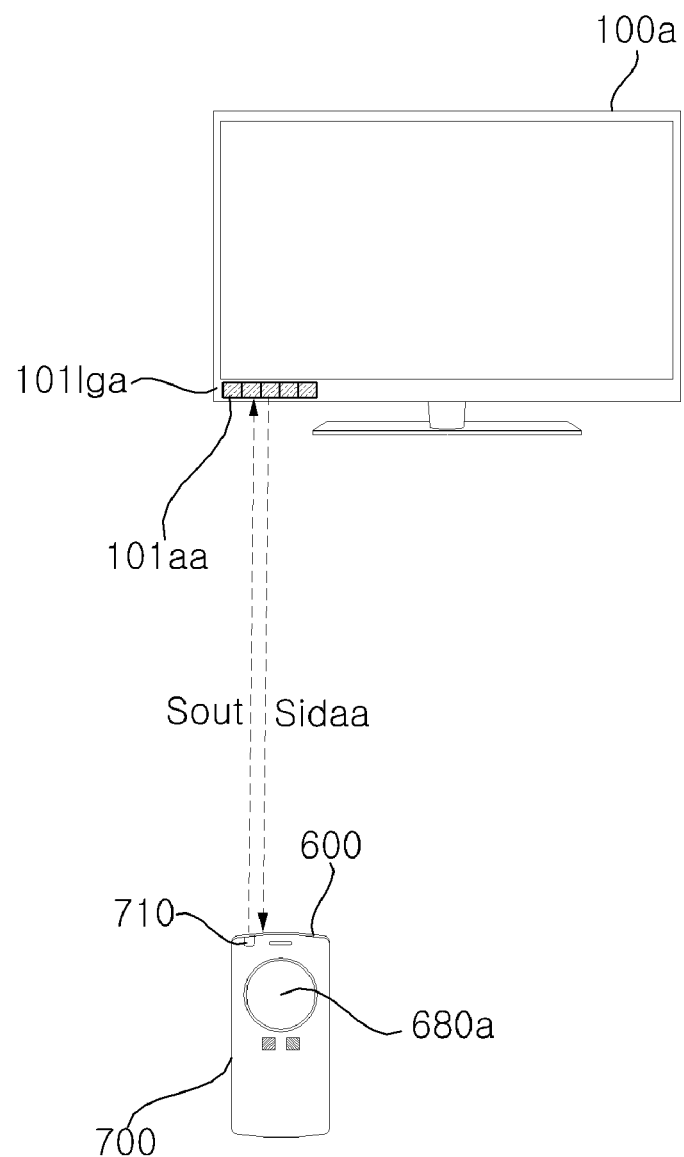

FIG. 11J illustrates a case where the transmission apparatus 101*aa* having the space-based second infrared reflection pattern is provided in a bezel area 101*lgc* of the image display apparatus 100*a*.

As shown in the figure, when the transmission apparatus 101*aa* having the space-based second infrared reflection pattern is provided in the bezel area 101*lgc* of the image display apparatus 100*a*, it is not necessary to provide an infrared reflection pattern in a separate space, and therefore the degree of freedom of design may be improved.

Figure 11K:
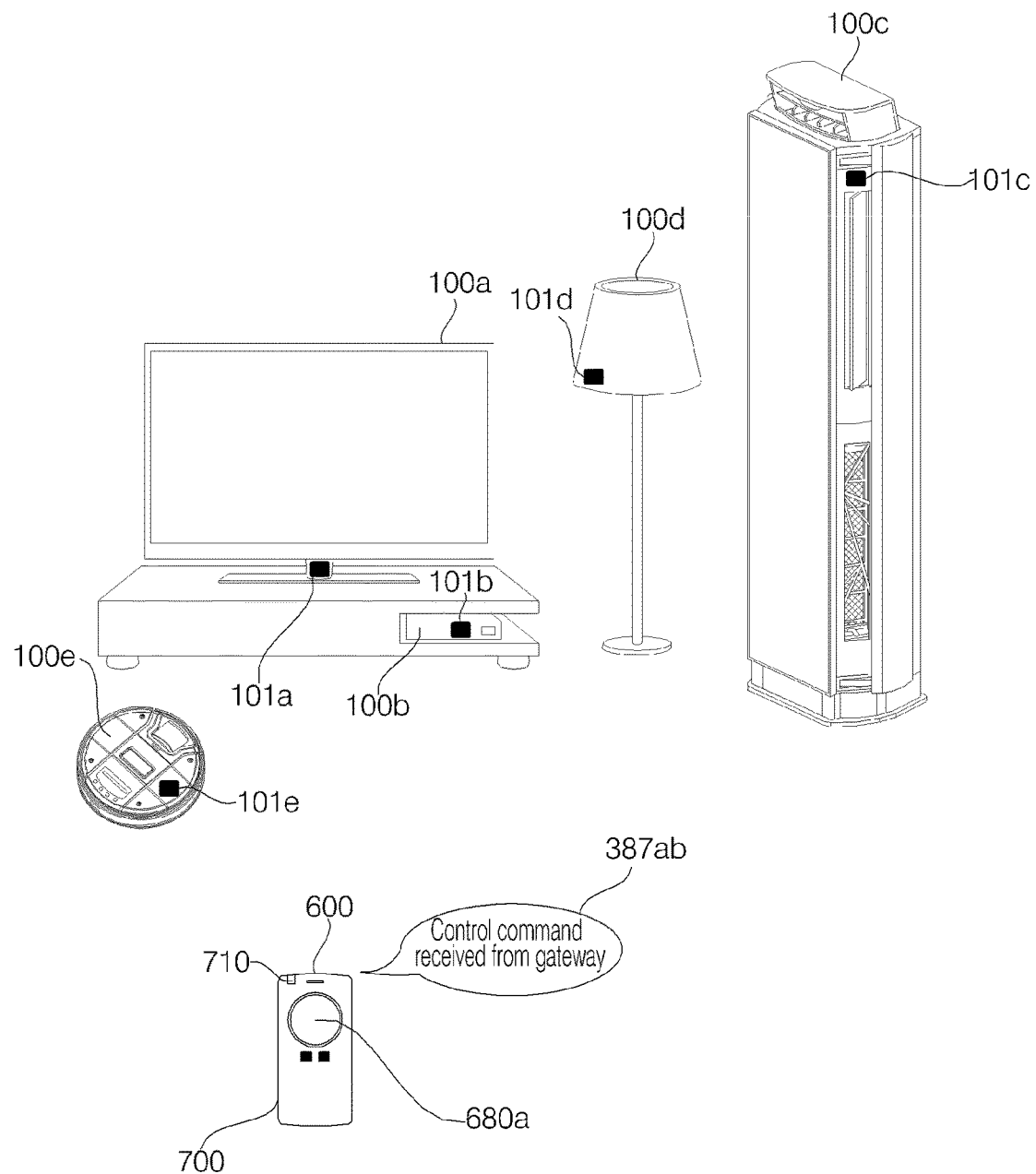

FIG. 11K illustrates a case where control command information is received from the transmission apparatus 101*a* corresponding to the image display apparatus 100*a*.

Figure 11L:
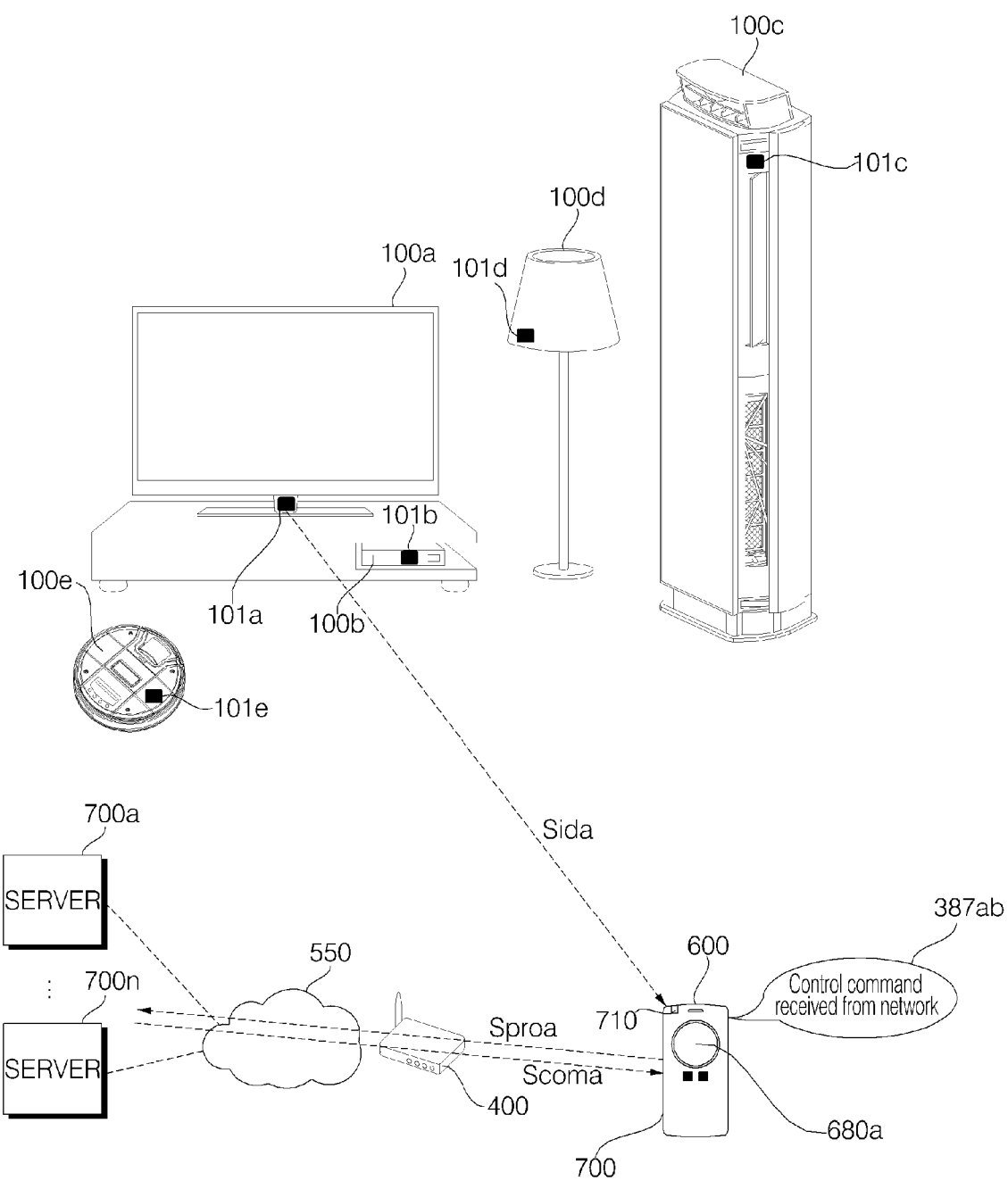

FIG. 11L illustrates a case where control command information is received from the server 700.

In the figure, a control command information request Sproa directed to the server 700 is output from the mobile terminal 600 and the control command information Scoma from the server 700 is received by the mobile terminal 600.

Figure 11M:
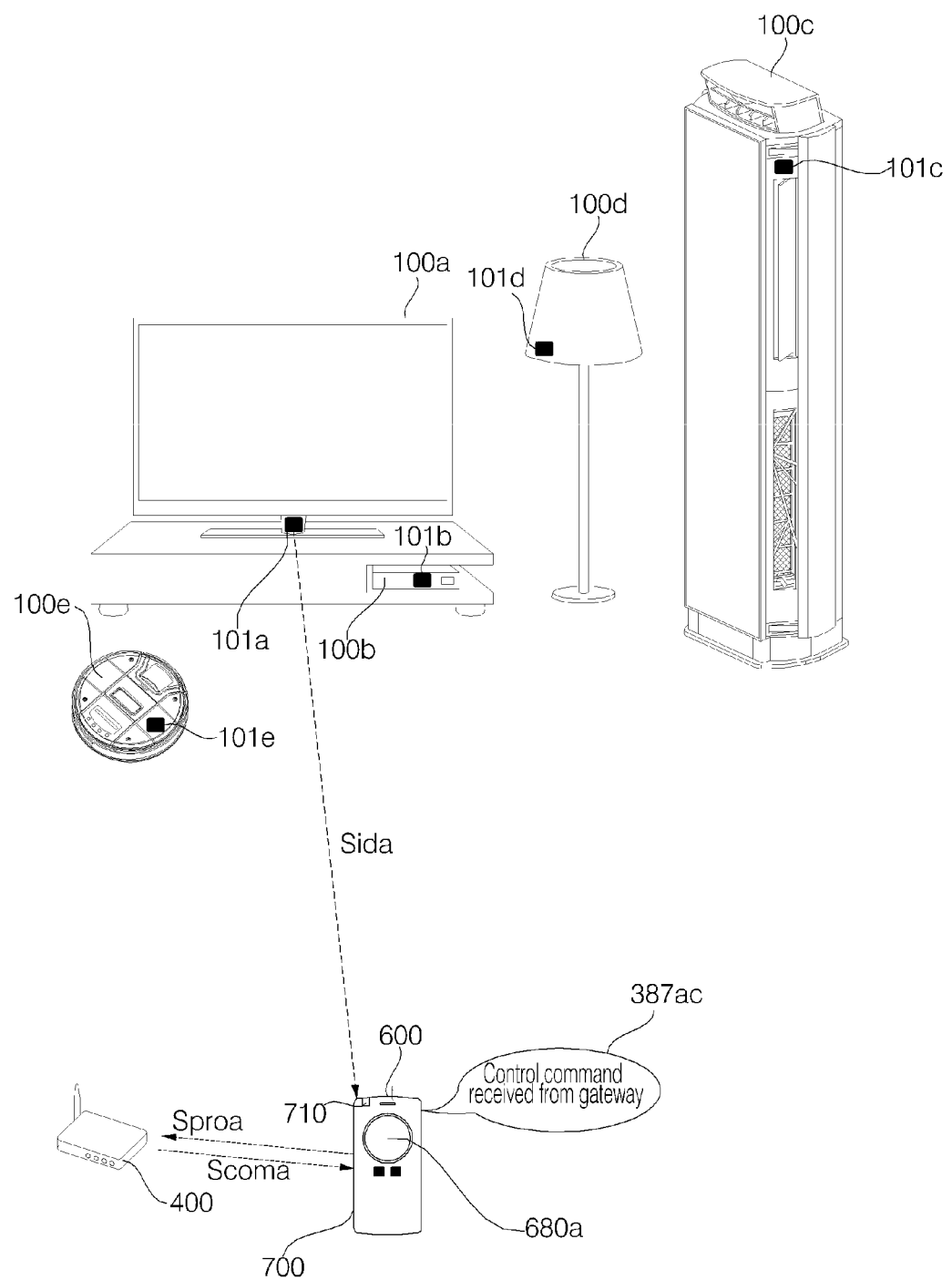

Next, FIG. 11M illustrates a case where control command information is received from the gateway 400. Particularly, in the figure, a control command information reception complete message 387*ac* is output in the form of sound.

In the figure, a control command information request Sproa directed to the gateway 400 is output from the mobile terminal 600, and the mobile terminal 600 receives control command information Scoma from the gateway 400.

Figure 11N:
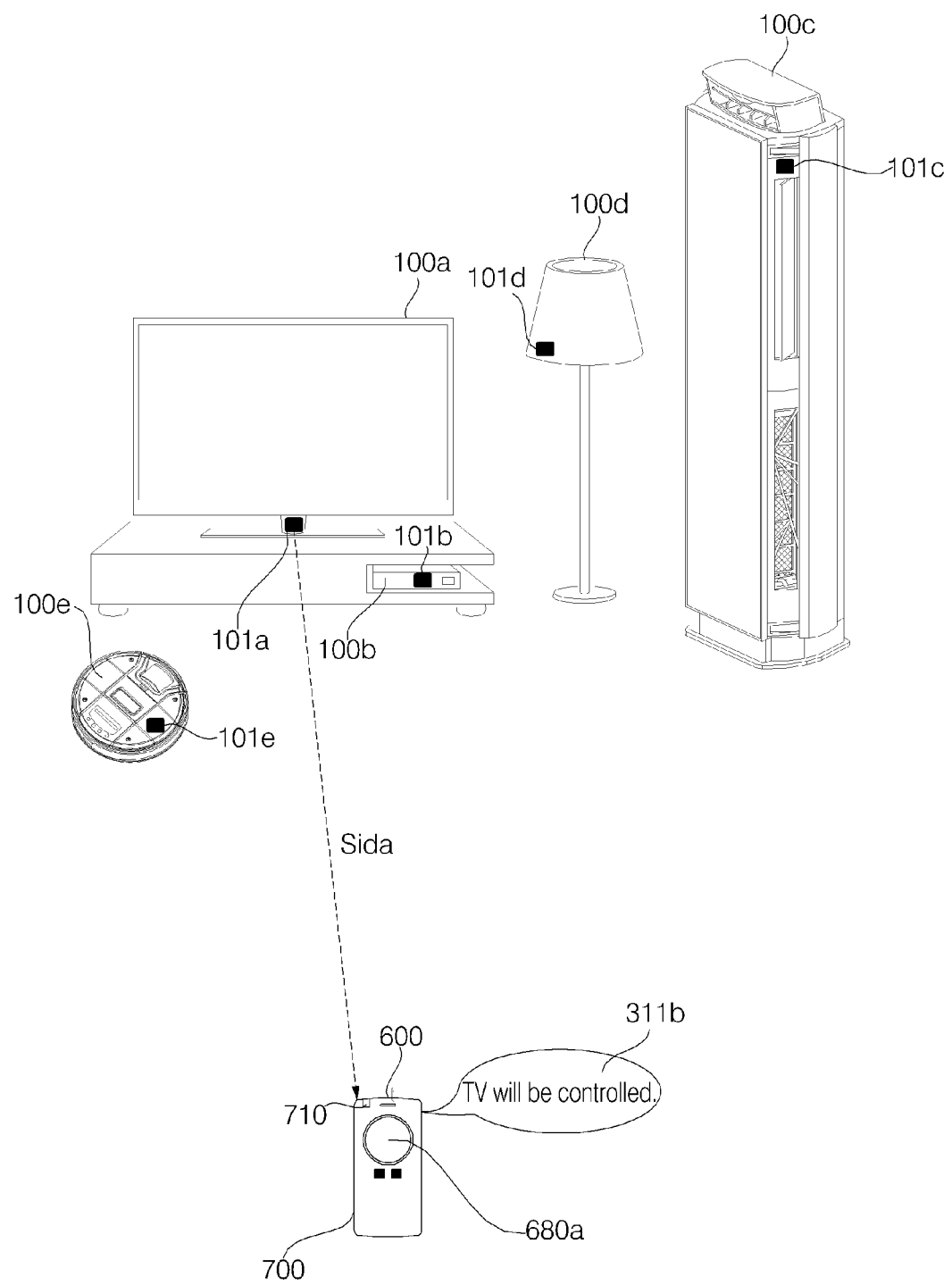

A remote control object is displayed through the transmission apparatus 101*a*, the server 700 or the gateway 400 based on the received control command information. Alternatively, when setting of the received control command is completed in a predetermined item in the remote control object, the mobile terminal 600 may output a device control enable message 311*b*, as shown in FIG. 11N.

Figure 11O:
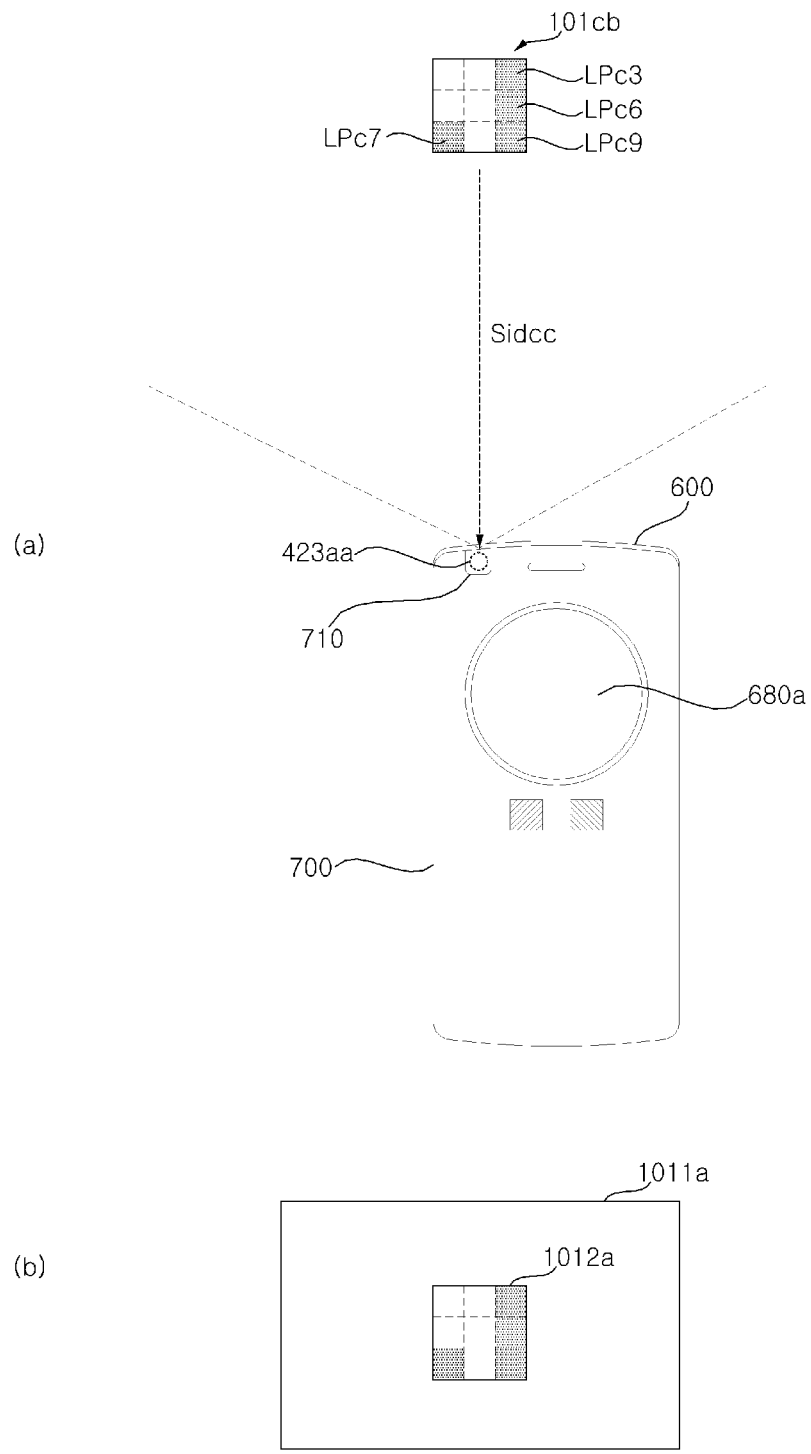

FIG. 11O, which is similar to FIG. 11B, illustrates that the transmission unit 421 of the mobile terminal 600 does not output an infrared output signal Sout and only some (LPc3, LPc6, LPc7, LPc9) of nine infrared light emission units of the transmission apparatus 101*cb* in the air conditioner 100*c* emit light.

The infrared image 1011*a* acquired by the infrared camera 423*aa* may be the same as that of FIG. 11B. The controller 670 may compare the acquired infrared image with the infrared pattern data pre-stored in the memory 660, and may identify that the device at which the mobile terminal is directed is the air conditioner 100*c*.

FIG. 11P, which is similar to FIG. 11I, illustrates a case where the infrared output signal Sout is not output from the transmission unit 421 of the mobile terminal 600 and only some (LPa2, LPa3, LPa7) of nine infrared light emission units in the transmission apparatus 101*ab* of the image display apparatus 100*a* emit light.

The infrared image 1011*b* acquired by the infrared camera 423*aa* may be the same as that shown in FIG. 11E, and thus the controller 670 may compare the acquired infrared image with the infrared pattern data pre-stored in the memory 660 or the like, and may identify the device at which the mobile terminal is directed as g the image display apparatus 100*a*.

Figure 12A:
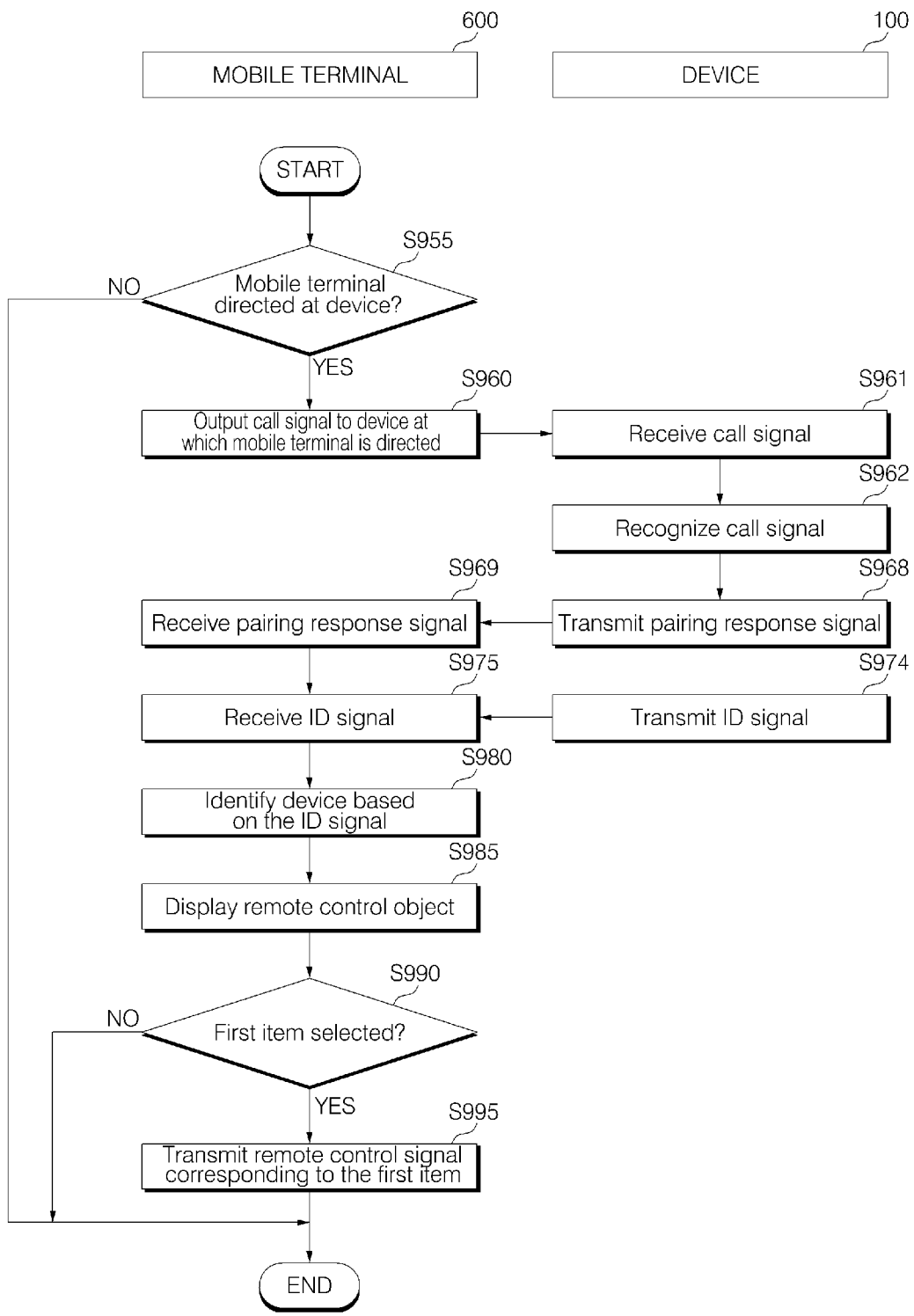
FIGS. 12A to 12C are flowcharts illustrating various exemplary methods of operating a mobile terminal according to another embodiment of the present invention.
Figure 12B:
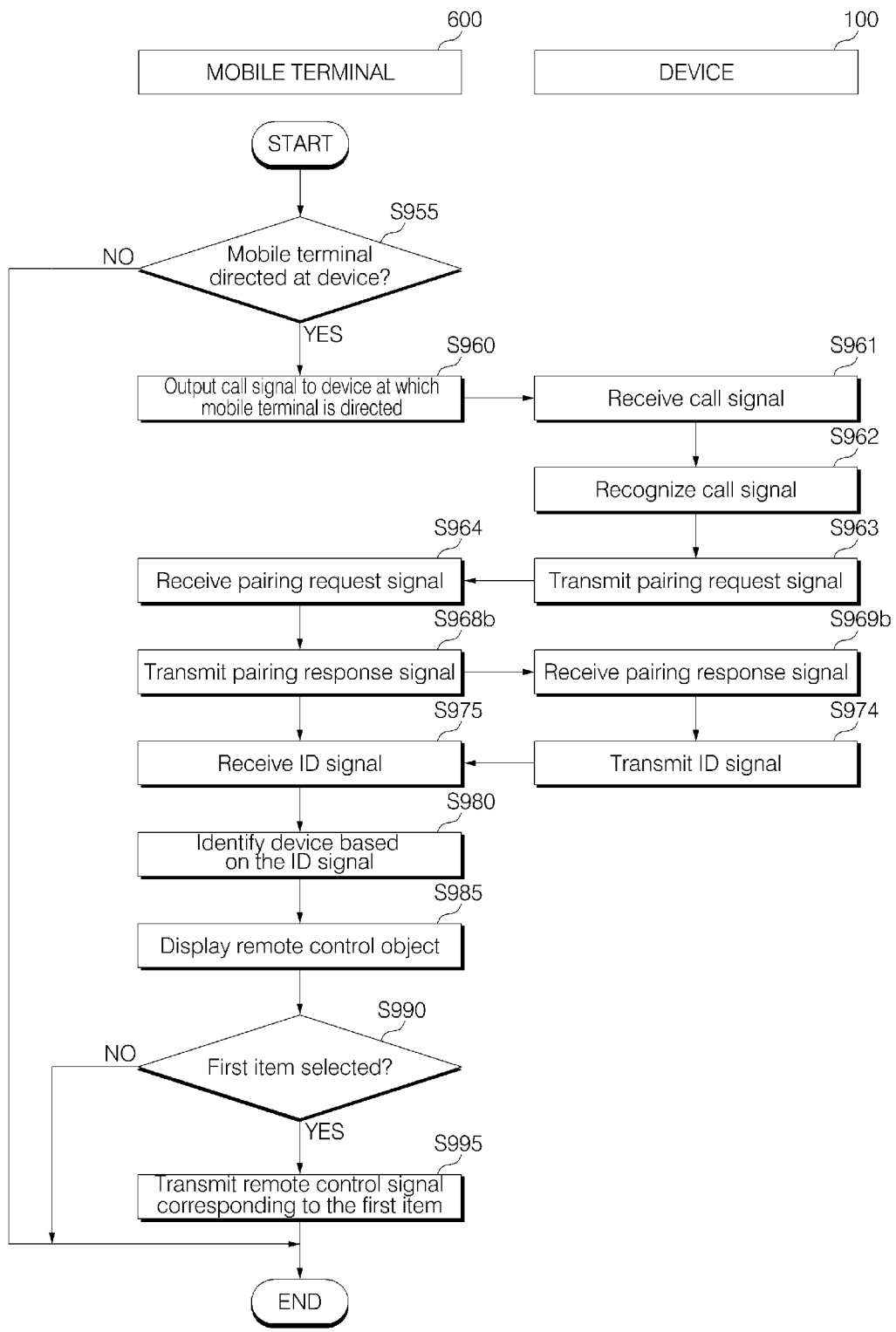
Figure 12C:
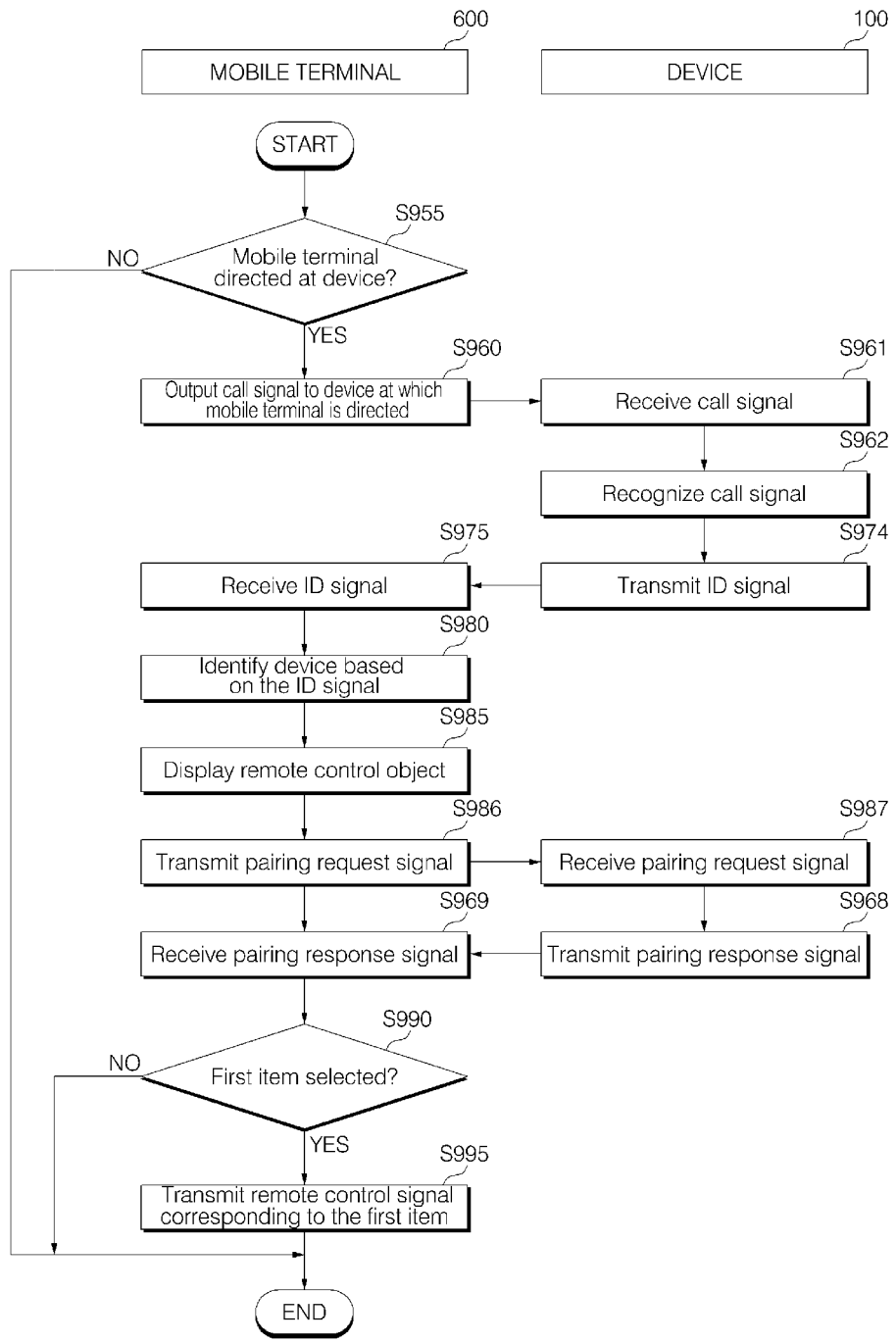
Figure 12C:
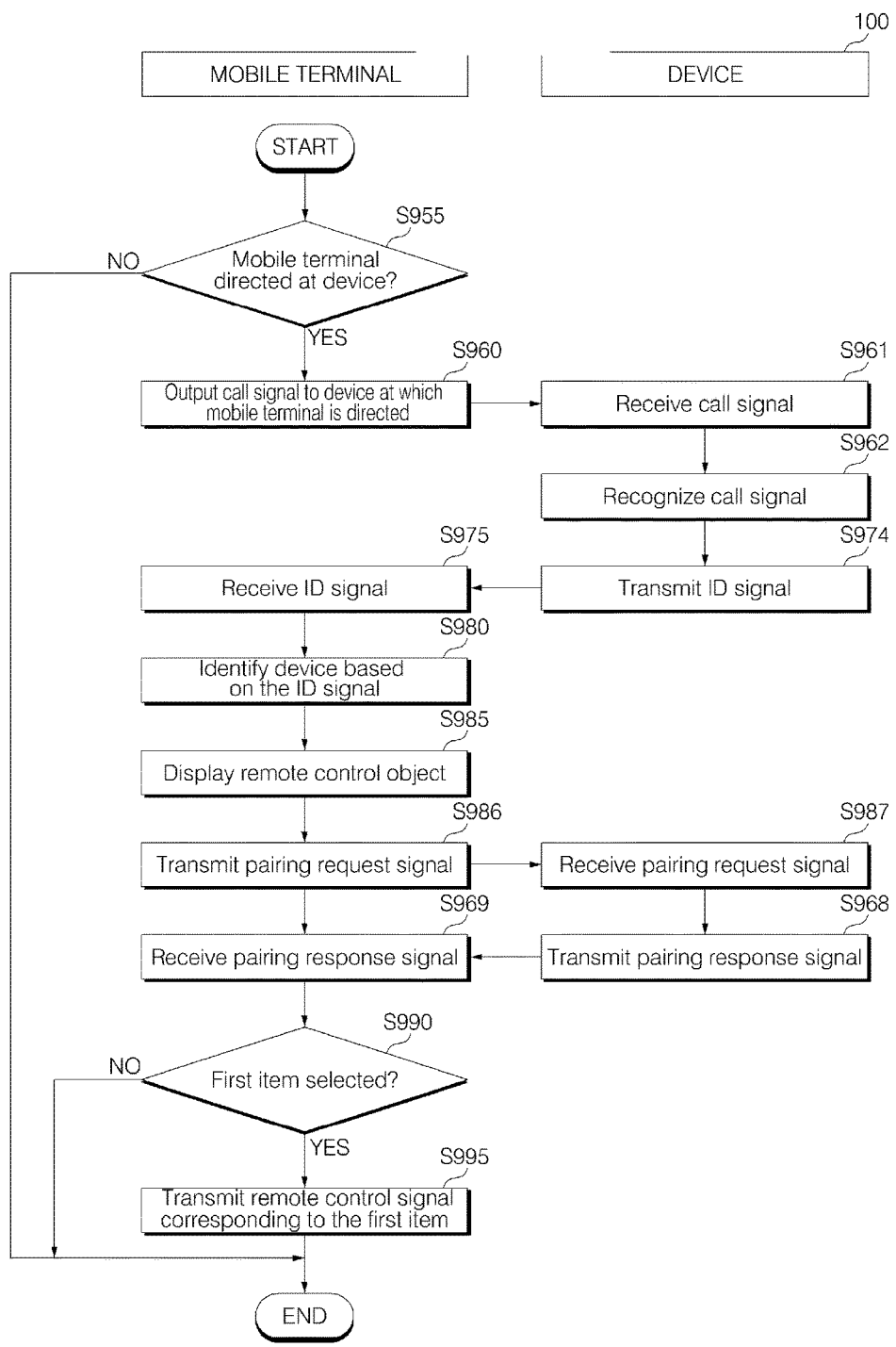

FIGS. 12A to 12C are flowcharts illustrating various exemplary methods of operating a mobile terminal according to another embodiment of the present invention, and FIGS. 13A to 13G are views illustrating the operation methods of FIGS. 12A to 12C.

Referring to FIG. 12A, when the mobile terminal 600 is directed at a device (S955), the transmitter transmission unit 421 of the mobile terminal 600 transmits a paging signal Scall in toward the device (S960).

The paging signal Scall may include a pairing request signal.

The device 100 at which the mobile terminal 600 is directed may receive the paging signal Scall (S961) and recognize the paging signal Scall (S962).

The device 100 may recognize a pairing request signal according to recognition of the paging signal and transmit a pairing response signal corresponding to the pairing request signal (S968).

The mobile terminal 600 may receive the pairing response signal (S969). Thereby, pairing between the mobile terminal 600 and the device 100 may be completed.

The device 100 may transmit an ID signal after completion of the pairing (S974).

Then, the mobile terminal 600 may receive the ID signal (S975).

The processor 170 of the mobile terminal 600 may identify the device based on the ID signal (S980). The method for identifying the device is configured as described above.

Next, the controller 670 of the mobile terminal 600 controls an object for remote control of the device to be displayed (S985).

Next, the controller 670 of the mobile terminal 600 determines whether a first item in the remote control object is selected (S990), and if so, performs a control operation to transmit a remote control signal corresponding to the first item (S995). Thus, the device may be easily remotely controlled.

Next, FIG. 12B is similar to FIG. 12A, but except for steps from a call signal output step S960 and an identification step (S980).

Referring to FIG. 12B, the transmission unit 421 of the mobile terminal 600 transmits a paging signal Scall toward the device at which the mobile terminal is directed (S960).

The device 100 at which the mobile terminal 600 is directed may receive the paging signal Scall (S961) and recognize the paging signal Scall (S962).

The device 100 may transmit a pairing request signal according to recognition of the paging signal (S963).

The reception unit 423 of the mobile terminal 600 may receive the pairing request signal (S964).

Then, the transmission unit 421 of the mobile terminal 600 may transmit a pairing response signal corresponding to the pairing request signal (S968*b*).

The device 100 may receive the pairing response signal (S969*b*). Thereby, pairing between the mobile terminal 600 and the device 100 may be completed.

The device 100 may transmit an ID signal after completion of the pairing (S974). Then, the reception unit 423 of the mobile terminal 600 may receive the ID signal (S975).

Next, FIG. 12C is similar to FIG. 12A except for the steps from the call signal output step (S960) and the matching step (S985).

Referring to FIG. 12C, the transmission unit 421 of the mobile terminal 600 transmits a paging signal Scall toward the device at which the mobile terminal is directed (S960).

The device 100 at which the mobile terminal 600 is directed may receive the paging signal Scall (S961) and recognize the paging signal Scall (S962).

The device 100 may transmit an ID signal according to recognition of the paging signal (S974). Then, the reception unit 423 of the mobile terminal 600 may receive the ID signal (S975).

Next, the controller 670 of the mobile terminal 600 identifies the device based on the received ID signal (S980). Then, the controller performs a control operation to display an object for remote control of the device (S985).

Next, the transmission unit 421 of the mobile terminal 600 may transmit a pairing request signal (S986). The device 100 may receive the pairing request signal (S987).

Next, the device 100 may transmit a pairing response signal corresponding to the pairing request signal (S988).

The reception unit 423 of the mobile terminal 600 may receive the pairing response signal (S989). Thereby, the pairing between the mobile terminal 600 and the device 100 may be completed.

FIG. 13A is a view illustrating an exemplary method used for the mobile terminal 600 to identify the air conditioner 101*c*, in relation to FIG. 12A.

When the mobile terminal 600 transmits a call signal Scall to the air conditioner 101*c*, the air conditioner 101*c* receives and recognizes the call signal Scall. Then, the air conditioner 101*c* recognizes a pairing request signal Sprq in the call signal Scall.

The air conditioner 101*c* transmits a pairing response signal Sprsc according to recognition of the pairing request signal Sprq. The mobile terminal 600 receives the pairing response signal Sprsc. Thereby, the pairing is completed.

The air conditioner 101*c* outputs an ID signal Sidc after completion of the pairing. The mobile terminal 600 receives the ID signal Sidc and identifies the air conditioner 101*c* based on the ID signal Sidc.

Figure 13B:
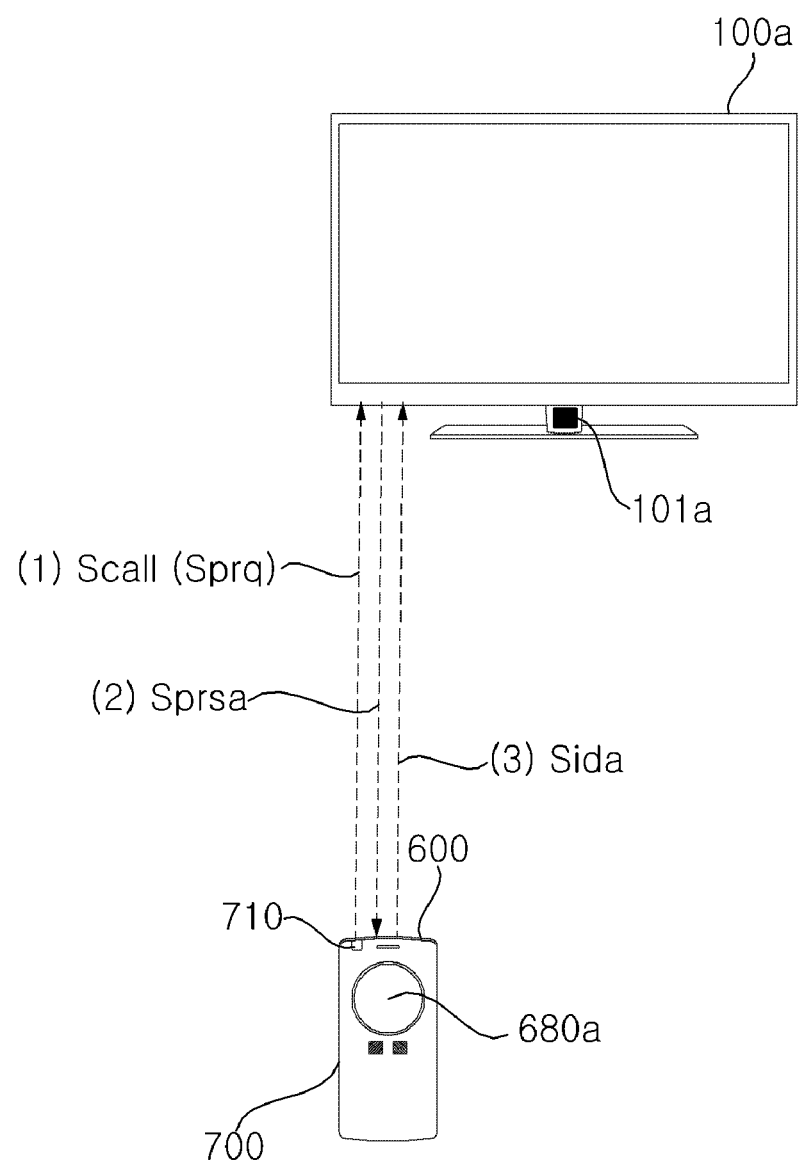

FIG. 13B is a view illustrating another exemplary method used for the mobile terminal 600 to identify the image display apparatus 100*a*, in relation to FIG. 12A.

When the mobile terminal 600 transmits a paging signal Scall to the image display apparatus 100*a*, the image display apparatus 100*a* receives and recognizes the paging signal Scall. Then, the image display apparatus 100*a* recognizes a pairing request signal Sprq in the paging signal Scall.

The image display apparatus 100*a* transmits a pairing response signal Sprsa according to recognition of the pairing request signal Sprq. The mobile terminal 600 receives the pairing response signal Sprsa. Thereby, the pairing is completed.

The mobile terminal 600 may receive an ID signal in one of a radio frequency (RF) signal, a Wi-Fi signal, a ZigBee signal, a Bluetooth signal, a laser signal, and an Ultra Wideband (UWB) signal from the image display apparatus 100*a* through pairing between the image display apparatus 100*a* and the mobile terminal 600.

The image display apparatus 100*a* outputs an ID signal Sida after completion of the pairing. The mobile terminal 600 receives the ID signal Sida and identifies the image display apparatus 100*a* based on the ID signal Sida.

Figure 13C:
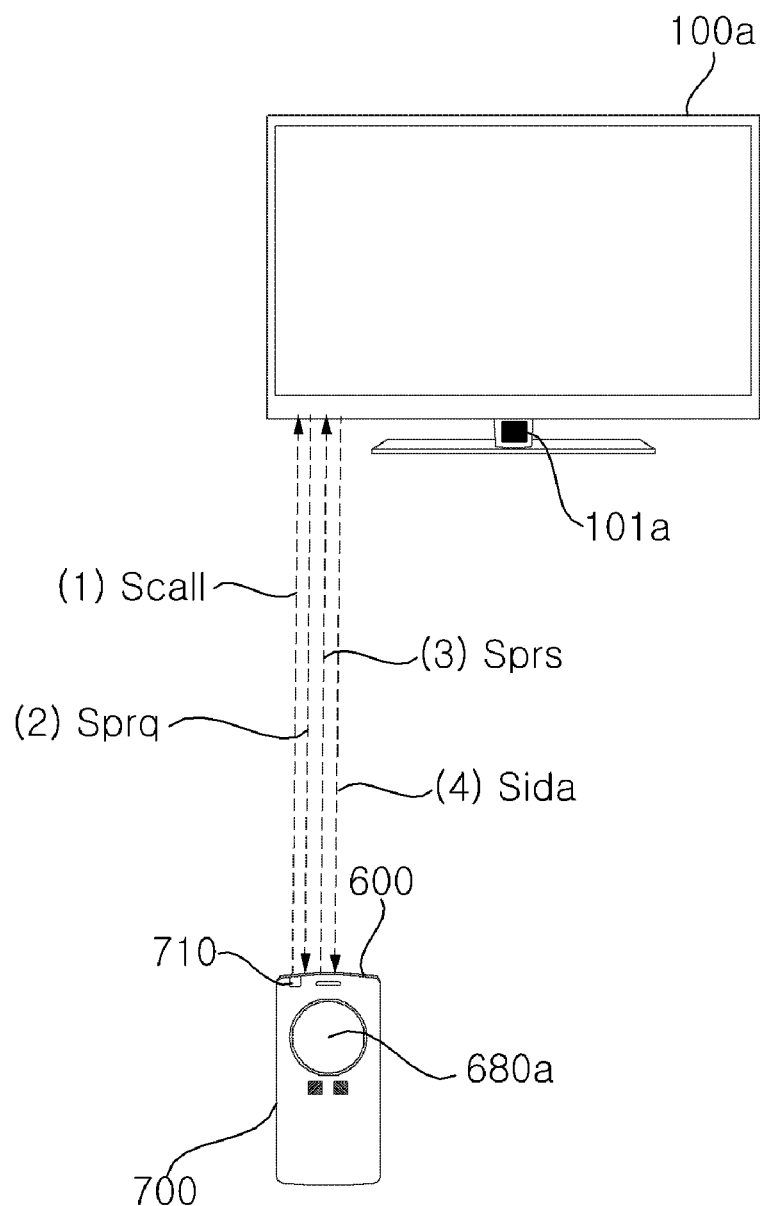

FIG. 13C is a view illustrating another exemplary method used for the mobile terminal 600 to identify the image display apparatus 100*a*, in relation to FIG. 12B.

When the mobile terminal 600 transmits a paging signal Scall to the image display apparatus 100*a*, the image display apparatus 100*a* receives and recognizes the paging signal Scall. Then, the image display apparatus 100*a* transmits a pairing request signal Sprq according to recognition of the paging signal Scall.

The mobile terminal 600 receives the pairing request signal Sprq and transmits a pairing response signal Sprs in response to the pairing request signal Sprq.

The image display apparatus 100*a* receives the pairing response signal Sprs. Thereby, the pairing is completed.

The image display apparatus 100*a* outputs an ID signal Sida after completion of the pairing. The mobile terminal 600 receives the ID signal Sida and identifies the image display apparatus 100*a* based on the ID signal Sida.

Figure 13D:
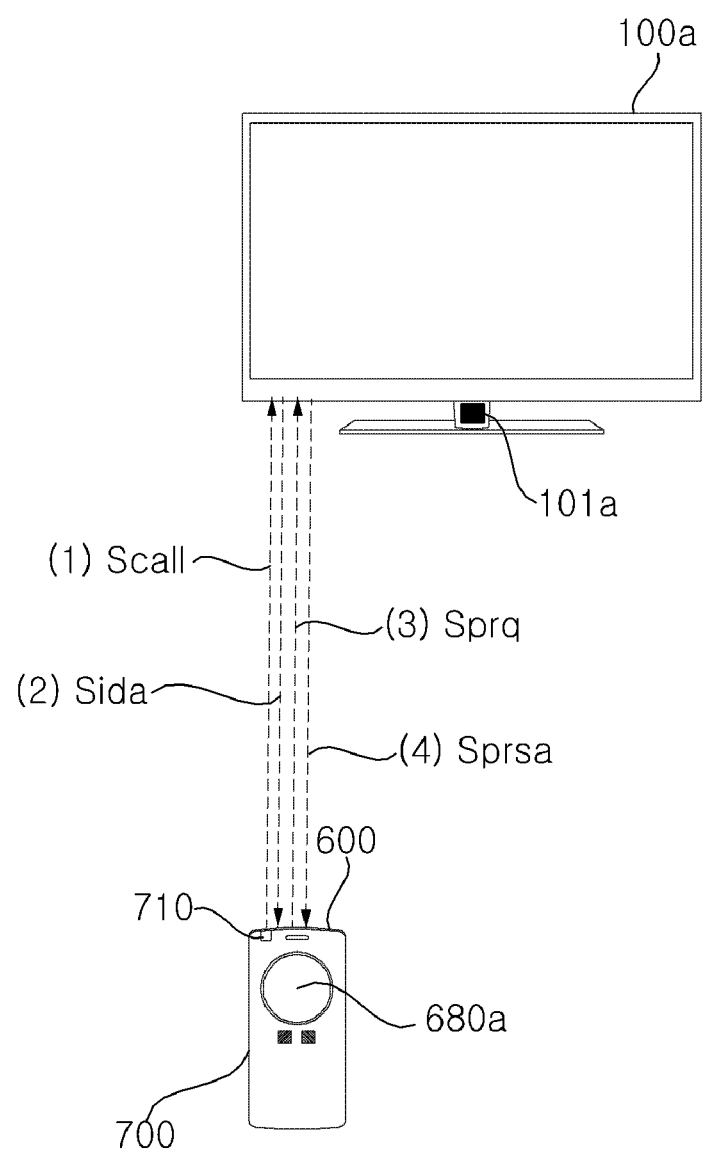

FIG. 13D is a view illustrating another exemplary method used for the mobile terminal 600 to identify the image display apparatus 100*a*, in relation to FIG. 12C.

When the mobile terminal 600 transmits a paging signal Scall to the image display apparatus 100*a*, the image display apparatus 100*a* receives and recognizes the paging signal Scall. Then, the image display apparatus 100*a* outputs the ID signal Sida according to recognition of the call signal Scall. The mobile terminal 600 receives the ID signal Sida and identifies the image display apparatus 100*a* based on the ID signal Sida.

After completing the device identification, the mobile terminal 600 transmits a pairing request signal Sprq. The image display apparatus 100*a* receives the pairing request signal Sprq and transmits a pairing response signal Sprsa in response to the pairing request signal Sprq.

In the mobile terminal 600, the image display apparatus 100*a* receives the pairing response signal Sprsa. Thereby, the pairing is completed.

Figure 13F:
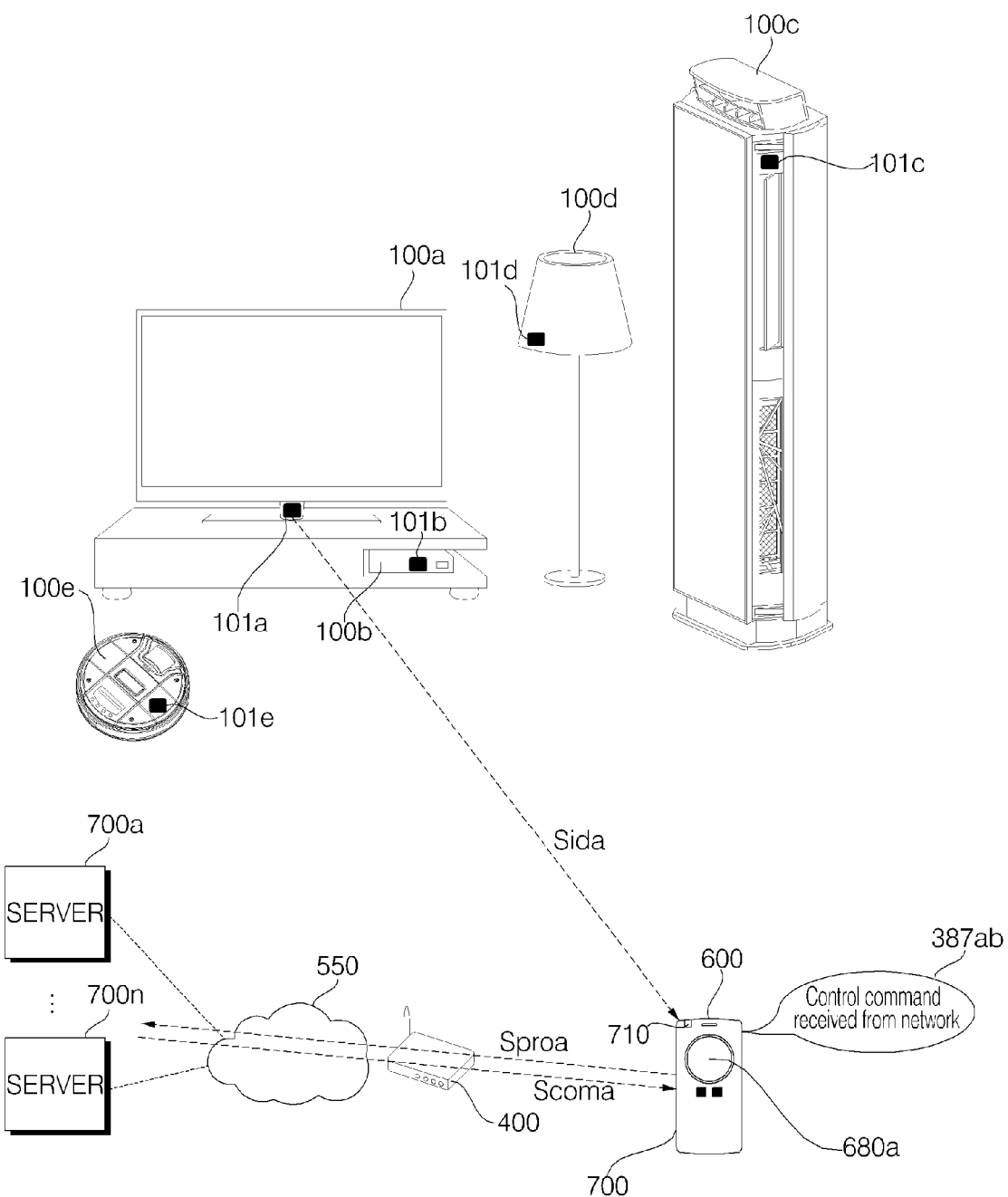
Figure 13F:
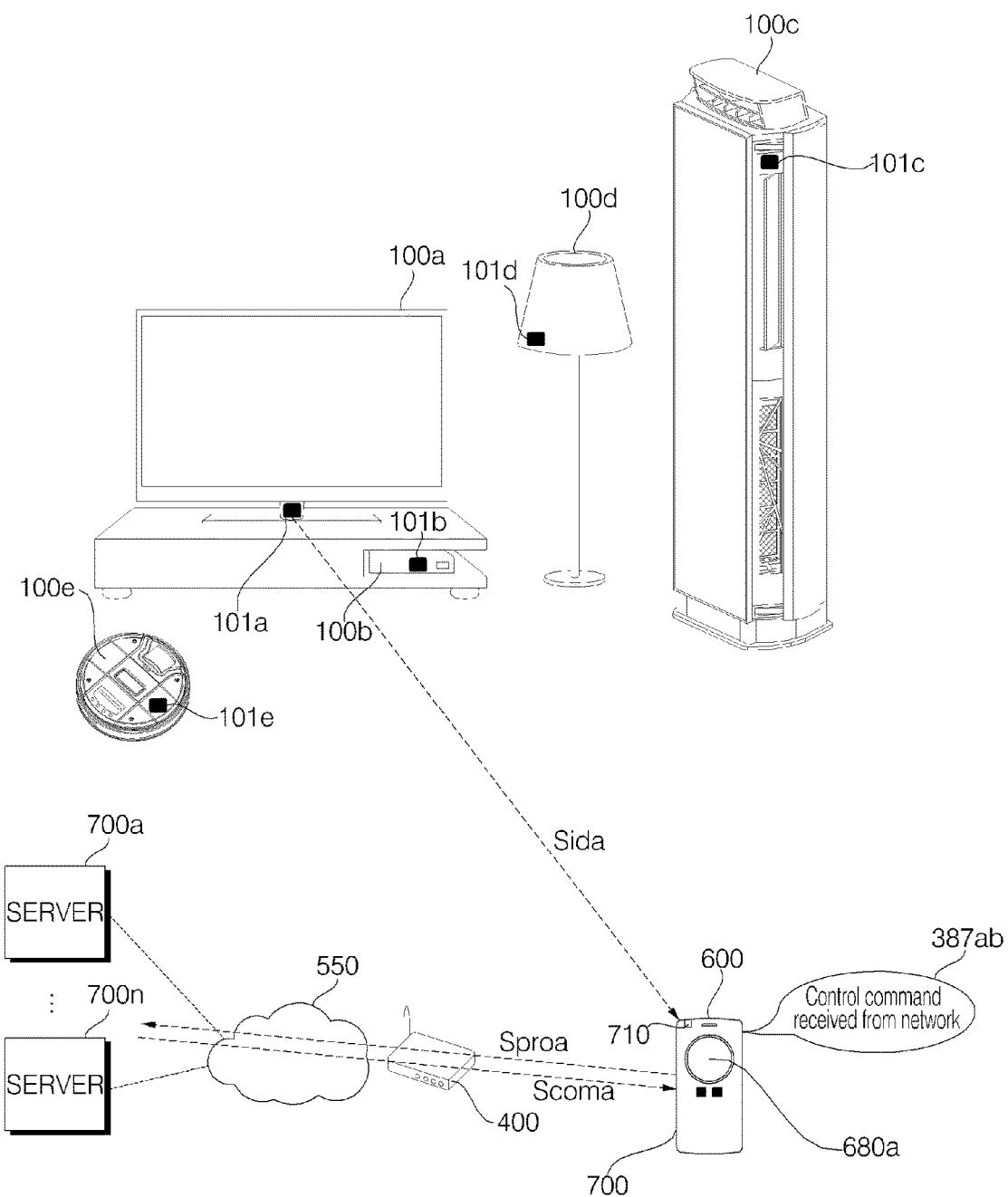

FIGS. 13E to 13G illustrate various examples of extraction of control command information after reception of an ID signal.

FIG. 13E illustrates a case where control command information is received from the transmission apparatus 101*a*. In the figure, a message 387*aa* indicating reception of control command information from the transmission apparatus is output in the form of sound.

Next, FIG. 13F illustrates a case where control command information is received from the server 700. In the figure, a message 387*ab* indicating reception of control command information from the server is output in the form of sound.

Next, FIG. 13G illustrates a case where control command information is received from the gateway 400. In the figure, a message 387*ab* indicating reception of control command information from the gateway 400 is output in the form of sound.

As a result, the controller 670 of the mobile terminal 600 may control display a remote control object for remote control of the device to be displayed, based on the control command information received from the outside as shown in FIG. 13E or 13G.

Figure 14:
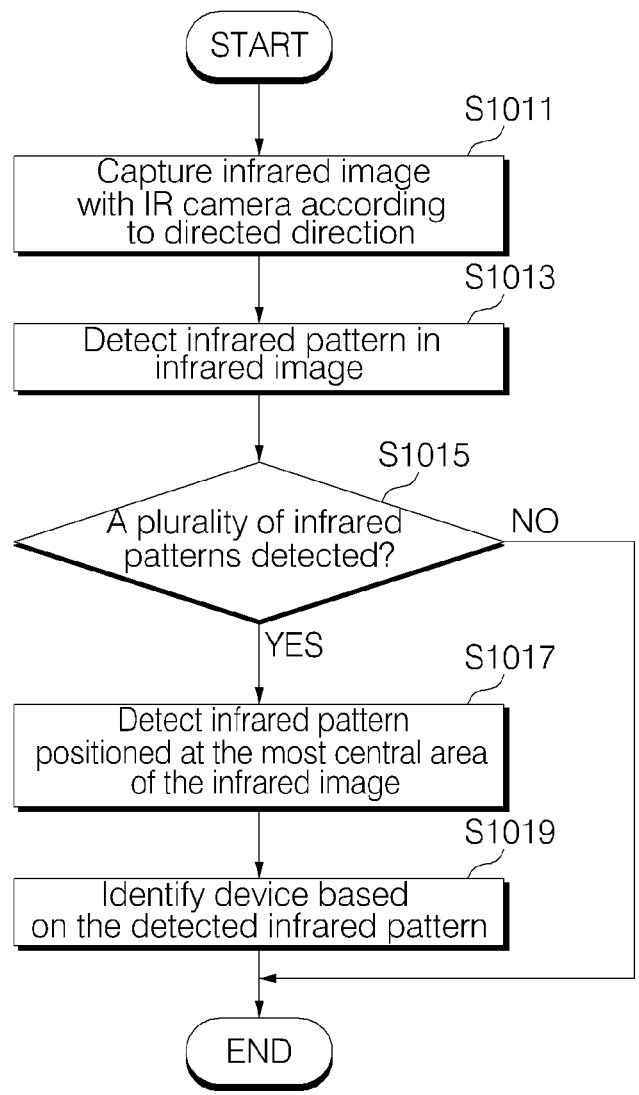
FIG. 14 is a flowchart illustrating a method of operating a mobile terminal according to another embodiment of the present invention.
Figure 15A:
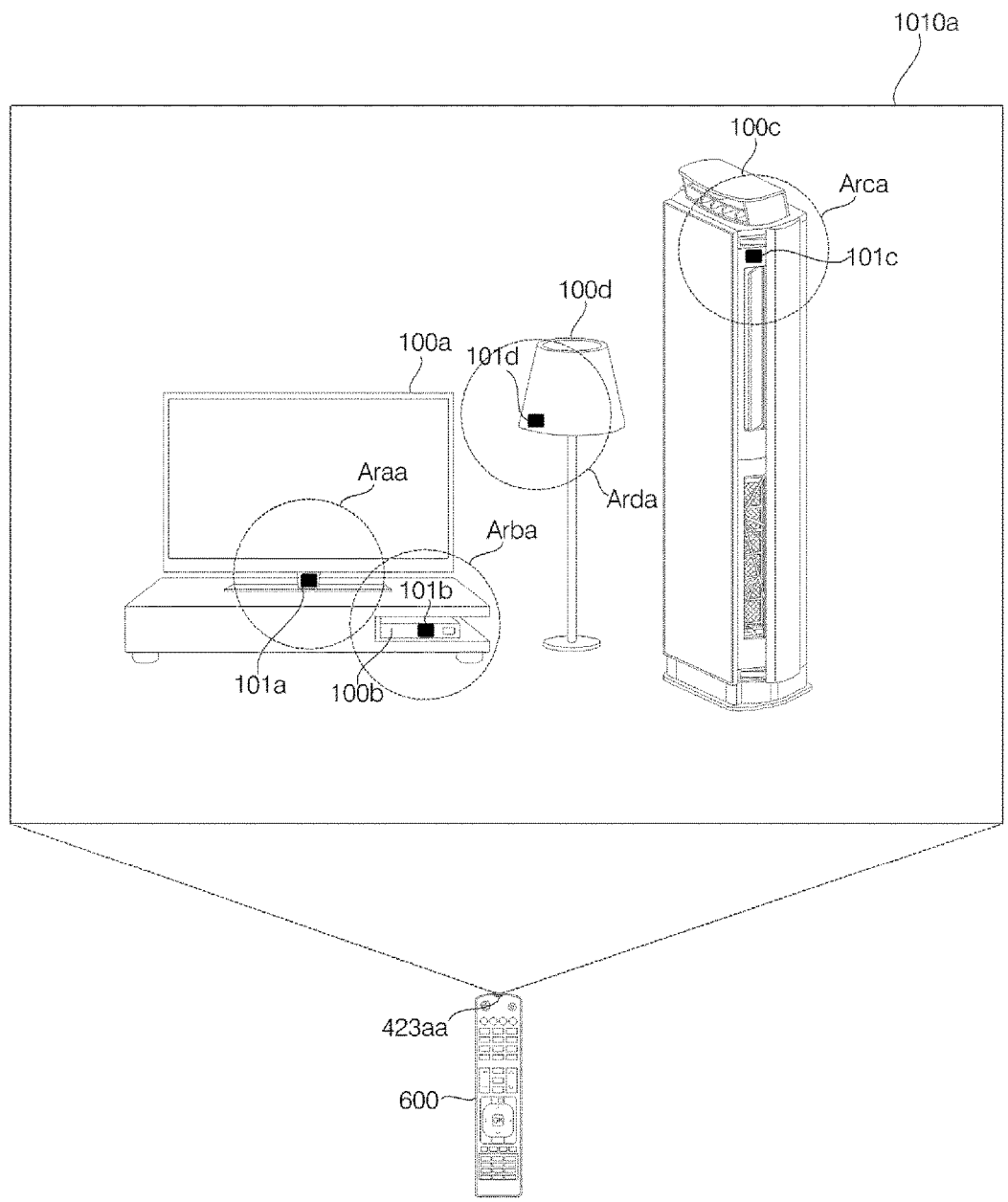
FIGS. 15A to 15B are views illustrating the method of operating the mobile terminal of FIG. 14.
Figure 15B:
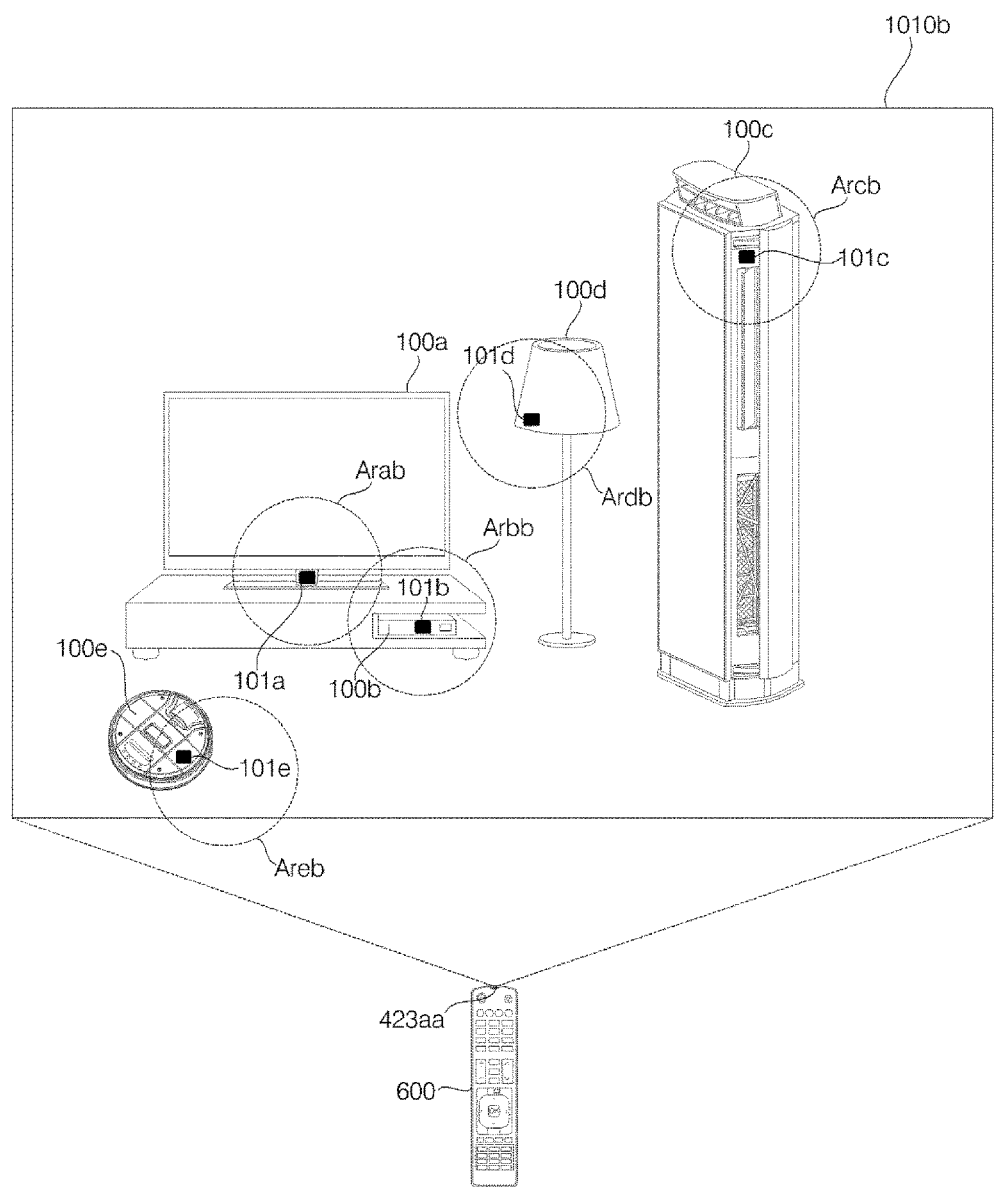

FIG. 14 is a flowchart illustrating a method of operating a mobile terminal according to another embodiment of the present invention, and FIGS. 15A to 15B are views illustrating the method of operating the mobile terminal of FIG. 14.

Referring to FIG. 14, the reception unit 423 of the mobile terminal 600 may capture an infrared image (S1011).

For example, in the case where the transmission apparatus 101 outputs an infrared (IR) ID signal, the reception unit 423 of the mobile terminal 600 may include an IR camera 423*aa* to detect the infrared ID signal.

Upon receiving at least one infrared ID signal, the infrared camera 423*aa* may capture an infrared image from the at least one received infrared ID signal.

Particularly, the infrared camera 423*aa* may capture an infrared image including the transmission apparatus 101 corresponding to the device 100 or the device, according to the direction of orientation of the mobile terminal 600.

Next, in the captured infrared image, the controller 670 may detect an infrared pattern from the device 100 or the transmission apparatus 101 corresponding to the device (S1013).

Next, the controller 670 outputs an infrared (IR) signal from at least one device or at least one transmission apparatus corresponding to the at least one device to determine whether an infrared pattern is detected, based on the at least one infrared signal (S1015).

If so, the controller 670 may detect the infrared pattern positioned in the most central area of the infrared image as a representative infrared pattern (S1017), and identify the device based on a representative infrared pattern (S1019).

If there is only one infrared pattern in step S1015, the controller 670 may identify the device based on a single infrared pattern as in step 1019.

FIGS. 15A to 15B are views illustrating a method of selecting a device based on one of a plurality of infrared (IR) signals at the time of receiving the plurality of infrared (IR) signals by the mobile terminal.

It is assumed that the mobile terminal 600 is provided with a reception unit 423 for receiving an infrared (IR) signal, and the reception unit 423 is provided with an infrared camera 423*aa*.

Referring to FIG. 15A, when the mobile terminal 600 is directed at the air conditioner 100*c* among a plurality of devices, the infrared camera 423*aa* may capture an infrared image 1010*a* as shown in the figure.

Upon receiving a plurality of IR signals, the controller 670 may detect an IR signal positioned in the most central area in an infrared image captured by the infrared camera as a representative IR signal, identify a device corresponding to the detected representative IR signal, and perform a control operation to allow remote control of the identified device.

That is, the controller 670 may detect an infrared pattern positioned in the most central area of the infrared image as a representative infrared pattern, recognize or identify a device corresponding to the detected infrared pattern, and performs a control operation to allow remote control of the recognized or identified device.

That is, in the figure, the air conditioner 100*c* and the transmission apparatus 101*c* corresponding to the air conditioner are positioned at the center of the infrared image 1010*a*, and on the left side thereof, the lighting device 100*d* and the transmission apparatus 101*d* corresponding to the lighting device, the set-top box 100*b* and the transmission apparatus 101*b* corresponding to the set-top box are positioned. On the leftmost side, the image display apparatus 100*a* and the transmission apparatus 101*a* corresponding thereto are arranged.

The controller 670 may detect the infrared pattern area in which an infrared signal is output, in the infrared image 1010*a*.

Among an area Arca including the transmission apparatus 101*c* corresponding to the air conditioner, an area Arda including the transmission apparatus 101*d* corresponding to the lighting device 100*d*, an area Arba including the transmission apparatus of 101*b* corresponding to the set-top box 100, the controller 670 may select the area Arca, which is the most central area including the transmission apparatus 101*c* corresponding to the air conditioner.

Then, the controller 670 may extract the area Arca including the transmission apparatus 101*c* corresponding to the air conditioner and located at the most central position among the plurality of areas and detect an infrared pattern in the area Arca.

For example, the controller 670 may detect an infrared (IR) signal from the transmission apparatus 101*c* corresponding to the air conditioner 100*c* as a representative infrared (IR) signal, recognize or identify the air conditioner 100*c* corresponding to the detected representative IR signal, and perform a control operation to display an remote control object for remote control of the air conditioner 100*c* according to the recognized or identified air conditioner 100*c*.

Referring to FIG. 15B, when the mobile terminal 600 is directed at the image display apparatus 100*a* among a plurality of devices, the infrared camera 423*aa* may capture an infrared image 1010*b* as shown in the figure.

If a plurality of infrared (IR) signals is received, the controller 670 may detect an IR signal positioned in the most central area in the IR image captured by the infrared camera as a representative IR signal, recognize or identify a device corresponding to the detected representative IR signal, and perform a control operation to allow remote control of the recognized or identified device.

In the figure, the image display apparatus 100*a* and the transmission apparatus 101*a* corresponding thereto are positioned at the center of an image 1010*b*, and on the right side thereof, the set-top box 100*b*, the transmission apparatus 101*b* corresponding to the set-top box, the lighting device 100*d*, and the transmission apparatus 101*d* corresponding to the lighting device are arranged. The air conditioner 100*c* and the transmission apparatus 101*c* corresponding thereto are arranged on the rightmost side. The robot cleaner 100*e* and the corresponding transmission apparatus 101*e* corresponding thereto are arranged on the left side of the image display apparatus 100*a*.

The controller 670 may detect an IR pattern area in which an infrared signal is output, in the infrared image 1010*b*.

Among an area Arb including the transmission apparatus 101*a* corresponding to the image display apparatus 100*a*, an area Arbb including the transmission apparatus 101*b* corresponding to the set-top box, an area Ardb including the transmission apparatus 101*d* corresponding to the lighting device 100*d*, an area Arcb including the transmission apparatus 101c corresponding to the air conditioner 100c, and an area Areb including the transmission apparatus 101e corresponding to the robot cleaner 100e, the controller 670 may select the area Arab, which is the most central area including the transmission apparatus 101a corresponding to the image display apparatus 100a.

Then, the controller 670 may extract the area Arab including the transmission apparatus 101a corresponding to the image display apparatus 100a and located at the most central position among the plurality of areas and detect an infrared pattern in the area Arab.

Accordingly, the controller 670 may detect an IR signal from the transmission apparatus 101a corresponding to the image display apparatus 100a as a representative IR signal, and recognize or identify the image display apparatus 100a corresponding to the representative IR signal, and perform a control operation to display an remote control object for remote control of the image display apparatus 100a according to the image display apparatus 100a.

The IR pattern described above may conceptually include a time-based IR pattern or a space-based IR pattern.

In the case where transmission apparatus 101 transmits a level variation or duty variation-based IR signal based on, the time-based IR pattern may conceptually include a pattern having a level or duty varying for a predetermined time.

In this case, when the transmission apparatus 101 transmits a level variation or duty variation-based IR signal, the controller 670 may detect a level variation or duty variation-based IR pattern based on a plurality of captured IR images, and identify the device based on the detected IR pattern.

If the transmission apparatus 101 does not output the IR signal itself but forms an IR pattern, the space-based IR pattern may conceptually include the shape of a reflection pattern because an IR output signal Sout output from the transmission unit 421 of the mobile terminal 600 to the transmission apparatus 101 and is selectively reflected by the IR reflection pattern on the transmission apparatus 101, In the captured IR image having at least one reflection pattern including the IR reflection pattern reflected from the device 100a or the transmission apparatus 101a corresponding to the device, the controller 670 may detect the IR pattern reflected by the infrared reflection pattern formed on the device 100a or the transmission apparatus 101a corresponding to the device, and recognize or identify the device 100a based on the detected IR pattern.

When a partial reflection pattern and a partial absorption pattern are formed on the transmission apparatus 101, the controller 670 may detect an IR pattern based on the IR reflection pattern and the IR absorption pattern formed on the device or the transmission apparatus corresponding to the device in the captured IR image, and identify the device based on the detected IR pattern.

Detection of a time-based IR pattern will be described with reference to FIGS. 9B to 9D, and detection of the space-based IR pattern will be described with reference to FIGS. 11B to 11F.

FIG. 9B illustrates that the transmission unit 106c of the transmission apparatus 101c corresponding to the air conditioner 100c outputs an infrared ID signal IRc.

The IR camera 423aa of the mobile terminal 600 may capture an IR image including the transmission apparatus 101c corresponding to the air conditioner 100c as shown in FIG. 9B(a).

When the devices at which the mobile terminal is directed are changed, the controller 670 may perform a control operation to change the displayed remote control object. This will be described with reference to FIG. 16 and the subsequent figures.

Figure 16:
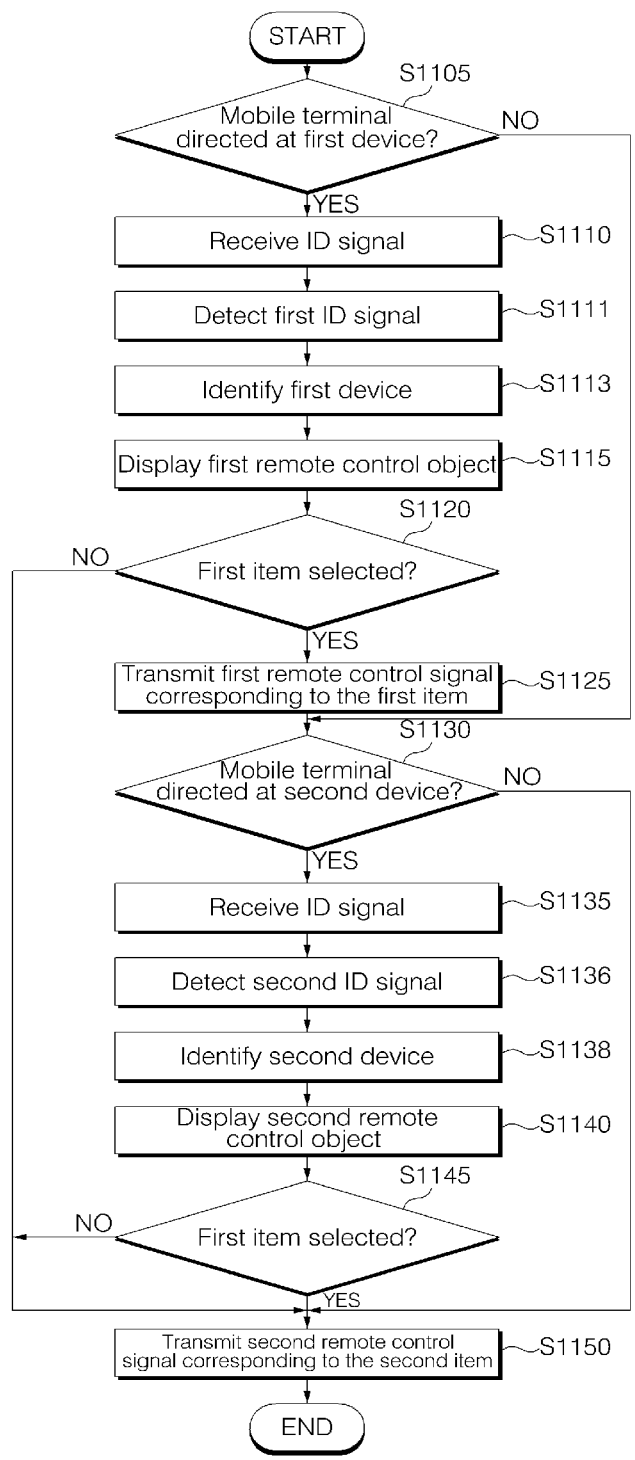
FIG. 16 is a flowchart illustrating an exemplary method of operating a mobile terminal according to another embodiment of the present invention.

FIG. 16 is a flowchart illustrating an exemplary method of operating a mobile terminal according to another embodiment of the present invention, and FIGS. 17A to 27E are views illustrating the method of operating the mobile terminal of FIG. 16.

Referring to FIG. 16, when the mobile terminal 600 is directed at a first device (S1105), the reception unit 423 of the mobile terminal 600 receives at least one ID signal (S1110).

Next, the controller 670 of the mobile terminal 600 detects a first ID signal from the at least one ID signal including the first ID signal (S1111). Then, based on the detected first ID signal, the controller identifies the first device (S1113).

For example, as shown in FIG. 3A, when the mobile terminal 600 is directed at the air conditioner 100c, the reception unit 423 of the mobile terminal 600 may receive at least one ID signal, and detect a first ID signal corresponding to the air conditioner 100c or the transmission apparatus 101c corresponding to the air conditioner 100c from the at least one ID signal.

Any one ID signal may be detected using the method described in FIGS. 14 to 15B.

Then, the controller 670 of the mobile terminal 600 identifies or recognizes whether the detected first ID signal is the ID signal of the first device. For example, the controller may recognize that the detected first ID signal is the ID signal of the first device by comparing the detected first ID signal with the ID signal pattern data stored in the memory 660.

Then, the controller 670 of the mobile terminal 600 performs a control operation to display a first remote control object for remote control of the first device (S1115).

Next, the controller 670 of the mobile terminal 600 determines whether a first item is selected in the first remote control object (S1120). If so, the controller controls a first remote control signal corresponding to the first item to be transmitted (S1125). Thus, the first device may be easily remotely controlled.

Next, when the mobile terminal 600 is directed at a second device (S1130), the reception unit 423 of the mobile terminal 600 receives at least one ID signal (S1135).

Next, the controller 670 of the mobile terminal 600 detects a second ID signal from the at least one ID signal including the second ID signal (S1136). Then, based on the detected second ID signal, the controller identifies the second device (S1138).

For example, as shown in FIG. 3B, when the mobile terminal 600 is directed at the image display apparatus 100a, the reception unit 423 of the mobile terminal 600 may receive at least one ID signal, and detect a second ID signal corresponding to the image display apparatus 100a or the transmission apparatus 101a corresponding to the image display apparatus 100a, from the at least one ID signal.

Next, the controller 670 of the mobile terminal 600 recognizes or identifies whether the detected second ID signal is the ID signal of the second device. For example, the controller may recognize or identify that the detected second ID signal is the ID signal of the second device by comparing the detected second ID signal with the ID signal pattern data stored in the memory 660.

Then, the controller 670 of the mobile terminal 600 performs a control operation to display a second remote control object for remote control of the second device (S1140).

Next, the controller 670 of the mobile terminal 600 determines whether a first item is selected in the second remote control object (S1145). If so, the controller 670 of the mobile terminal 600 controls a second remote control signal corresponding to the first item to be transmitted (S1150). Thus, the second device may be easily remotely controlled.

Figure 17A:
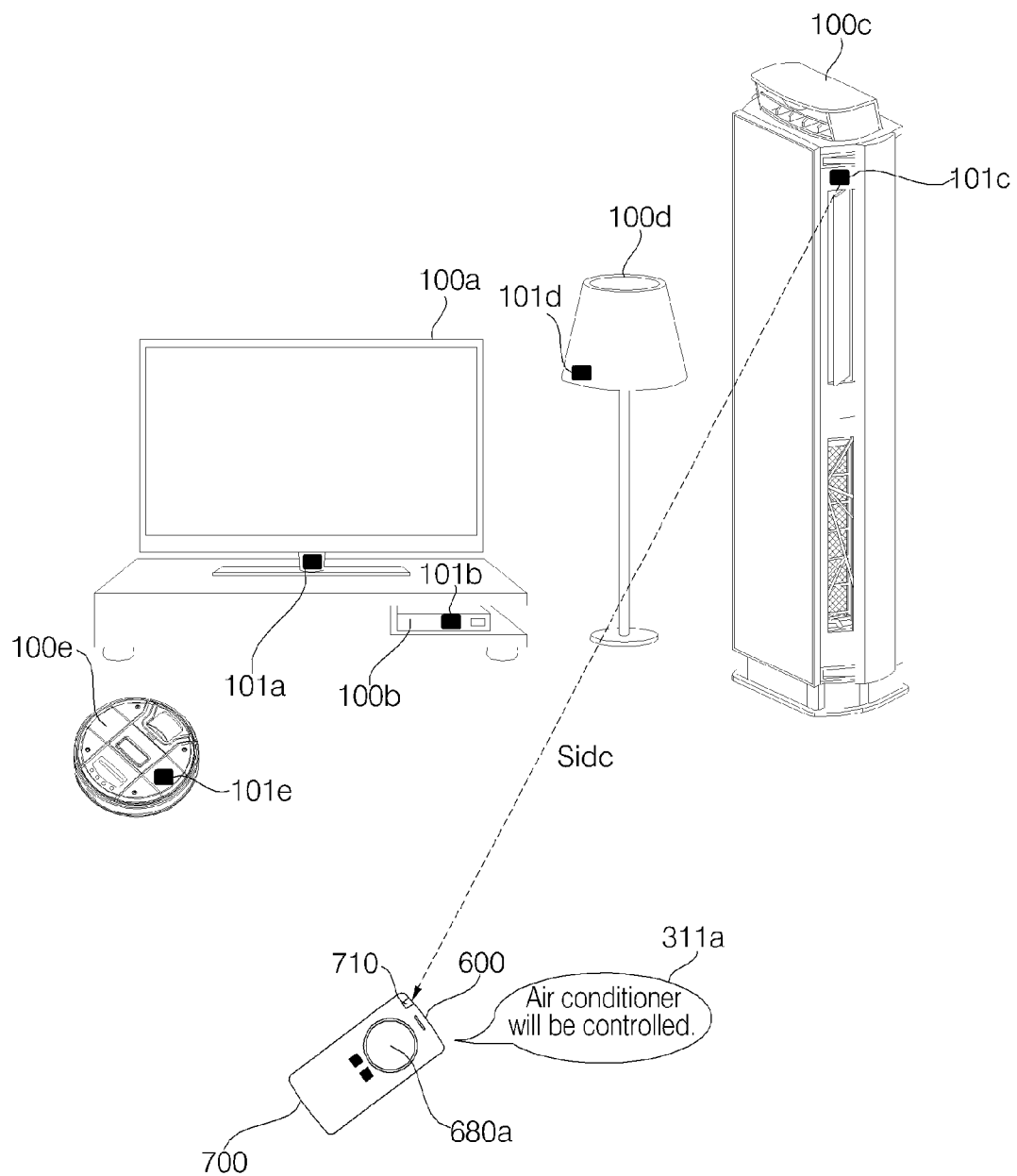
FIGS. 17A to 27E are views illustrating the method of operating the mobile terminal of FIG. 16.

FIG. 17A illustrates a case where the mobile terminal 600 is directed at the air conditioner 100*c* among the various devices 100*a*, 100*b*, 100*c*, 100*d*, and 100*e* in a house.

The mobile terminal 600 receives an ID signal Sidc from the transmission apparatus 101*c* corresponding to the air conditioner 100*c*. Then, the mobile terminal may detect the ID signal Sidc from at least one ID signal including the ID signal Sidc, recognize or identify that the directed device is the air conditioner, based on the detected ID signal Sidc, and control a remote control object for the air conditioner 100*c* to be displayed.

Figure 17B:
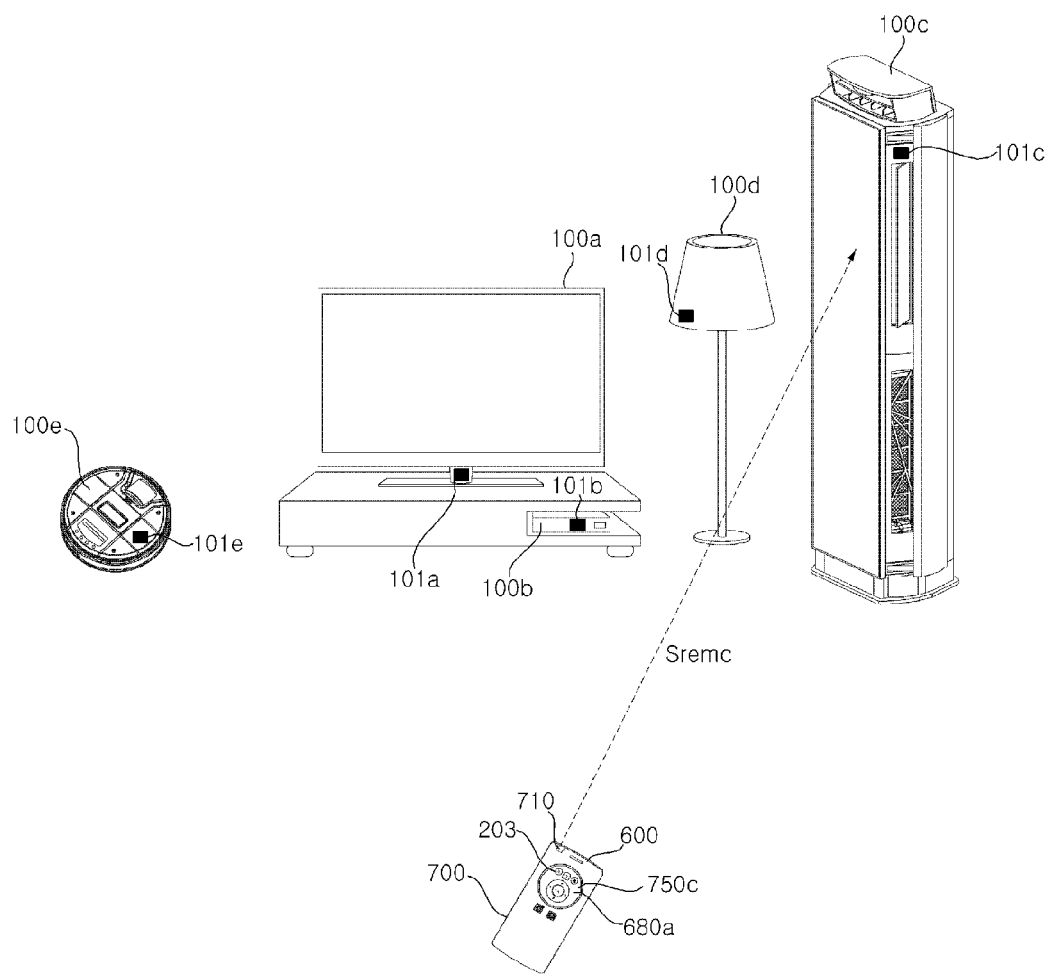
Figure 17A:
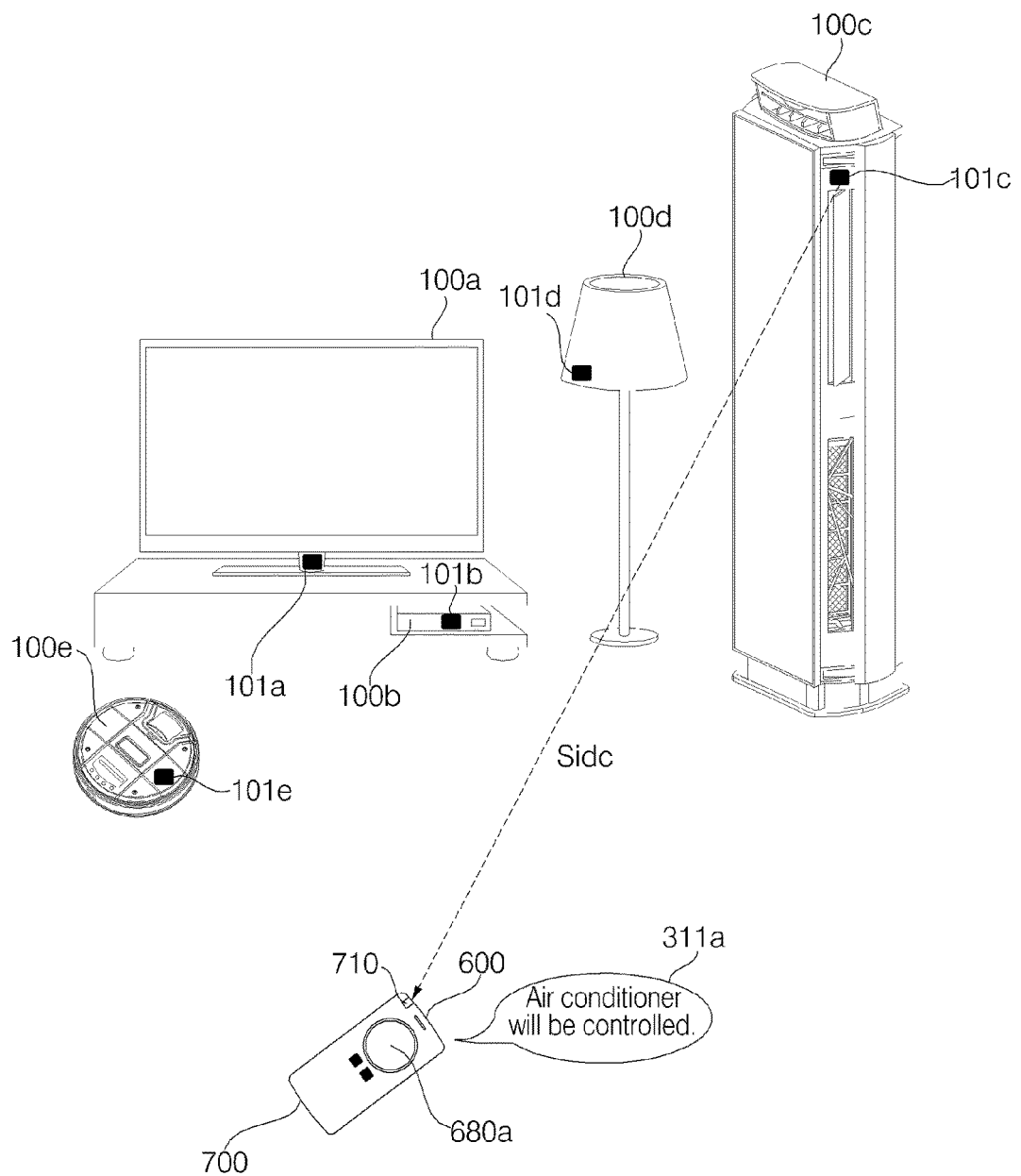
Figure 17B:
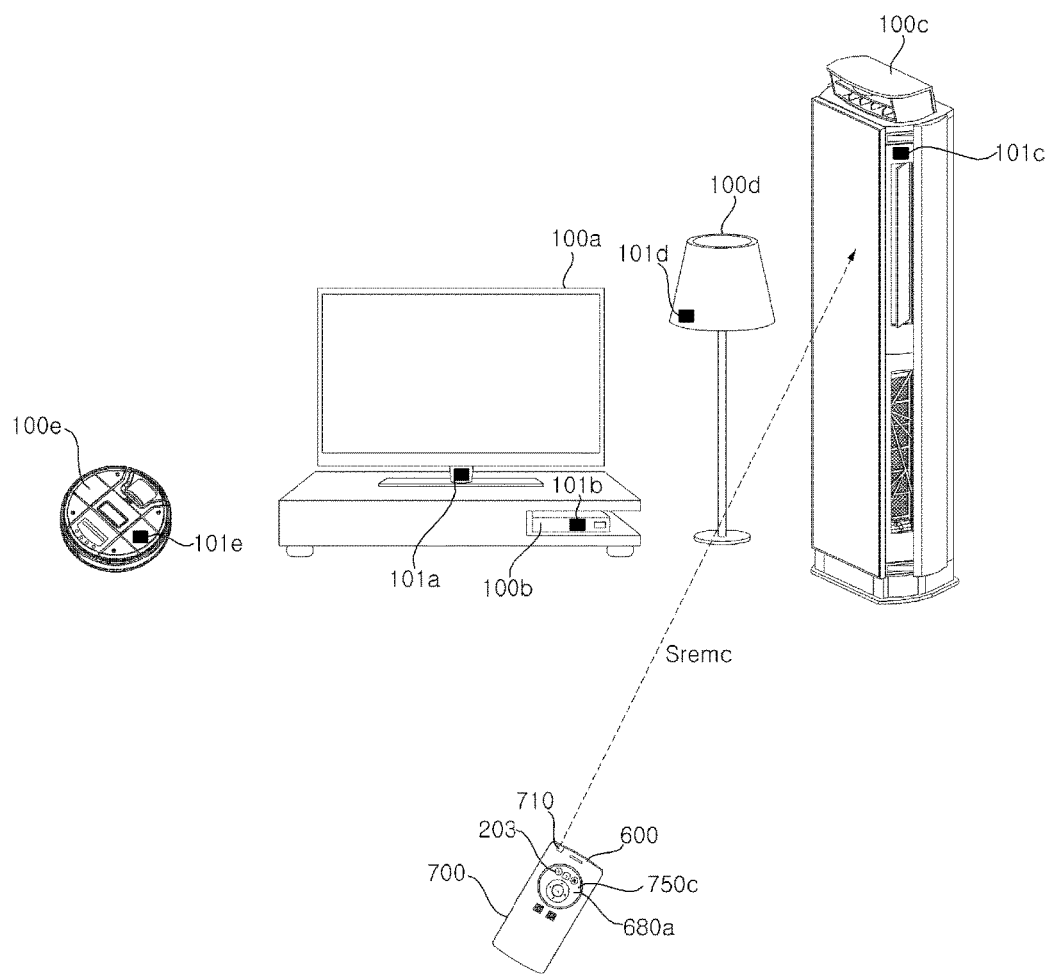

FIG. 17B illustrates a case where a menu item 203 is selected in the remote control objects of the mobile terminal 600. In this case, a remote control signal Sremc corresponding to the menu item 203 is transmitted to the air conditioner 100*c*.

For example, the mobile terminal 600 may match the menu item 203 with a wind strength adjustment command for control of the air conditioner.

Accordingly, as shown in FIG. 17C, the air conditioner 100*c* may output cold air 1103 corresponding to the wind strength set according to the selection of the menu item 203.

Figure 18A:
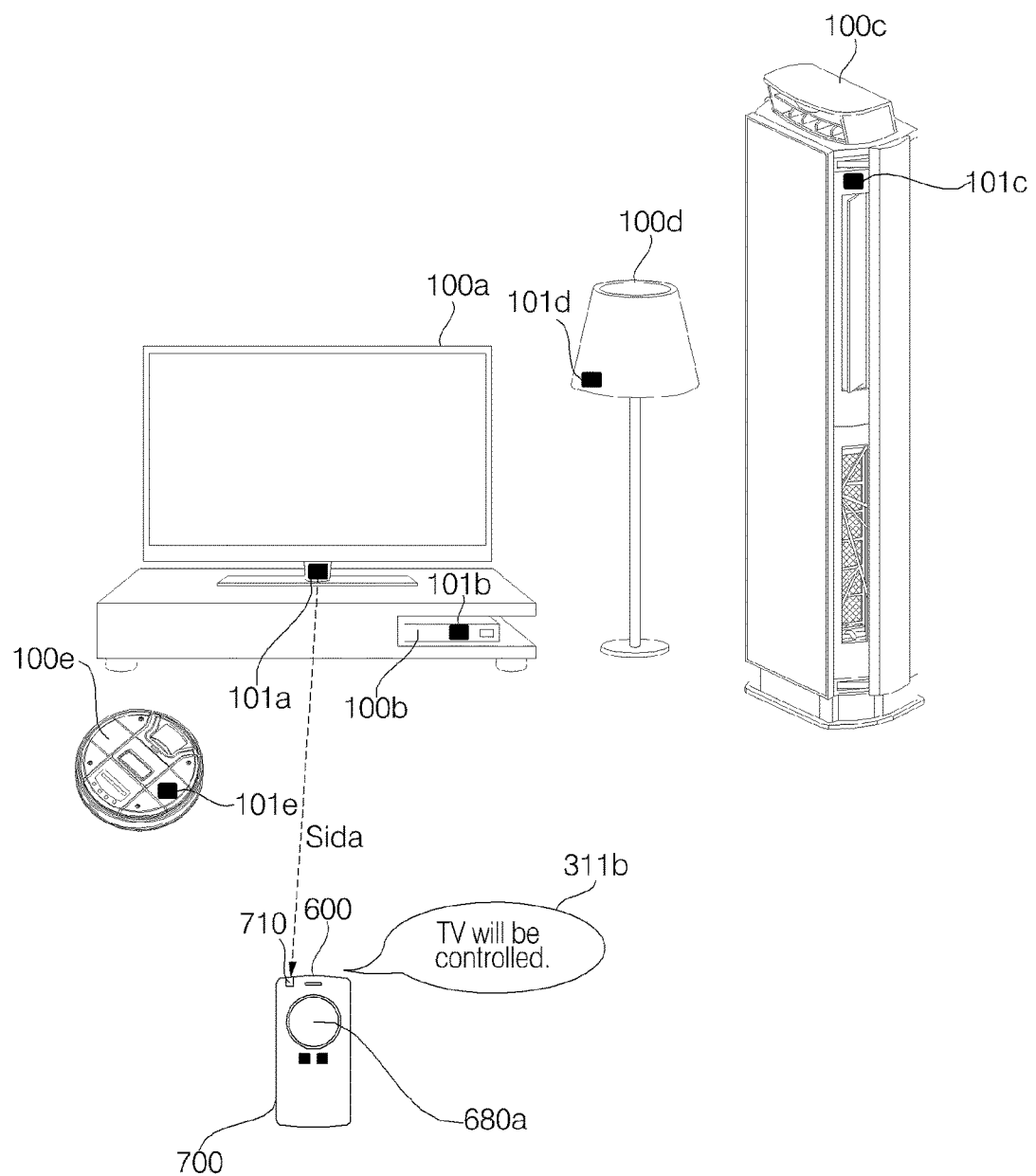

FIG. 18A illustrates a case where the mobile terminal 600 is directed at the image display apparatus 100*a* among the various devices 100*a*, 100*b*, 100*c*, 100*d*, and 100*e* in the house.

The mobile terminal 600 receives an ID signal Sida from the transmission apparatus 101*a* corresponding to the image display apparatus 100*a*. Then, the mobile terminal 600 may detect the ID signal Sida in at least one ID signal including the ID signal Sida, recognize or identify, based on the detected ID signal Sida, that the device at which the mobile terminal is directed is the image display apparatus 100*a*, and control a remote control object for the image display apparatus 100*a* to be displayed.

Figure 18B:
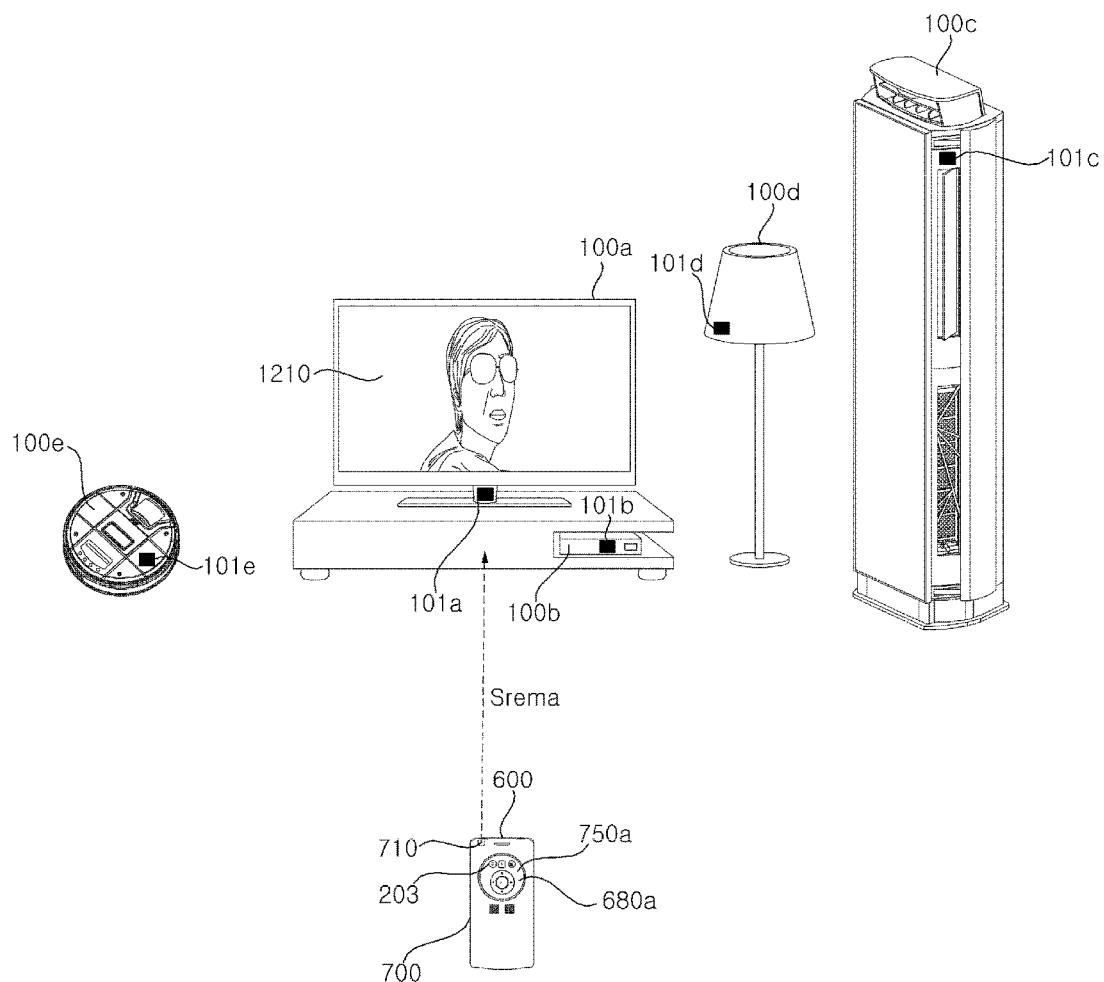

Next, FIG. 18B illustrates a case where the menu item 203 is selected in the remote control object of the mobile terminal 600. In this case, a remote control signal Srema corresponding to the menu item 203 is transmitted to the image display apparatus 100*a*.

Accordingly, as shown in FIG. 18C, when a predetermined image 1210 is displayed on the image display apparatus 100*a*, a menu object may be displayed at the bottom of the screen according to selection of the menu item 203.

As shown in FIGS. 17A to 18C, by setting different operations for menu items for different device control, different devices may be easily remotely controlled.

Figure 19A:
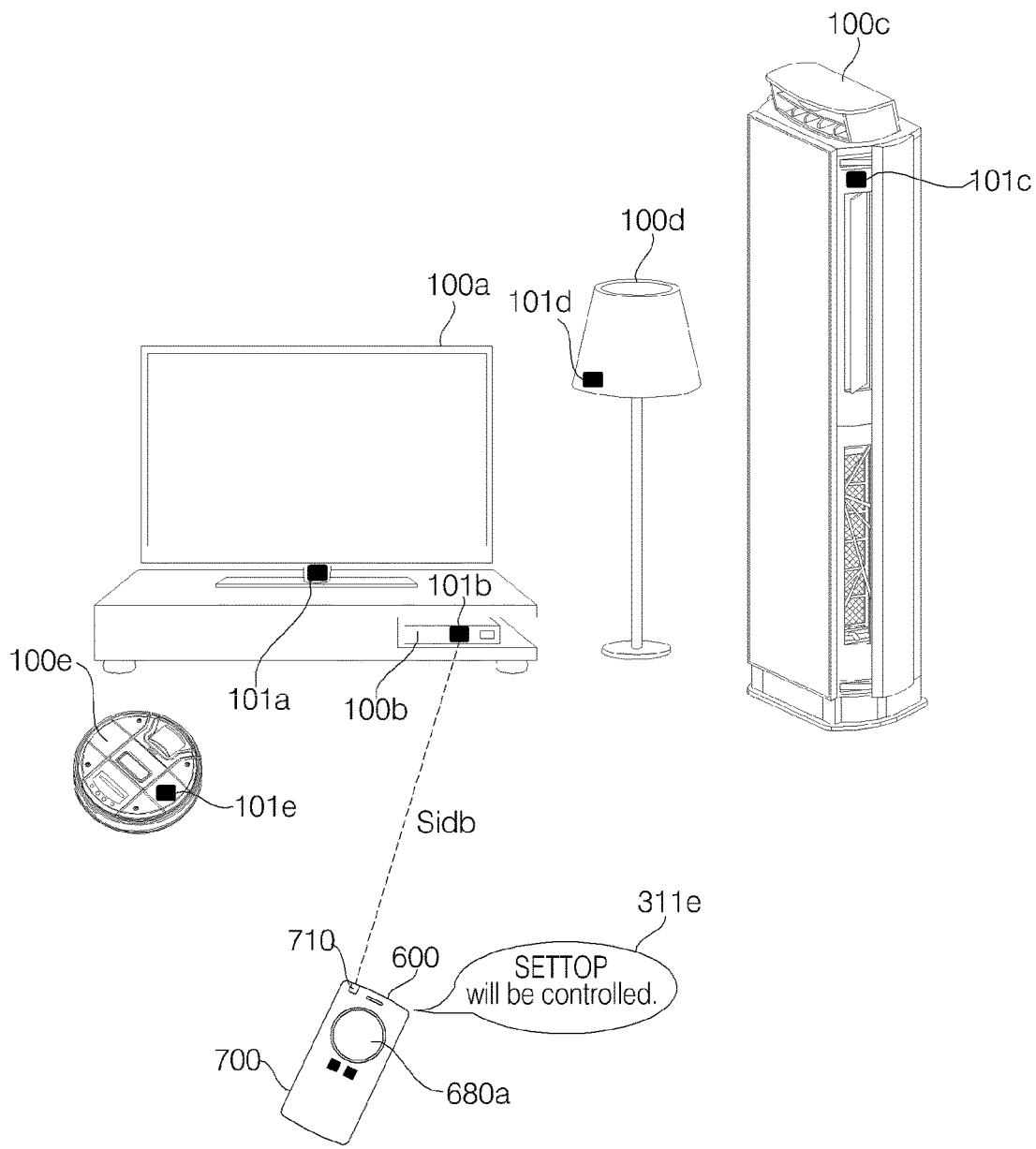

FIG. 19A illustrates a case where the mobile terminal 600 is directed at the set-top box 100*b* among the various devices 100*a*, 100*b*, 100*c*, 100*d*, and 100*e* in the house.

The mobile terminal 600 receives an ID signal Sidb from the transmission apparatus 101*b* corresponding to the set-top box 100*b*. The mobile terminal may detect the ID signal Sidb from at least one ID signal including the ID signal Sidb, recognize or identify, based on the detected ID signal Sidb, that the directed device is the set-set-top box, and control a remote control object for the set-top box 100*b* to be displayed.

Next, FIG. 19B illustrates a case where the menu item 203 is selected in the remote control object of the mobile terminal 600.

For example, when a specific operation is not set for the menu item 203 at the time of set-top box control, the mobile terminal 600 may output an operation disable message 1311 in the form of sound, as shown in the figure. Thus, the user may recognize that the menu item is not operable.

Figure 19D:
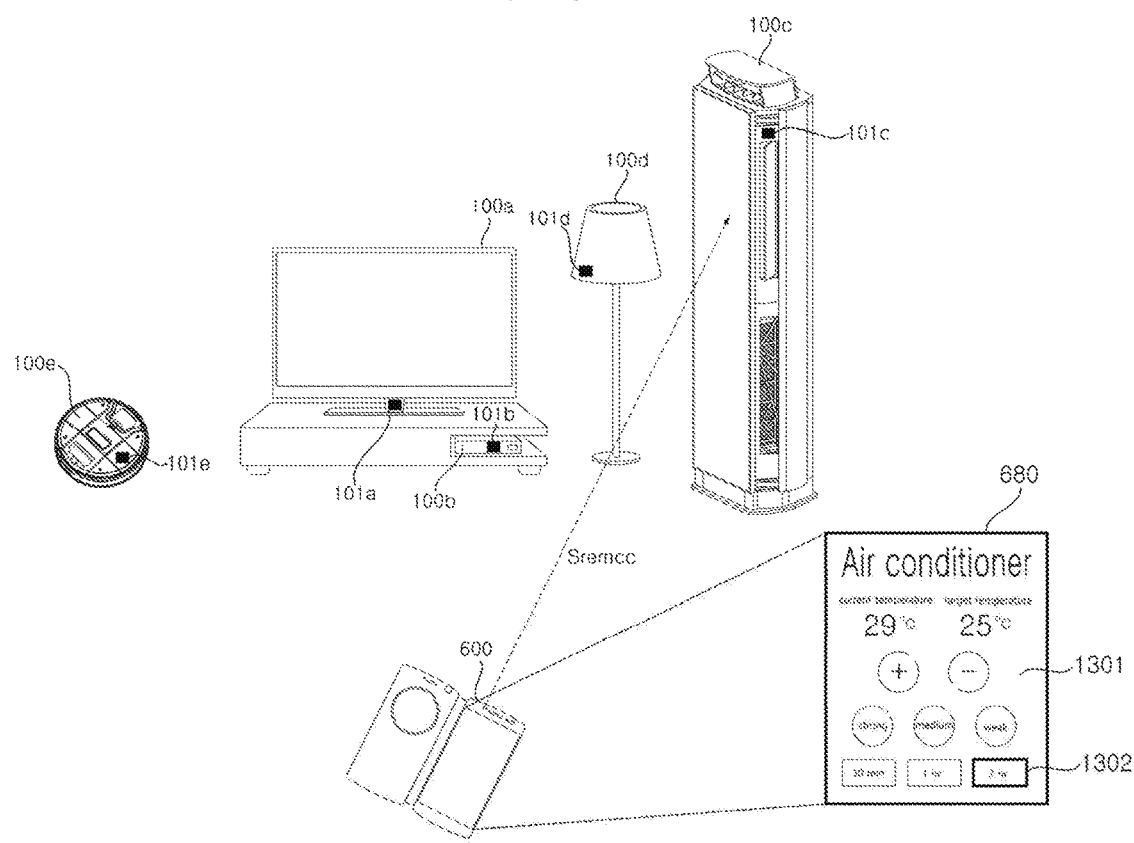
Figure 19C:
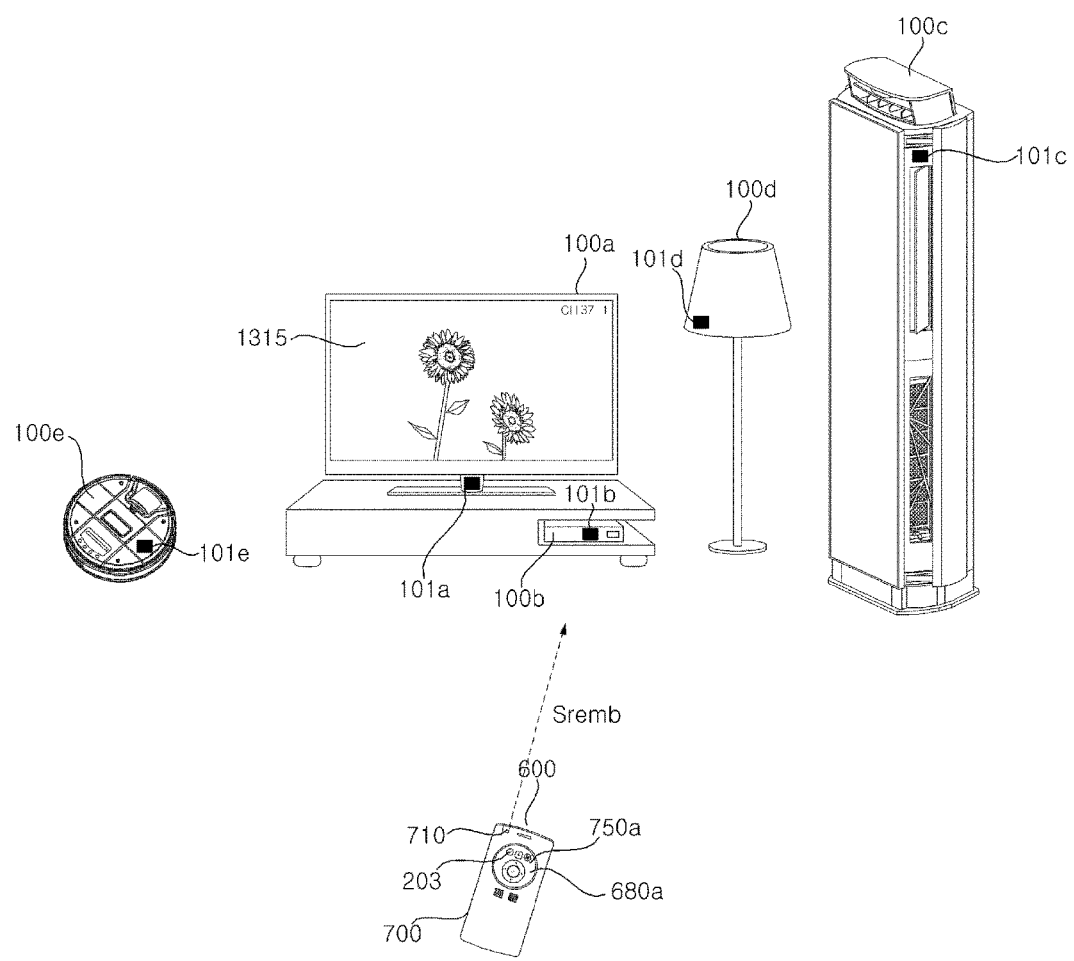
Figure 19D:
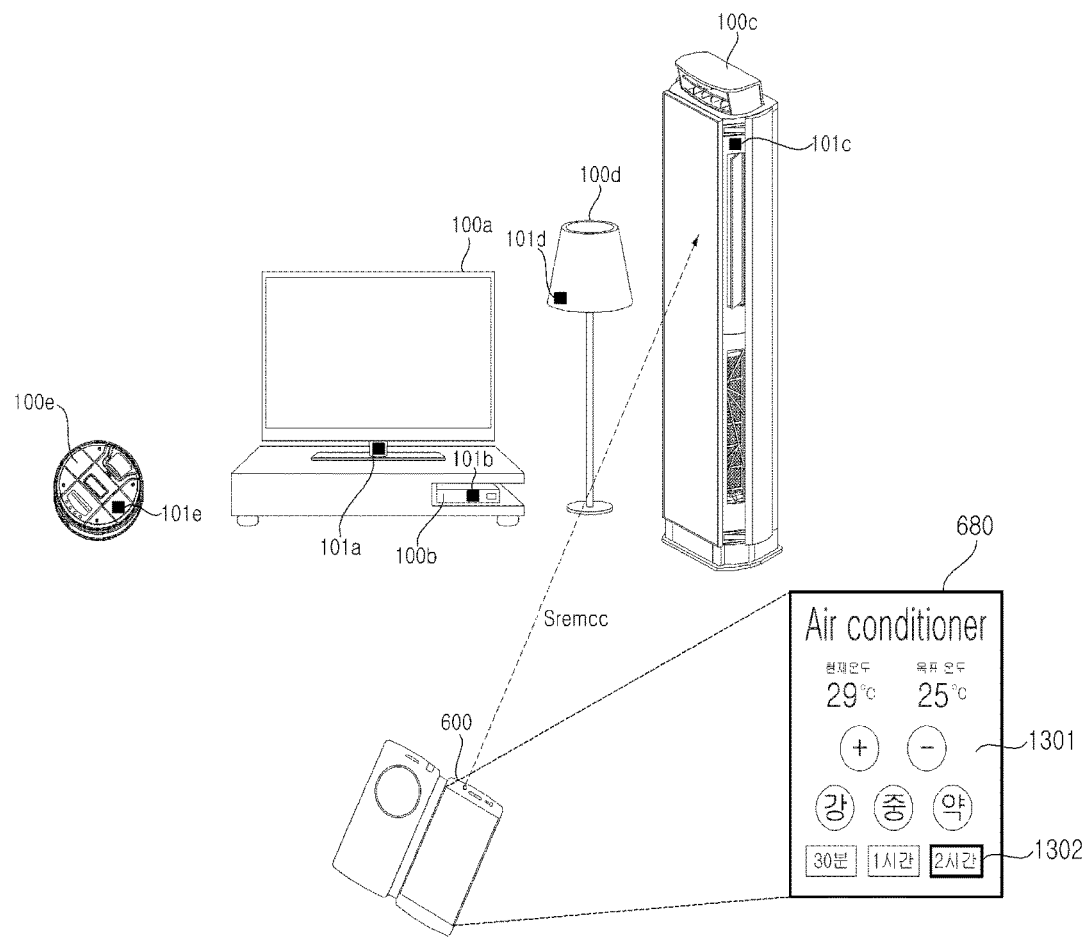

Next, FIG. 19C illustrates a case where a channel item 203*a* is selected in the remote control object of the mobile terminal 600.

The mobile terminal 600 may transmit a remote control signal Sremb related to change of a channel to the set-top box 100*b* according to selection of the channel item 203*a*.

Accordingly, the set-top box 100*b* may perform channel change and may provide the image display apparatus 100*a* with a broadcast image of a changed channel.

In the figure, it is illustrated that a broadcast image 1310 of Channel (CH) 36-1 shown in FIG. 19B is changed, and a broadcast image 1315 of CH 37-1 is displayed on the image display apparatus 100*a*.

As shown in FIG. 19D, when the front case 701 of the mobile terminal 600 is open, the controller 680 may recognize a change in electrical conductivity formed on the display 680, thereby recognizing that the front case is open.

Then, a remote control object 1301 different from the remote control object 750*c* of FIG. 19B may be controlled to be displayed according to opening of the front case.

Preferably, the number of items of the remote control object 1301 to be displayed according to opening of the front case is larger than the number of remote control objects 750*c* displayed when the front case is closed as shown in FIG. 19B.

In the figure, it is illustrated that the remote control object 1301 includes air conditioner state information (current temperature information, target temperature information), a temperature setting item, a wind strength setting item, and an operation time setting item.

When the operation time setting item 1302 is selected, the transmission unit 432*b* of the mobile terminal 600 may output a remote control signal Sremcc to the air conditioner 100*c*.

Then, the air conditioner 100*c* may operate during the set operation time, and the cold wind 1102 may be output as shown in FIG. 19E.

FIG. 20A illustrates a case where the mobile terminal 600 is directed at the air conditioner 100*c* among the various devices 100*a*, 100*b*, 100*c*, 100*d*, and 100*e* in the house.

The mobile terminal 600 receives an ID signal Sidc from the transmission apparatus 101*c* corresponding to the air conditioner 100*c*. Then, the mobile terminal may detect the ID signal Sidc from at least one ID signal including the ID signal Sidc, recognize or identify, based on the detected ID signal Sidc, that the directed device is the air conditioner, and control a remote control object for the air conditioner 100*c* to be displayed.

When device identification is completed or display of the remote control object is completed with the mobile terminal 600 directed at the air conditioner 100*c*, the mobile terminal 600 may output the air conditioner control enable message stating "Air conditioner will be controlled." in the form of sound. Thereby, the user may recognize that air conditioner can be controlled.

Figure 20B:
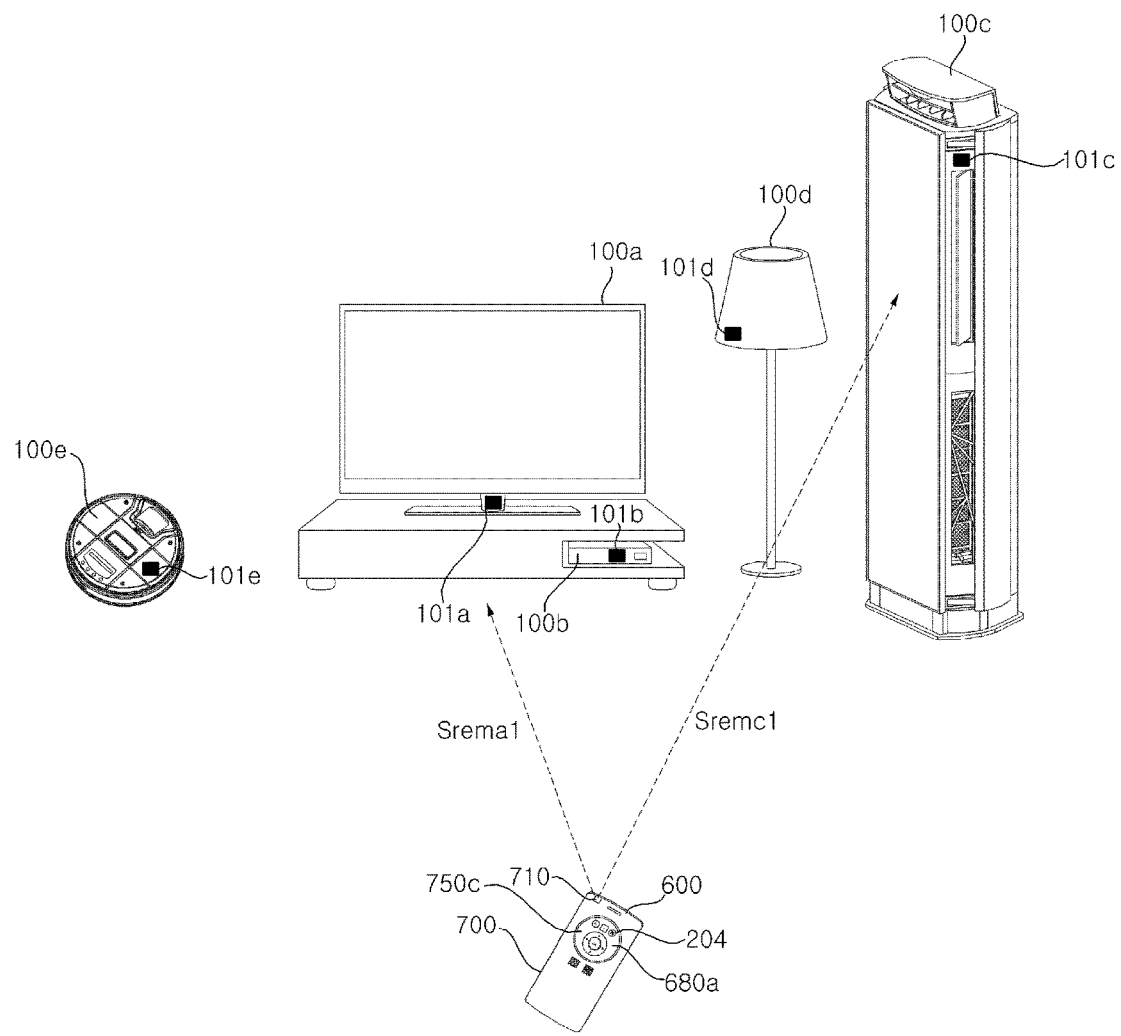

Next, FIG. 20B illustrates a case where a multi-device operation item 204 is selected among the remote control object of the mobile terminal 600.

The multi-device operation item 204 may be referred to as an IFTTT (If This, Then That) item.

When the mobile terminal 600 is set to remotely control the air conditioner 100c, the function of Power On of the air conditioner 100c and Power On of the image display apparatus 100a may be set in the multi-device operation item 204.

For example, when the multi-device operation item 204 is selected, the mobile terminal 600 may transmit a first remote control signal Sremc1, which is a power-on signal, to the air conditioner 100c, transmit a second remote control signal Srema1, which is a power-on signal, to the image display apparatus 100a.

Thus, as shown in FIG. 20C, the air conditioner 100c may be turned on to output cold air 1103, and the image display apparatus 100a may be turned on to display a predetermined image 1315.

Setting of the multi-device function for a multi-device operation item 204 may be set differently according to selection by the user.

For example, when the multi-device operation item 204 is selected, the mobile terminal 600 may transmit a first remote control signal Sremc1, which is a power-on signal, and a second remote control signal Srema11 to the air conditioner 100c.

Figure 20D:
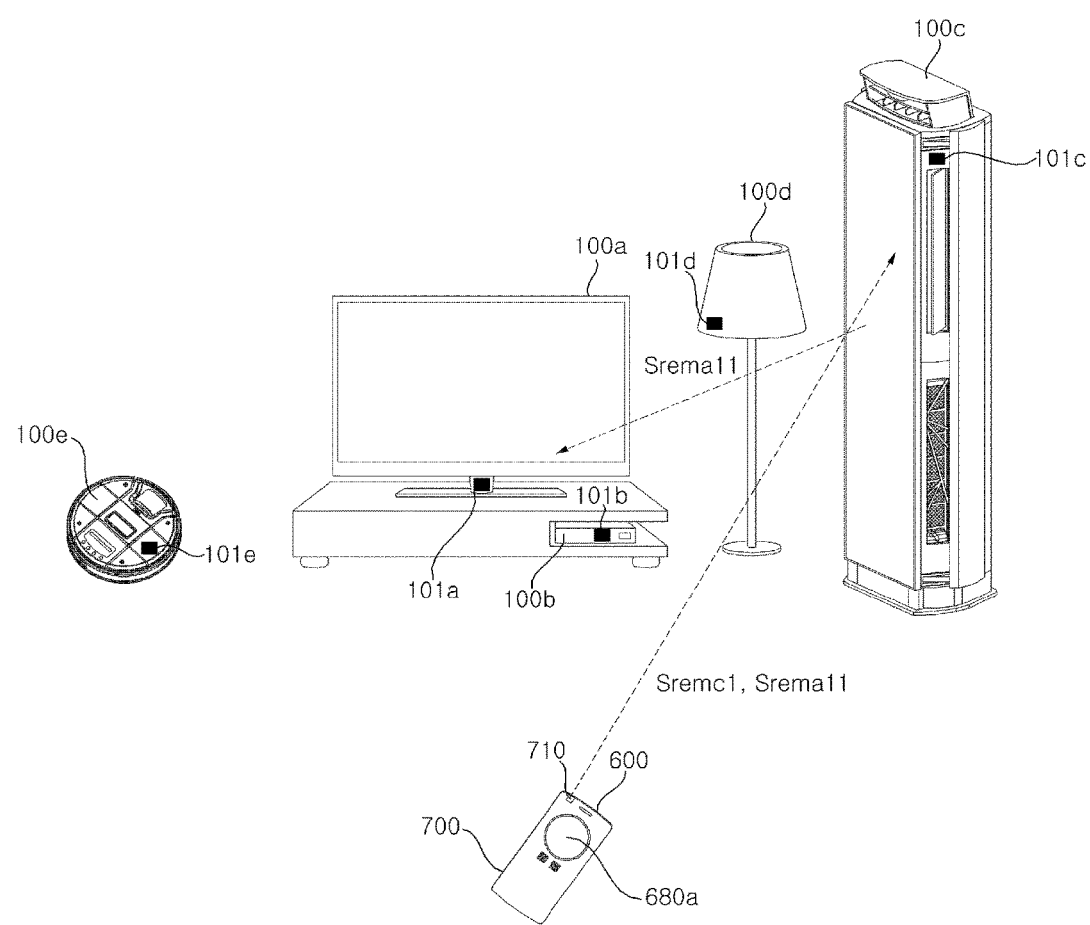

In this case, the air conditioner 100c may transmit a power-on signal, which is the second remote control signal Srema11, to the image display apparatus 100a, as shown in FIG. 20D.

That is, according to selection of the multi-device operation item 204, the directed device may receive a predetermined remote control signal and transmit the remote control signal corresponding to the multi-device operation item 204 to another device.

Figure 21A:
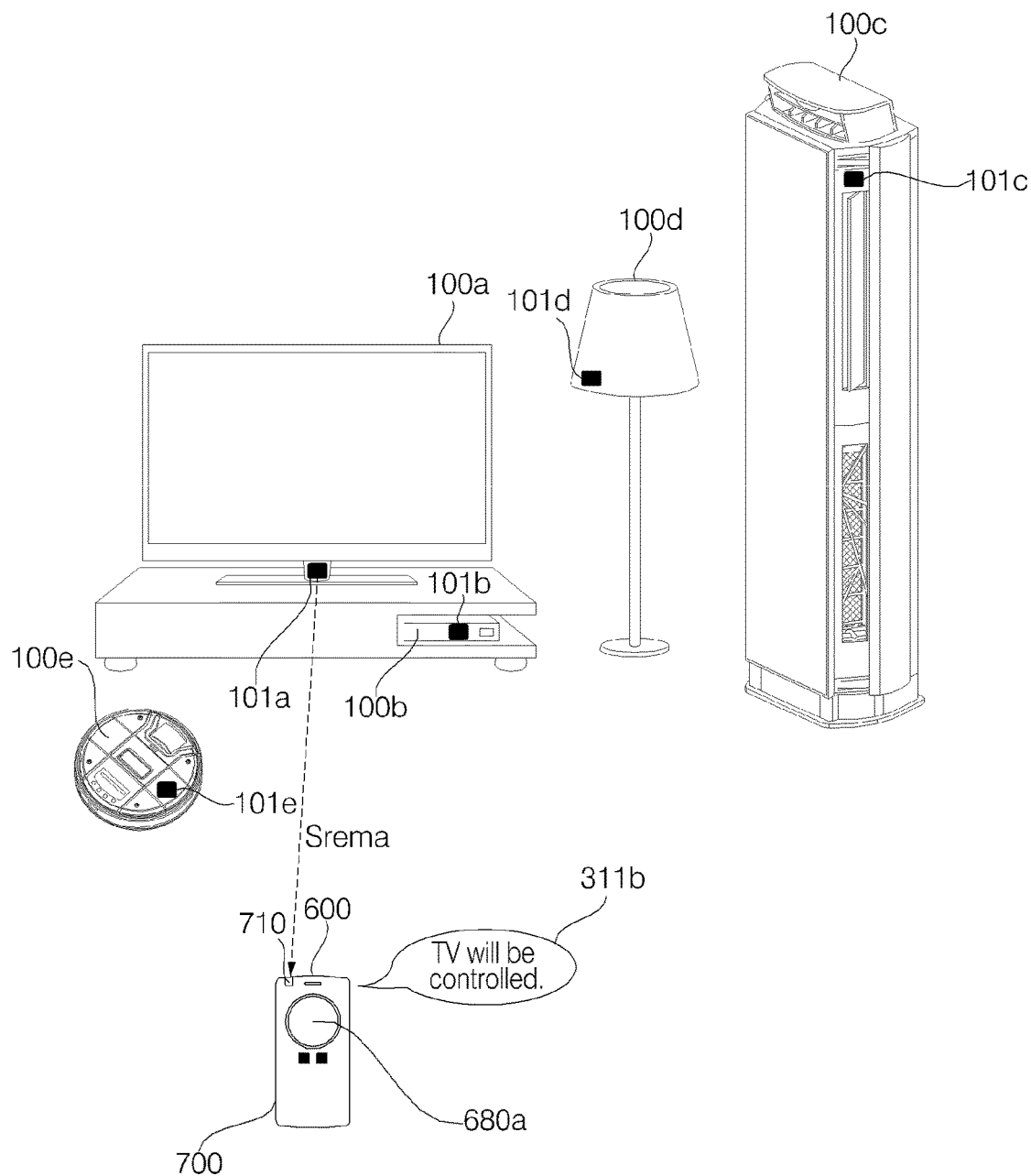

FIG. 21A illustrates a case where the mobile terminal 600 is directed at the image display apparatus 100a among the various devices 100a, 100b, 100c, 100d, and 100e in the house.

The mobile terminal 600 receives an ID signal Sida from the transmission apparatus 101a corresponding to the image display apparatus 100a. Then, the mobile terminal may detect the ID signal Sida from at least one ID signal including the ID signal Sida, recognize or identify, based on the detected ID signal Sida, that the remotely controllable device is the image display apparatus 100a, and control a remote control object for the image display apparatus 100a to be displayed.

Figure 21B:
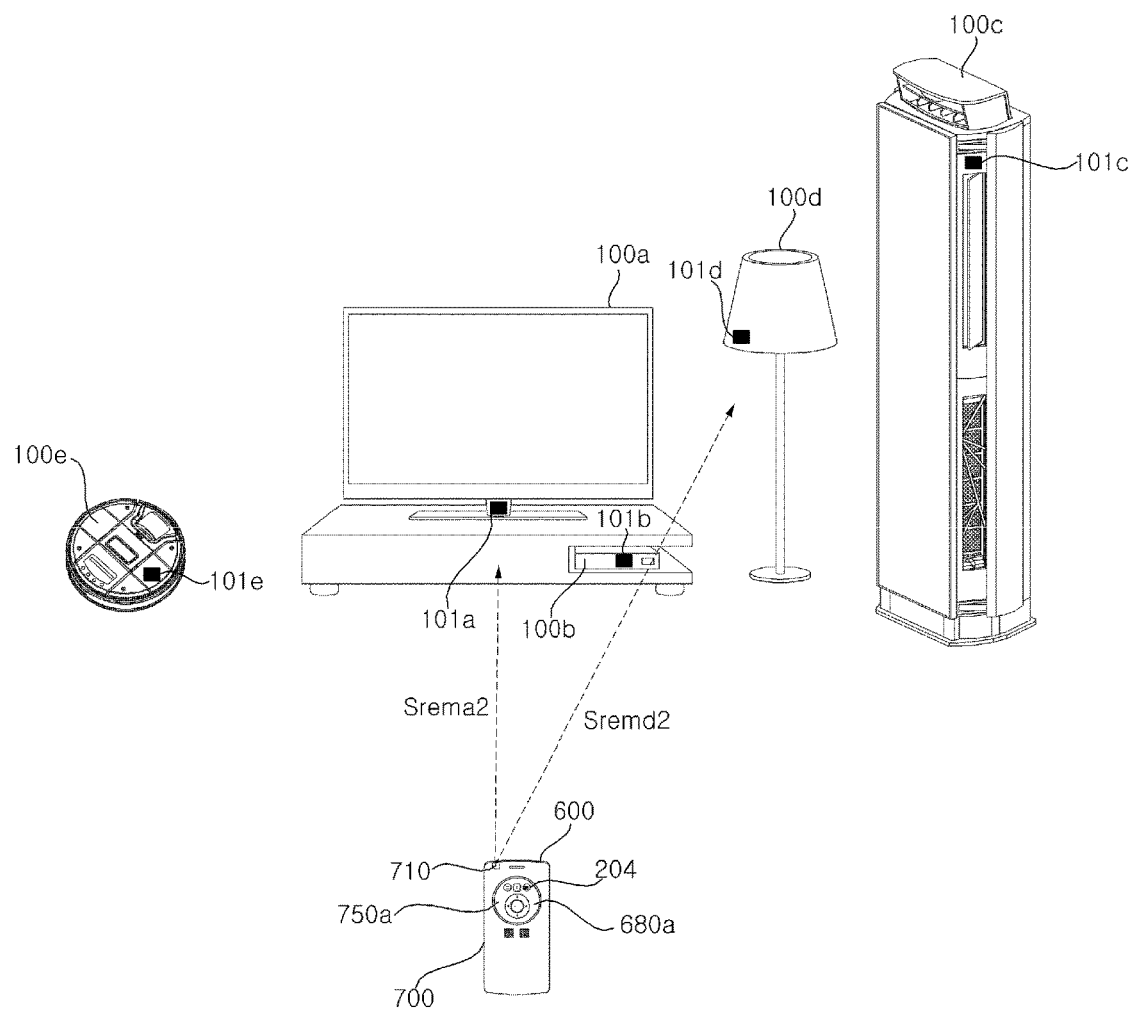

Next, FIG. 21B illustrates a case where the multi-device operation item 204 is selected in the remote control object of the mobile terminal 600.

The power-on function of the image display apparatus 100a and the power-on function of the lighting device 100d may be set in the multi-device operation item 204 when the mobile terminal 600 is set to remotely control the image display apparatus 100a.

That is, according to selection of the multi-device operation item 204, the mobile terminal 600 may transmit a first remote control signal Srema2, which is a power-on signal, to the image display apparatus 100a, and transmit a second remote control signal Sremd2, which is a power-on signal to the lighting device 100d.

Figure 21C:
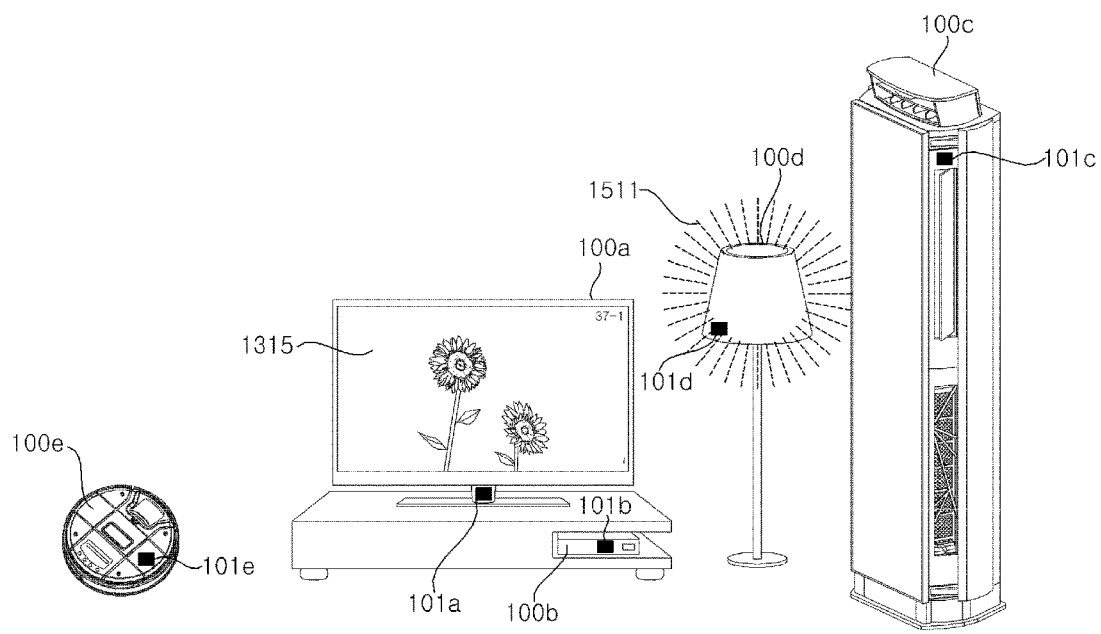

Accordingly, as shown in FIG. 21C, the image display apparatus 100a may be turned on to display a predetermined image 1315 according to selection of the multi-device operation item 204, and the lighting device 100d may be turned on to output light 1511 of a first color.

Figure 22C:
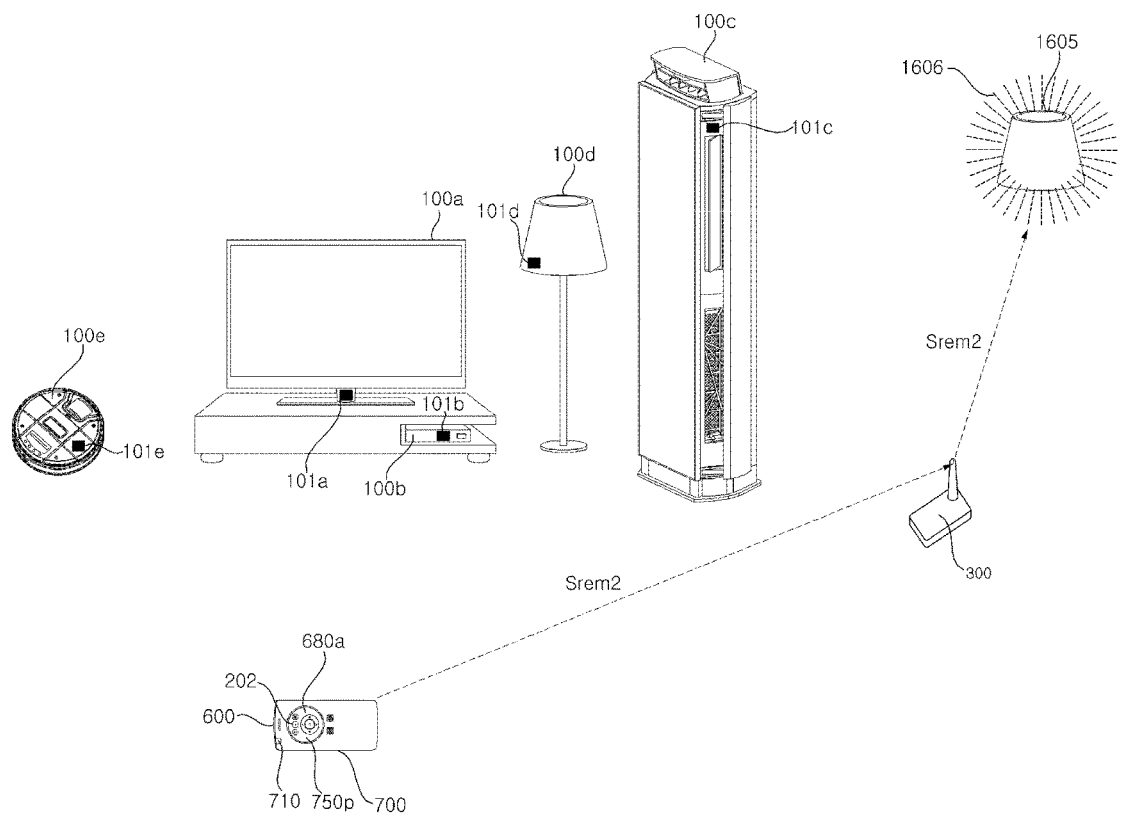

FIGS. 22A to 22C illustrate a method of remotely controlling a device corresponding to a user's voice when the user's voice is received through a microphone.

FIG. 22A illustrates a case where sound 1611 indicating a specific device such as "Room lighting of 2nd floor" is received while the mobile terminal 600 is not directed at any of the devices 100a, 100b, 100c, 100d, and 100r in front thereof.

The microphone 623 of the mobile terminal 600 may acquire a user voice including predetermined device information and the controller 670 may perform signal processing on the acquired user voice to extract device information from the voice, and perform a control operation to display an object for remote control of the device corresponding to the device information.

In other words, the controller 670 may perform signal processing on the user voice through a speech recognition algorithm, thereby recognizing sound such as "Room lighting of 2nd floor".

When a remote control object is set for a device (not shown) for room lighting of the second floor, and display of the remote control object is completed, a second floor room lighting control enable message 1612 such as "Room lighting of 2nd floor will be controlled." may be output in the form of sound. Thereby, the user may recognize that room lighting of the second floor can be controlled.

Next, FIG. 22C illustrates a case where a power item 202 is selected in the remote control object of the mobile terminal 600.

The controller 670 outputs a remote control signal Srem2 for turning on a lighting device for lighting of a room on the second floor to an AP device 300 according to selection of the power source item 202. Then, the AP device 300 may transmit the remote control signal Srem2 to the second floor room lighting device 1605 which is connected to the wireless network.

As a result, the second floor room lighting device 1605 may be turned on to output light 1606 of a predetermined color.

The controller 670 may set a remote control signal output based on reception of the IR signal at the time of selecting an item set for remote control of a device to be different from a remote control signal output based on speech recognition at the time of selecting an item set for remote control of the device.

In other words, the controller 670 may control the transmission unit 421 such that a remote control signal that is set to be output upon selection of an item set for device remote control is output based on the IR signal, and may control the transmission unit 421 such that a remote control signal that is set to be output based on speech recognition upon selection of an item set for device remote control is output based on various communication protocols.

In outputting an IR-based remote control signal, the controller 670 may control an IR-based remote control signal of a different pattern to be output to control a specific device.

The mobile terminal 600 may perform remote control using various input methods such as speech recognition and gesture in addition to the remote control object to remotely control a specific device.

For example, when the mobile terminal 600 is directed at the specific device, the mobile terminal 600 may receive an ID signal through the reception unit 423 and display a remote control object for controlling the device to allow remote control of device. When a user voice is acquired through the microphone 623 in this state, the mobile terminal 600 may control a remote control signal corresponding to the user voice to be transmitted to the device.

Alternatively, if the controller 670 of the mobile terminal 600 acquires user voice through the microphone 623 within a predetermined period of time while device identification is completed or a remote control object for remote control of the device is displayed, the controller may control a remote control signal corresponding to the user voice to the device to be transmitted to the device.

Specifically, if the user voice is acquired through the microphone 623 within a predetermined time while the first device is remotely controllable, the controller 670 of the mobile terminal 600 may control a remote control signal corresponding to the user voice to be transmitted to the device. This operation is described below with reference to FIGS. 23A to 23C.

Figure 23A:
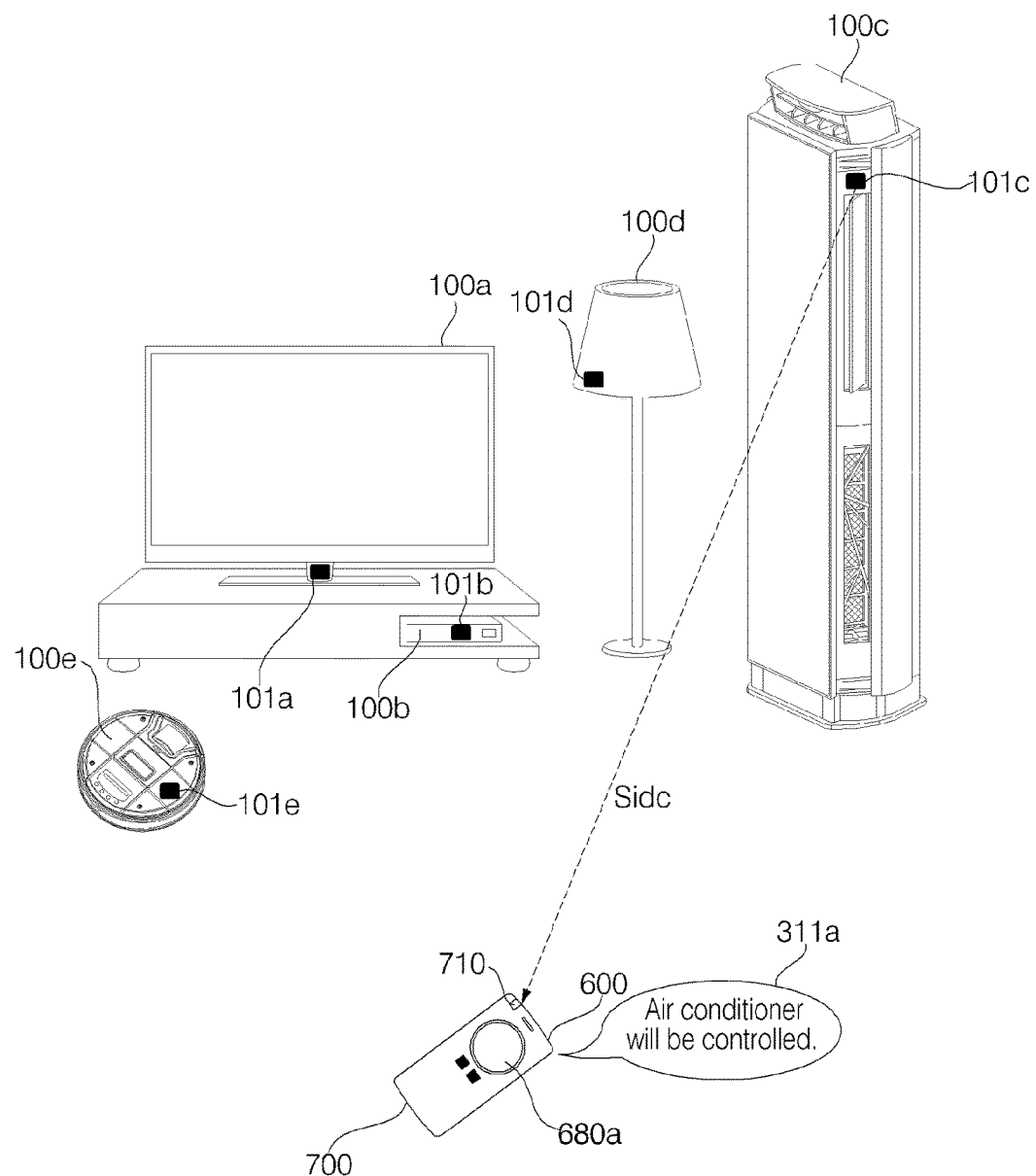

FIG. 23A illustrates a case where the mobile terminal 600 can remotely control the air conditioner 100c among the various devices 100a, 100b, 100c, 100d, and 100e in the house, as in the case of FIG. 20A.

Figure 23B:
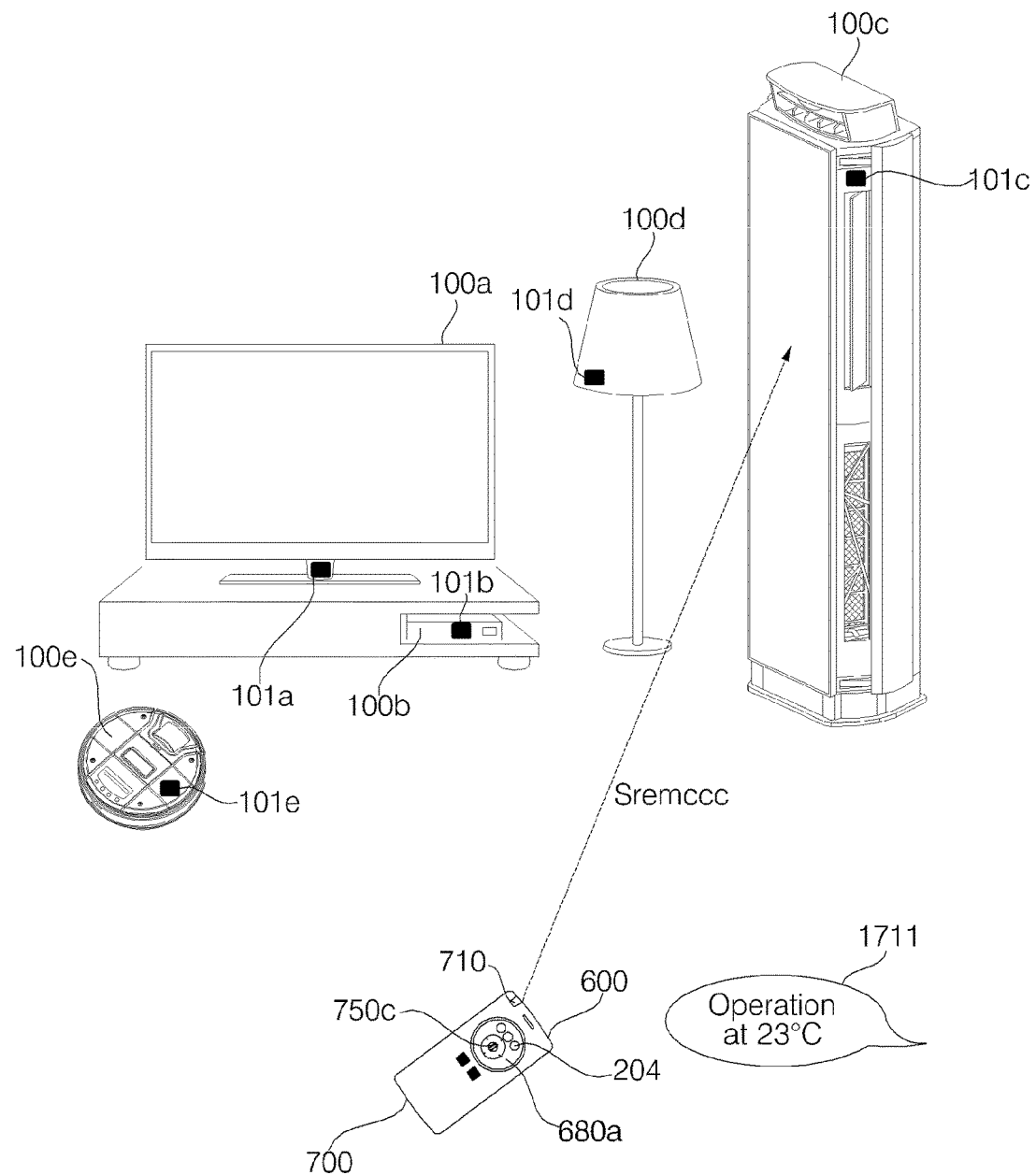

Next, FIG. 23B illustrates a case where there is a user voice, such "Operation at 23° C.".

The microphone 623 of the mobile terminal 600 recognizes a user voice 1711 such as "Operation at 23° C.", and the controller 670 performs signal processing on the acquired user voice.

The controller 670 may control a remote control signal Sremcc corresponding to "Operation at 23° C." 1711 to be output after speech recognition signal processing.

Accordingly, as shown in FIG. 23C, the air conditioner 100c may operate with the target temperature set to 23° C. In the figure, cold wind 1104 is output according to the operation.

As described above, after the mobile terminal is allowed to remotely control a specific device, it can easily perform remote control of the device through the user voice rather than selecting a predetermined item in the remote control object.

When the mobile terminal 600 receives an ID signal Sid from the device, the controller 670 of the mobile terminal 600 detect the ID signal Sid from the at least one ID signal including the ID signal Sid. When detection of the ID signal Sid is completed, the controller may control an ID signal detection complete message to be output.

Figure 24A:
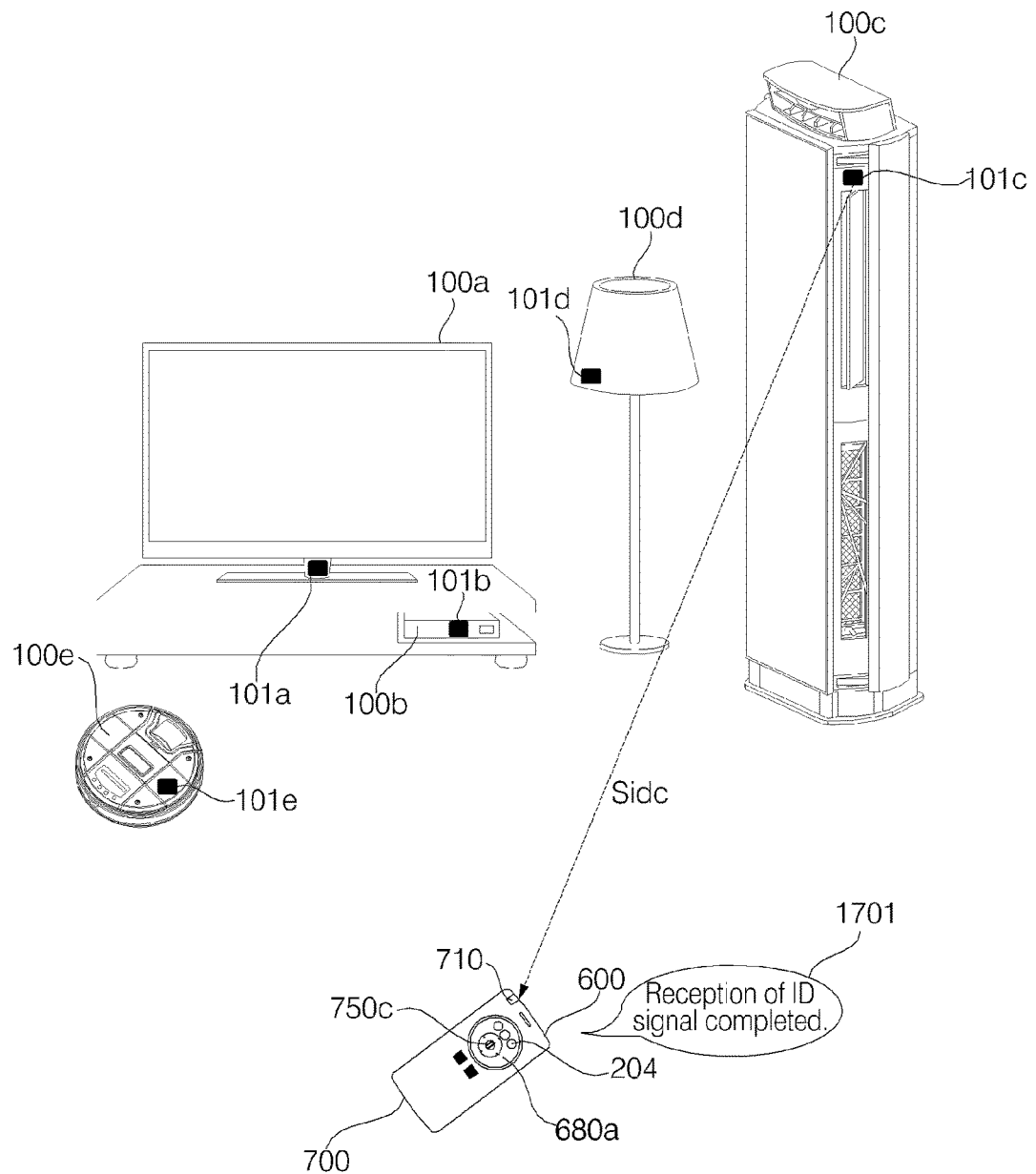

FIG. 24A illustrates a case where an ID signal detection complete message 1701 is output in the form of sound.

The controller 670 of the mobile terminal 600 may perform device recognition or identification based on the detected device ID signal Sidc. Then, it may control a control command to be matched with at least one of the remote control objects to allow remote control of the recognized or identified device.

The controller 670 of the mobile terminal 600 may a control operation to output a message 1702 indicating that item setting is being performed or is to be performed in the remote control object.

FIG. 24B illustrates a case where the message 1702 indicating that item setting is being performed or is to be performed in the remote control object is output in the form of sound after the device ID signal Sidc.

Once a remote control object is displayed for remote control of the device, the controller 670 of the mobile terminal 600 may perform a control operation to output a control enable message 1703 as shown in FIG. 24C. In the figure, an air conditioner control enable message 1703 is output in the form of sound.

Figure 24D:
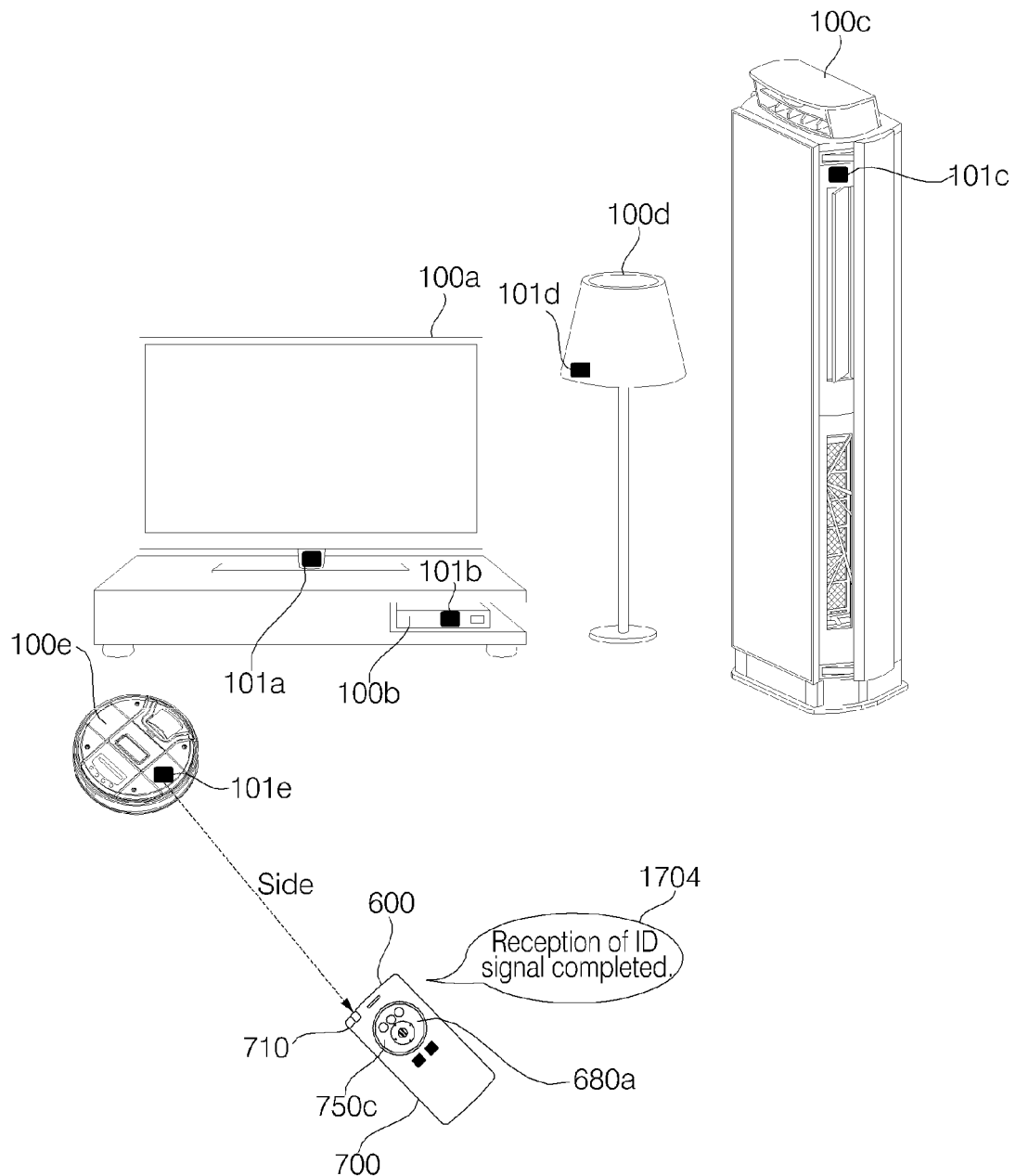

FIG. 24D illustrates a case where an ID signal detection complete message 1704 is output in the form of sound.

The controller 670 of the mobile terminal 600 may perform device recognition or identification based on a detected device ID signal Side. Then, it may control a control command to be matched with at least one of the remote control objects to allow remote control of the recognized or identified device.

The controller 670 of the mobile terminal 600 may a control operation to output a message 1702 indicating that item setting is being performed or is to be performed in the remote control object.

Figure 24E:
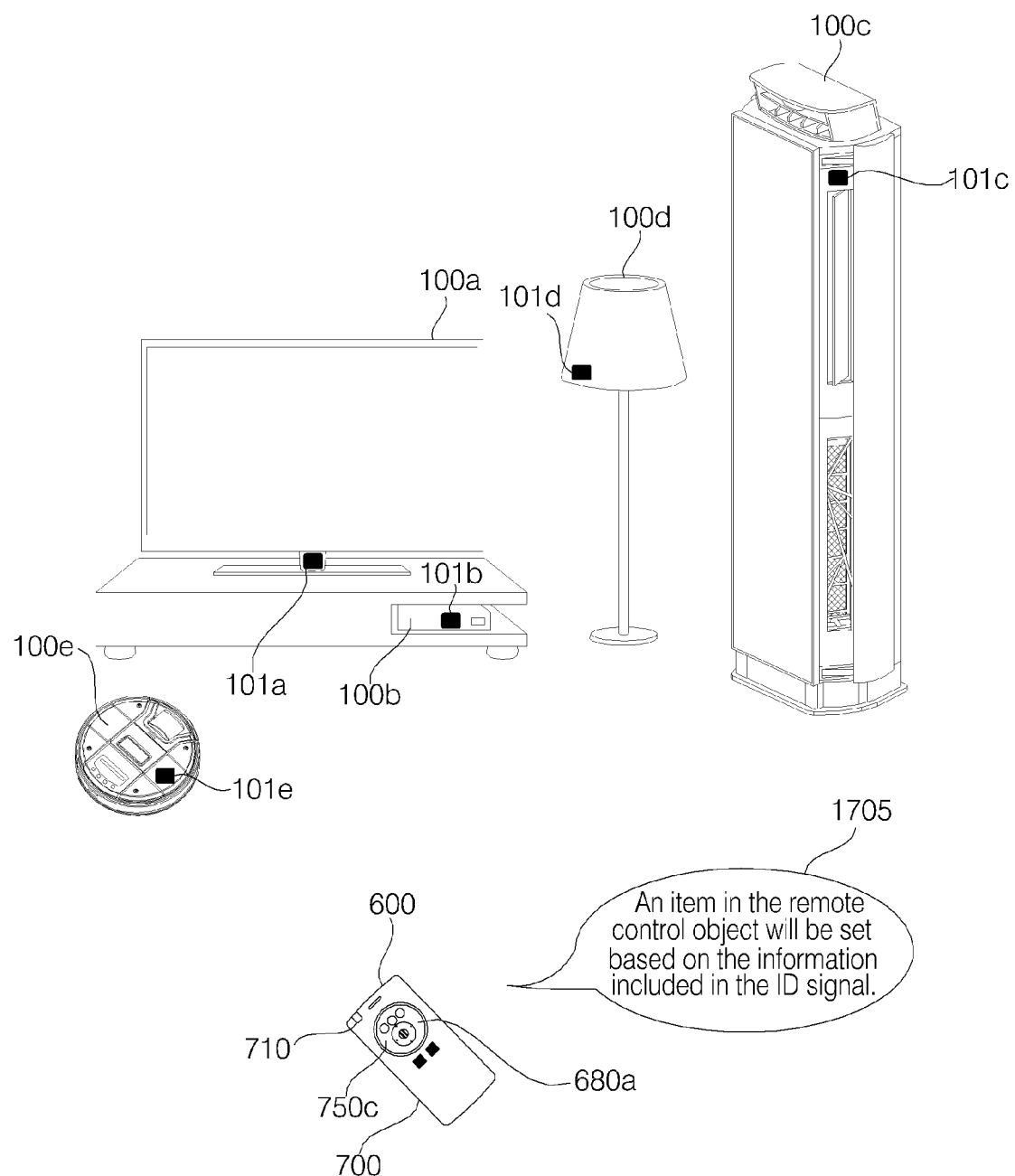

FIG. 24E illustrates a case where the message 1705 indicating that item setting is being performed or is to be performed in the remote control object is output in the form of sound after the device ID signal Side.

Figure 24F:
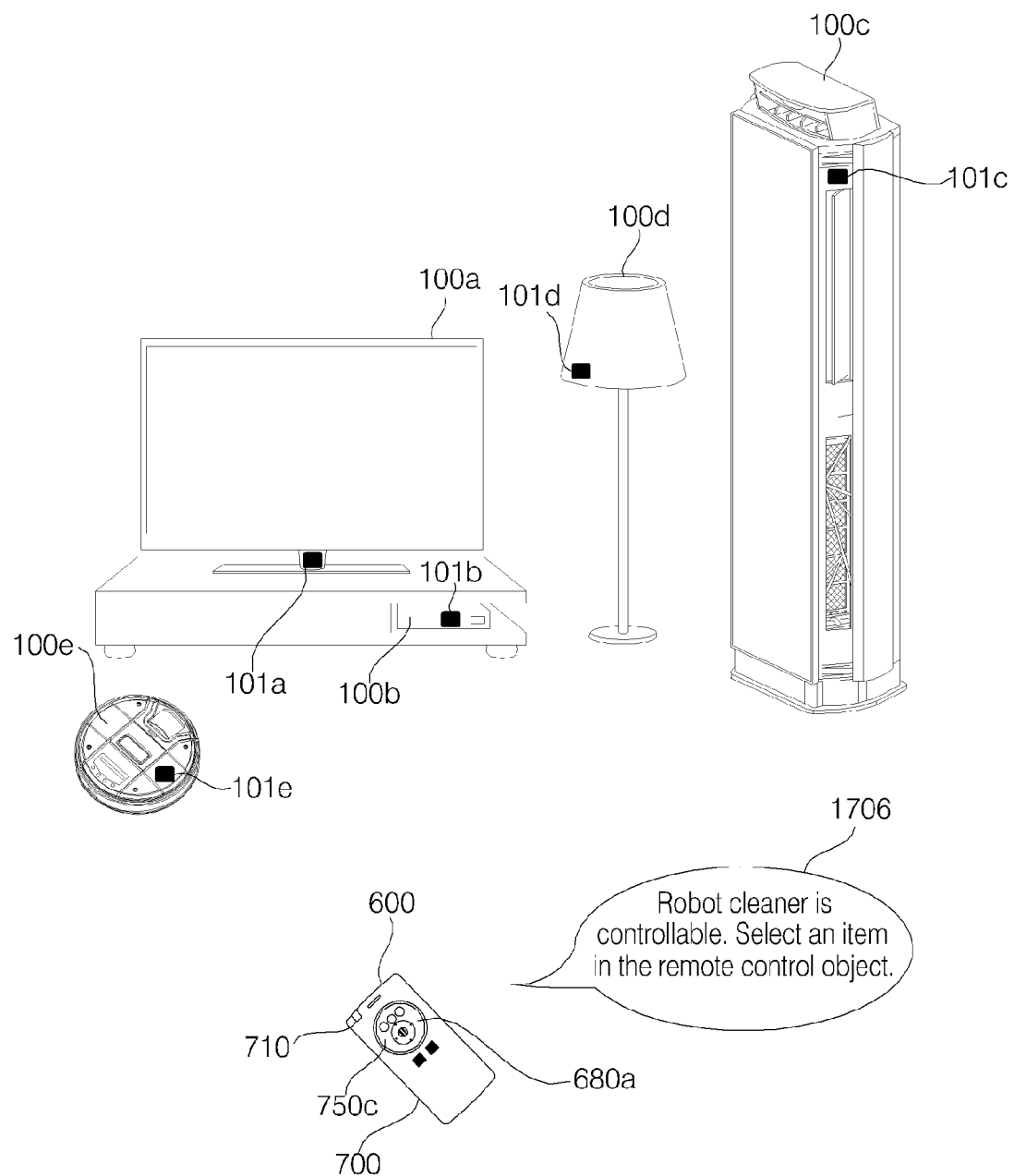

Once a remote control object is displayed for remote control of the device, the controller 670 of the mobile terminal 600 may perform a control operation to output a control enable message 1703 as shown in FIG. 24F. In the figure, a robot cleaner control enable message 1706 is output in the form of sound.

The controller 670 may control a first item in the remote control object to be matched with a plurality of control commands, and control a remote control signal corresponding to a corresponding control command among the plurality of control commands to be transmitted to the device according to the number of times of selection of the first item, a time for selection of the first item, a gesture made in selecting the first item, or a user voice input in selecting the first item. Details are described below with reference to FIGS. 25A to 25D.

Figure 25A:
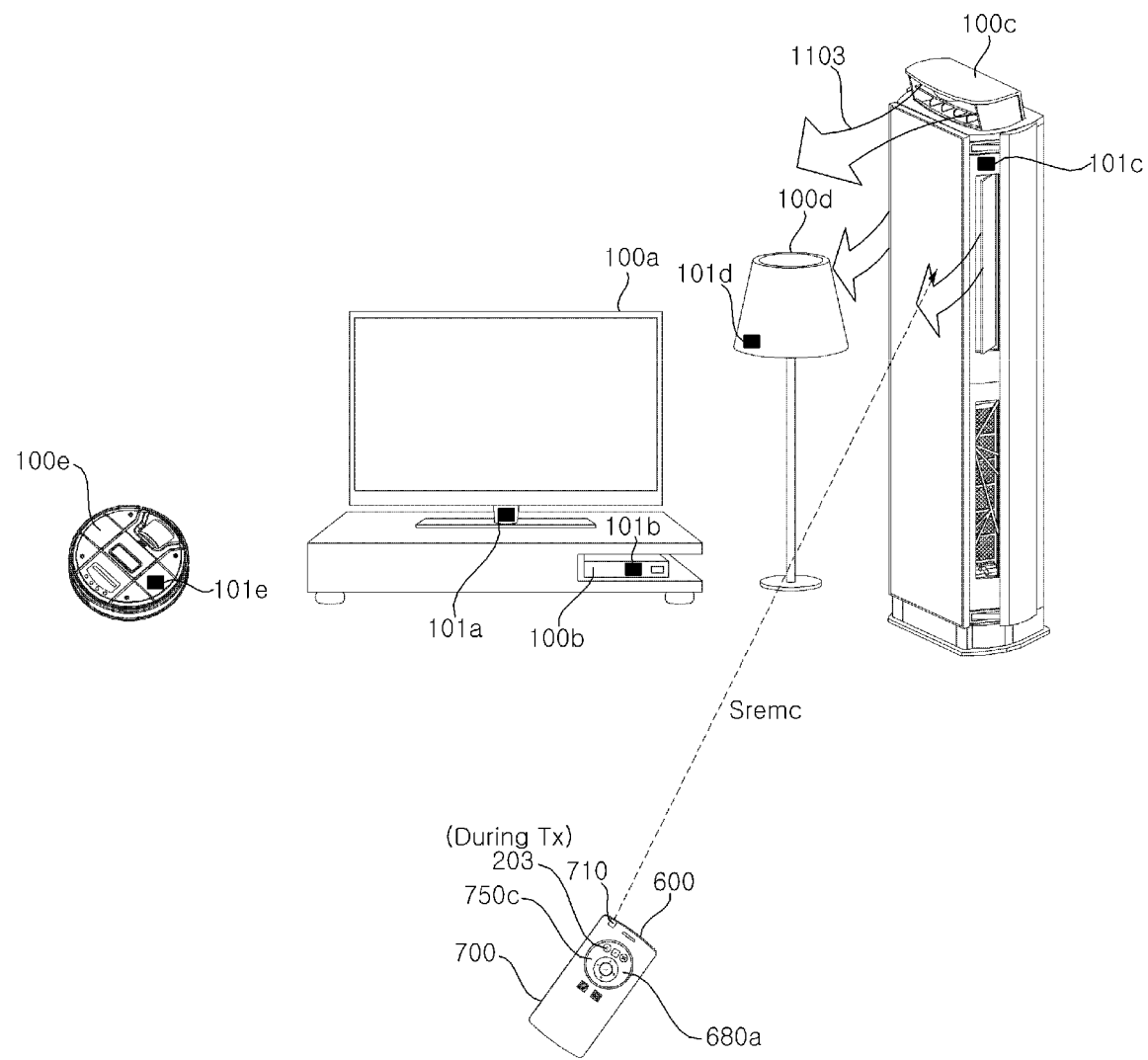
Figure 24F:
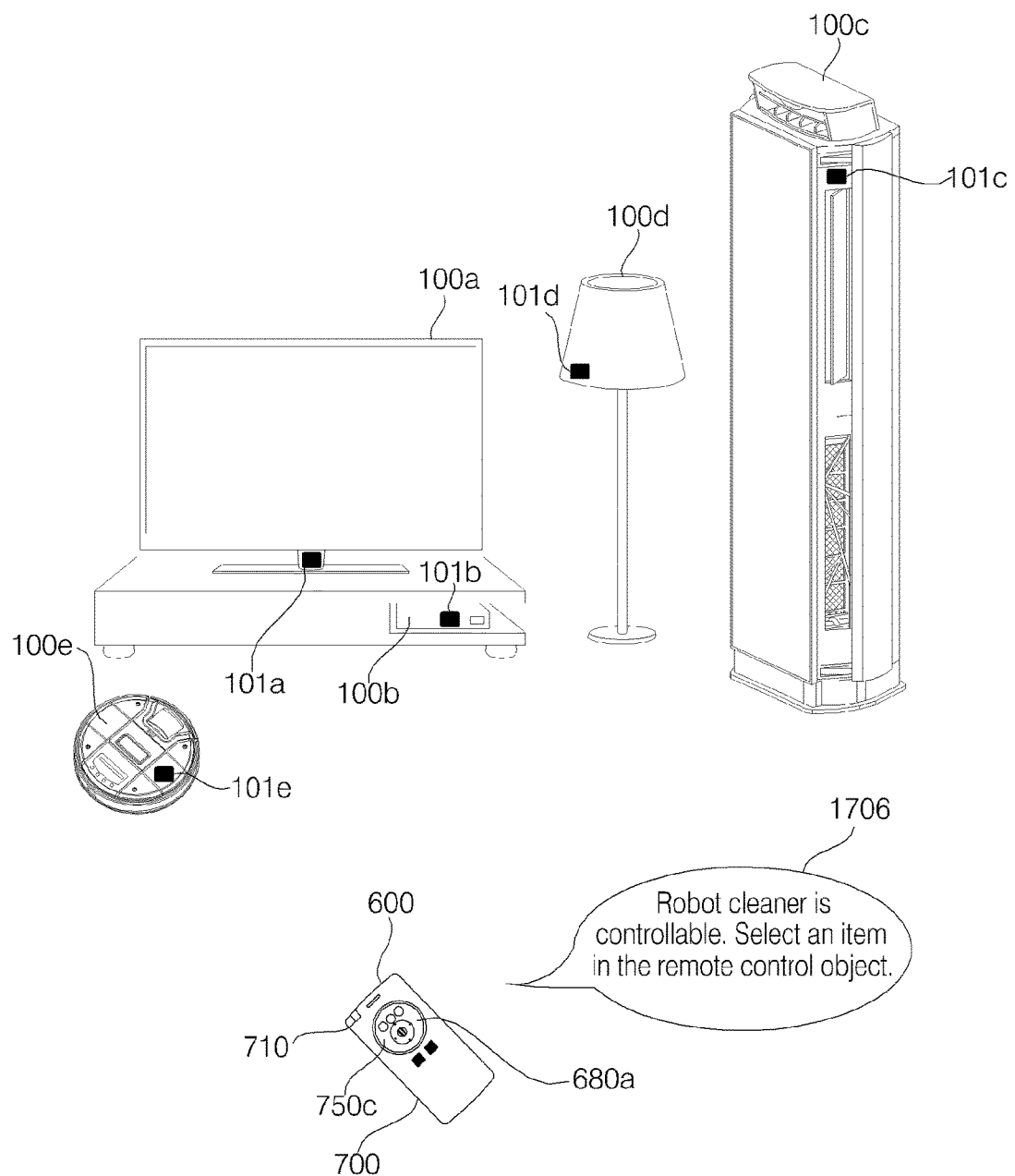

FIG. 25A illustrates that, when a menu item 203 remains pressed for a period Tx while the mobile terminal 600 is allowed to remotely control the air conditioner 100c, the menu item 203 is matched with a wind strength setting command, and the wind strength setting is performed on the air conditioner 100c. The figure illustrates that cold wind 1103 corresponding to the set wind strength is output.

Figure 25C:
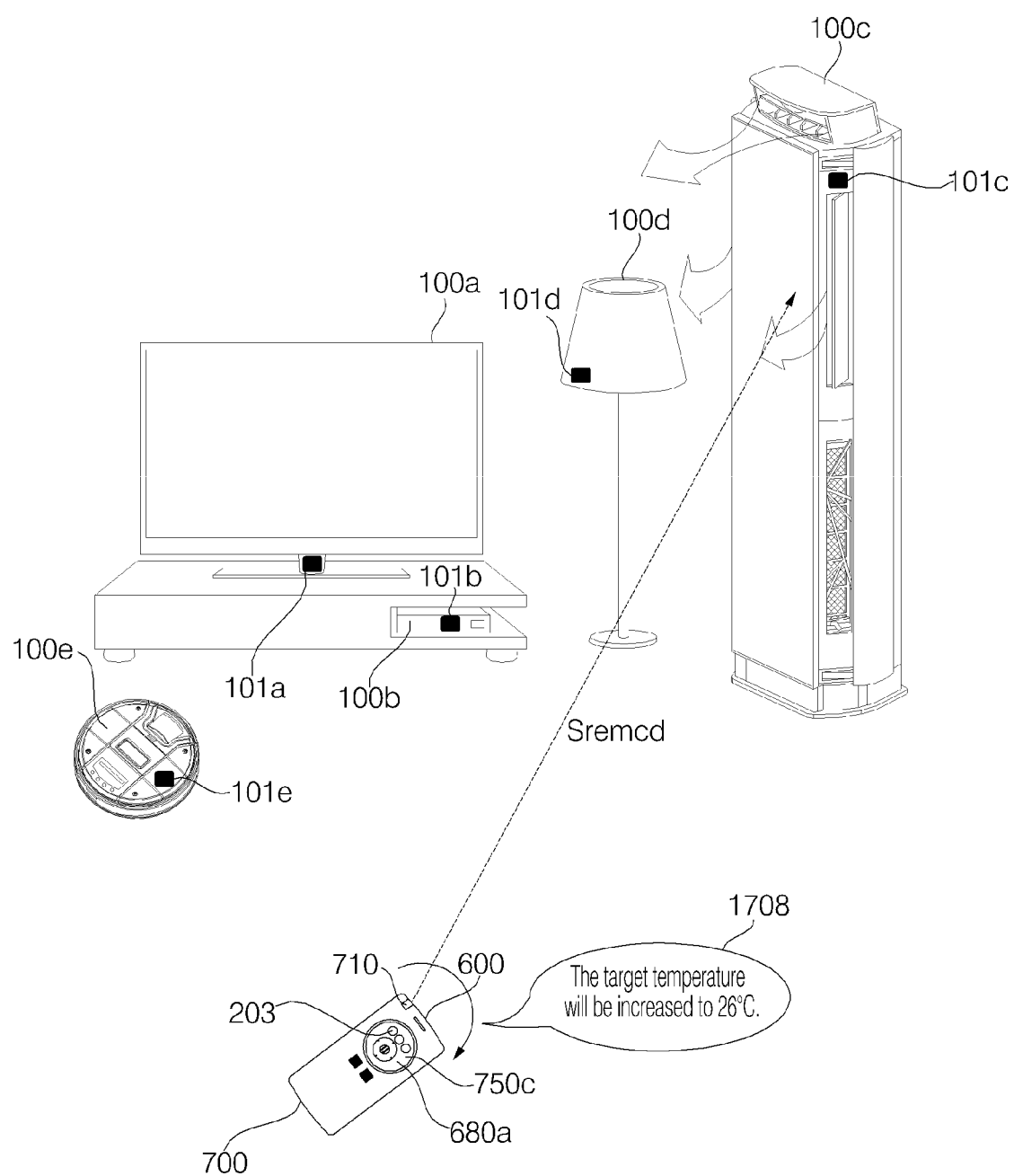
Figure 25B:
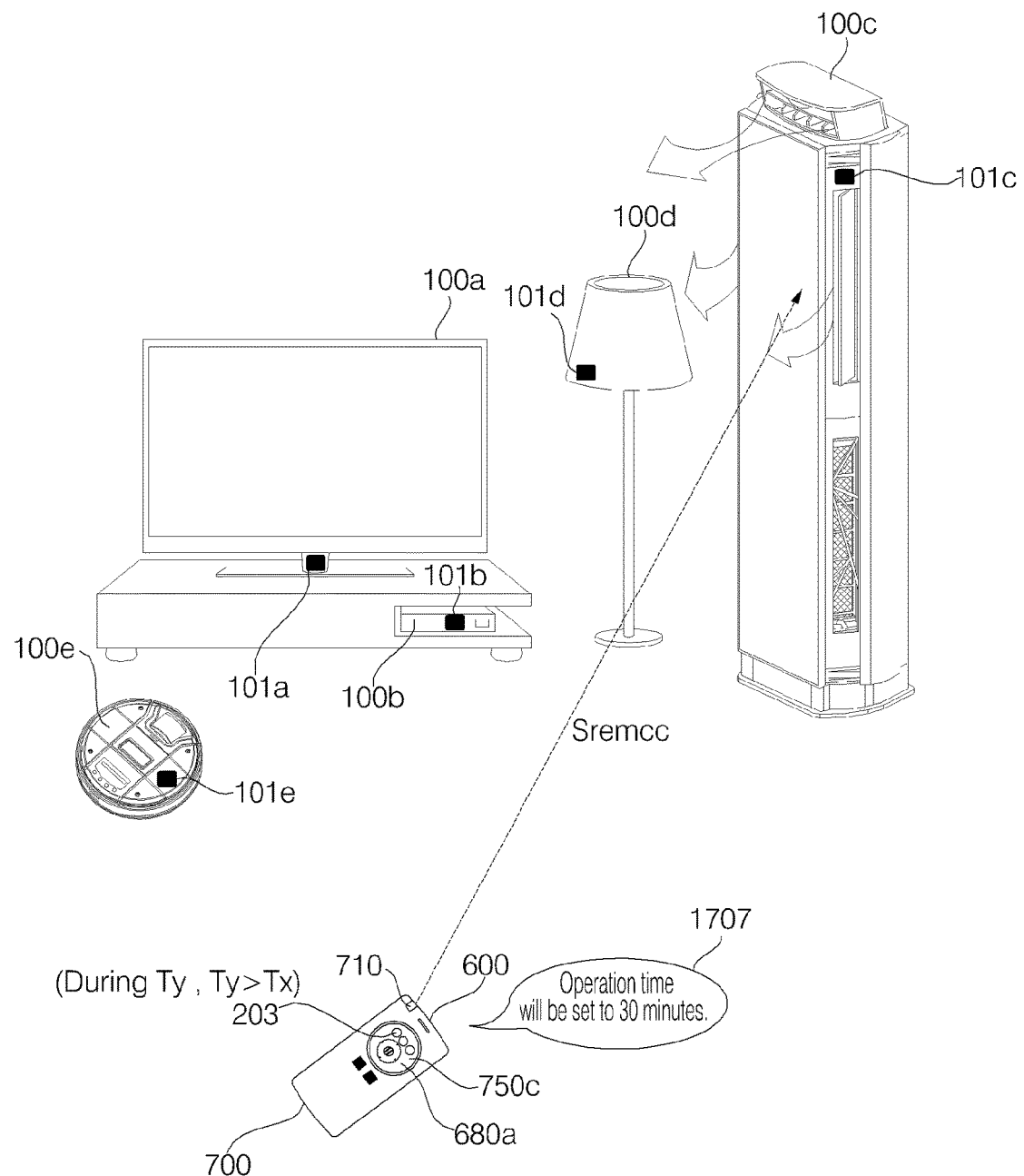

Next, FIG. 25B illustrates that, when the menu item 203 remains pressed for a period Ty longer than the period Tx while the mobile terminal 600 is allowed to remotely control the air conditioner 100c, the menu item 203 is matched with an operation time setting command and the operation time setting is performed on the air conditioner 100c according to selection of the menu item 203.

If the menu item 203 remains pressed for a long time such as the period Ty, the controller 670 of the mobile terminal 600 may controls the menu item 203 to be matched with an air conditioner operation time setting command and control an operation time setting message 1707 to be output.

Next, FIG. 25C illustrates that the menu item 203 is selected and the mobile terminal 600 rotates clockwise while the mobile terminal 600 is allowed to remotely control the air conditioner 100c.

The controller 670 of the mobile terminal 600 may extract motion of the mobile terminal 600 based on the motion sensor 645 such as a gyro sensor or an acceleration sensor and match the motion with a control command corresponding to the motion.

In the figure, it is illustrated that a clockwise movement of the mobile terminal 600 is matched with a control command corresponding to increase of the target temperature.

The controller 670 of the mobile terminal 600 may control a control command corresponding to increase of the target temperature to be matched with clockwise movement of the mobile terminal 600 and control a target temperature increase message 1708 to be output in the form of sound.

Figure 25D:
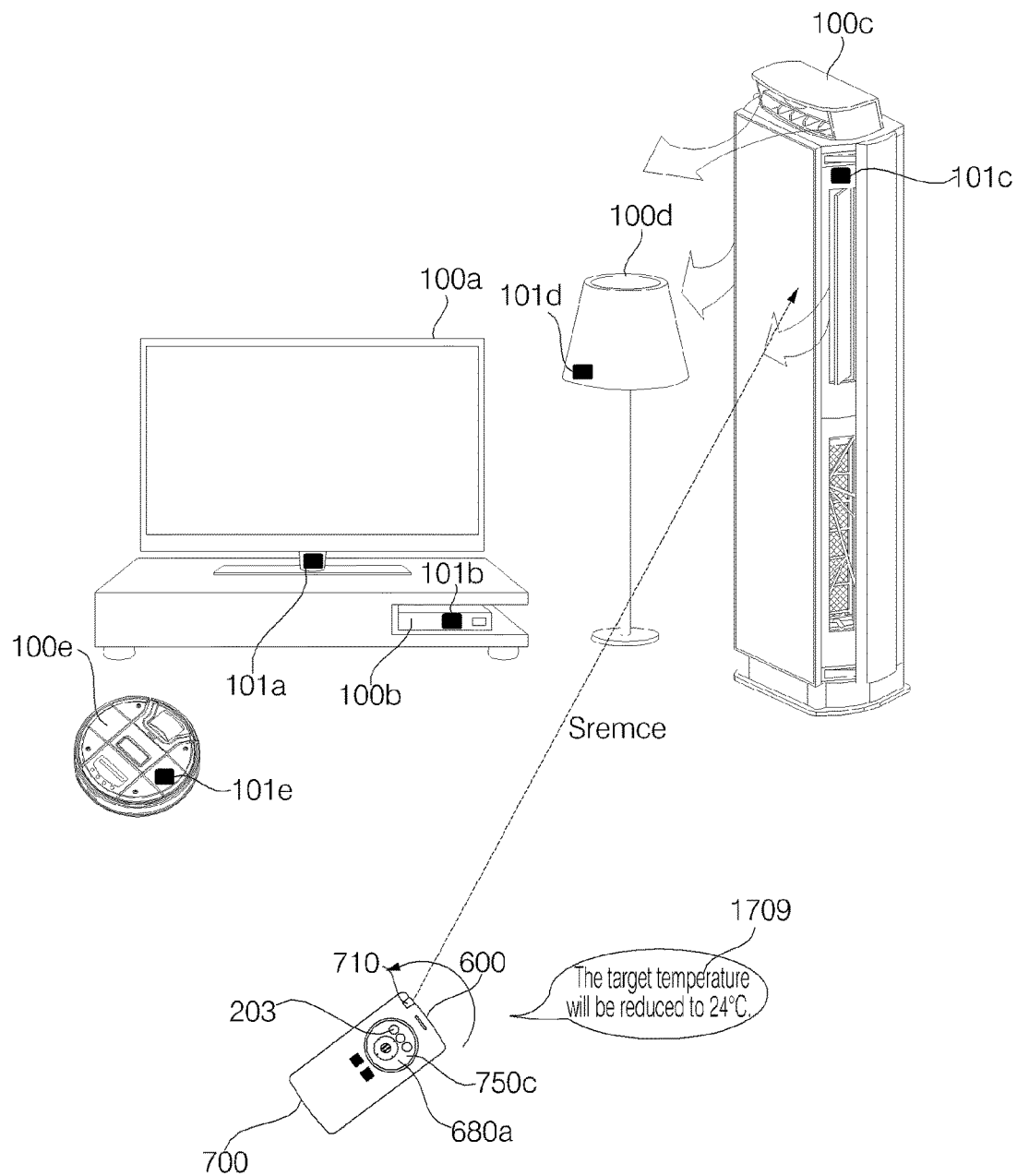

Unlike FIG. 25C, FIG. 25D illustrates a case where a control command corresponding to decrease of the target temperature is matched with counterclockwise movement of the mobile terminal 600.

The controller 670 of the mobile terminal 600 may control the control command corresponding to decrease of the target temperature to be matched with counterclockwise movement of the mobile terminal 600 and control a target temperature decrease message 1709 to be output in the form of sound.

When the mobile terminal 600 receives an ID signal Sid from the device, the controller 670 of the mobile terminal 600 detect the ID signal Sid from the at least one ID signal including the ID signal Sid. When detection of the ID signal Sid is completed, the controller may control an ID signal detection complete message to be output.

Figure 26A:
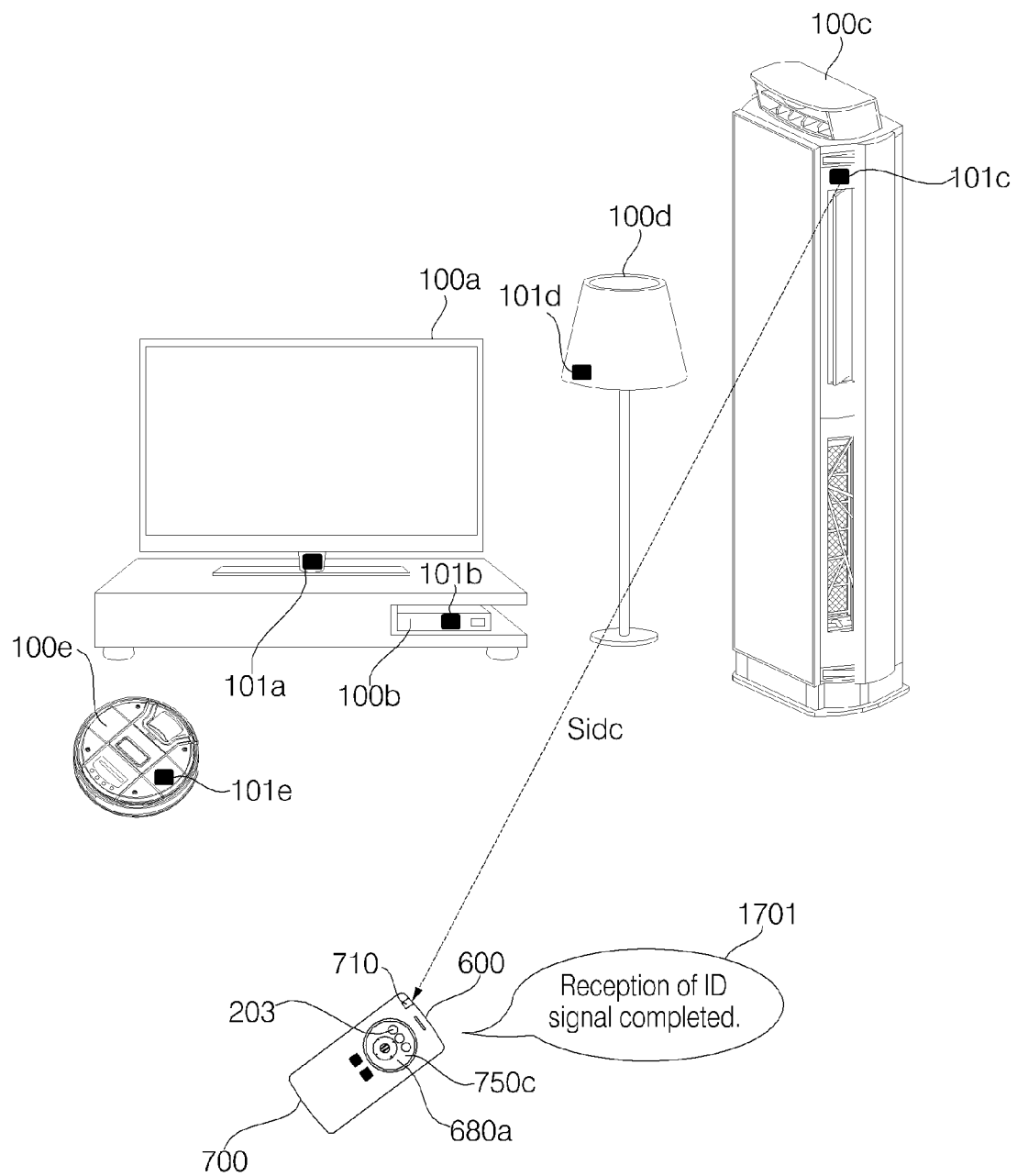

FIG. 26A illustrates a case where an ID signal detection complete message 1701 is output in the form of sound.

The mobile terminal 600 may include a camera 621 configured to capture an image. The controller 670 may perform user authentication based on the image captured by the camera 621. If user authentication is successful, the controller may perform a control operation to enable remote control of the device.

Figure 26C:
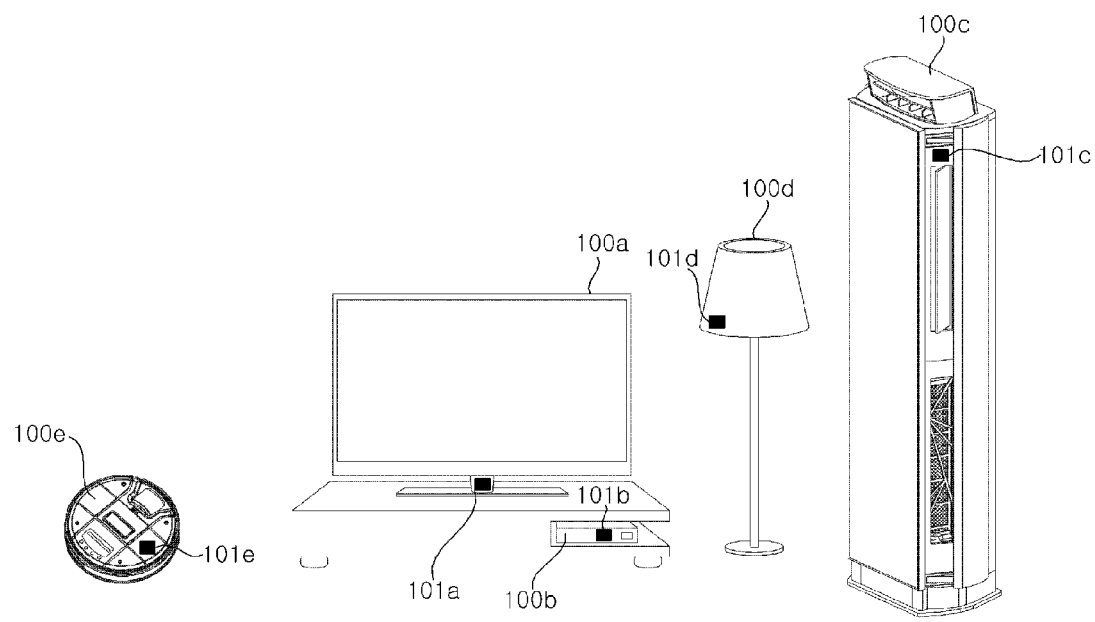
Figure 26B:
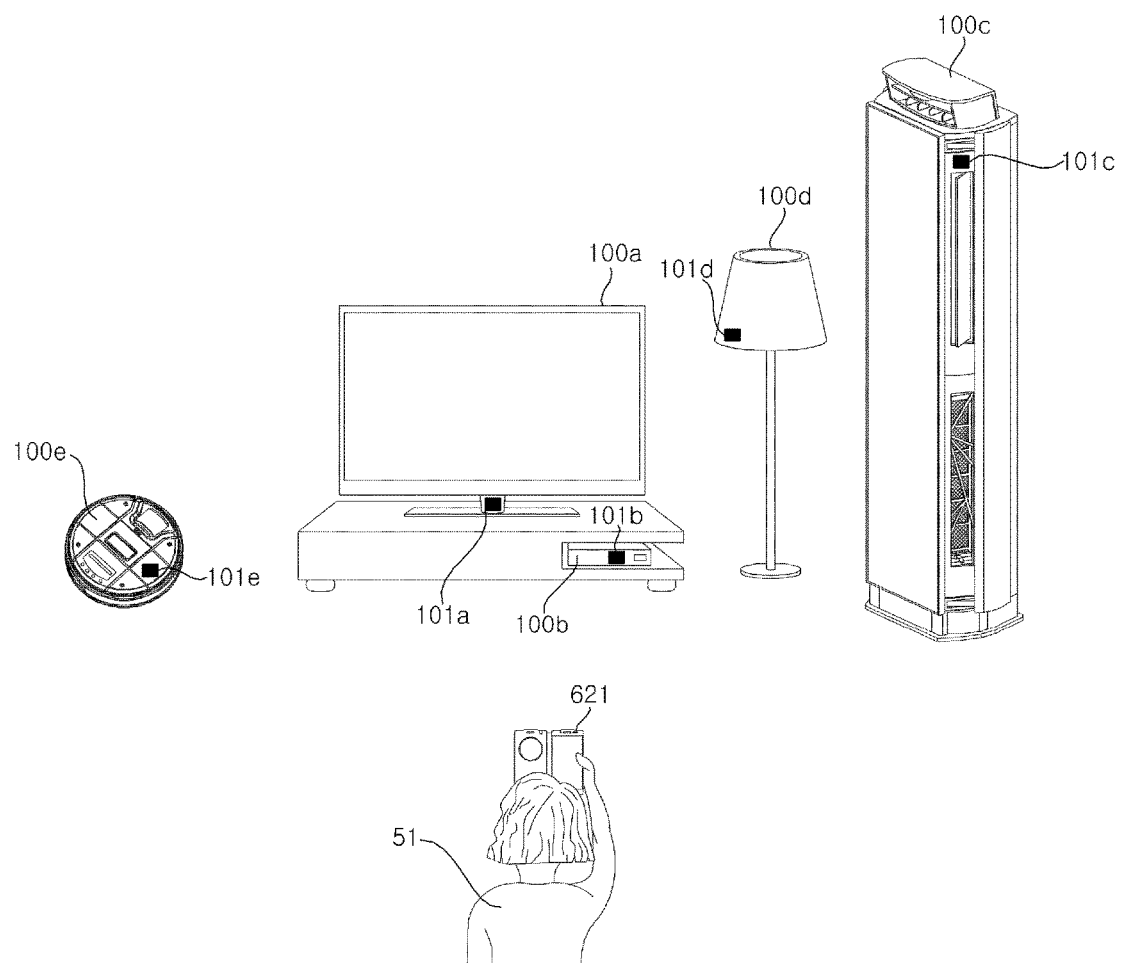
Figure 26C:
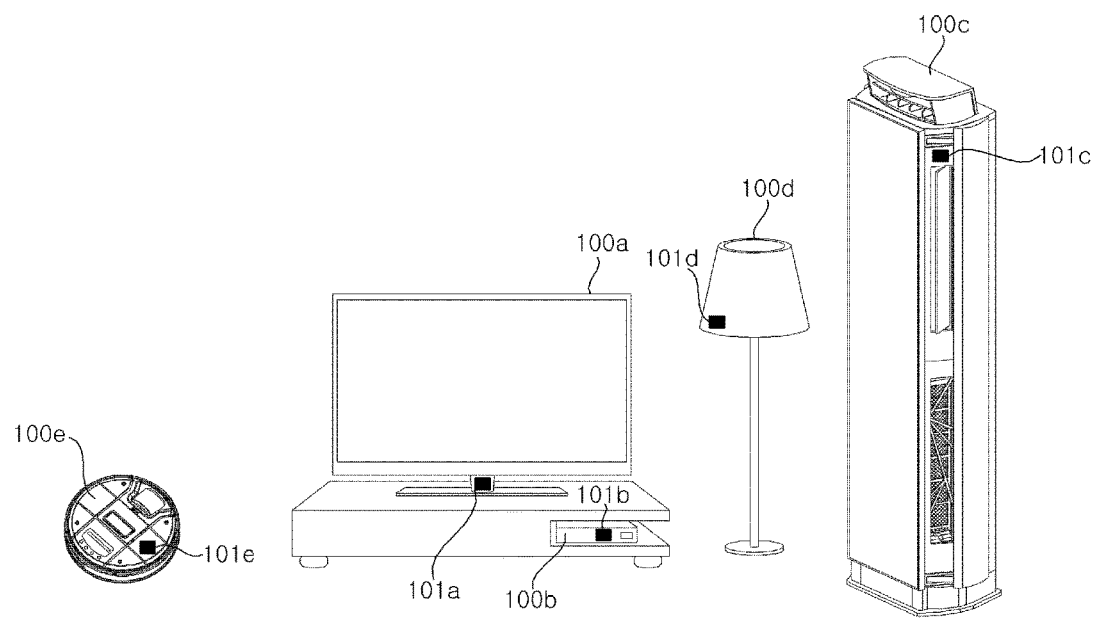

FIG. 26B illustrates a case where the camera 621 of the mobile terminal 600 is oriented at the face of a user 51.

The camera 621 may capture an image including the user's face and the controller 670 may perform user authentication based on the image captured by the camera 621.

For example, if a user face image is stored in the memory 660, the controller 670 may compare the image captured by the camera 621 with the user face image data stored in the memory 660.

FIG. 26C illustrates performing user authentication using a fingerprint recognition unit (not shown) of the mobile terminal 600.

When the user 51 places his finger 52 on the fingerprint recognition unit (not shown) of the mobile terminal 600, the fingerprint recognition unit (not shown) may capture the fingerprint of the finger 52.

The controller 670 may compare the captured fingerprint image data with fingerprint image data stored in the memory 660 to perform user authentication.

If the user authentication is successful, the controller 670 of the mobile terminal 600 may control a user authentication success message 1711 to be output in the form of sound as shown in FIG. 26D.

Alternatively, the controller 670 of the mobile terminal 600 may extract user information based on the image captured by the camera 621, and transmit the user information Suser to the device 100c at which the mobile terminal is directed. When user authentication verification information Sok is received from the device 100c, the controller may perform a control operation to enable remote control of the device.

In particular, upon receiving the user authentication verification information Sok from the device 100c, the controller 670 of the mobile terminal 600 may control the device to output an authentication complete message 1712 in the form of sound.

If the user authentication is successful, the controller 670 of the mobile terminal 600 may perform a control operation to enable remote control of the device, and may control, as shown in FIG. 26F, a device control execution message 1713 to be output for the authenticated user.

Figure 26G:
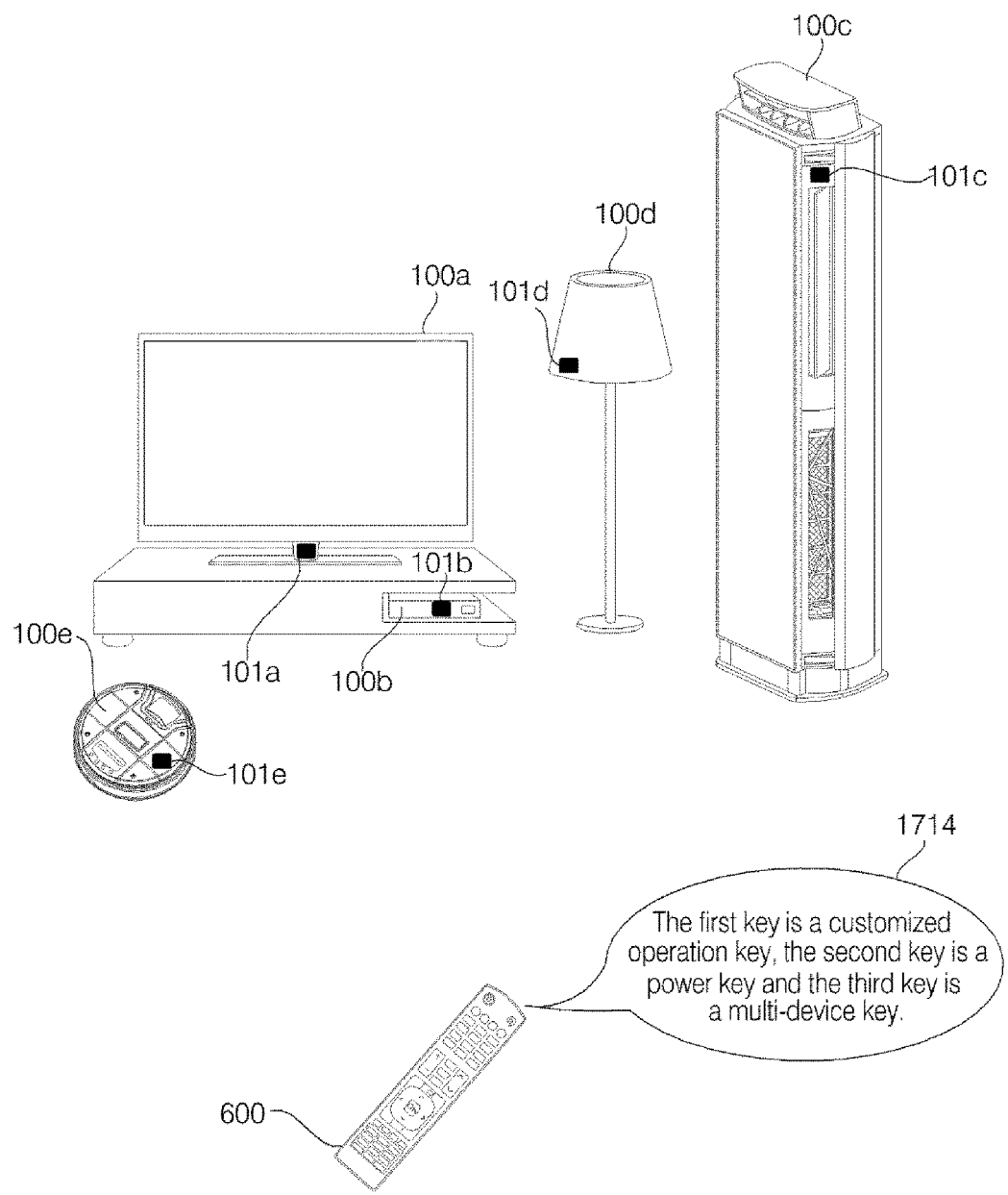
Figure 26G:
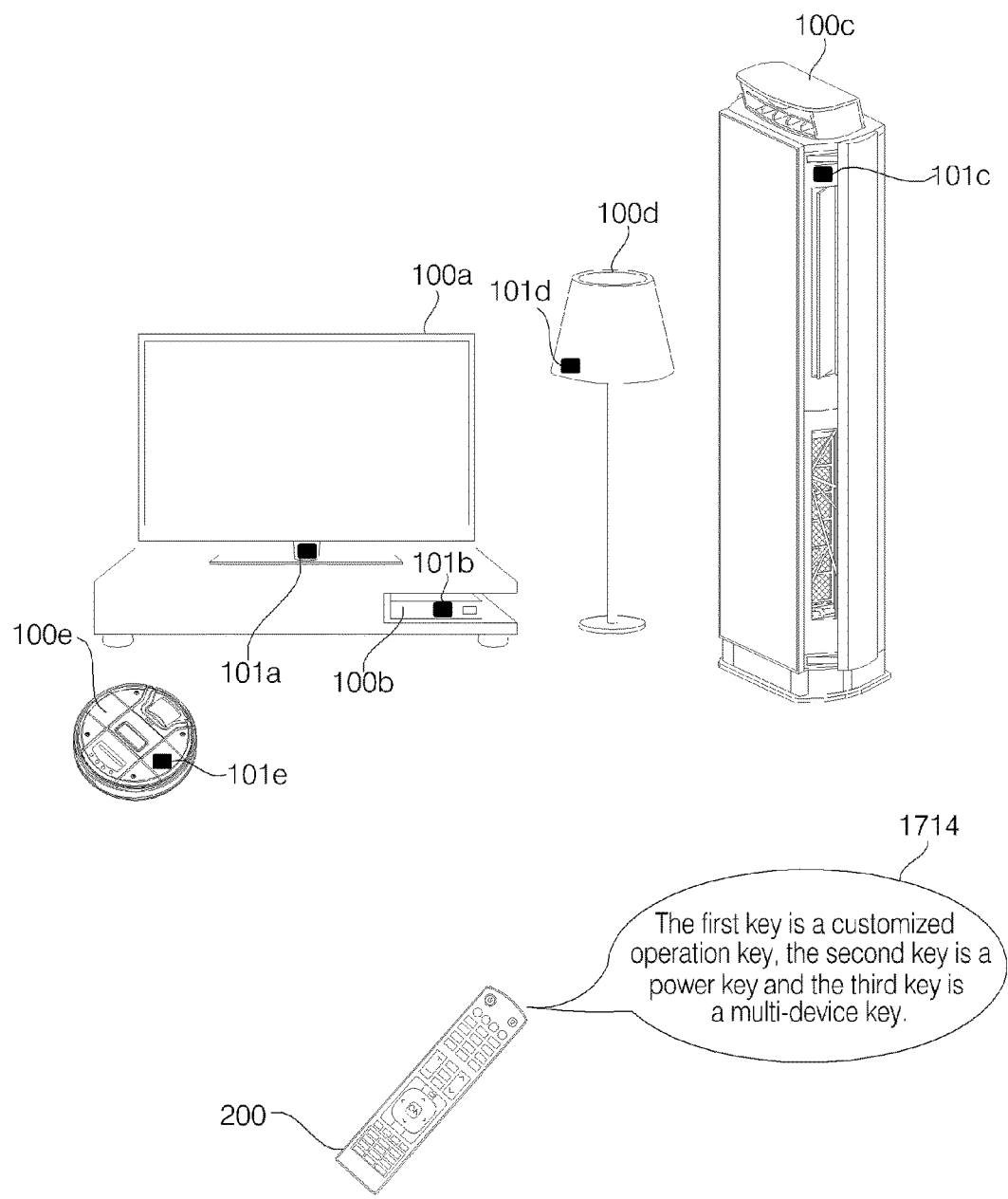

For example, the controller 670 of the mobile terminal 600 may perform a control operation to output an item setting guide message 1714 for at least a part of the remote control object, as shown in FIG. 26G.

Thus, the user may easily select a corresponding item for a desired operation.

In particular, the controller 670 of the mobile terminal 600 may perform item setting in a customized operation remote control object according to the user authentication, thereby enhancing user convenience.

If selection of a predetermined item is not implemented within a predetermined time, the controller 670 may perform a control operation to enter the standby mode. If the standby mode is terminated, the controller may perform a control operation to display a remote control object for remote control of the previously directed device to remotely control the device. This will be described with reference to FIGS. 27A to 27E.

FIG. 27A illustrates a case where the mobile terminal 600 operates to control the air conditioner 100c.

As shown in FIG. 27B, If the mobile terminal 600 does not operate within a predetermined time, the controller 670 of the mobile terminal 600 may restrict the power in each unit and control the mobile terminal 600 to enter the standby mode. For example, the controller may control only the sensing unit 640 and the wireless communication unit 610 to operate.

The controller 670 of the mobile terminal 600 may control a message 1716 indicating entry into the standby mode to be output in the form of sound when the mobile terminal 600 enters the standby mode, as shown in the figure.

Next, the controller 670 of the mobile terminal 600 may control the standby mode to be terminated when the mobile terminal 600 moves in the standby mode, as shown in FIG. 27C.

The controller 670 of the mobile terminal 600 may control a standby mode termination message 1717 to be output in the form of sound, as shown in the figure.

When the standby mode is terminated, the controller 670 of the mobile terminal 600 may control the mobile terminal 600 to operate in order to control the air conditioner 100c at which the mobile terminal has been previously directed.

The controller 670 of the mobile terminal 600 may control an air conditioner control enable message 1717 to be output in the form of sound as shown in the figure.

The controller 670 of the mobile terminal 600 may be initialized when the standby mode is terminated. The controller 670 of the mobile terminal 600 may control an initialization message 1718 to be output in the form of sound as shown in FIG. 27D.

Figure 27E:
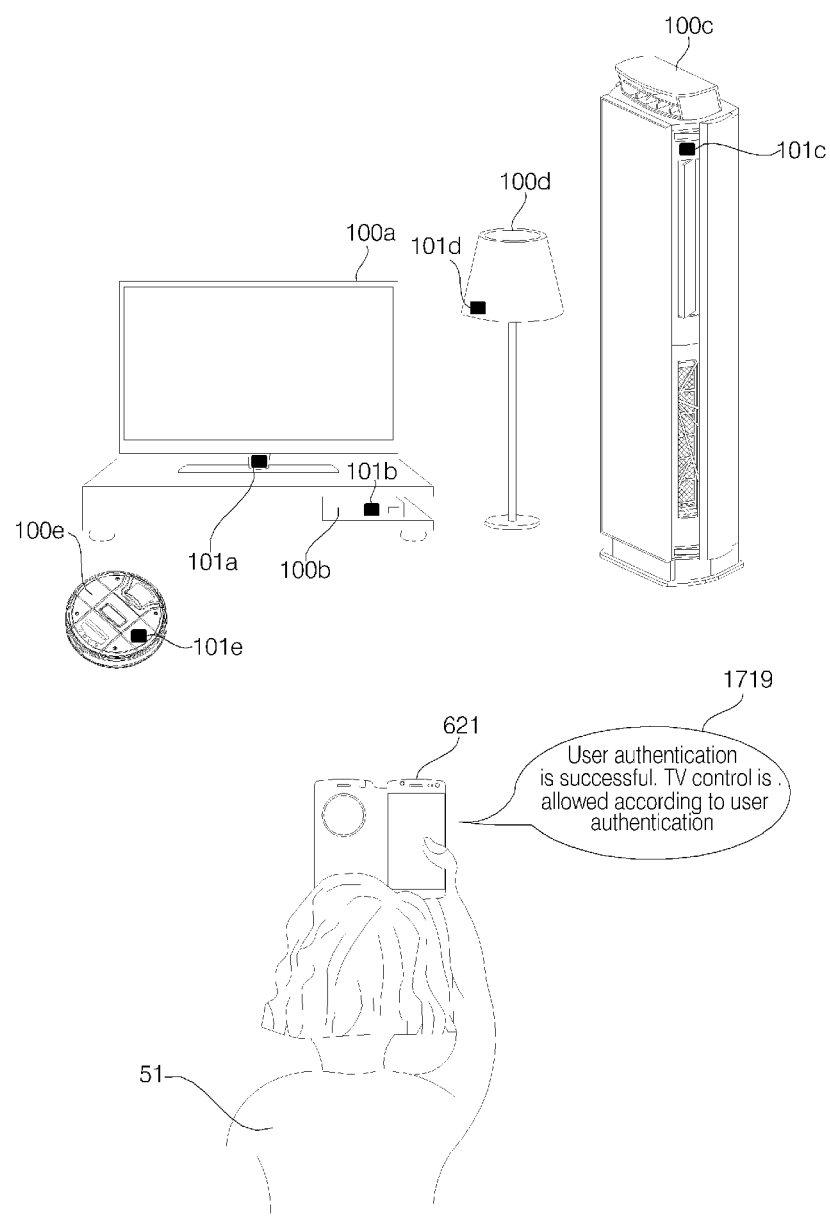
Figure 27D:
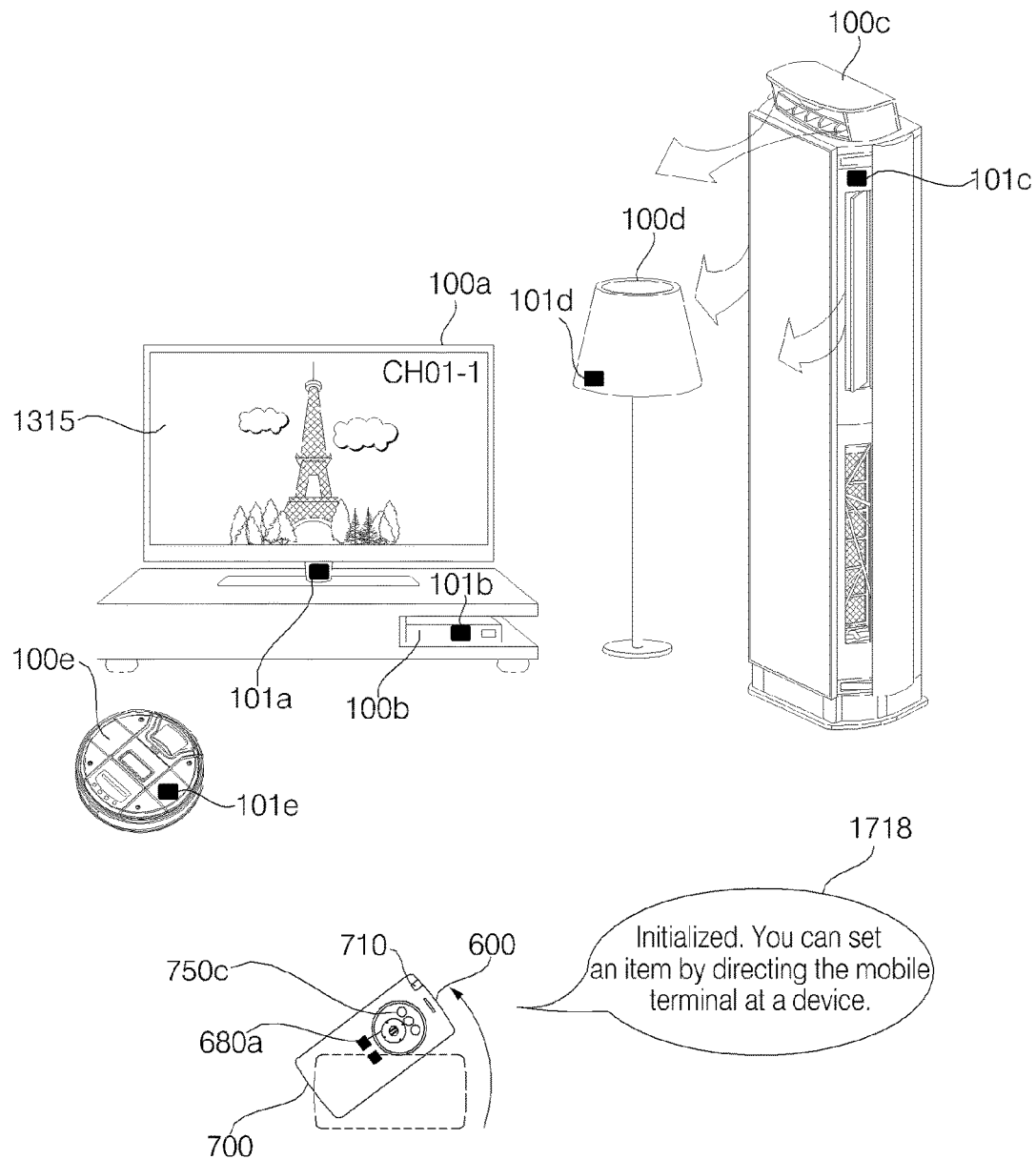

When user authentication through the camera 621 of the mobile terminal 600 is performed at the end of the standby mode as shown in FIG. 27E, the controller 670 of the mobile terminal 600 may perform a control operation to perform remote control of the device, which is set to the default. The controller 670 of the mobile terminal 600 may control a device control enable message 1719 according to the user authentication to be output in the form of sound, as shown in FIG. 27E.

FIG. 28 is a flowchart illustrating an exemplary method of operating a mobile terminal according to another embodiment of the present invention, and FIGS. 29A to 30C are views illustrating the method of operating the mobile terminal of FIG. 28.

Referring to FIG. 28, when the mobile terminal 600 is directed at the first device (S1705), the reception unit 423 of the mobile terminal 600 receives a first ID signal (S1710).

For example, when the mobile terminal 600 is directed at the air conditioner 100c, the reception unit 423 of the mobile terminal 600 may receive an ID signal of a pattern corresponding to the air conditioner 100c or the transmission apparatus 101c corresponding to the air conditioner 101c.

Next, the controller 670 of the mobile terminal 600 recognizes whether or not the received ID signal is the ID signal of the first device, based on the first ID signal. For example, the controller may determine that the signal is the ID signal of the first device by comparing the ID signal with an IR signal pattern stored in the memory 660.

Then, the controller 670 of the mobile terminal 600 controls a first remote control object for remote control of the first device to be displayed (S1715).

Next, the controller 670 of the mobile terminal 600 determines whether the first item is selected in the displayed remote control object and the mobile terminal is turned to the second device, or whether the mobile terminal directed at the first device is moved within a predetermined time so as to be directed at the second device (S1720), and if so, the reception unit 423 of the mobile terminal 600 receives the second ID signal (S1735).

As shown in FIG. 3B, when the mobile terminal 600 is directed at the image display apparatus 100a, the reception unit 423 of the mobile terminal 600 may receive an ID signal of a pattern corresponding to the image display apparatus 100a from the image display apparatus 100a or the transmission apparatus 101a corresponding to the image display apparatus 100a.

Next, the controller 670 of the mobile terminal 600 identifies whether or not the received ID signal is the ID signal of the second device, based on the second ID signal. For example, the controller may identify that the received ID signal is the ID signal of the second device, by comparing the receive ID signal with an ID signal pattern stored in the memory 660.

Then, the controller 670 of the mobile terminal 600 controls a second remote control object for remote control of the second device to be displayed (S1740).

Next, in step 1720, if a first item is selected in a second remote control object and the mobile terminal is turned to the second device or if the mobile terminal directed at the first device is moved to within a predetermined time so as to be directed at the second device, the controller 670 of the mobile terminal 600 may control the first device information to be transmitted to the second device (S1750). The first device information may be transmitted over an IR signal or an RF signal.

As a result, the second device at which the mobile terminal is finally directed is allowed to perform a related operation using the first device information.

Accordingly, both remote control of a plurality of devices and a related operation may be performed using one mobile terminal 600. Thereby, user convenience may be enhanced.

If a first item is selected in a set object and the mobile terminal is turned to the second device or if the mobile terminal directed at the first device is moved to within a predetermined time so as to be directed at the second device, the controller 670 of the mobile terminal 600 may control pointing information about the mobile terminal 600 to be transmitted over an RF signal.

Hereinafter, various related operations performed between a plurality of devices will be described.

Figure 29A:
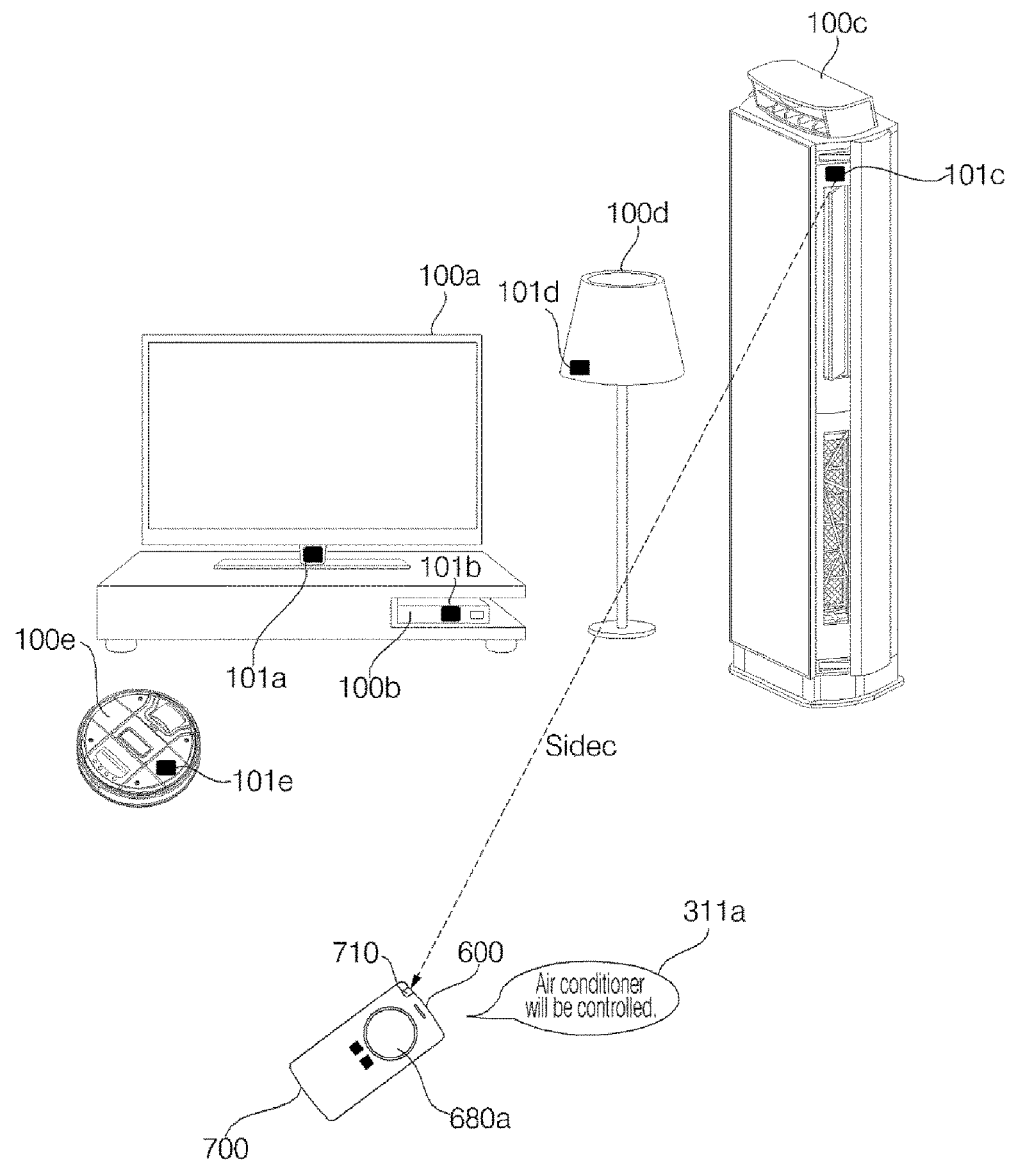
FIGS. 29A to 30C are views illustrating the method of operating the mobile terminal of FIG. 28.

FIG. 29A illustrates a case where the mobile terminal 600 is directed at the air conditioner 100c among the various devices 100a, 100b, 100c, 100d, and 100e in the house.

The mobile terminal 600 receives an IR signal which is an ID signal Sidec from the transmission apparatus 101c corresponding to the air conditioner 100c. Then, the mobile terminal may extract device information about the air conditioner 100c based on the IR signal which is the ID signal Sidec. Then, the mobile terminal may display a remote control object for the air conditioner 100c based on the extracted device information.

When the device identification or item setting is completed while the mobile terminal 600 is directed at the direction of the air conditioner 100c, the mobile terminal 600 may output an air conditioner control enable message 311a in the form of sound. Thereby, the user may recognize that control of the air conditioner is allowed.

Figure 29B:
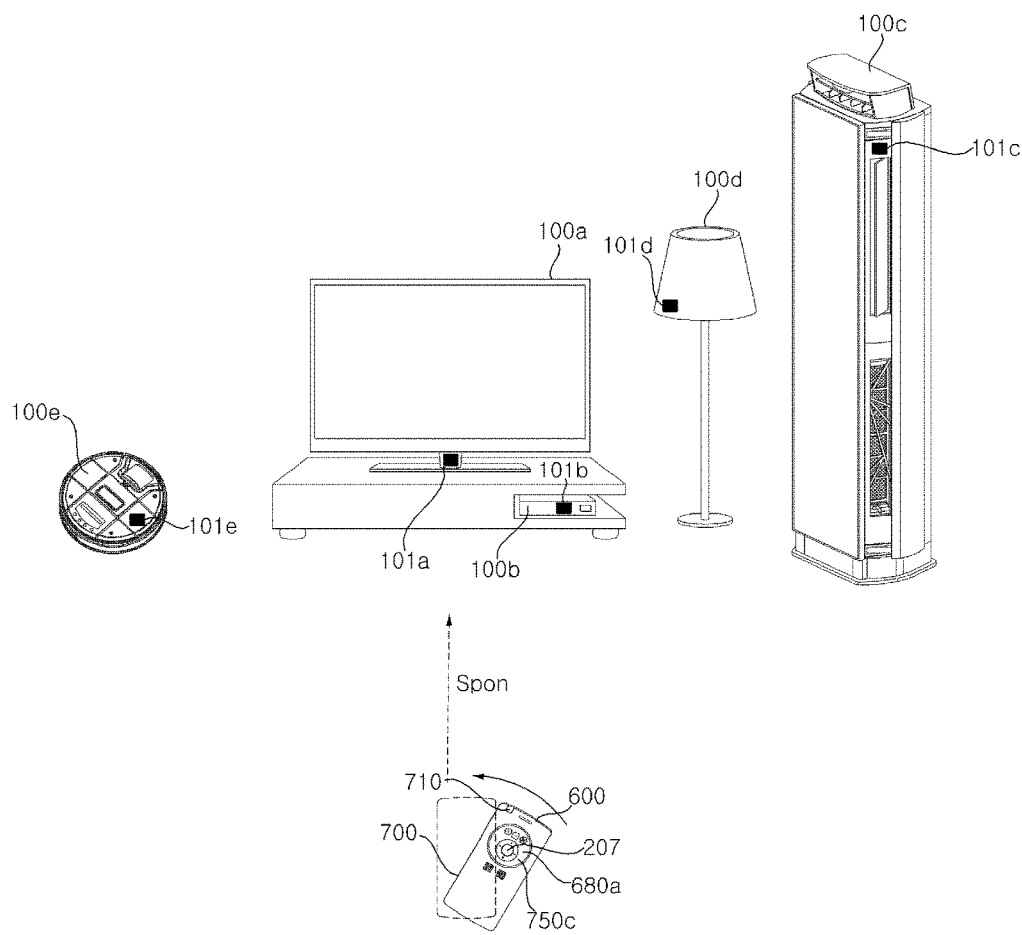

Next, FIG. 29B illustrates a case where the direction of orientation of the mobile terminal 600 is changed from the air conditioner 100c to the image display apparatus 100a while an identification item 207 in a remote control object 750c displayed on the mobile terminal 600 is selected.

The mobile terminal 600 receives an IR signal from the transmission apparatus 101a corresponding to the image display apparatus 100a. Then, the mobile terminal may extract device information about the image display apparatus 100a based on the IR signal. Then, the mobile terminal may a remote control object for the image display apparatus 100a based on the extracted device information.

If the identification item 207 of the mobile terminal 600 is selected and the direction of orientation of the mobile terminal 600 is changed from the air conditioner 100c to the image display apparatus 100a while the power of the image display apparatus 100a is off, the controller 670 of the mobile terminal 600 may control a power-on signal Spon to be transmitted to the image display apparatus 100a. Accordingly, when the direction of orientation of the mobile terminal 600 is changed from the air conditioner 100c to the image display apparatus 100a, the image display apparatus 100a may be automatically turned on.

Figure 29C:
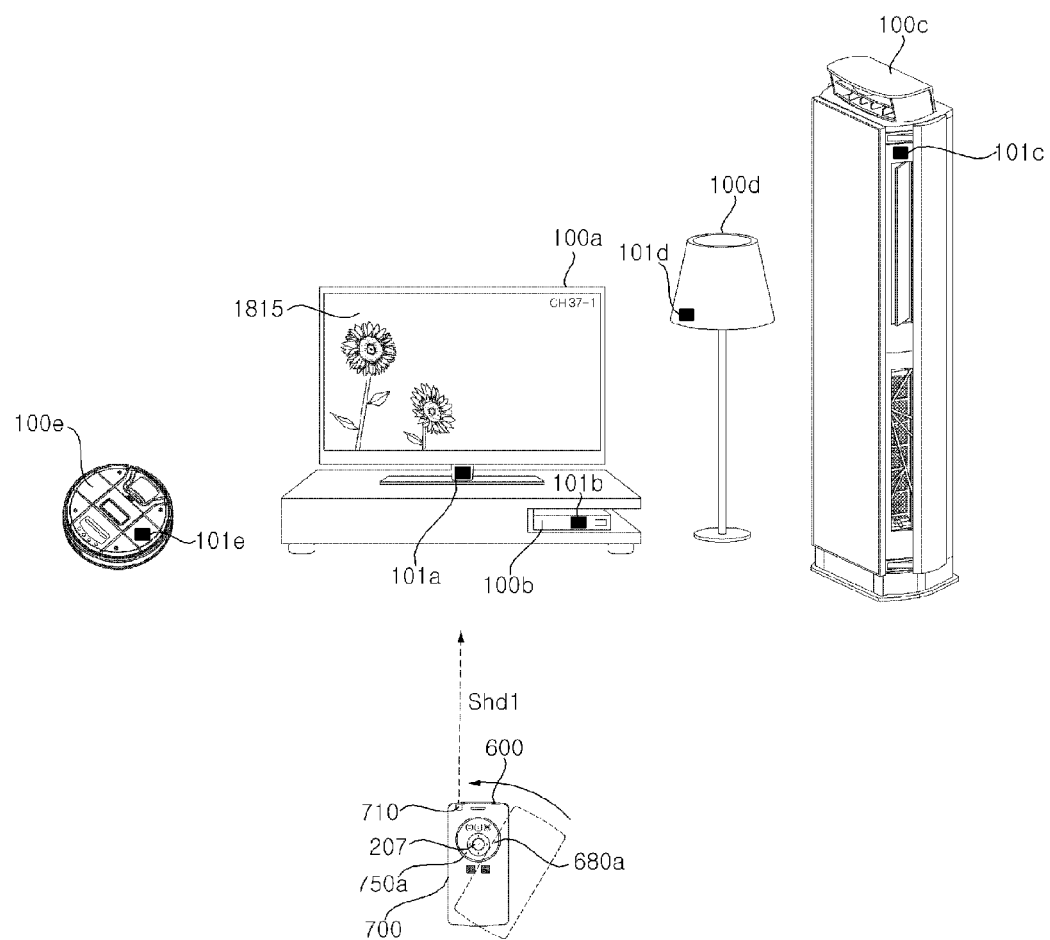

In another case, if the identification item 207 of the mobile terminal 600 is selected and the direction of orientation of the mobile terminal 600 is changed from the air conditioner 100c to the image display apparatus 100a, the controller 670 of the mobile terminal 600 may control information Shd1 about the air conditioner 100c to be transmitted over an IR signal or an RF signal, as shown in FIG. 29C.

The memory 660 of the mobile terminal 600 may store the usage history information about the mobile terminal 600, and the controller 670 of the mobile terminal 600 may control the information about the air conditioner 100c identified in FIG. 29A to be transmitted to the image display apparatus 100a.

For example, the controller 670 of the mobile terminal 600 may control the state information and the device information about the air conditioner 100c to be transmitted to the image display apparatus 100a.

Then, the image display apparatus 100a may check the state information and the device information about the air conditioner 100c.

Figure 29D:
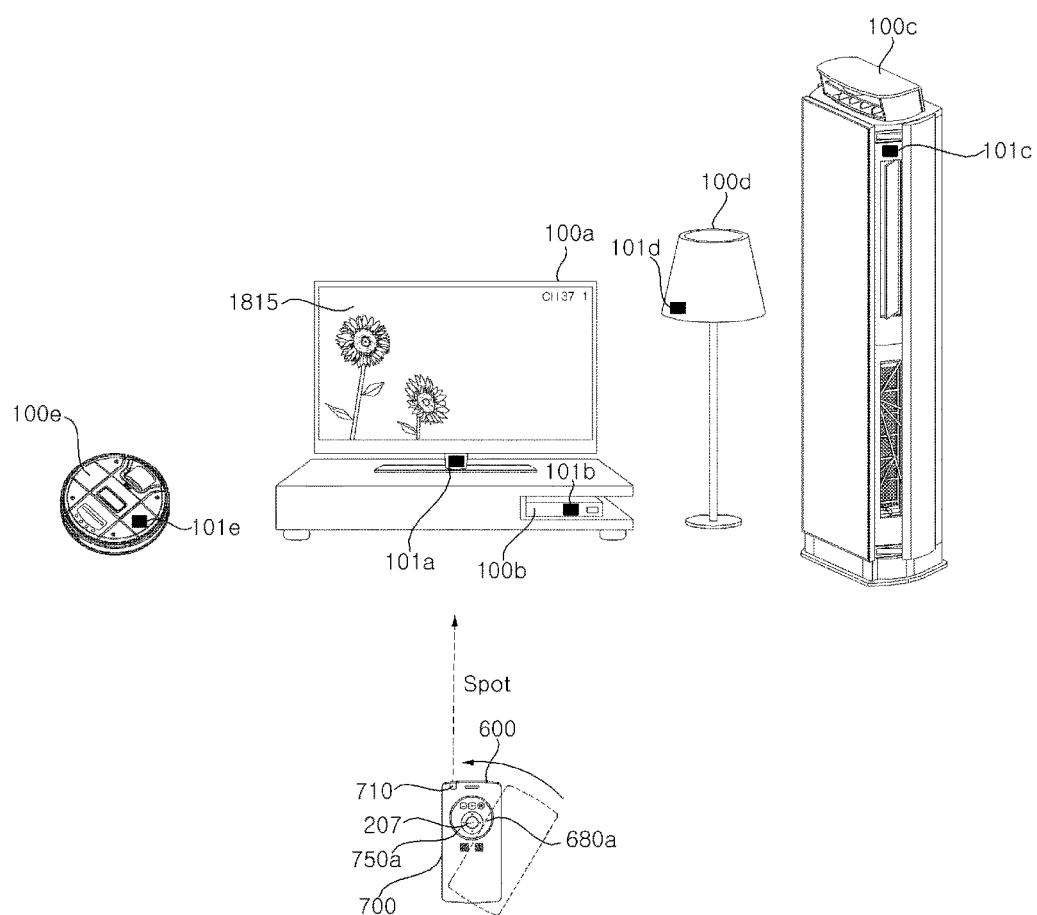
Figure 29B:
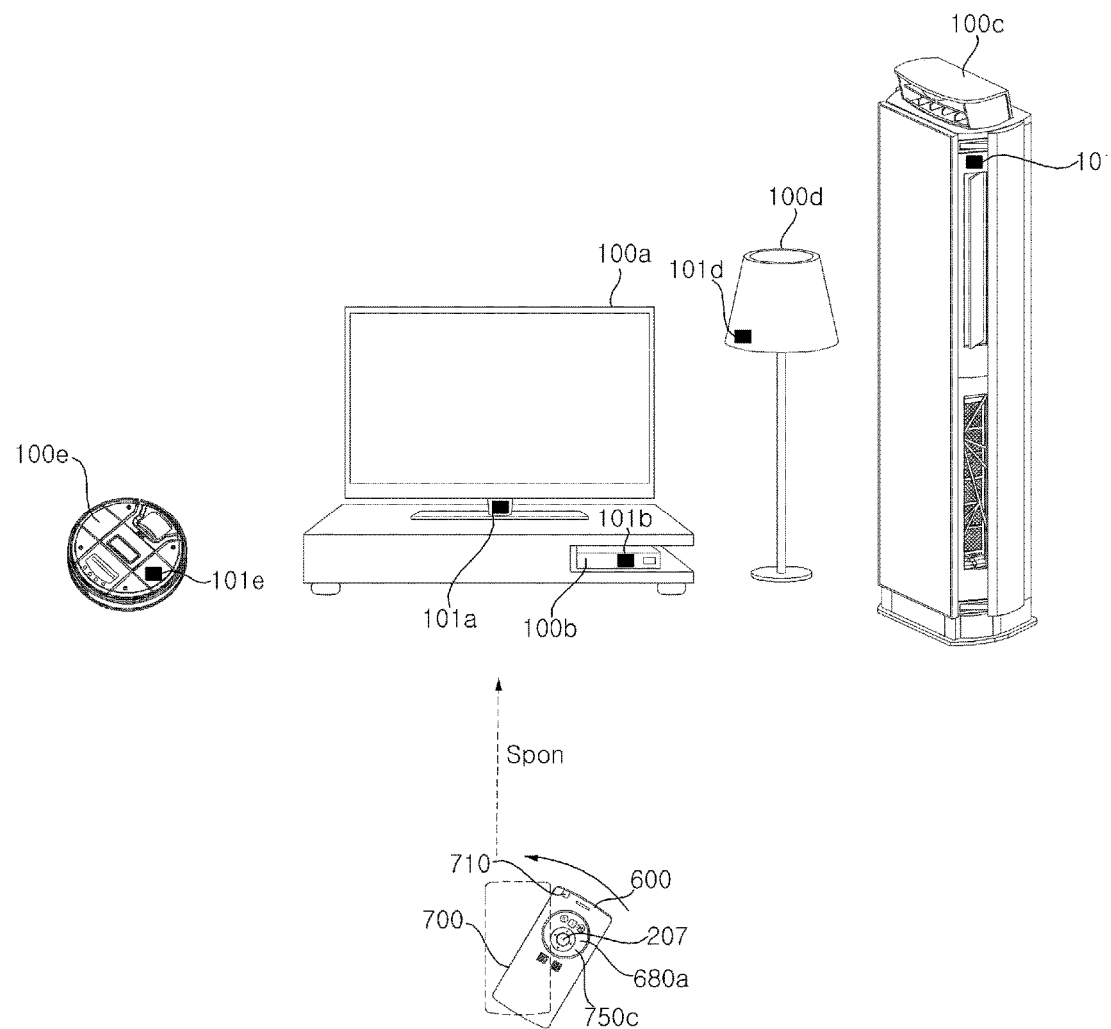
Figure 29C:
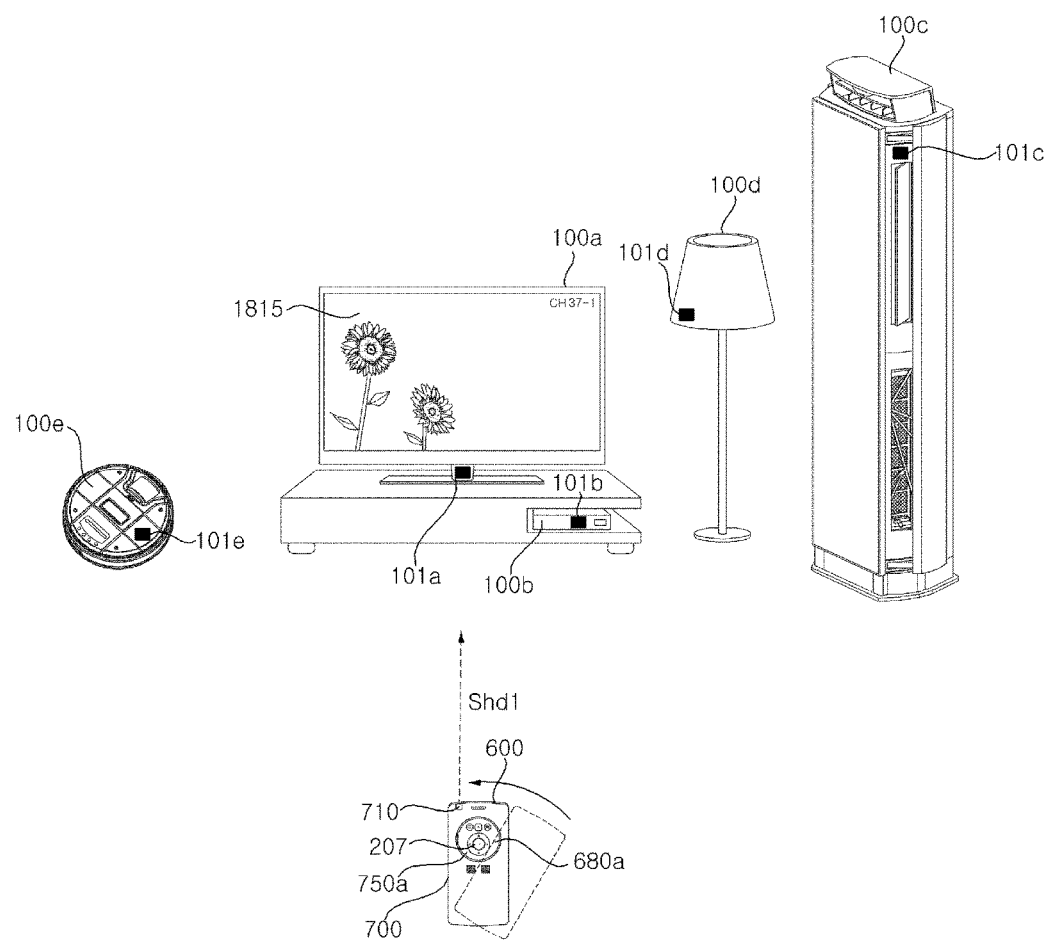
Figure 29J:
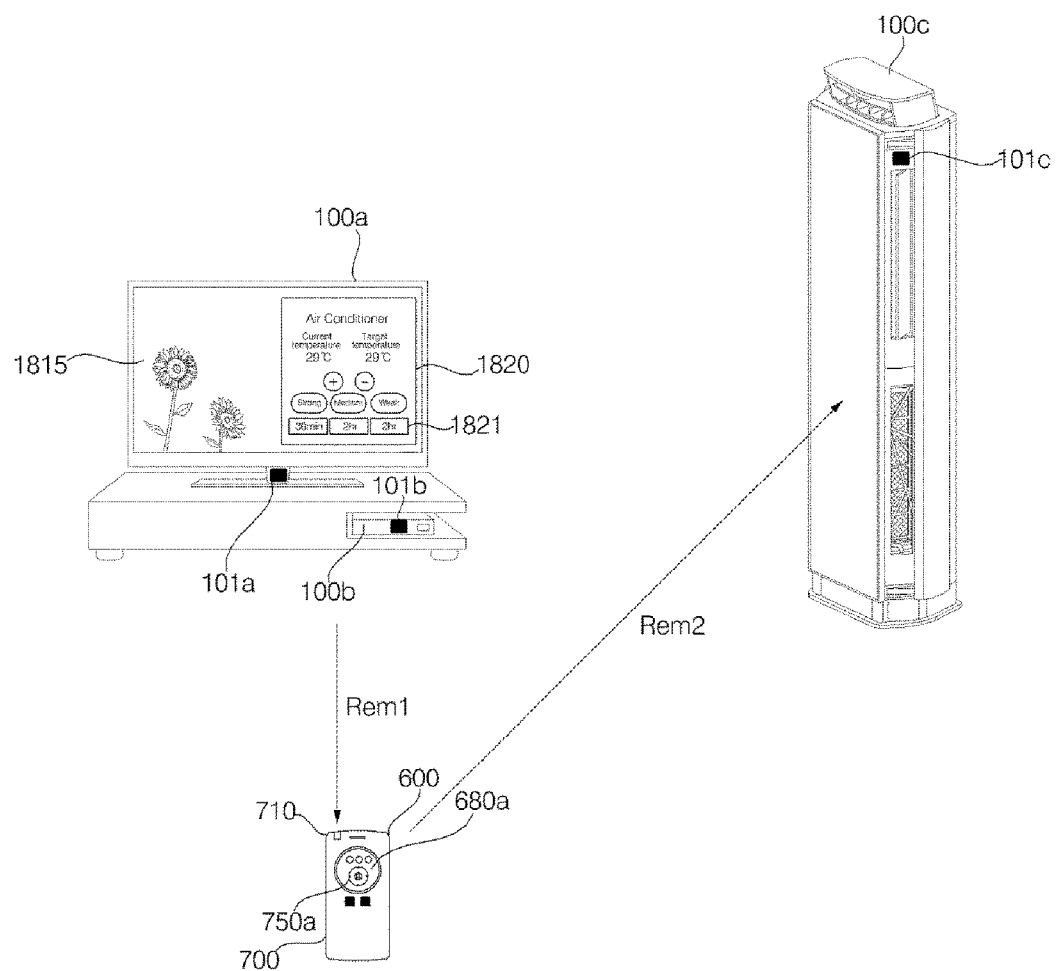

In another case, if the identification item 207 of the mobile terminal 600 is selected and the direction of orientation of the mobile terminal 600 is changed from the air conditioner 100c to the image display apparatus 100a, the controller 670 of the mobile terminal 600 may control the pointing information Spot about the mobile terminal 600 to be transmitted over an RF signal, as shown in FIG. 29D.

Since the controller 670 of the mobile terminal 600 receives IR signals from a plurality of devices or the transmission apparatuses corresponding to the plurality of devices, it may calculate the absolute coordinates such as an x-axis coordinate, a y-axis coordinate and a z-axis coordinate according to movement of the mobile terminal 600, using, for example, trigonometry.

Alternatively, may calculate the absolute coordinates such as an x-axis coordinate, a y-axis coordinate and a z-axis coordinate according to movement of the mobile terminal 600, using an IR signal, gyro sensor information and acceleration sensor information from a plurality of devices or the transmission apparatuses corresponding to the plurality of devices, wherein the gyro sensor information and acceleration are in the sensing unit 640.

If the identification item 207 is selected in a displayed remote control object 750c with the mobile terminal directed at another device and the mobile terminal is turned to the image display apparatus 100a, or if the mobile terminal directed at another home device is turned to the image display apparatus 100a within a predetermined time, the controller 670 of the mobile terminal 600 may control pointing information Spot calculated therein to be transmitted over an RF signal.

Accordingly, the interface unit (not shown) of the image display apparatus 100a may receive the pointing information Spot from the mobile terminal 600 and the controller 170 of the image display apparatus 100a may control a pointer 205 indicating the direction of movement of the mobile terminal to be displayed on the display 180 based on the received pointing information Spot.

FIG. 29E illustrates that an arrow-shaped pointer 205 is moved and displayed on the display 180 as the mobile terminal 600 is turned from the air conditioner 100c toward the image display apparatus 100a.

Accordingly, remote control of the image display apparatus 100a may be performed immediately upon switch of the remote control function between the plurality of devices.

In addition, the user is allowed to shift the pointer 205 through the mobile terminal 600, thereby easily performing various input operations.

FIG. 29F illustrates that an air conditioner-shaped pointer 1805 is shifted and displayed on the display 180 as the mobile terminal 600 is turned from the air conditioner 100c to the image display apparatus 100a.

The mobile terminal 600 transmits information Shd1 related to the air conditioner as shown in FIG. 29C, and transmits pointing information Spot as shown in FIG. 29D. Accordingly, the controller 170 may control an air conditioner pointer 1805 indicating the direction of movement of the mobile terminal to be displayed on the display 180, using the pointing information Spot and the information Shd1 related to the air conditioner.

Thus, the user may intuitively recognize that the device that was previously remotely controlled is the air conditioner.

If the mobile terminal is turned from the air conditioner 100c of the mobile terminal 600 to the image display apparatus 100a while the identification item 207 of the mobile terminal 600 is operating, the remote control object 1820 for remote control of the air conditioner may be displayed on the image display apparatus 100a.

For example, since the mobile terminal 600 transmits the information Shd1 related to the air conditioner, the controller 170 of the image display apparatus 100a may generate the remote control object 1820 for remote control of the air conditioner as shown in FIG. 29C, and control the same to be displayed as shown in FIG. 29G.

When the air conditioner operation state information (for example, current temperature information, target temperature information, etc.) is included in the information Shd1 related to the air conditioner, the remote control object 1820 may include state information and a control item for remote control of the air conditioner.

In the figure, the current temperature and the target temperature are displayed in the remote control object 1820, and a temperature setting item (+, −), a wind strength setting item (strong, medium, weak), and an operation time setting item (30 min., 1 hr, 2 hr) are illustrated.

The remote control object 1820 shown in FIG. 29G may be displayed when touch of the user on the identification item 207 in the remote control object 750c displayed on the mobile terminal 600 is terminated.

For example, when the user touches the identification item 207 and the mobile terminal 600 is turned from the air conditioner 100c to the image display apparatus, the pointers 205 and 1805 may be displayed. If the mobile terminal is directed at the image display apparatus 100a, the remote control object 1820 as shown in FIG. 29G may be further displayed when the user's touch on the identification item 207 is terminated.

To this end, the controller 670 of the mobile terminal 600 may transmit identification item operation termination information to the image display apparatus 100a when the user's touch on the identification item 207 is terminated with the mobile terminal directed at the image display apparatus 100a.

The controller 170 of the image display apparatus 100a may control the remote control object 1820 to be displayed, based on the identification item operation termination information. Although not shown in the figure, the pointer 205 of FIG. 29E or the pointer 1805 of FIG. 29F may be displayed as well.

FIG. 29H illustrates a case where the operation time setting item 1821 is selected in the remote control object 1820.

The operation time setting item 1821 may be selected by the pointer 205 or 1805 and the identification item 207.

In FIG. 29H, since the mobile terminal 600 is directed at the image display apparatus 100a, at least a part of the plurality of items operates to control the image display apparatus 100a.

Accordingly, in selecting a predetermined item in the remote control object 1820 for refrigerator control, the predetermined item is preferably selected based on the pointing information about the mobile terminal 600 and the operation of the identification item 207.

Figure 29I:
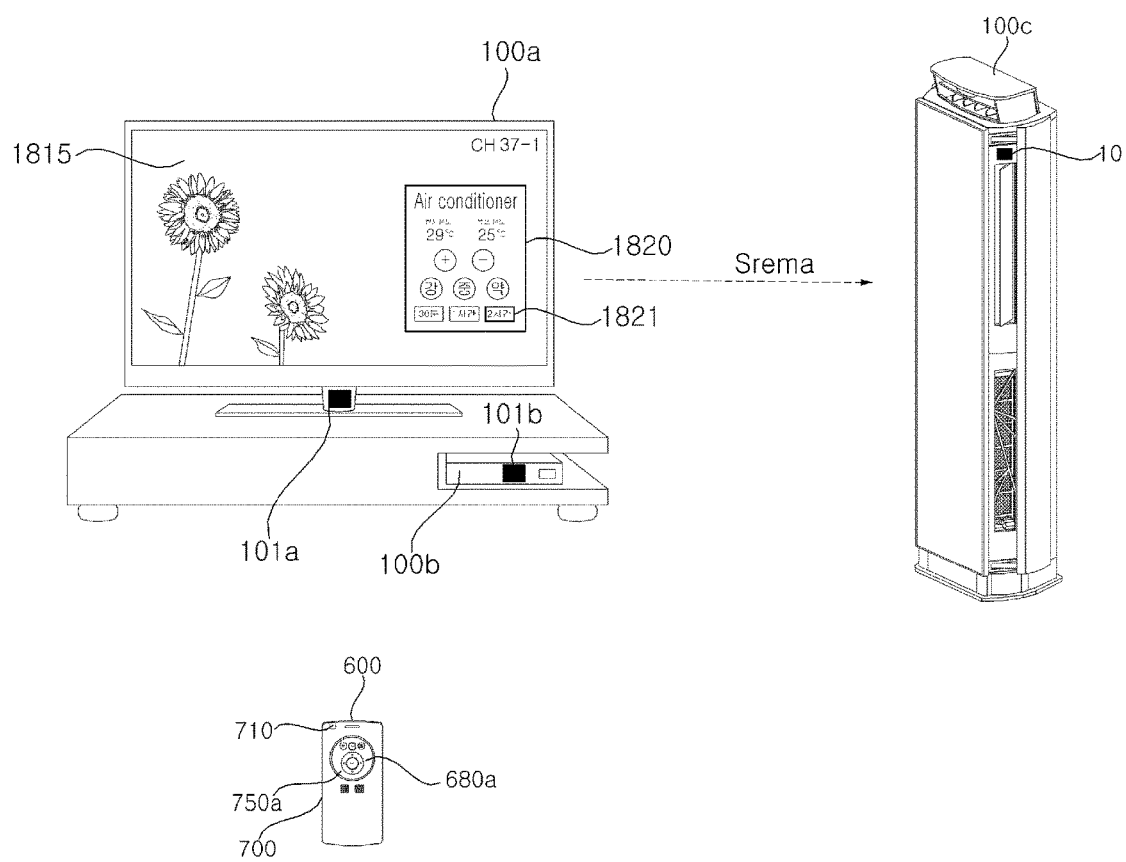

As another example, the mobile terminal 600 may transmit a related remote control signal to the image display apparatus 100a when a wheel item 206 having a four-direction item operates. Thus, the channel may be changed according to operation of the Up item or a Down item in the wheel item 206, or the volume may be changed according to the operation of a Left item or Right item in the wheel item 206.

in FIG. 29H, when the operation time setting item 1821 is selected, the image display apparatus 100a may output an IR signal-based remote control signal Srema for controlling the air conditioner 101c as shown in FIG. 29I. Accordingly, the operation time setting in the air conditioner 101c is performed.

Alternatively, in FIG. 29H, when the operation time setting item 1821 is selected, the image display apparatus 100*a* may output an IR signal-based first remote control signal rem1 for controlling the air conditioner 101*c*, to the mobile terminal 600. Upon the receiving the first remote control signal, the mobile terminal 600 may output an IR signal-based second remote control signal rem2 for controlling the air conditioner 101*c*. Thus, the air conditioner 101*c* may perform the operation time setting based on the second remote control signal rem2.

Figure 30A:
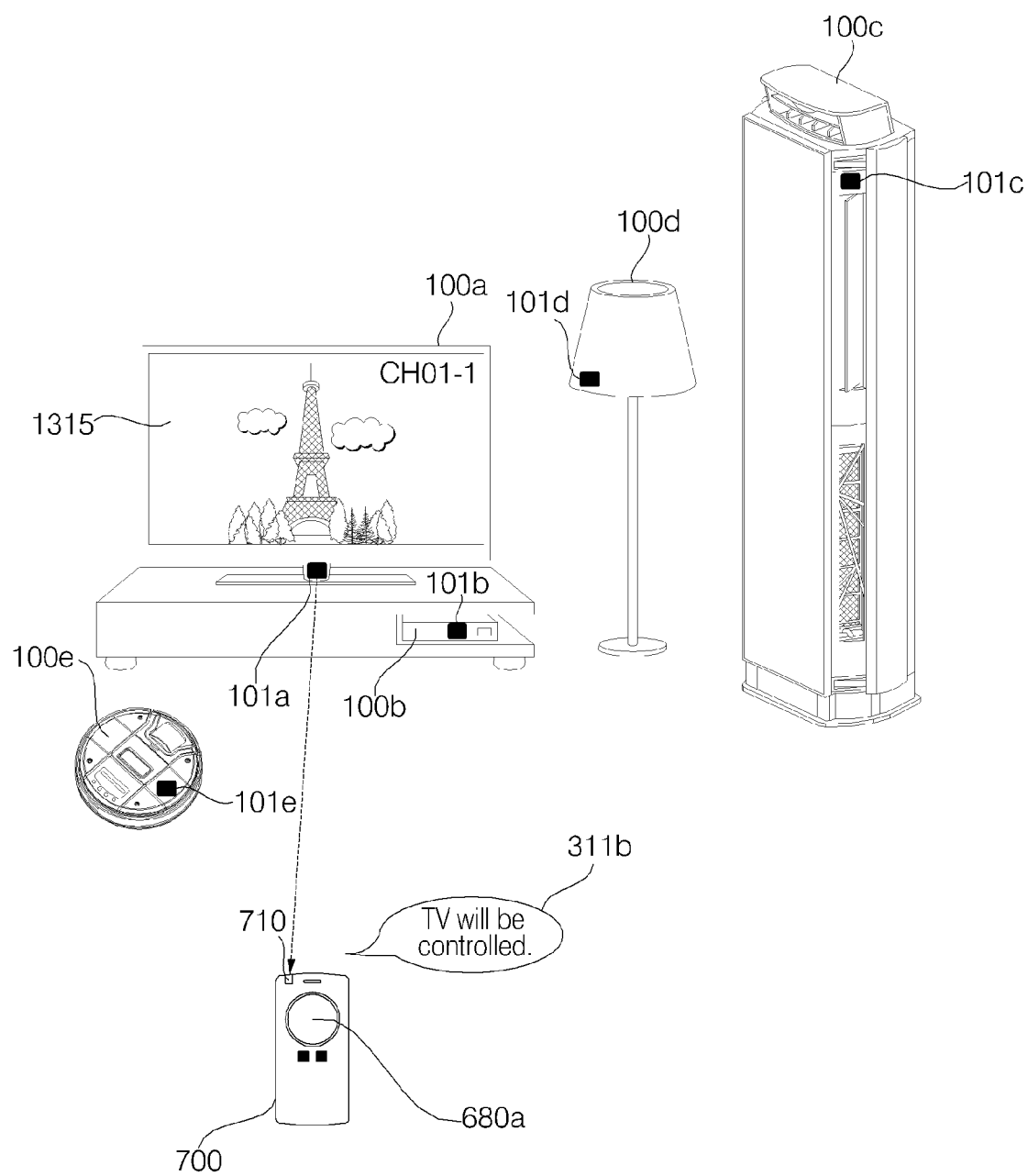
Figure 30A:
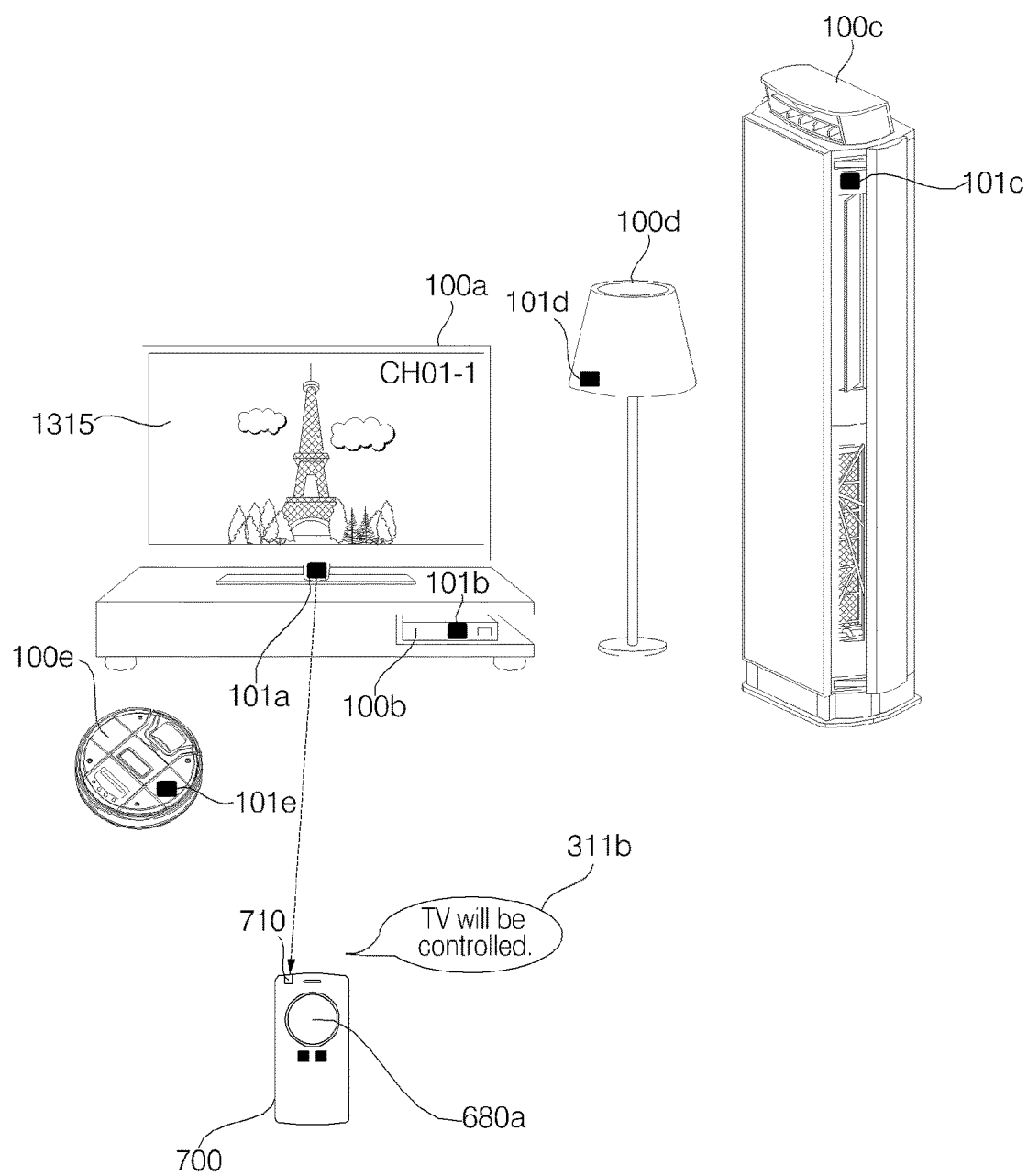
Figure 30B:
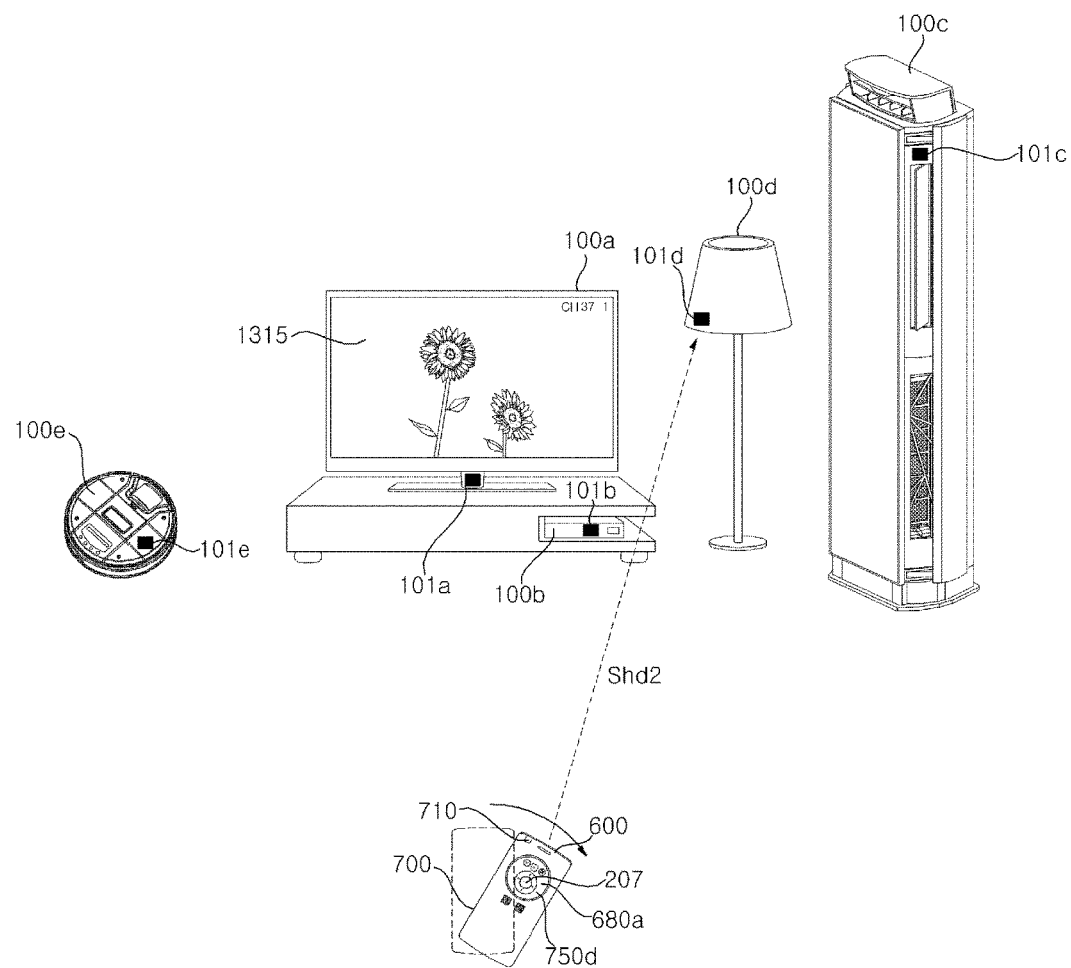

FIGS. 30A to 30C are views illustrating a case where the mobile terminal 600 directed at the image display apparatus 100*a* is turned and directed at the lighting device 100*d* as the identification item 207 operates.

As shown in 30A, when the device identification or the item setting is completed with the mobile terminal 600 directed at the image display apparatus 100*a*, the mobile terminal may output an image display apparatus control enable message 311*b* such as "TV will be controlled" in the form of sound.

In the figure, it is illustrated that a broadcast image 1315 is displayed on the image display apparatus 100*a*.

Next, as shown in FIG. 30B, when the identification item 207 is selected in the displayed remote control object 750*d*, and the mobile terminal 600 directed at the image display apparatus 100*a* is turned and directed at the lighting device 100*d*, the mobile terminal 600 receives an IR signal from the transmission apparatus 101*d* corresponding to the lighting device 100*d*. Then, the mobile terminal may extract device information about the lighting device 100*d* based on the IR signal. Then, the mobile terminal may display a remote control object for the lighting device 100*d* based on the extracted device information.

If the direction of orientation of the mobile terminal is changed from the image display apparatus 100*a* to the lighting device 100*d* when the identification item 207 of the mobile terminal 600 is selected, the controller 670 of the mobile terminal 600 may control information Shd2 about the image display apparatus 100*a* to be transmitted over an IR signal or an RF signal as shown in FIG. 30B.

The memory 660 of the mobile terminal 600 may store usage history information about the mobile terminal 600 and the controller 670 of the mobile terminal 600 may control the information about the image display apparatus 100*a* identified in FIG. 30A to be transmitted to the lighting device 100*d*.

For example, the controller 670 of the mobile terminal 600 may control channel information, program information, and mood information about the current broadcast image to be transmitted to the lighting device 100*d*.

Thus, the lighting apparatus 100*d* may recognize the channel information, the program information, and the mood information.

Then, as shown in FIG. 30C, the lighting device 100*d* may output light 1511 of a predetermined color based on the received information Shd2 about the image display apparatus 100*a*, in particular, the mood information. Thus, illumination suitable for the broadcast image may be set easily.

Various embodiments are possible according to flow of information between the plurality of devices.

For example, in a case where a transmission apparatus is attached to a window, when the mobile terminal 600 is directed at the window and then turned to the image display apparatus 100*a*, weather information may be displayed on the image display apparatus 100*a*.

Here, the weather information is information received from an external server. The mobile terminal 600 may transmit the weather information to the image display apparatus 100*a* or the image display apparatus 100*a* be connected to the server and receive the weather information.

As another example, in the case where the transmission apparatus is attached to the window, when the mobile terminal 600 is directed at the window and then turned to the air conditioner 100*c*, the temperature control 100*h*, or the air cleaner 101*e*, the air conditioner 100*c*, the temperature control 100*h*, or the air cleaner 101*e* may automatically perform an operation corresponding to the weather information.

As another example, in the case where the transmission apparatus is attached to the window, when the mobile terminal 600 is directed at the window and is then turned to the lighting device 100*d*, light of a color corresponding to the weather information is output from the lighting device 100*d*.

As another example, when the mobile terminal 600 is directed at the robot cleaner 100*e* and is then turned to the vicinity of another device or the ground, the robot cleaner 100*e* may automatically clean the vicinity of the other device or the ground.

As another example, when the mobile terminal 600 is directed at the robot cleaner 100*e* and is then turned to the image display apparatus 100*a*, the cleaning history information about the robot cleaner 100*e*, the home guide information during the home guide operation, or the like may be displayed on the image display apparatus 100*a*.

As another example, when the mobile terminal 600 is directed at the air conditioner 100*c* and is then turned to the image display apparatus 100*a*, filter replacement cycle information, power consumption information, power price information, and the like may be displayed on the image display apparatus 100*a*.

As another example, when the mobile terminal 600 is directed at a water purifier (not shown) and is then turned to the image display apparatus 100*a*, filter replacement cycle information, power consumption information, power price information, and the like may be displayed on the image display apparatus 100*a*.

As another example, when the mobile terminal 600 is directed at the refrigerator 100*f* and is then turned to the image display apparatus 100*a*, information about a list of food in the refrigerator, the operation state information about the refrigerator, power consumption information, and the like may be displayed on the image display apparatus 100*a* as state information.

As another example, in the case where a transmission apparatus is attached to a telephone (not shown), when the mobile terminal 600 is directed at the telephone (not shown) and is then turned to the image display apparatus 100*a*, information about a list of most recent incoming calls, or call time information, and the like may be displayed on the image display apparatus 100*a*.

Figure 31:
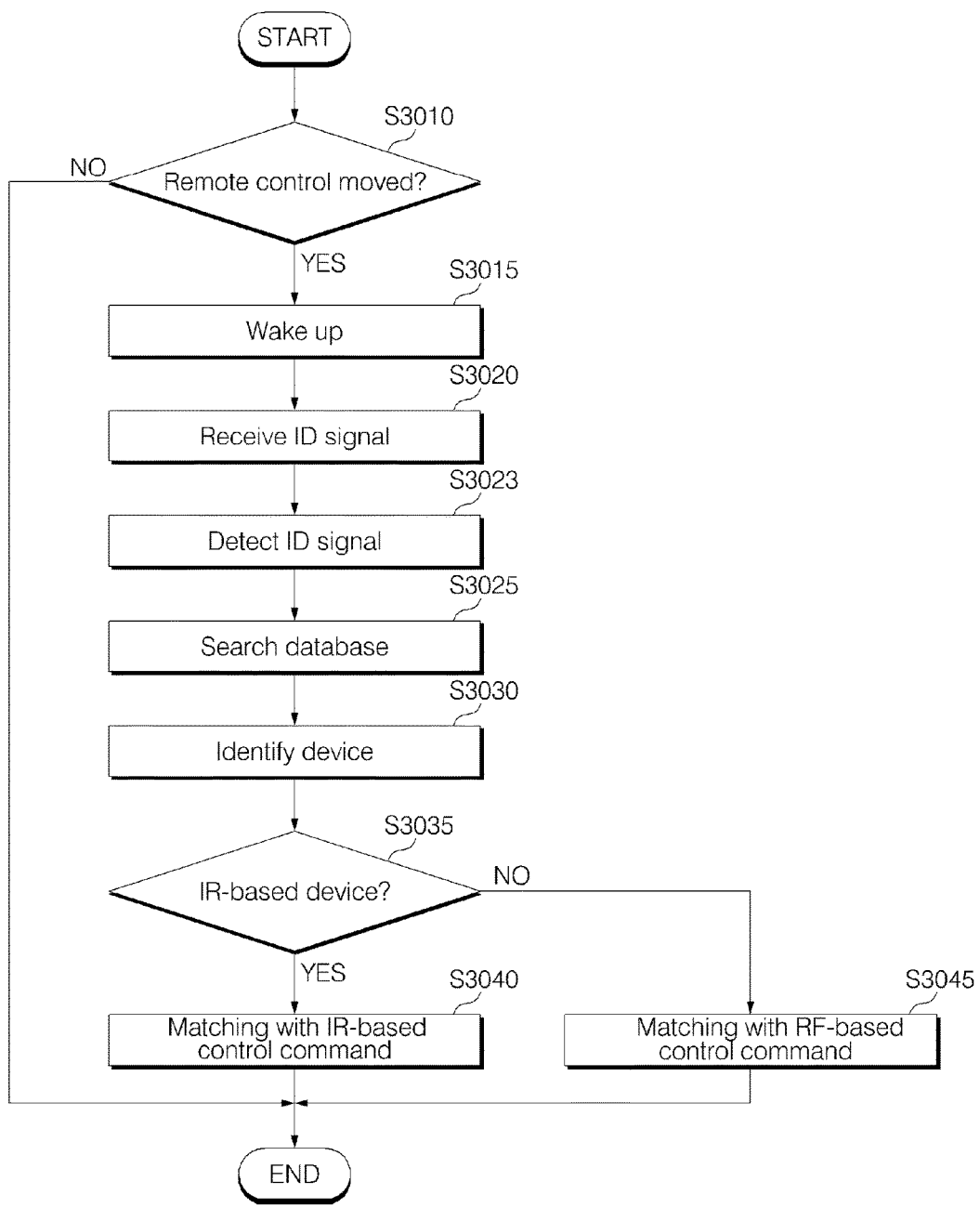
FIG. 31 is a flowchart illustrating an exemplary method of operating a mobile terminal according to another embodiment of the present invention.
Figure 32A:
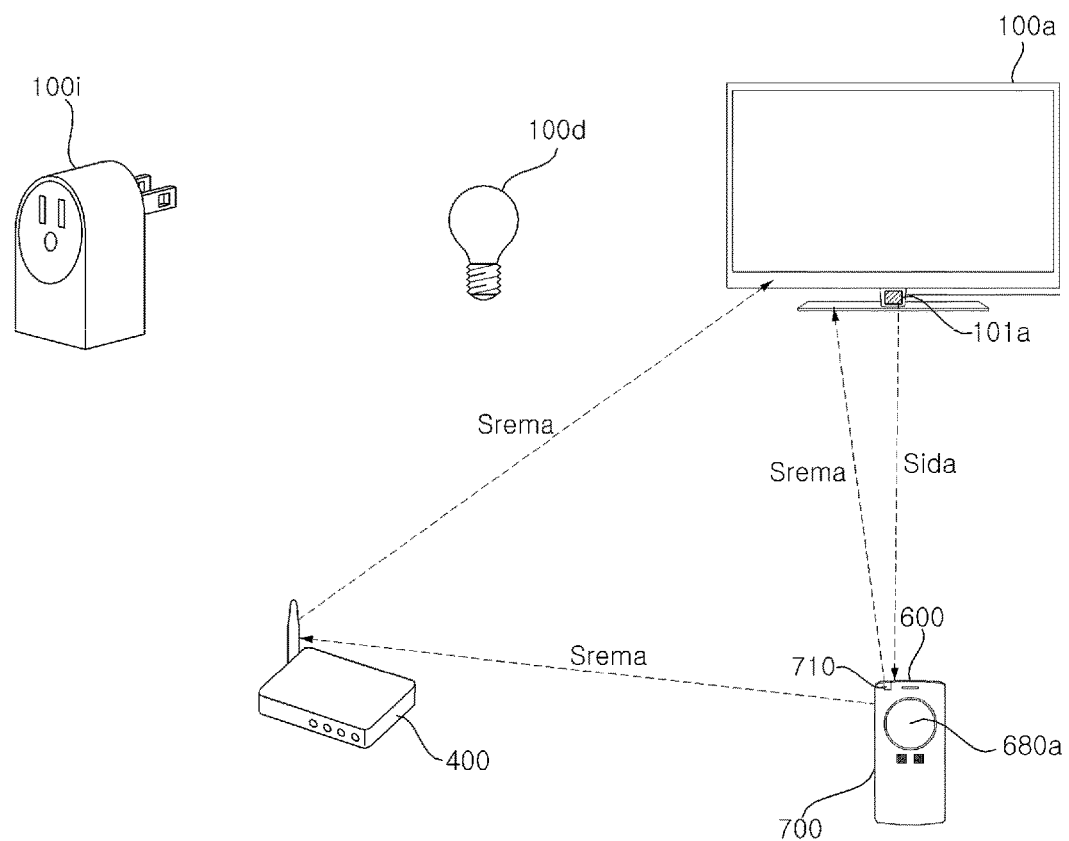

FIG. 31 is a flowchart illustrating an exemplary method of operating a mobile terminal according to another embodiment of the present invention, and FIGS. 32A to 32C are views illustrating the method of operating the mobile terminal of FIG. 31.

FIG. 31 illustrates a case where the mobile terminal 600 wakes up from the standby mode to set a control command for the directed mobile terminal.

Referring to FIG. 31, the controller 670 of the mobile terminal 600 determines whether the mobile terminal 600 is moving (S3010).

The controller 670 of the mobile terminal 600 determines whether or not the mobile terminal 600 is moving, based on the sensor information from the motion sensor 645 such as a gyro sensor or an acceleration sensor in the sensing unit 640.

If the mobile terminal 600 moves, the controller 670 of the mobile terminal 600 may control the respective units of the mobile terminal 600 to wake up (S3015). For example, the controller may control power to be supplied to each unit.

As another example, when a predetermined key of the mobile terminal 600 is selected, the controller 670 of the mobile terminal 600 may control each unit of the mobile terminal 600 to wake up.

Next, when the mobile terminal 600 is directed at a specific device, the reception unit 423 of the mobile terminal 600 receives at least one ID signal (S3020).

The controller 670 of the mobile terminal 600 detects the ID signal from the device 100 or the transmission apparatus 101 corresponding to the device in the at least one received ID signal (S3023).

Then, the controller 670 of the mobile terminal 600 may search the database in the memory 660 to compare the data with the detected ID signal (S3025). Then, the controller may compare the received ID signal with pre-stored ID signal data to identify or recognize the device (S3030).

The controller 670 of the mobile terminal 600 may determine whether the identified device is an IR-based device (S3035), and if so, may control an IR signal-object to be displayed (S3040).

If the identified device is not an IR-based device, the controller 670 of the mobile terminal 600 may perform a control operation to display an object which is based on a communication protocol other than the IR signal-based object (S3045).

The signal other than the IR signal may be any one of an RF signal, a Wi-Fi signal, a ZigBee signal, a Bluetooth signal, a laser signal, and a UWB signal.

FIGS. 32A to 32C illustrates a mobile terminal 600, an image display apparatus 100a, which is an IR-based device, a smart plug 100i, a smart bulb 100d, and a gateway 400, wherein the smart plug 100i, the smart bulb 100d, and the gateway 400 are devices based on a signal other than the IR signal.

FIG. 32A illustrates a case where the mobile terminal 600 is directed at the image display apparatus 100a.

The controller 670 of the mobile terminal 600 may perform device identification based on an ID signal Sida from the transmission apparatus 101a corresponding to the image display apparatus 100a. Then, the controller may control at least one of remote control objects to be displayed as an object based on the IR signal. Accordingly, when any one of the remote control objects is selected, an IR-based remote control signal Srema may be output.

The remote control signal Srema from the mobile terminal 600 may be directly transmitted to the image display apparatus 100a or may be transmitted to the image display apparatus 100a via the gateway 400.

When the mobile terminal 600 is directed at the smart bulb 100d or the smart plug 100i as shown in FIG. 32B or 32C, the controller 670 of the mobile terminal 600 may perform a control operation based on the received ID signal Sidd or Sidi to display at least one of the remote control objects as an object based on a signal other than the IR signal. Accordingly, when any one of the remote control objects is selected, a remote control signal Sremd or Sremi based on a signal the IR signal may be output. In particular, the remote control signal Sremd or Sremi based on a signal other than the IR signal may be transmitted to the smart plug 100i or the smart bulb 100d via the gateway 400.

FIG. 33 is a flowchart showing an exemplary method of operating a mobile terminal according to another embodiment of the present invention.

Referring to FIG. 33, the controller 670 of the mobile terminal 600 may identify the device based on the received ID signal (S3310).

The controller 670 of the mobile terminal 600 determines whether a control command for the identified device exists in the memory 660 (S3315). If the control command exists in the memory, the control command may be matched with at least one of the remote control objects based on the control command stored in the memory 660.

If there is no control command, the controller 670 of the mobile terminal 600 may control a device control command request to be transmitted (S3320).

The gateway 400 may receive the device control command request (S3325), and may transmit the device control command request to the server 700 over a network 550 (S3330).

If the device is an IR-based device, the device control command request may be transmitted to a server related to the IR-based device.

If the device is an RF-based device, the device control command request may be transmitted to a server related to the RF-based device.

If the device is a smart device, the device control command request may be transmitted to a server related to the smart device.

The gateway 400 may receive the device control command from the server 700 (S3335). Then, the device control command may be updated (S3040). In other words, it may be stored in the server 700.

Then, the gateway 400 may transmit a device control command (S3345).

The mobile terminal 600 may receive the device control command from the gateway 400 (S3350). Then, the device control command may be updated (S3340). In other words, it may be stored in the memory 660 in the mobile terminal 600.

Alternatively, after receiving the device control command from the gateway 400, the mobile terminal 600 may update the device control command and immediately match the control command with at least one of the remote control objects.

The method of operating the mobile terminal of the present invention may be implemented as a code that may be read by a processor on a recording medium readable by a processor included in the mobile terminal. The processor-readable recording medium may include all kinds of recording apparatuses in which data that may be read by the processor is stored. Examples of the recording medium readable by the processor include a ROM, a RAM, a CD-ROM, a magnetic tape, a floppy disk, an optical data storage device, and may also be implemented in the form of a carrier wave such as transmission over the Internet. In addition, the processor-readable recording medium may be distributed over network-connected computer systems so that code readable by the processor in a distributed fashion may be stored and executed.

While the present invention has been particularly shown and described with reference to exemplary embodiments thereof, it is to be understood that the invention is not limited to the disclosed exemplary embodiments, but, on the contrary, It will be understood by those skilled in the art that various changes in form and details may be made therein without departing from the spirit and scope of the present invention.

The invention claimed is:

1. A mobile terminal comprising:
a display;
a camera;
a reception unit to receive at least one device identification (ID) signal from at least one device or a transmission apparatus corresponding to the device;
a transmission unit; and
a controller configured to:
   detect an ID signal of a remotely controllable device in the at least one received device ID signal;
   extract control command information for remote control of the device based on the detected ID signal;
   perform a control operation based on the extracted control command information, causing the display to display a remote control object for remote control of the device;
   cause the transmission unit to transmit a remote control signal corresponding to an item selected from the remote control object;
   when the mobile terminal is paired with the device, detect a pattern positioned at a central area of at least one infrared image, captured via the camera and including a plurality of patterns, as a representative pattern;
   identify the paired device based on the detected representative pattern; and
   perform a control operation, causing the display to display a remote control object for remote control of the paired device according to the identified paired device.

2. The mobile terminal according to claim 1, wherein, when the mobile terminal receives the at least one device ID signal, the controller detects the ID signal of the remotely controllable device from the at least one received device ID signal, extracts the control command information for remote control of the device based on the detected ID signal, and performs a control operation based on the extracted control command information to display the remote control object for remote control of the device.

3. The mobile terminal according to claim 2, wherein the ID signal comprises an infrared ID signal,
wherein, when at least one infrared ID is received, the mobile terminal captures the at least one infrared image from the received at least one infrared ID signal.

4. The mobile terminal according to claim 3, wherein the controller detects an infrared pattern positioned in a most central area as a representative infrared pattern based on the at least one captured infrared image and identifies the paired device based on the detected representative infrared pattern.

5. The mobile terminal according to claim 3, wherein, when the reception unit receives a level variation-based infrared ID signal or a duty variation-based infrared ID signal, the controller detects a level variation-based infrared pattern or a duty variation-based infrared pattern based on a plurality of captured IR images, and identifies the paired device based on the detected infrared pattern.

6. The mobile terminal according to claim 3, wherein the controller transmits an infrared output signal to the paired device or the transmission apparatus corresponding to the paired device,
wherein the reception unit detects an infrared pattern reflected by an infrared reflection pattern formed on the paired device or the transmission apparatus corresponding to the paired device in the captured infrared image, and identifies the paired device based on the detected infrared pattern.

7. The mobile terminal according to claim 3, wherein the controller detects an infrared pattern emitted from the paired device or the transmission apparatus corresponding to the paired device in the captured at least one infrared image, and identifies the paired device based on the detected infrared pattern.

8. The mobile terminal according to claim 1, wherein a first ID signal of the at least one ID signal is detected and a first remote control object for remote control of a first device is controlled to be displayed based on the detected first ID signal,
wherein a second ID signal of the at least one ID signal is detected and a second remote control object for remote control of a second device is controlled to be displayed based on the detected second ID signal.

9. The mobile terminal according to claim 8, wherein, when a multi-device operation item in the first remote control object is selected with the first remote control object for remote control of the first device being displayed, the controller performs a control operation to transmit a first remote control signal for remote control of the first device and a second remote control signal for remote control of the second device.

10. The mobile terminal according to claim 8, further comprising:
an audio output unit,
wherein the controller controls a first sound indicating remote control of the first device to be output, based on detection of the first ID signal, and
controls a second sound indicating remote control of the second device to be output, based on detection of the second ID signal.

11. The mobile terminal according to claim 1, further comprising:
a microphone to acquire user voice,
wherein, when the user voice is acquired through the microphone within a predetermined time while identification of the device is completed or the remote control object for remote control of the device is displayed, the controller controls a remote control signal corresponding to the user voice to be transmitted to the device.

12. The mobile terminal according to claim 1, further comprising:
a microphone to acquire a user voice,
wherein the controller extracts device information from the user voice by performing signal processing on the acquired user voice, and controls a remote control object for remote control of a device corresponding to the extracted device information to be displayed.

13. The mobile terminal according to claim 1, wherein the controller receives, from the device or the transmission apparatus corresponding to the device, device control command information for controlling the device and controls the remote control object for remote control of the device to be displayed, based on the received device control command information.

14. The mobile terminal according to claim 13, wherein, after identifying the device based on the detected device ID signal and transmitting information about the identified device to the device or the transmission apparatus corresponding to the device, the controller receives, from the device or the transmission apparatus corresponding to the device, the device control command information for controlling the device and controls the remote control object for remote control of the device to be displayed, based on the received device control command information.

15. The mobile terminal according to claim 13, wherein, after transmitting a device control command request to the device or the transmission apparatus corresponding to the device, the controller receives, from the device or the transmission apparatus corresponding to the device, the device control command information for controlling the device and controls the remote control object for remote control of the device to be displayed, based on the received device control command information.

16. The mobile terminal according to claim 1, wherein, after transmitting a device control command request to a gateway or a server, the controller receives, from the gateway or the server, device control command information for controlling the device and controls the remote control object for remote control of the device to be displayed, based on the received device control command information, wherein the device control command request is transmitted to the gateway or the server together with information for identifying the device.

17. The mobile terminal according to claim 1, wherein the controller receives device control command information for remote control of at least one device from a gateway or a server, based on control command profile information stored in a storage unit.

18. The mobile terminal according to claim 1, further comprising:
a fingerprint recognition unit,
wherein the controller performs user authentication based on an image captured by the fingerprint recognition unit and performs a control operation to enable the remote control of the device when the user authentication is successful.

19. The mobile terminal according to claim 1, wherein the controller controls a plurality of control commands to be matched with a first item in the remote control object,
wherein the controller controls a remote control signal corresponding to a control command among the plurality of control commands to be transmitted to the device according to a number of times of selection of the first item, a time for selection of the first item, a gesture made in selecting the first item, or a user voice input in selecting the first item.

20. The mobile terminal according to claim 1, wherein, when there is no input for a predetermined item in the remote control object within a predetermined time, the controller performs a control operation to enter a standby mode,
wherein, when the standby mode is terminated, the controller initializes the remote control object.

* * * * *